(12) United States Patent
Gass

(10) Patent No.: US 10,071,499 B2
(45) Date of Patent: Sep. 11, 2018

(54) SAFETY SYSTEMS FOR POWER EQUIPMENT

(71) Applicant: SawStop Holding LLC, Tualatin, OR (US)

(72) Inventor: Stephen F. Gass, West Linn, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 15/670,374

(22) Filed: Aug. 7, 2017

(65) Prior Publication Data
US 2017/0334087 A1   Nov. 23, 2017

Related U.S. Application Data

(63) Continuation of application No. 10/100,211, filed on Mar. 13, 2002, now Pat. No. 9,724,840.
(Continued)

(51) Int. Cl.
*B27B 13/16* (2006.01)
*B23D 29/00* (2006.01)
(Continued)

(52) U.S. Cl.
CPC ............ *B27B 13/16* (2013.01); *B23D 59/001* (2013.01); *B27B 5/38* (2013.01); *B27B 13/14* (2013.01); *B27G 19/00* (2013.01); *B27G 19/02* (2013.01); *B27G 21/00* (2013.01); *F16P 3/12* (2013.01); *F16P 3/144* (2013.01); *F16P 3/145* (2013.01);
(Continued)

(58) Field of Classification Search
CPC .. B23D 45/048; B23D 47/025; B23D 56/003; B23D 45/024; B23D 59/001; B27B 5/29; B27B 13/16; B27B 5/38; B27B 13/14; B27D 47/02; Y10T 83/8773; Y10T 83/855; Y10T 83/7684; Y10T 83/7726; F16P 3/8148; F16P 3/12; F16P 3/147; G05B 19/4061; B27G 19/00; B27G 19/02; B27G 21/00
USPC ..... 83/477.1, 397.1, DIG. 1, 581, 666, 62.1, 83/72, 471.3, 62, 473, 488, 490, 58, 76.7, 83/481, 471.2, 478, 487, 489, 574, 821, 83/823, 828, 954, 665, 522, 11, 22, 544, 83/476, 491, 526, 76.8, 546
See application file for complete search history.

(56) References Cited

U.S. PATENT DOCUMENTS 3,547,232 A * 12/1970 Fergle .................... F16D 49/00
188/110
3,785,230 A * 1/1974 Lokey ................ B23Q 11/0092
192/129 A
(Continued)

*Primary Examiner* — Ghassem Alie

(57) ABSTRACT

Machines with safety systems are disclosed. The machine may take the form of woodworking machines including table saws, band saws, miter saws, hand-held circular saws, pneumatic chop saws, radial-arm saws, jointers, planars, routers and shapers. The machines may include an operative structure configured to perform a task, where the operative structure includes a cutting tool adapted to move in at least one motion, and a safety system adapted to detect the occurrence of an unsafe condition between a person and the cutting tool and for mitigating the unsafe condition. The safety system may include a detection subsystem and a reaction subsystem. The machine may also include a bypass or override mode where in an injury mitigation system is disabled for certain cuts.

12 Claims, 96 Drawing Sheets

Related U.S. Application Data

(60) Provisional application No. 60/275,583, filed on Mar. 13, 2001.

(51) Int. Cl.
| | |
|---|---|
| *B27B 5/38* | (2006.01) |
| *B27B 13/14* | (2006.01) |
| *B27G 19/02* | (2006.01) |
| *F16P 3/12* | (2006.01) |
| *F16P 3/14* | (2006.01) |
| *G05B 19/4061* | (2006.01) |
| *B27G 21/00* | (2006.01) |
| *B27G 19/00* | (2006.01) |
| *B23D 59/00* | (2006.01) |
| *F16D 127/00* | (2012.01) |

(52) U.S. Cl.
CPC ............... *F16P 3/147* (2013.01); *F16P 3/148* (2013.01); *G05B 19/4061* (2013.01); *F16D 2127/008* (2013.01); *G05B 2219/45044* (2013.01); *G05B 2219/49141* (2013.01); *G05B 2219/49159* (2013.01); *Y10T 83/089* (2015.04); *Y10T 83/704* (2015.04)

(56) References Cited

U.S. PATENT DOCUMENTS

| | | | | |
|---|---|---|---|---|
| 4,117,752 A * | 10/1978 | Yoneda | ............... | B23D 59/001 |
| | | | | 192/129 A |
| 5,081,406 A * | 1/1992 | Hughes | ............... | B23D 59/005 |
| | | | | 318/478 |
| 6,227,563 B1 * | 5/2001 | Talisman | ............... | B60N 2/002 |
| | | | | 280/735 |

* cited by examiner

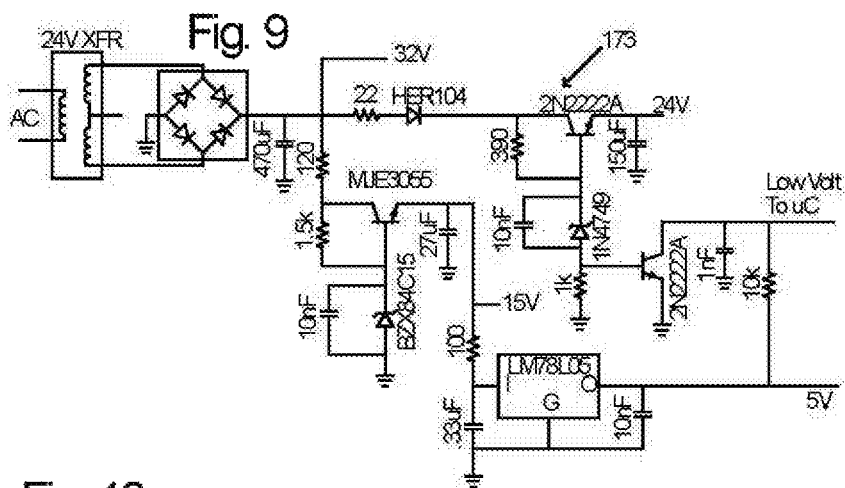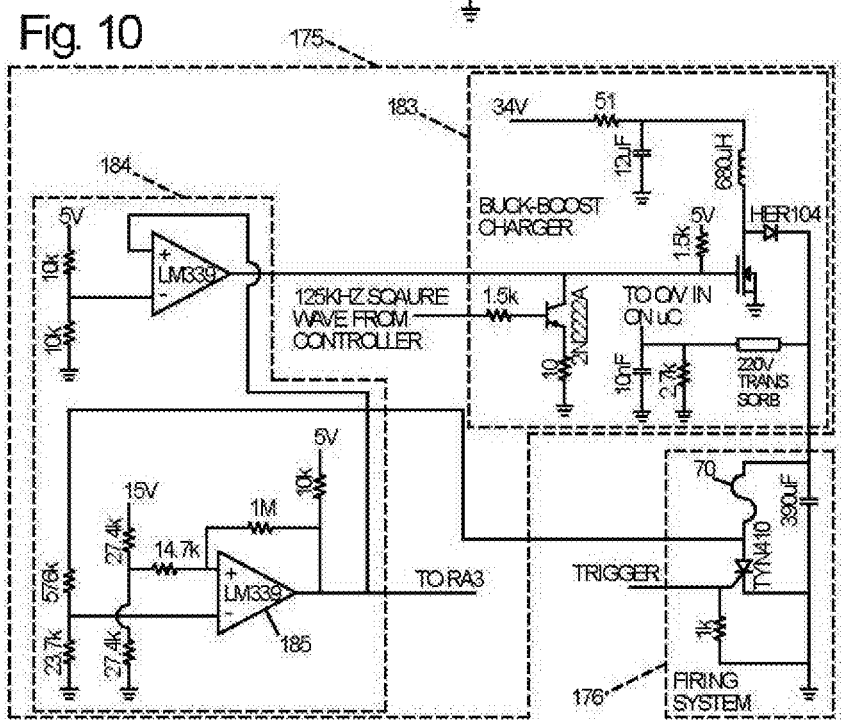

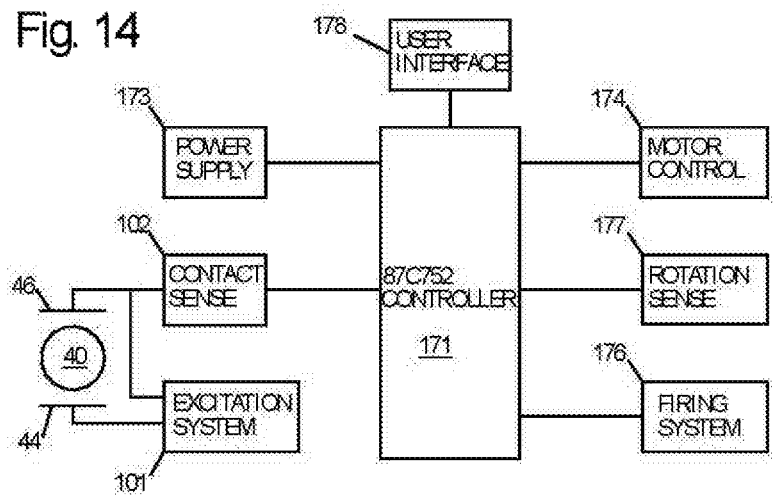
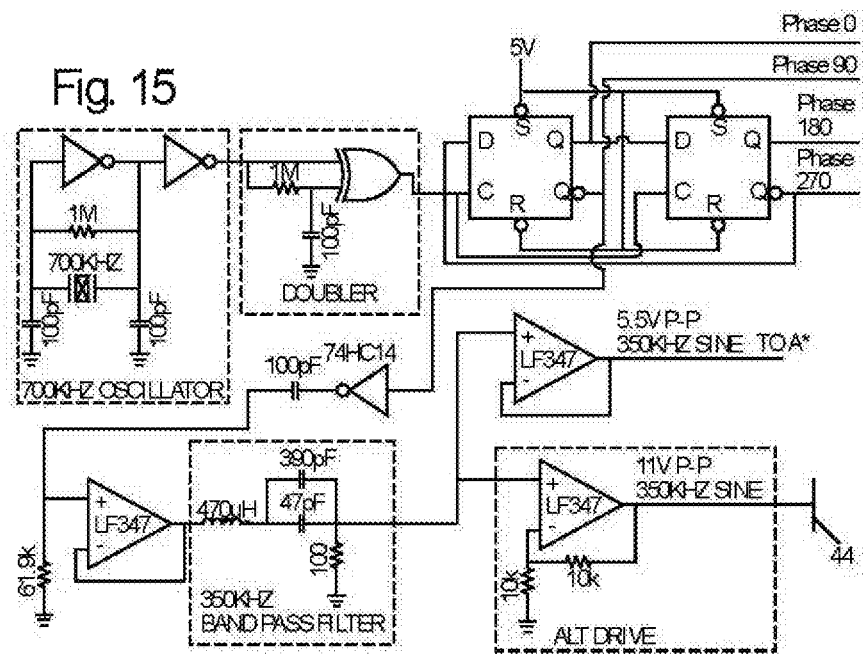

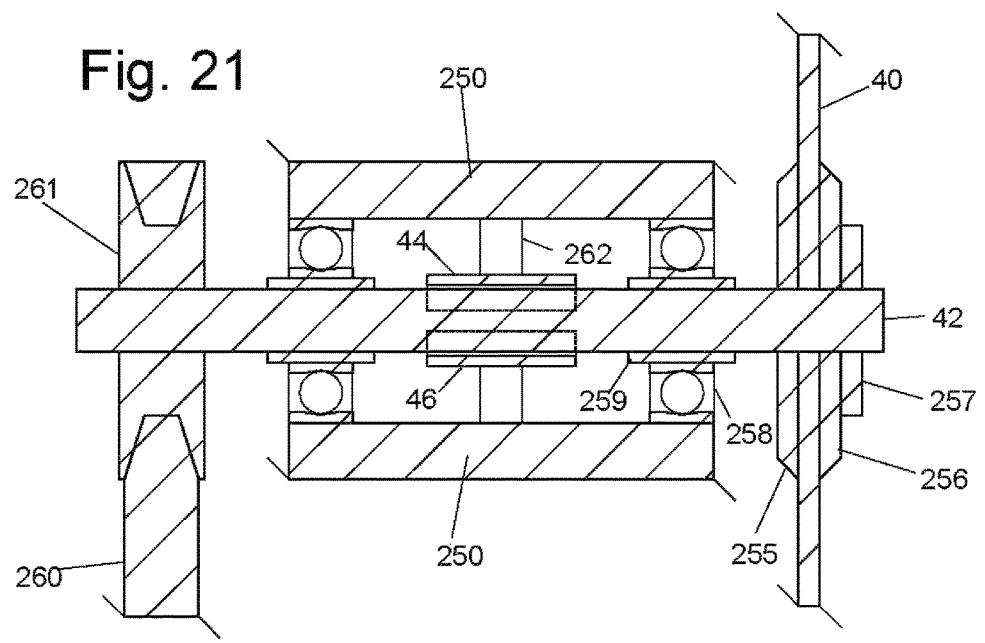
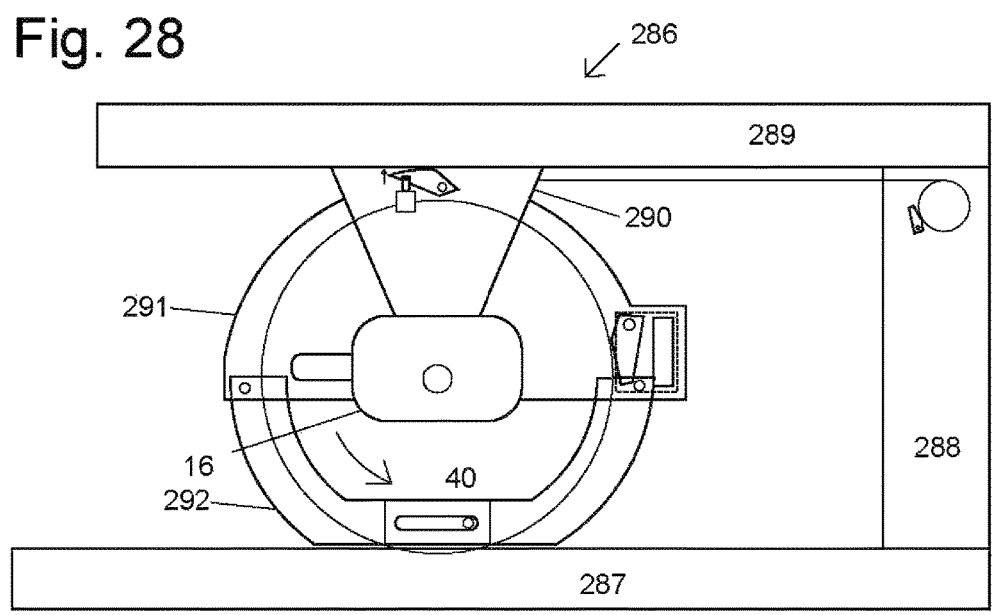

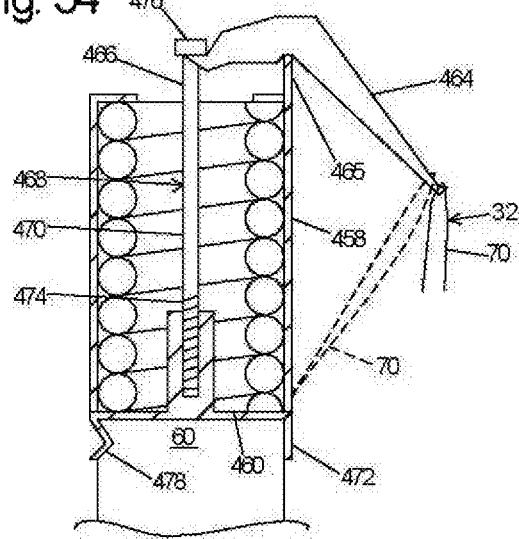
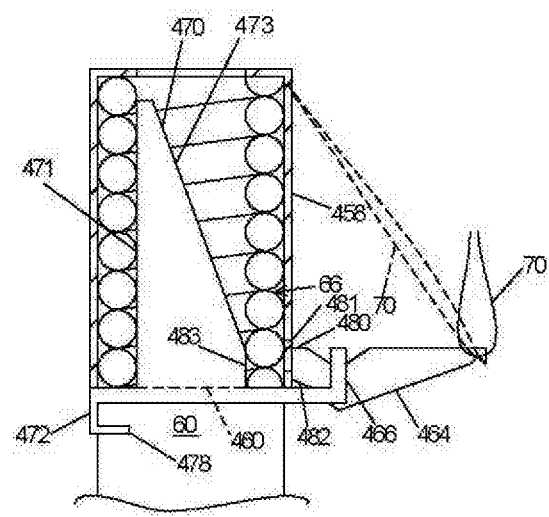

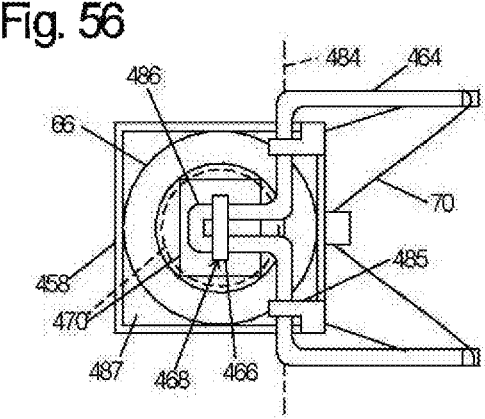
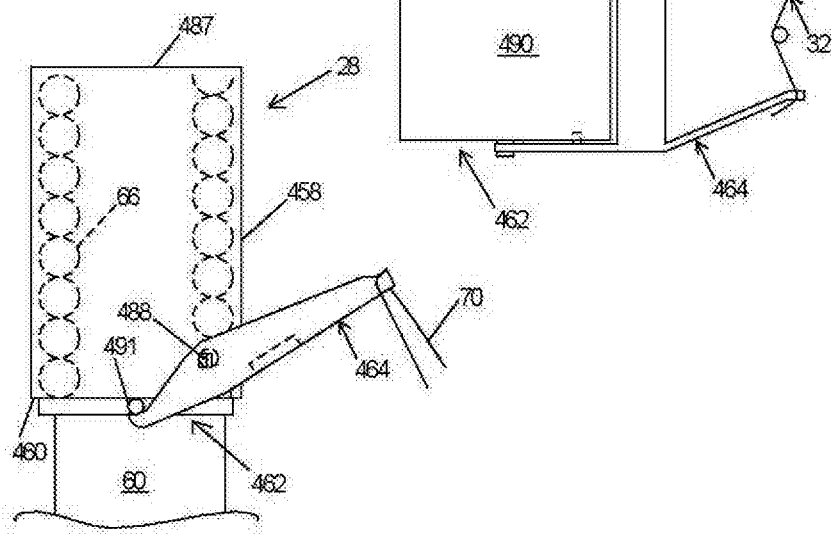

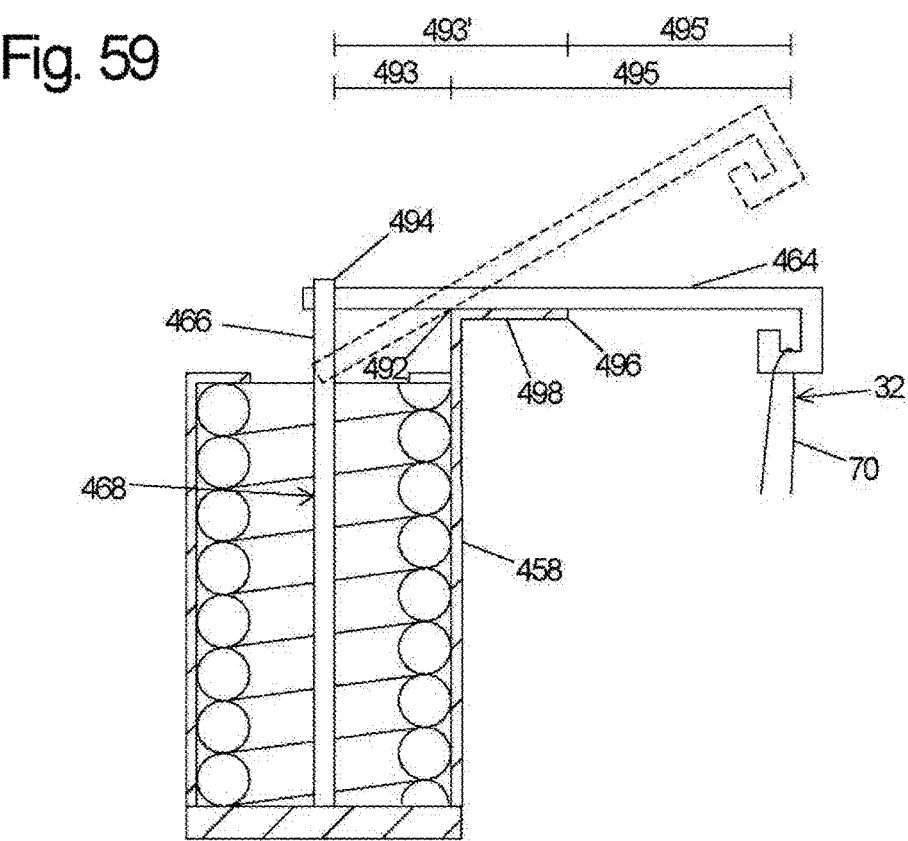

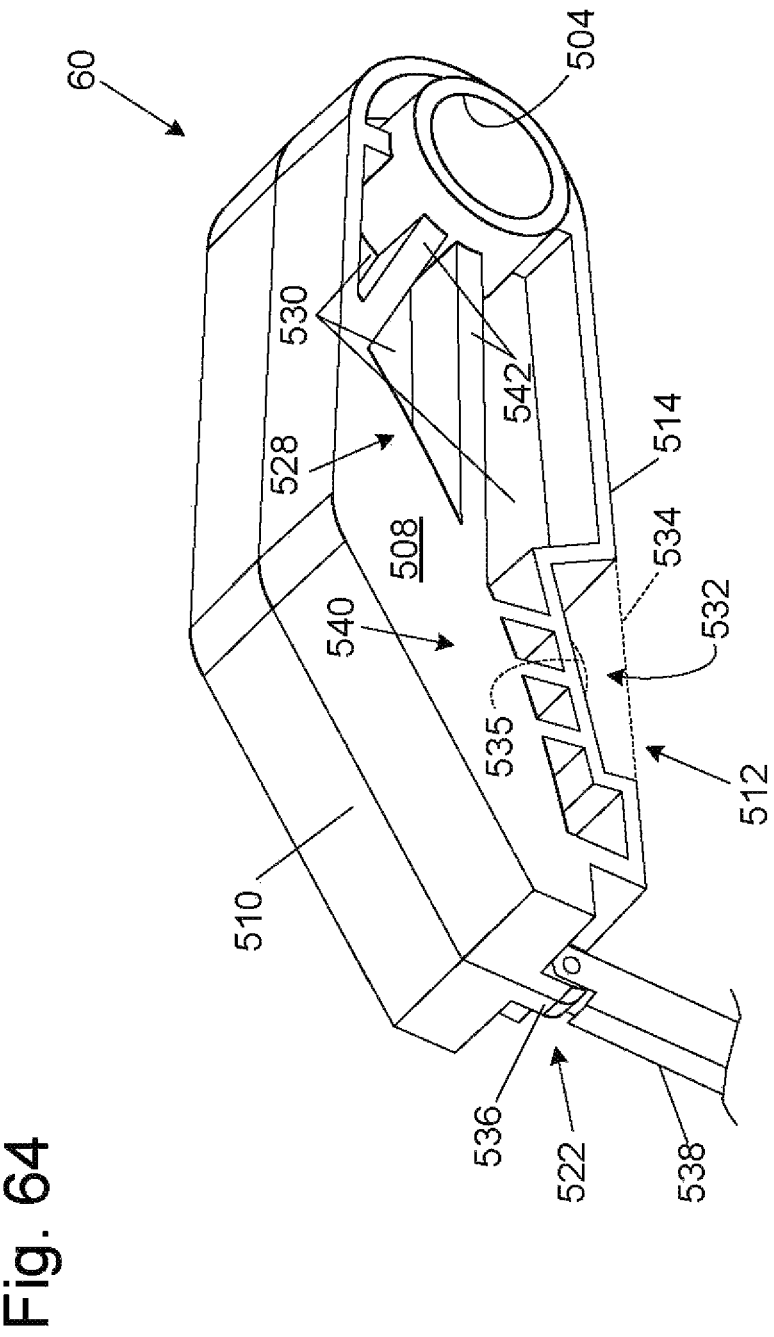

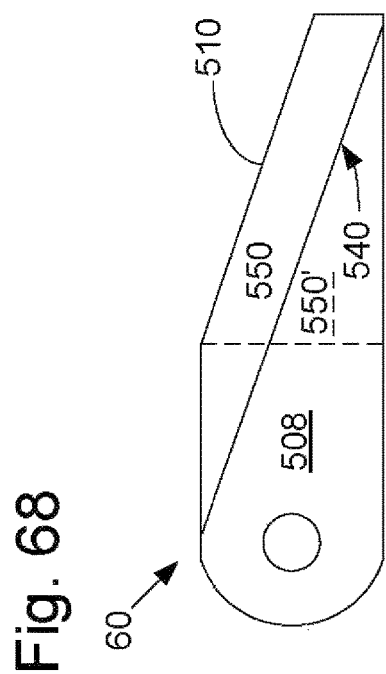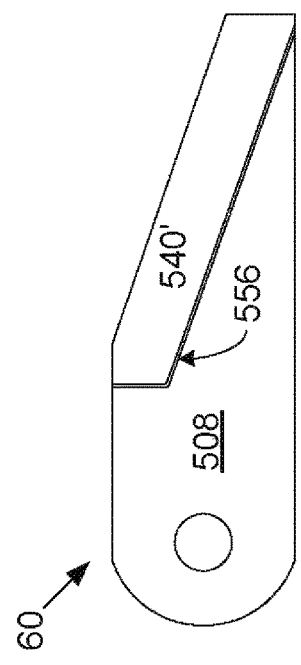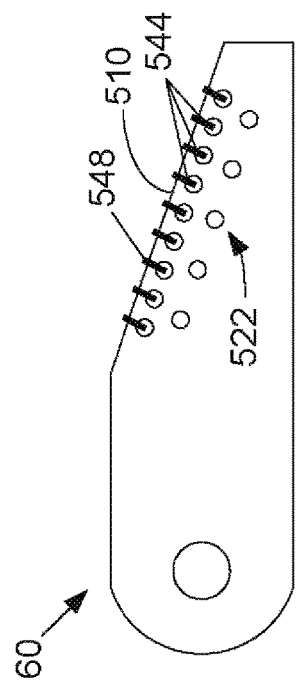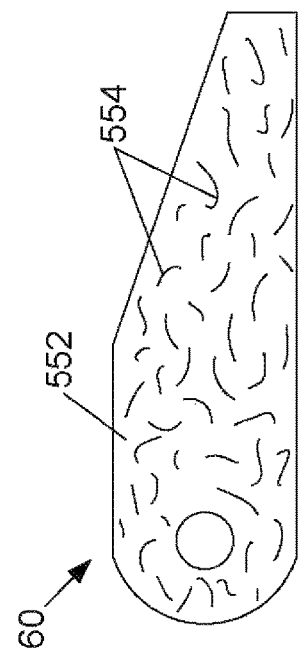

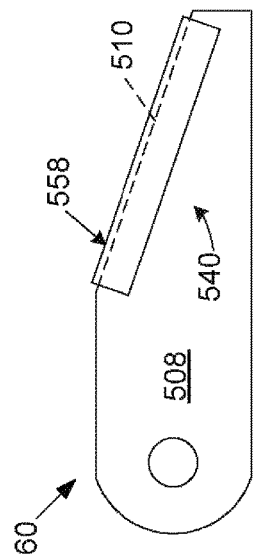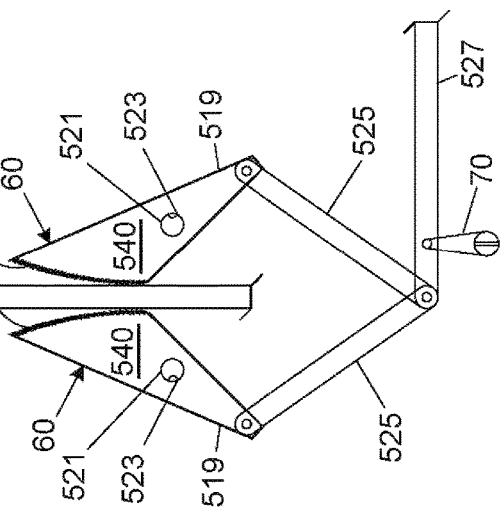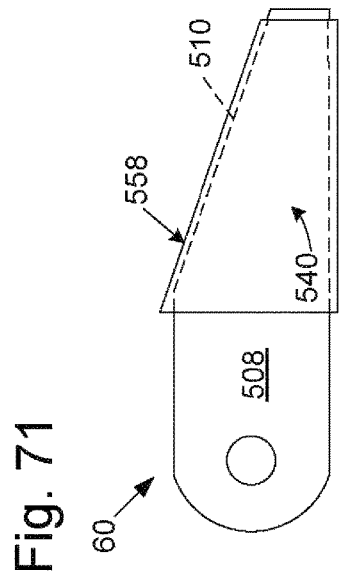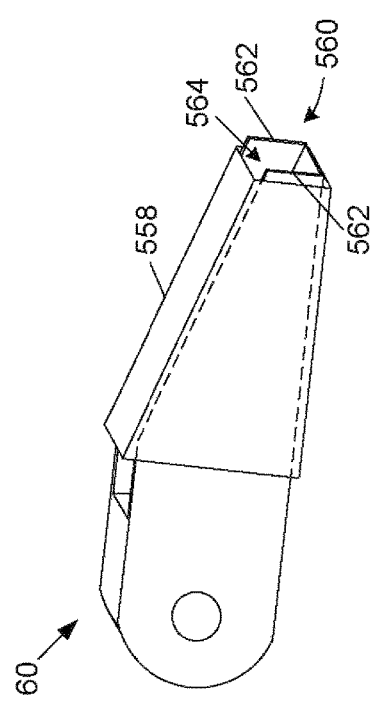

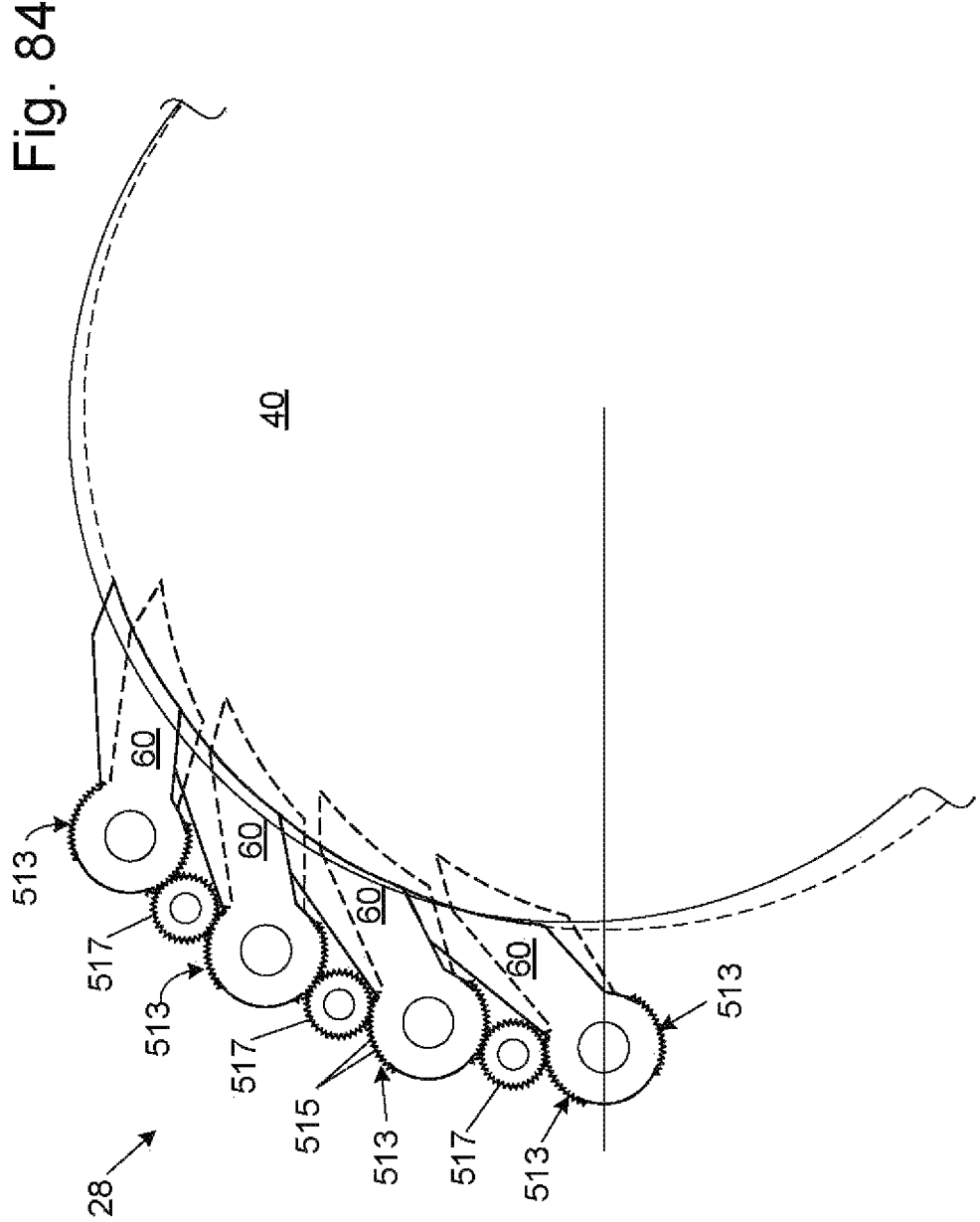

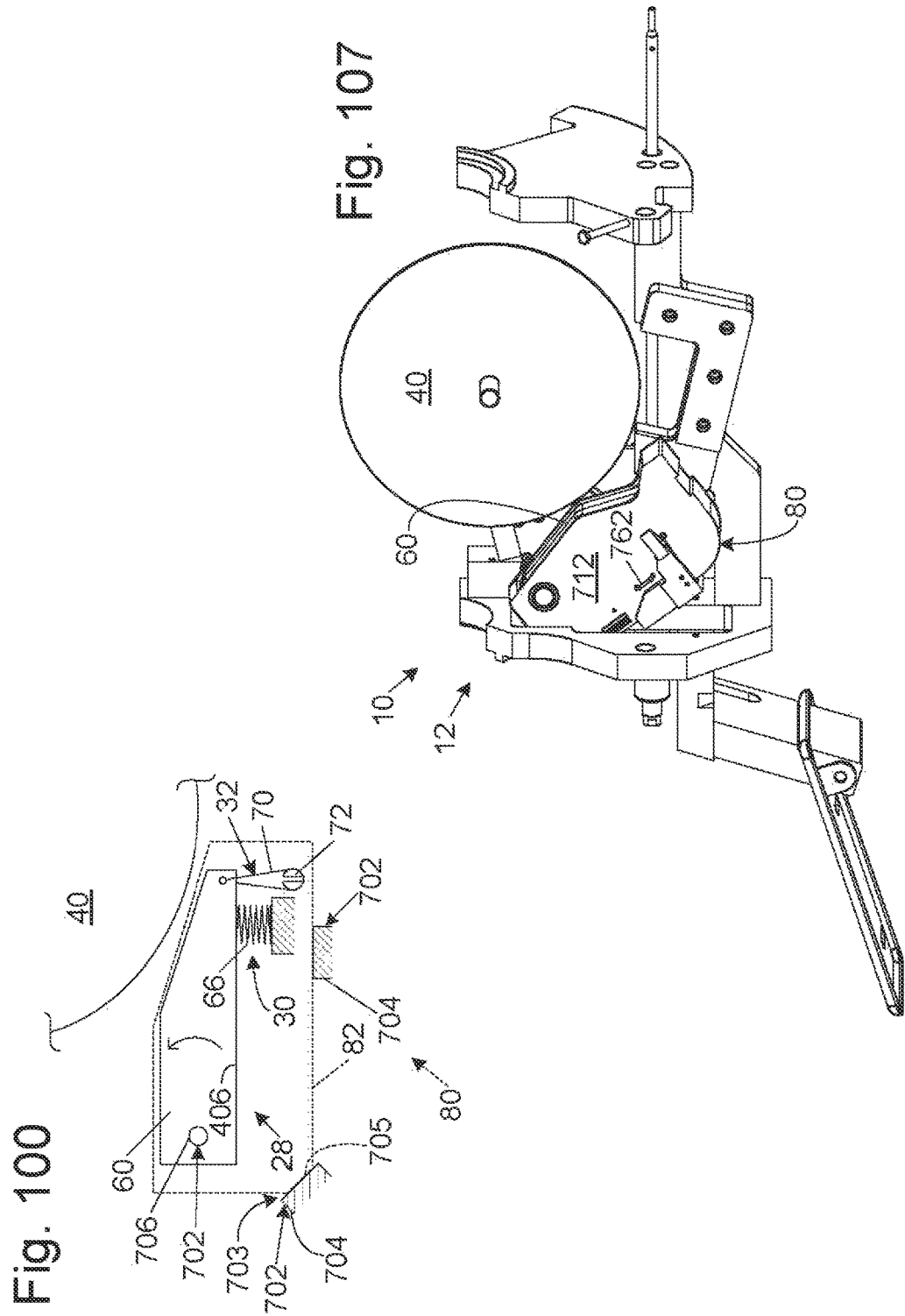

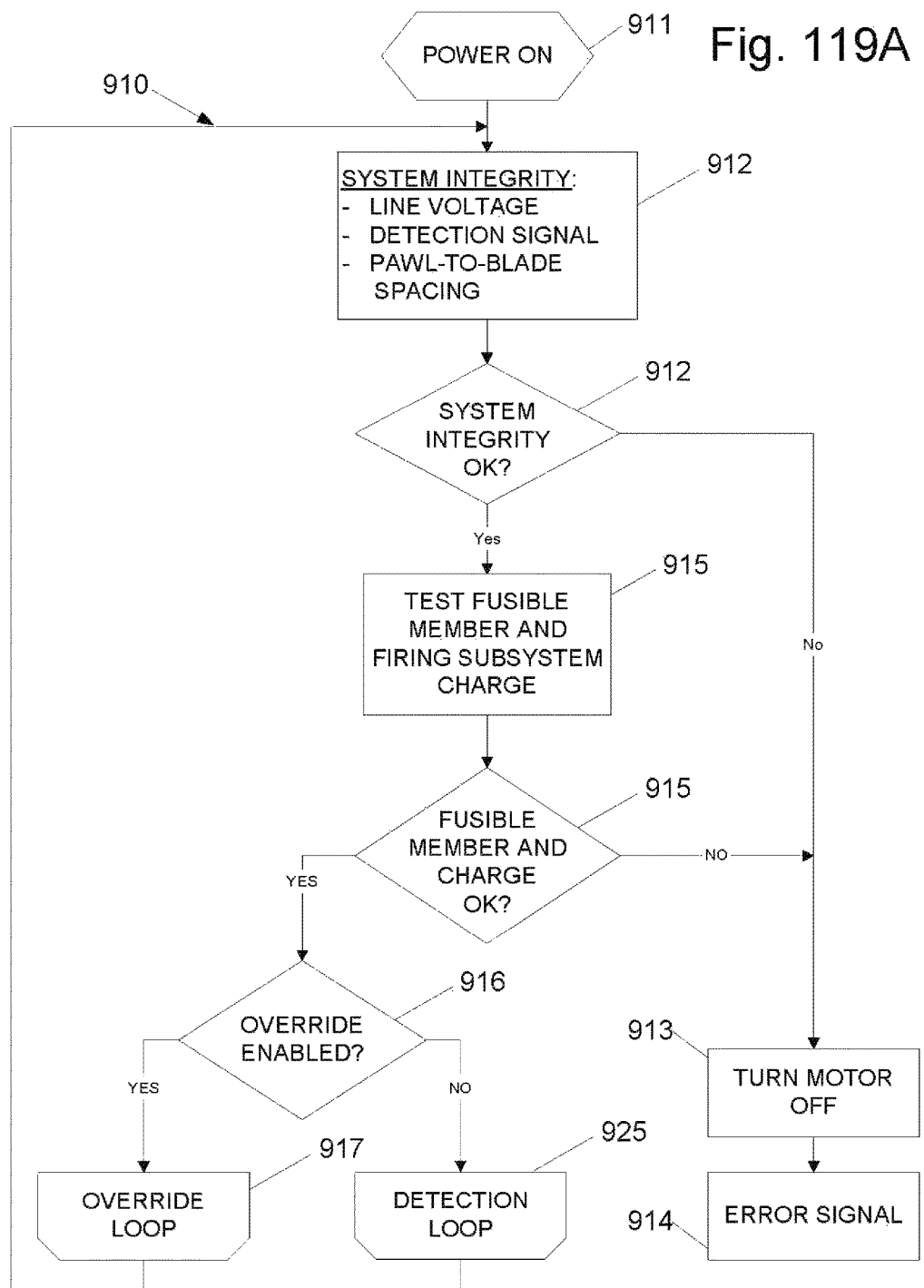

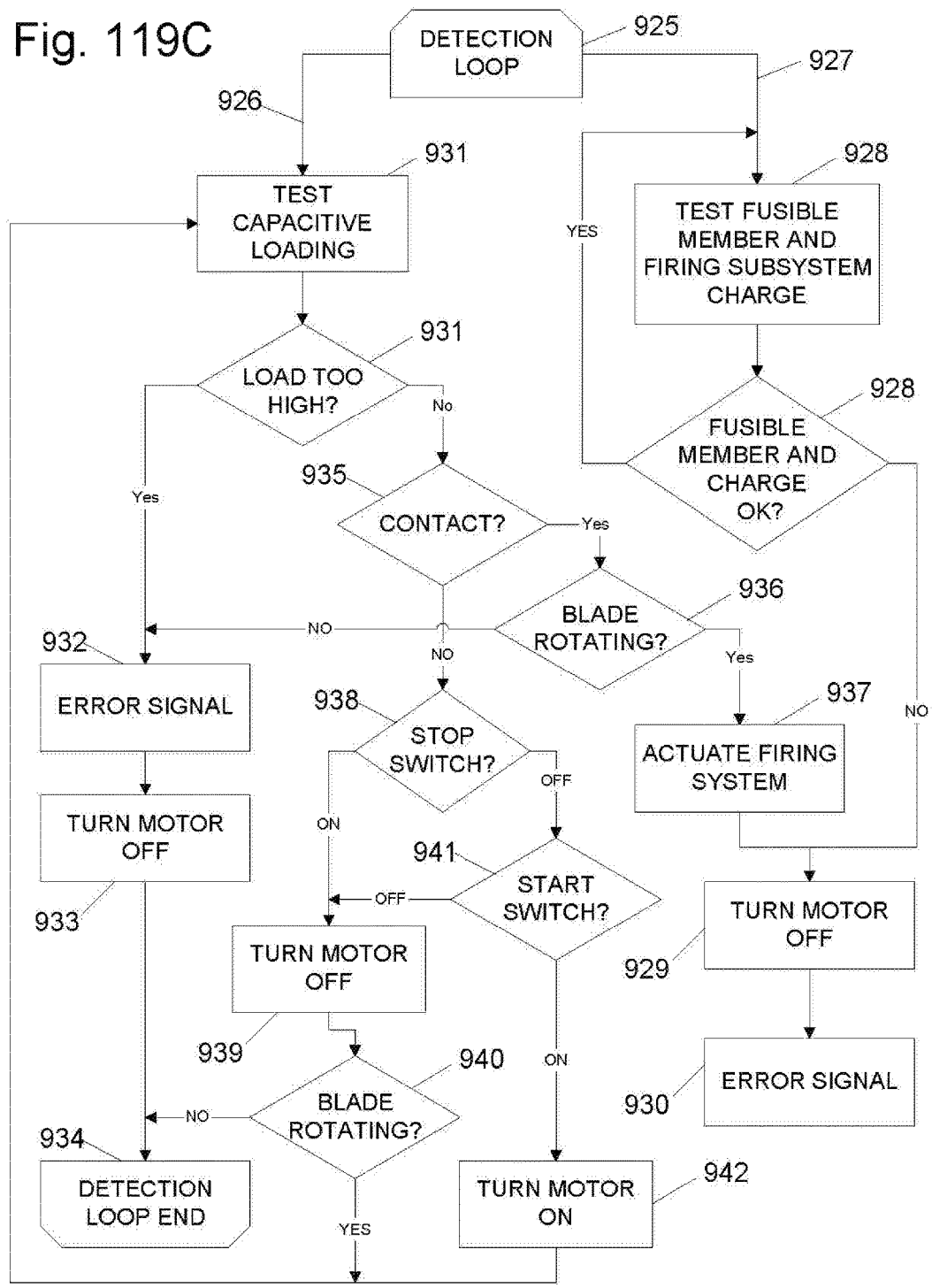

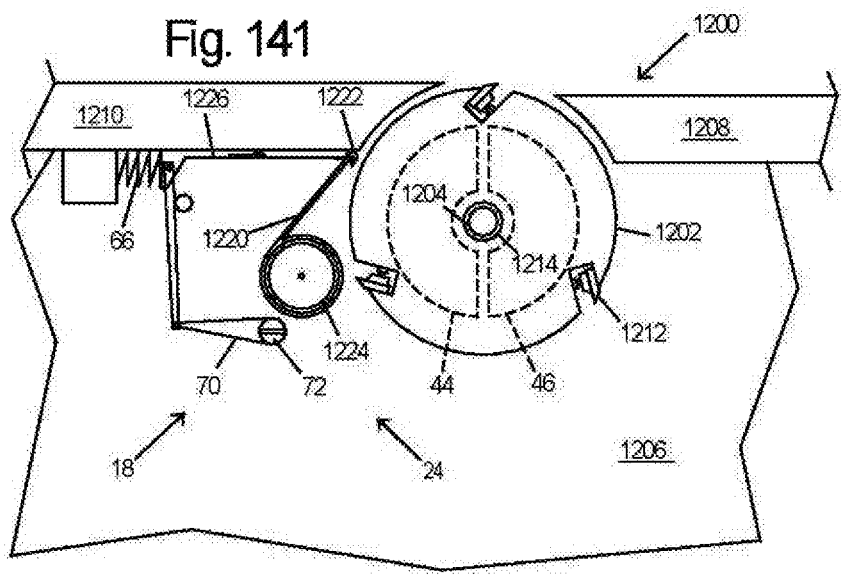
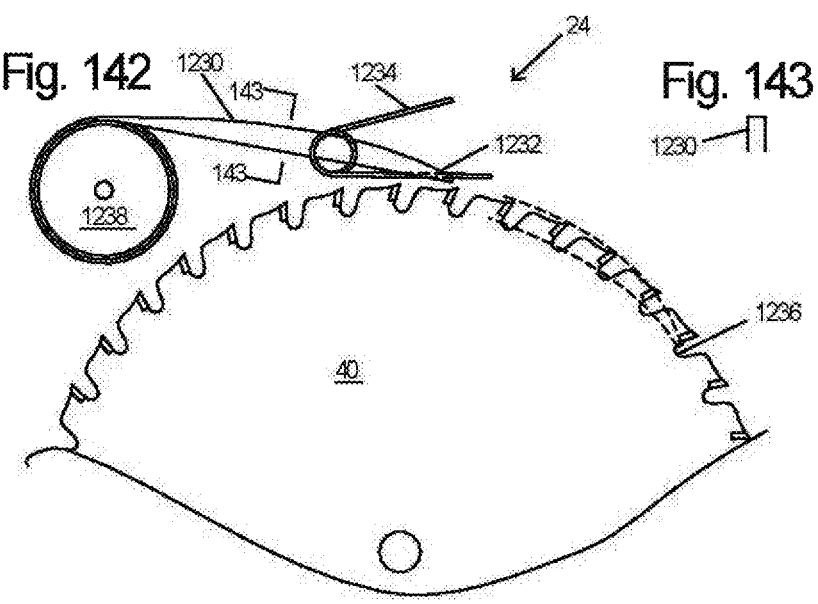

SAFETY SYSTEMS FOR POWER EQUIPMENT

CROSS-REFERENCE TO RELATED APPLICATIONS

This application is a continuation of U.S. patent application Ser. No. 10/100,211, filed Mar. 13, 2002, which claims the benefit of and priority from U.S. Provisional Patent Application Ser. No. 60/275,583, filed Mar. 13, 2001, both of which are hereby incorporated by reference.

This application hereby incorporates by reference the following U.S. patent application Ser. No. 09/676,190, filed Sep. 29, 2000. This application also hereby incorporates by reference the following PCT patent application: PCT/US00/26812, filed Sep. 29, 2000. This application further incorporates by reference the following U.S. provisional patent applications: Ser. No. 60/157,340, filed Oct. 1, 1999; Ser. No. 60/182,866, filed Feb. 16, 2000; Ser. No. 60/225,056, filed Aug. 14, 2000; Ser. No. 60/225,057, filed Aug. 14, 2000; Ser. No. 60/225,058, filed Aug. 14, 2000; Ser. No. 60/225,059, filed Aug. 14, 2000; Ser. No. 60/225,089, filed Aug. 14, 2000; Ser. No. 60/225,094, filed Aug. 14, 2000; Ser. No. 60/225,169, filed Aug. 14, 2000; Ser. No. 60/225,170, filed Aug. 14, 2000; Ser. No. 60/225,200, filed Aug. 14, 2000; Ser. No. 60/225,201, filed Aug. 14, 2000; Ser. No. 60/225,206, filed Aug. 14, 2000; Ser. No. 60/225,210, filed Aug. 14, 2000; Ser. No. 60/225,211, filed Aug. 14, 2000; Ser. No. 60/225,212, filed Aug. 14, 2000; Ser. No. 60/233,459, filed Sep. 18, 2000; Ser. No. 60/270,011, filed Feb. 20, 2001; Ser. No. 60/270,941, filed Feb. 22, 2001; Ser. No. 60/270,942, filed Feb. 22, 2001; Ser. No. 60/273,177, filed Mar. 2, 2001; Ser. No. 60/273,178, filed Mar. 2, 2001; Ser. No. 60/273,902, filed Mar. 6, 2001; Ser. No. 60/275,594, filed Mar. 13, 2001; and Ser. No. 60/275,595, filed Mar. 13, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The computer program listing identified herein is subject to copyright protection.

COMPUTER PROGRAM LISTING APPENDIX

A computer program listing is being submitted herewith via EFS-Web as a Computer Program Listing Appendix. The computer program listing is one ASCII text file entitled "sawbrk.txt". The date of creation of the file is Jun. 29, 2000, and the size of the file is 50602 bytes. That computer program listing (i.e., the "sawbrk.txt" ASCII text file) is hereby incorporated by reference.

FIELD

The present disclosure relates to safety systems and more particularly to high-speed safety systems for use on power equipment.

BACKGROUND

Beginning with the industrial revolution and continuing to the present, mechanized equipment has allowed workers to produce goods with greater speed and less effort than possible with manually-powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. For instance, U.S. Pat. Nos. 941,726, 2,978,084, 3,011,610, 3,047,116, 4,195,722 and 4,321,841, all disclose safety systems for use with power presses. These systems utilize cables attached to the wrists of the operator that either pull back a user's hands from the work zone upon operation or prevent operation until the user's hands are outside the danger zone. U.S. Pat. Nos. 3,953,770, 4,075,961, 4,470,046, 4,532,501 and 5,212,621, disclose radio-frequency safety systems which utilize radio-frequency signals to detect the presence of a user's hand in a dangerous area of the machine and thereupon prevent or interrupt operation of the machine.

U.S. Pat. Nos. 4,959,909, 5,025,175, 5,122,091, 5,198,702, 5,201,684, 5,272,946, and 5,510,685 disclose safety systems for use with meat-skinning equipment. These systems interrupt or reverse power to the motor or disengage a clutch upon contact with a user's hand by any dangerous portion of the machine. Typically, contact between the user and the machine is detected by monitoring for electrical contact between a fine wire mesh in a glove worn by the user and some metal component in the dangerous area of the machine. Although such systems are suitable for use with meat skinning machines, they are relatively slow to stop the motion of the cutting element because they rely on the operation of solenoids or must overcome the inertia of the motor. However, because these systems operate at relatively low speeds, the blade does not need to be stopped rapidly to prevent serious injury to the user.

U.S. Pat. Nos. 3,785,230 and 4,026,177, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid. U.S. Pat. No. 4,117,752 discloses a similar braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

None of these existing systems have operated with sufficient speed and/or reliability to prevent serious injury with many types of commonly used power tools. Although proximity-type sensors can be used with some equipment to increase the time available to stop the moving pieces, in many cases the user's hands must be brought into relatively close proximity to the cutting element in the normal course of operation. For example, many types of woodworking equipment require that the user's hands pass relatively close to the cutting tools. As a result, existing proximity-type sensors, which are relatively imprecise, have not proven effective with this type of equipment. Even where proximity sensors are practical, existing brake systems have not operated quickly enough to prevent serious injury in many cases.

In equipment where proximity-type detection systems have not proven effective, the cutting tool must stop very quickly in the event of user contact to avoid serious injury. By way of example, a user may feed a piece of wood through a table saw at a rate of approximately one foot per second. Assuming an average reaction time of approximately one-tenth of a second, the hand may have moved well over an inch before the user even detects the contact. This distance is more than sufficient to result in the loss of several digits, severing of vital vessels and tendons, or even complete severing of a hand. If a brake is triggered immediately upon contact between the user's body and the saw's blade, the blade must be stopped within approximately one-hundredth of a second to limit the depth of injury to about one-eighth of an inch. Standard solenoids or other electromagnetic devices are generally not designed to act in this time scale, particularly where significant force must be generated. For instance, in the case of solenoids or electromagnetic brakes that operate on 60 hz electrical power, it is possible that the power line will be at a phase that has low voltage at the time the brake is triggered and several milliseconds may elapse before the voltage reaches a sufficient level even to begin physical displacement of the brake, much less achieve a complete stoppage of the blade or cutting tool.

BRIEF DISCLOSURE

Safety systems for power equipment are disclosed. The safety systems include a detection system adapted to detect a dangerous condition between a person and a working portion of a machine, such as accidental contact with the working portion, and a reaction system associated with the detection system to cause a predetermined action to take place relative to the working portion upon detection of the dangerous condition by the detection system. The detection system may be adapted to capacitively impart an electric charge on the working portion and to detect when that charge drops. The reaction system may be a brake system to stop the working portion, a retraction system to retract the working portion, a system to cover the working portion, or some other system. The safety systems include other features and elements, as disclosed.

Machines equipped with safety systems are also disclosed, such as saws, jointers, and other woodworking machines. The machines include a working portion, such as a cutter or blade, a detection system adapted to detect a dangerous condition between a person and the working portion, and a reaction system associated with the detection system to cause a predetermined action to take place upon detection of the dangerous condition, such as a brake system to stop the working portion, a retraction system to retract the working portion, or a system to cover the working portion. The machines may include a control system adapted to control the operability of one or more of the working portion, the detection system and the reaction system. The machines include other features and elements, as disclosed.

BRIEF DESCRIPTION OF THE DRAWINGS

FIG. 9 is a schematic of a power supply of the subsystem of FIG. 5.

FIG. 10 is a schematic of a boost regulator portion and a firing portion of the subsystem of FIG. 5.

FIG. 14 is a block diagram of second and third alternative electronic subsystems.

FIG. 15 is a schematic of an excitation system portion of the subsystems of FIG. 14.

FIG. 21 is a schematic cross-sectional view of another exemplary embodiment in which the arbor is electrically insulated from the arbor block and the charge plates are capacitively coupled to the arbor.

FIG. 28 is a side elevation of another embodiment in which contact with a guard is detected in the context of a radial arm saw.

FIG. 54 is a cross-sectional side elevation view of another spring-biased brake mechanism.

FIG. 55 is a cross-sectional side elevation view of another spring-biased brake mechanism.

FIG. 56 is a top plan view of another spring-biased brake mechanism.

FIG. 57 is a side elevation view of another spring-biased brake mechanism.

FIG. 58 is a bottom plan view of the brake mechanism of FIG. 57.

FIG. 59 is a side elevation view of another spring-biased brake mechanism.

FIG. 64 is an isometric view of another pawl.

FIG. 67 is a side elevation view of another pawl.

FIG. 68 is a side elevation view of another pawl.

FIG. 69 is a side elevation view of another pawl.

FIG. 70 is a side elevation view of another pawl.

FIG. 71 is a side elevation view of another pawl.

FIG. 72 is a side elevation view of another pawl.

FIG. 73 is a side elevation view of another pawl.

FIG. 84 is a fragmentary side elevation view of another brake mechanism that includes plural pawls.

FIG. 85 is a top plan view of another brake mechanism.

FIG. 100 is a fragmentary side elevation view of a safety system having a replaceable brake mechanism housed in a cartridge.

FIG. 107 is an isometric view showing the cartridge of FIG. 106 installed in a machine.

FIGS. 119A-C are flowchart diagrams of an exemplary self-test and operational sequence.

FIG. 120 is a schematic block diagram of a logic controller.

FIG. 121 is a schematic diagram of a user interface.

FIG. 122 is a schematic diagram of a firing capacitor charge and test circuit.

FIG. 123 is a schematic block diagram of a logic controller.

FIG. 124 is a schematic diagram of a firing capacitor charge and test circuit.

FIG. 125 is an isometric view of an exemplary pawl adapted for measuring pawl-to-blade spacing.

FIG. 126 is a schematic diagram of an exemplary circuit for detecting blade-to-pawl spacing.

FIG. 127 is a partial cross-section view of an exemplary magnetic sensor assembly, where the arbor is not in cross-sectional view.

FIG. 128 is a schematic diagram of an exemplary circuit for use with a magnetic sensor assembly.

FIG. 129 is a schematic view of an exemplary EMF sensor assembly.

FIG. 130 is a partial cross-section view of an exemplary optical sensor assembly, where the arbor is not in cross-sectional view.

FIG. 131 is a side elevation of an alternative optical sensor assembly.

Figure 131:
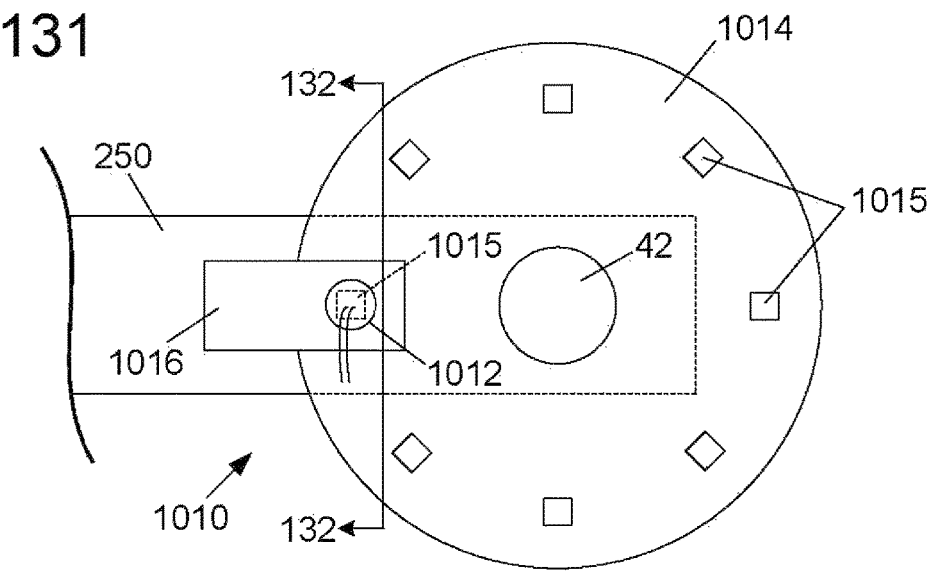
Figure 132:
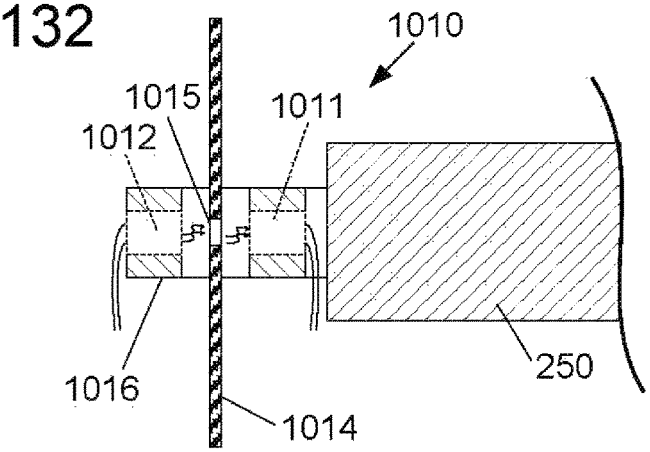

FIG. 132 is a cross-section view of the alternative optical sensor assembly of FIG. 131, taken generally along the line 132-132.

Figure 133:
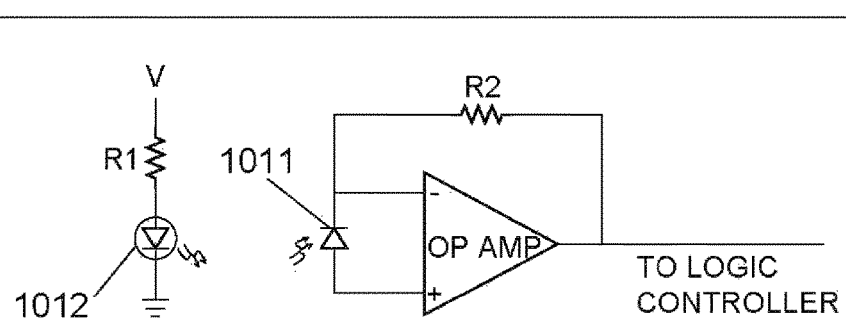

FIG. 133 is a schematic diagram of an exemplary circuit for use with an optical sensor assembly.

Figure 134:
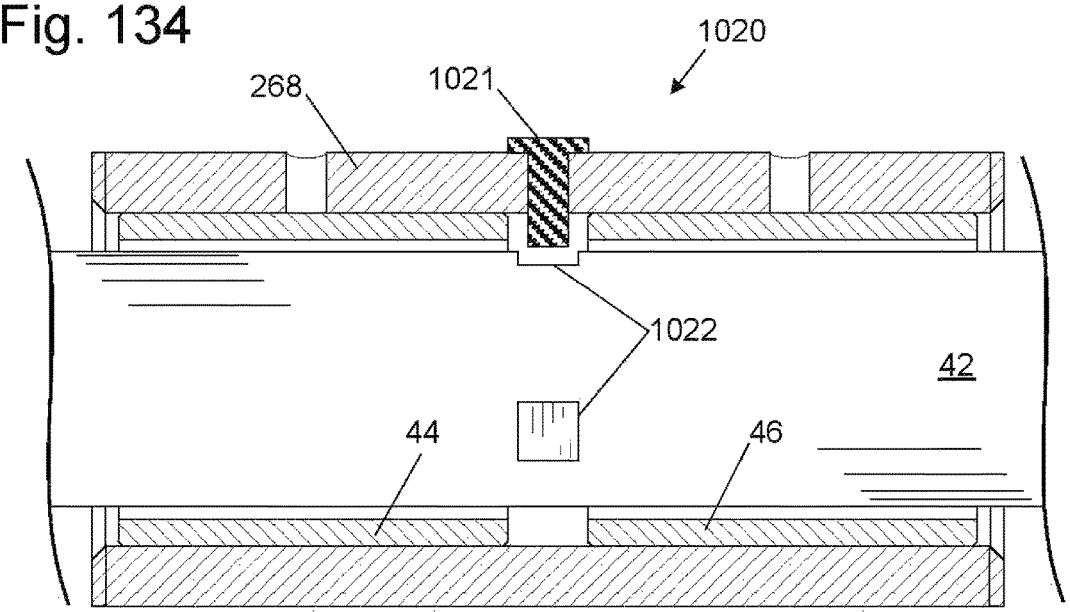

FIG. 134 is a partial cross-section view of an exemplary electrical sensor assembly, where the arbor is not in cross-sectional view.

Figure 135:
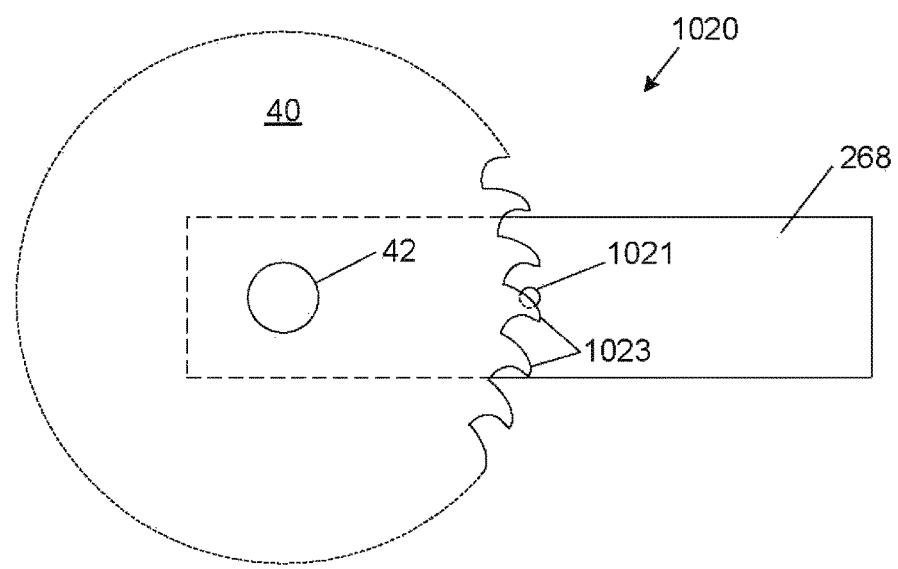

FIG. 135 is a schematic side elevation of an alternative electrical sensor assembly.

Figure 136:
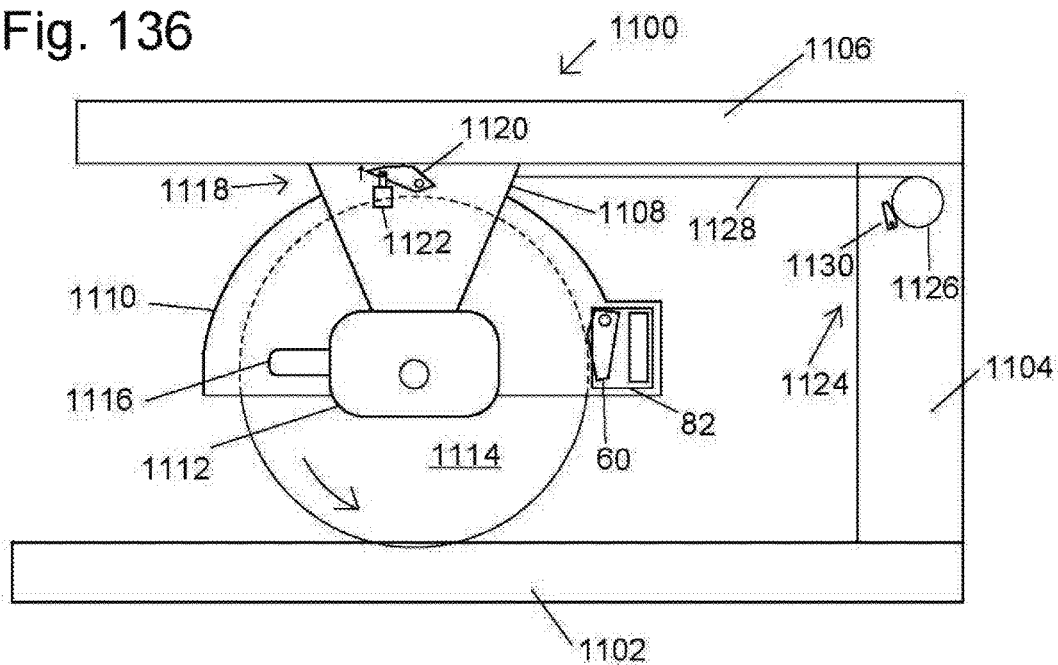

FIG. 136 is a side elevation of a radial arm saw equipped with a safety system.

Figure 137:
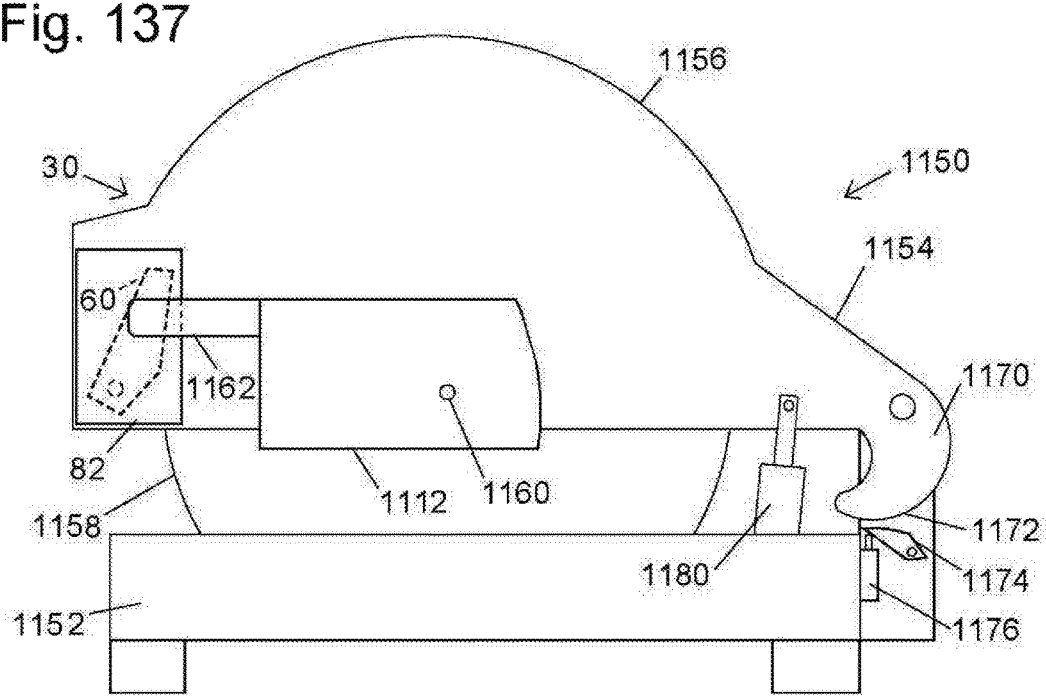

FIG. 137 is a side elevation of a miter saw or chop saw equipped with a safety system.

Figure 138:
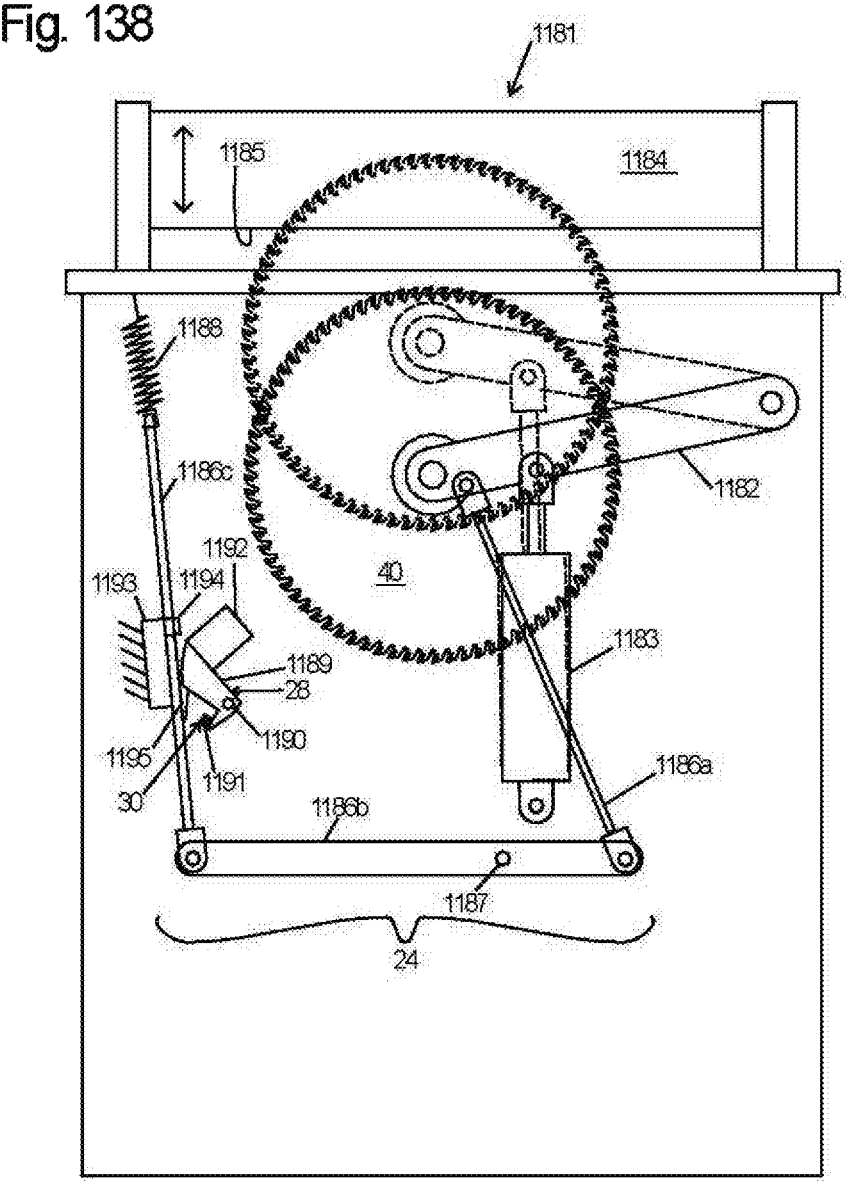

FIG. 138 is a side elevation of a pneumatic cut-off saw equipped with a safety system.

Figure 139:
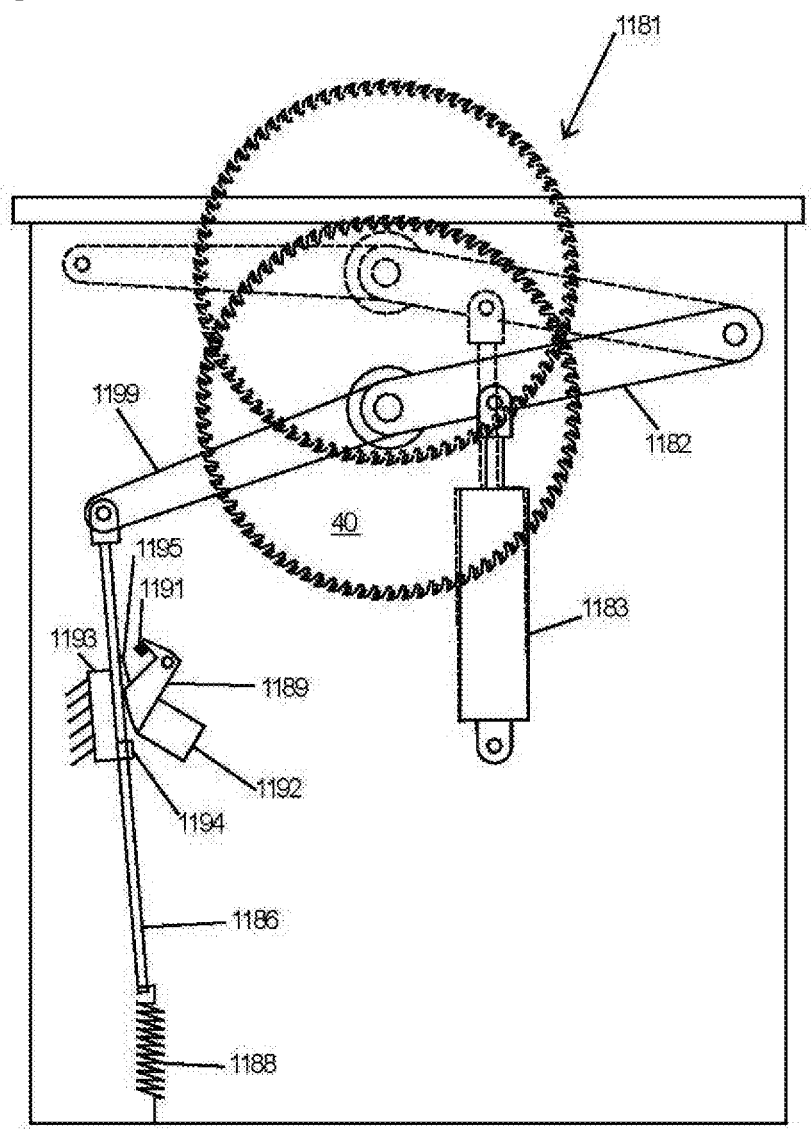

FIG. 139 is a side elevation of a pneumatic cut-off saw equipped with an alternative safety system.

Figure 140:
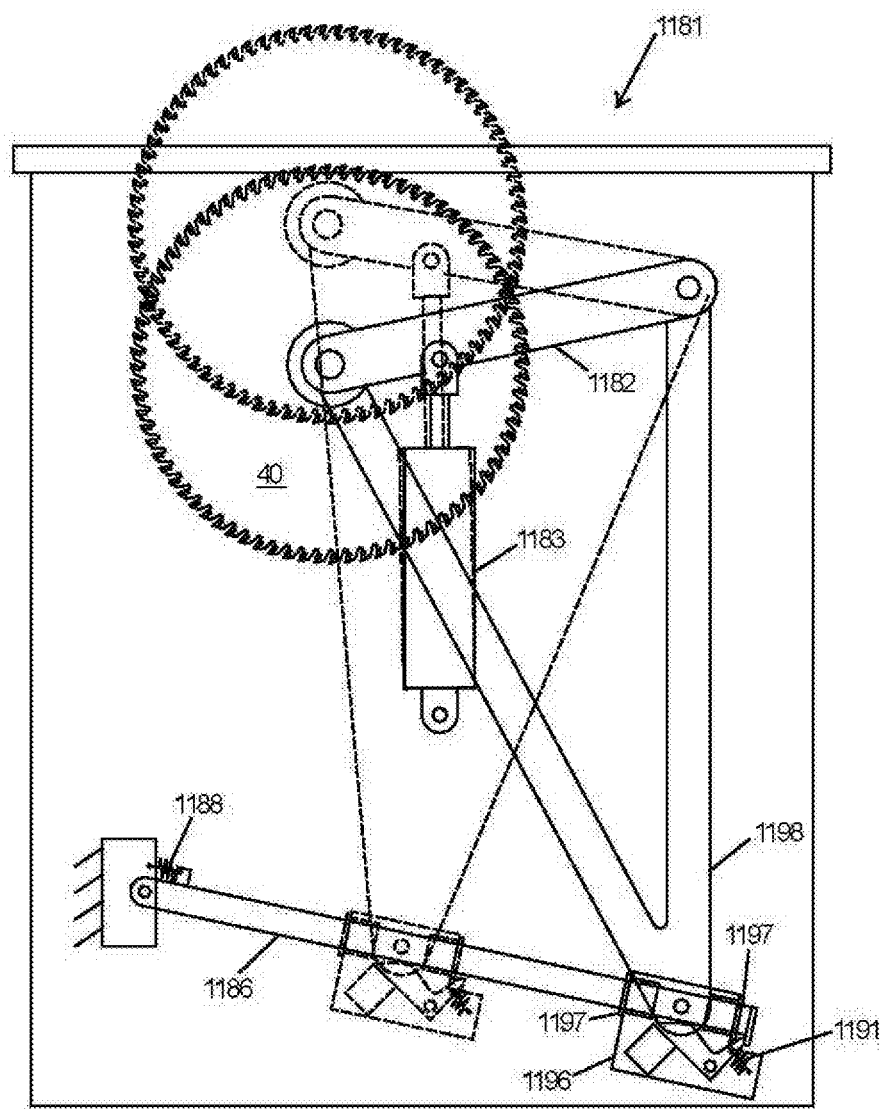

FIG. 140 is a side elevation of a pneumatic cut-off saw equipped with a second alternative safety system.

FIG. 141 is a breakaway side elevation view of a reaction system.

FIG. 142 is a schematic view of an alternative reaction system.

FIG. 143 is a cross-sectional view along lines 143-143 of FIG. 142 of a band forming part of the reaction system of FIG. 142.

Figure 144:
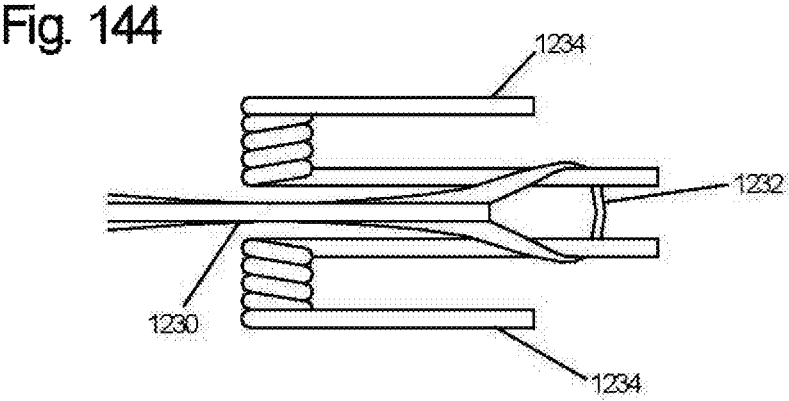

FIG. 144 is a top elevation view of a hook on the end of the band of FIG. 143.

Figure 145:
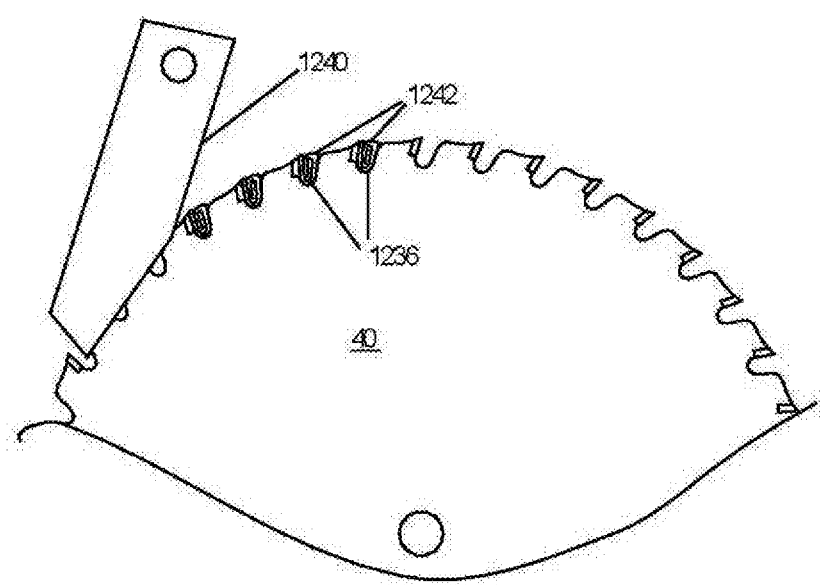

FIG. 145 is a schematic view of an alternative reaction system for obstructing a blade.

Figure 146:
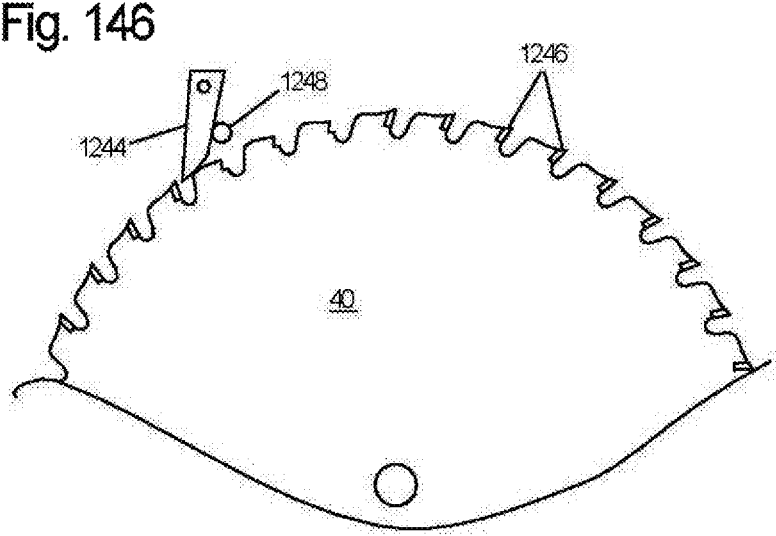

FIG. 146 is a schematic view of an alternative reaction system that breaks the teeth of a blade.

Figure 147:
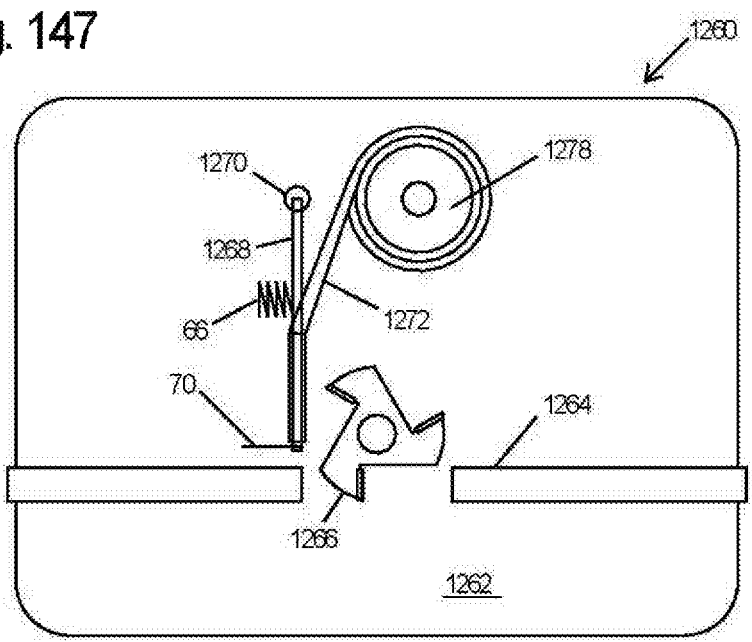

FIG. 147 is a top view of an alternative reaction system that wraps a cutting tool.

Figure 148:
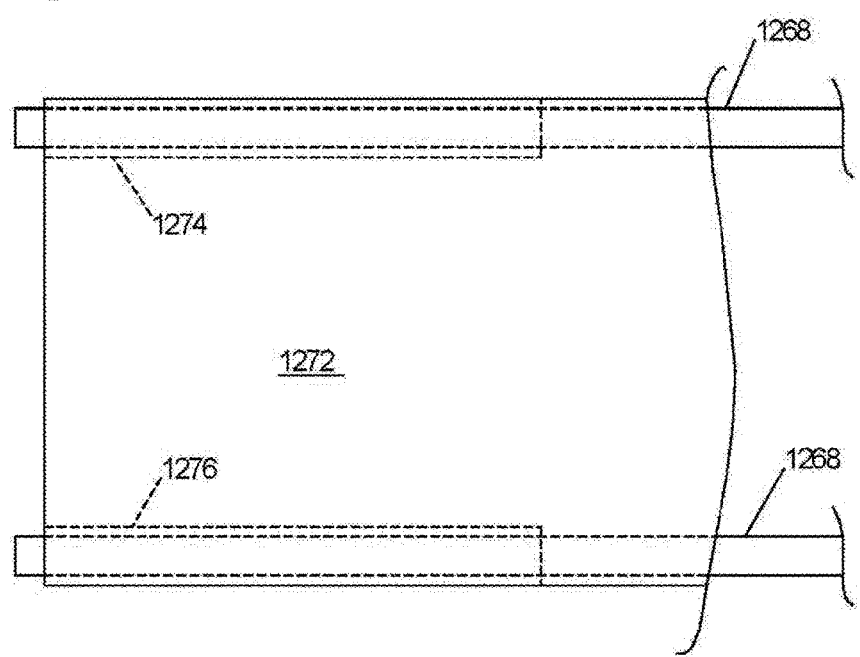

FIG. 148 shows a covering used in the reaction system of FIG. 147.

Figure 149:
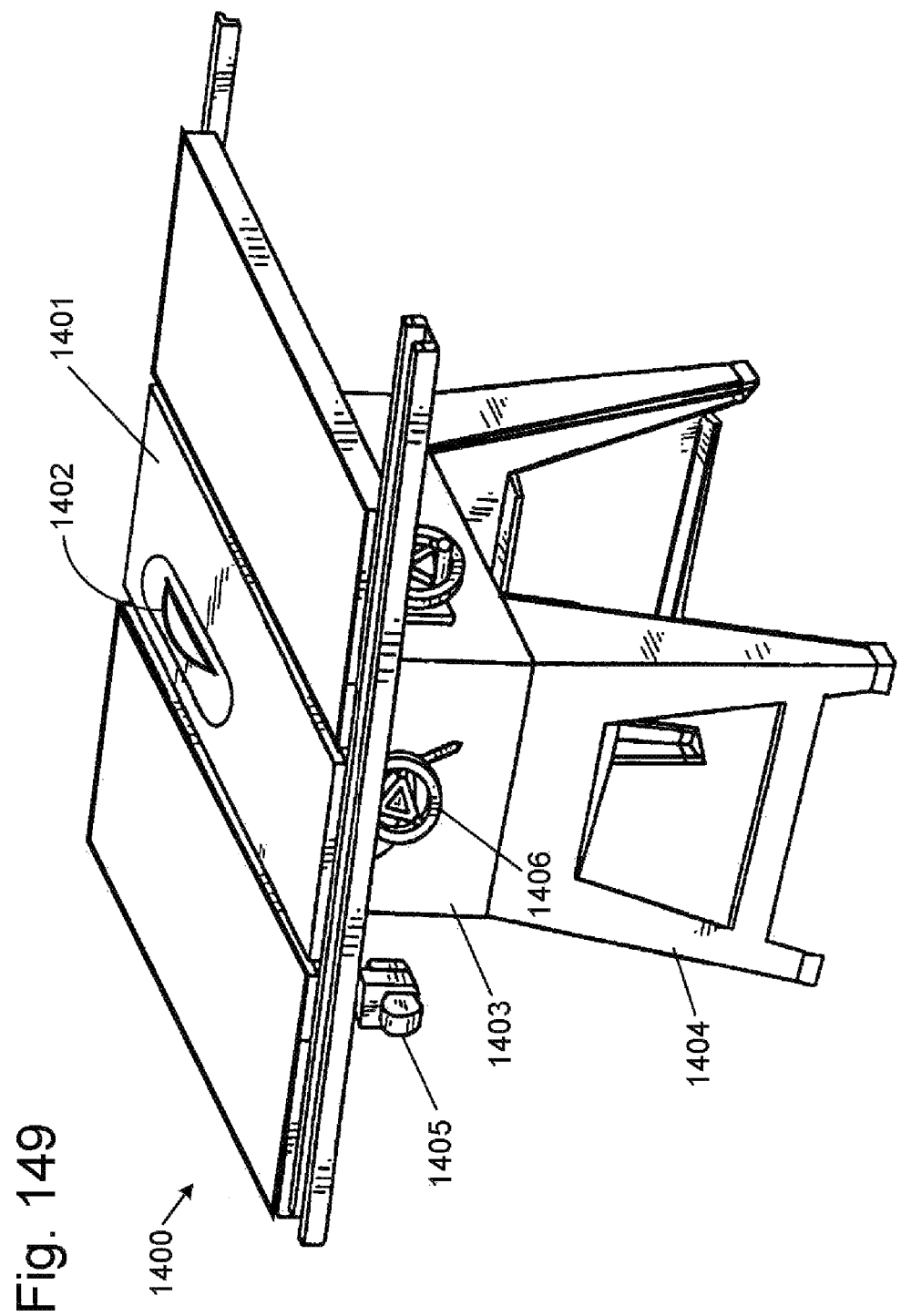

FIG. 149 shows a table saw.

Figure 150:
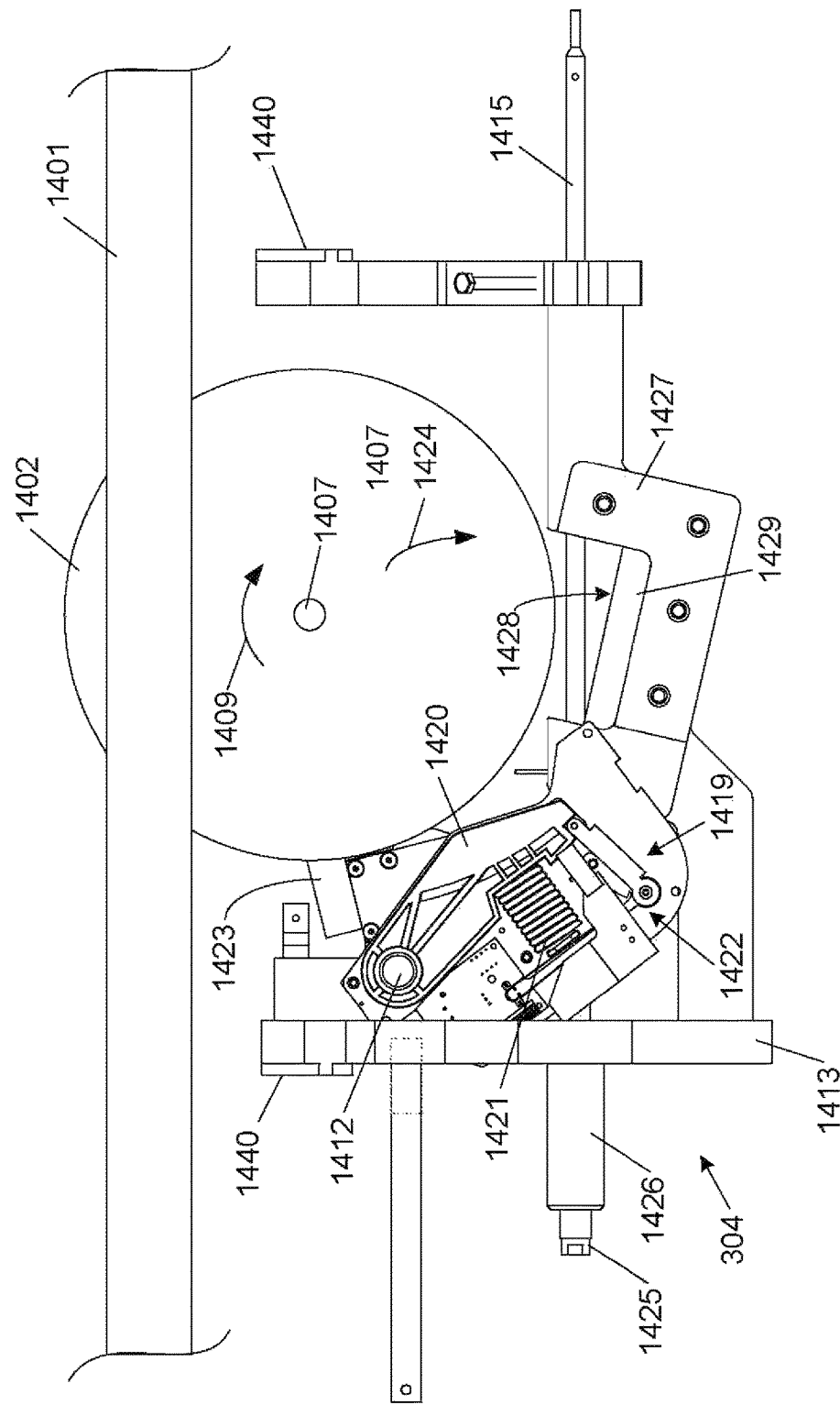

FIG. 150 is a schematic side view of one side of a table saw with an improved safety system.

Figure 151:
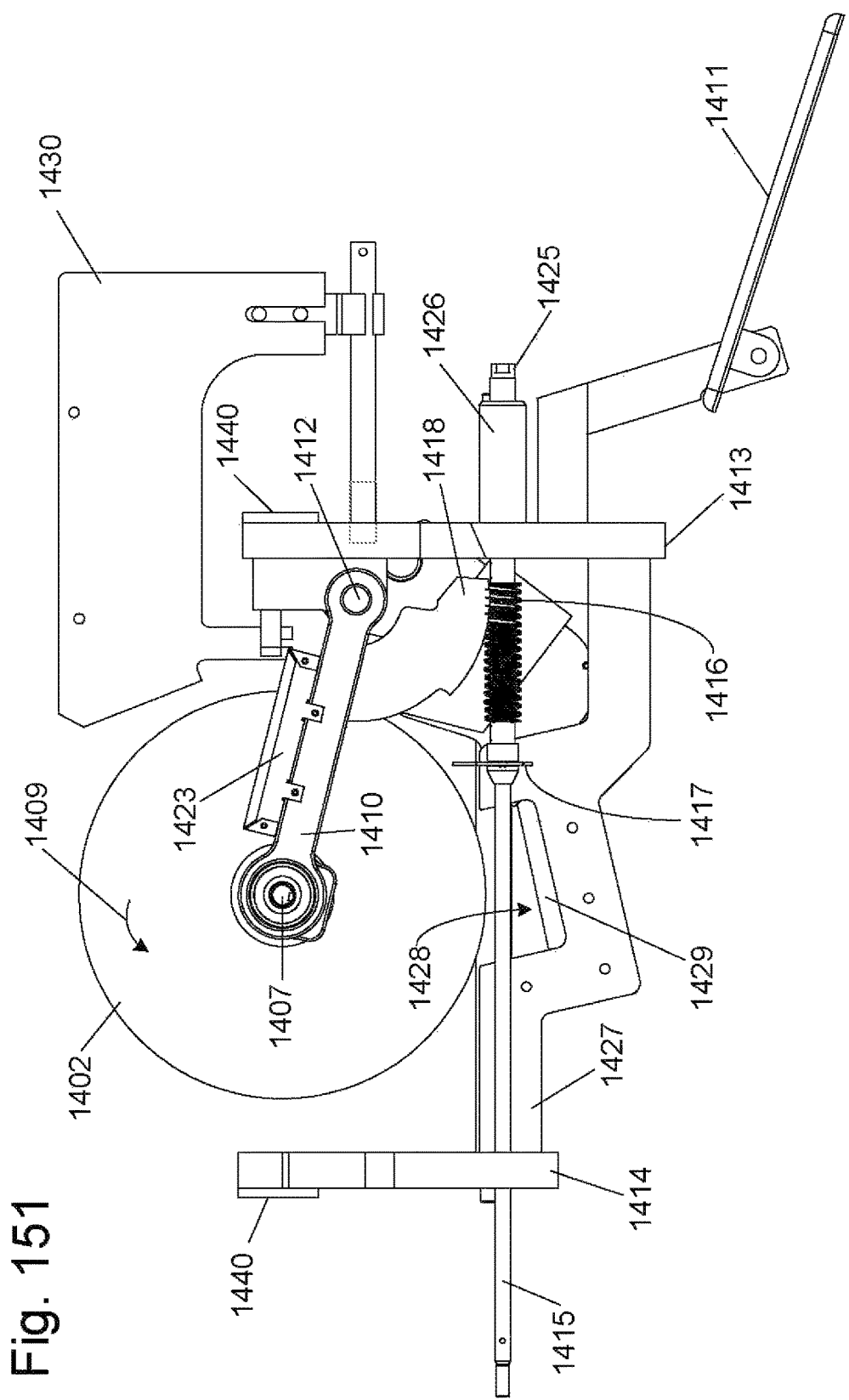

FIG. 151 is a schematic side view of a second side of the table saw of FIG. 150.

Figure 152:
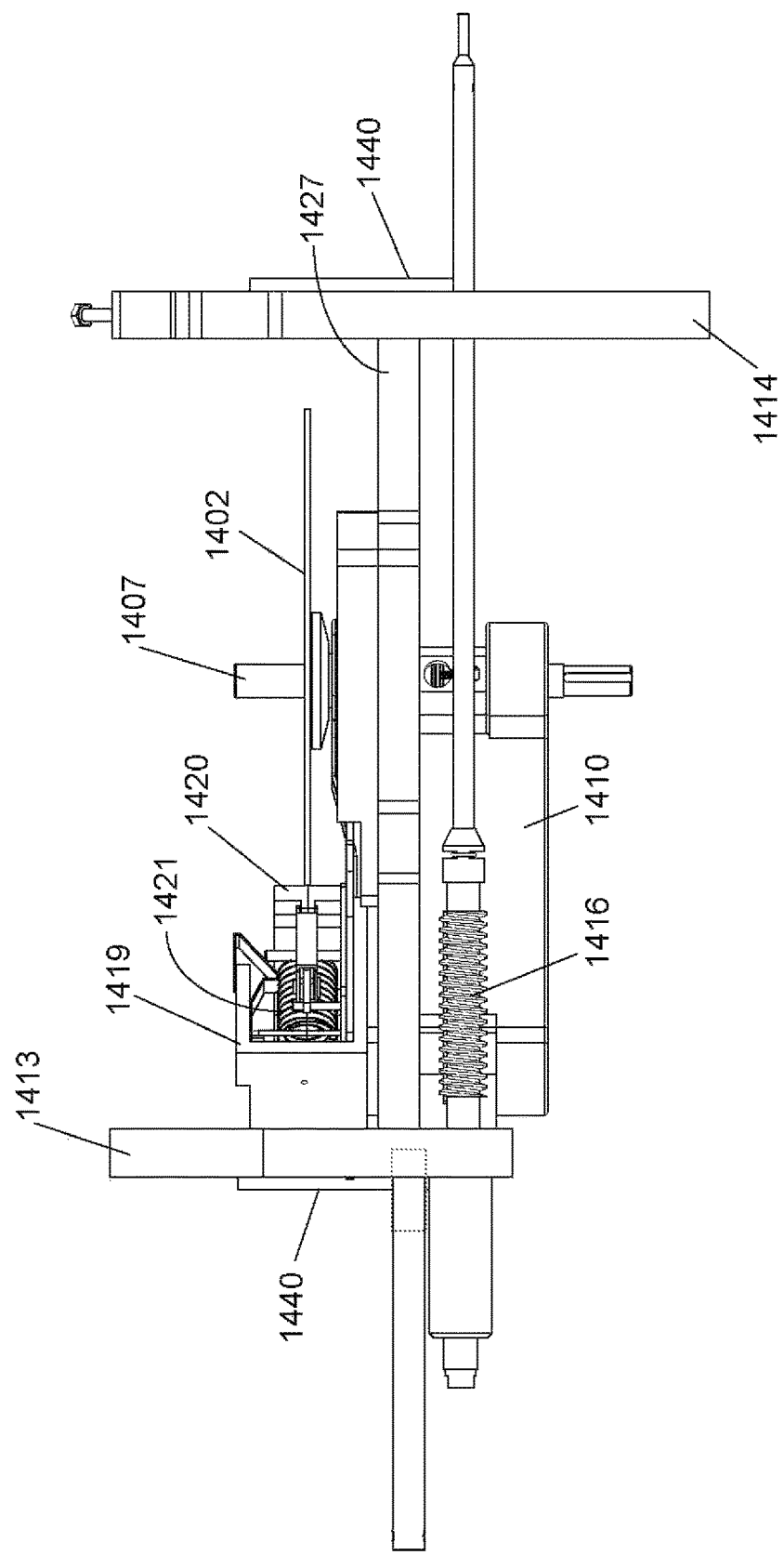

FIG. 152 is a schematic bottom view of the table saw of FIG. 150.

Figure 153:
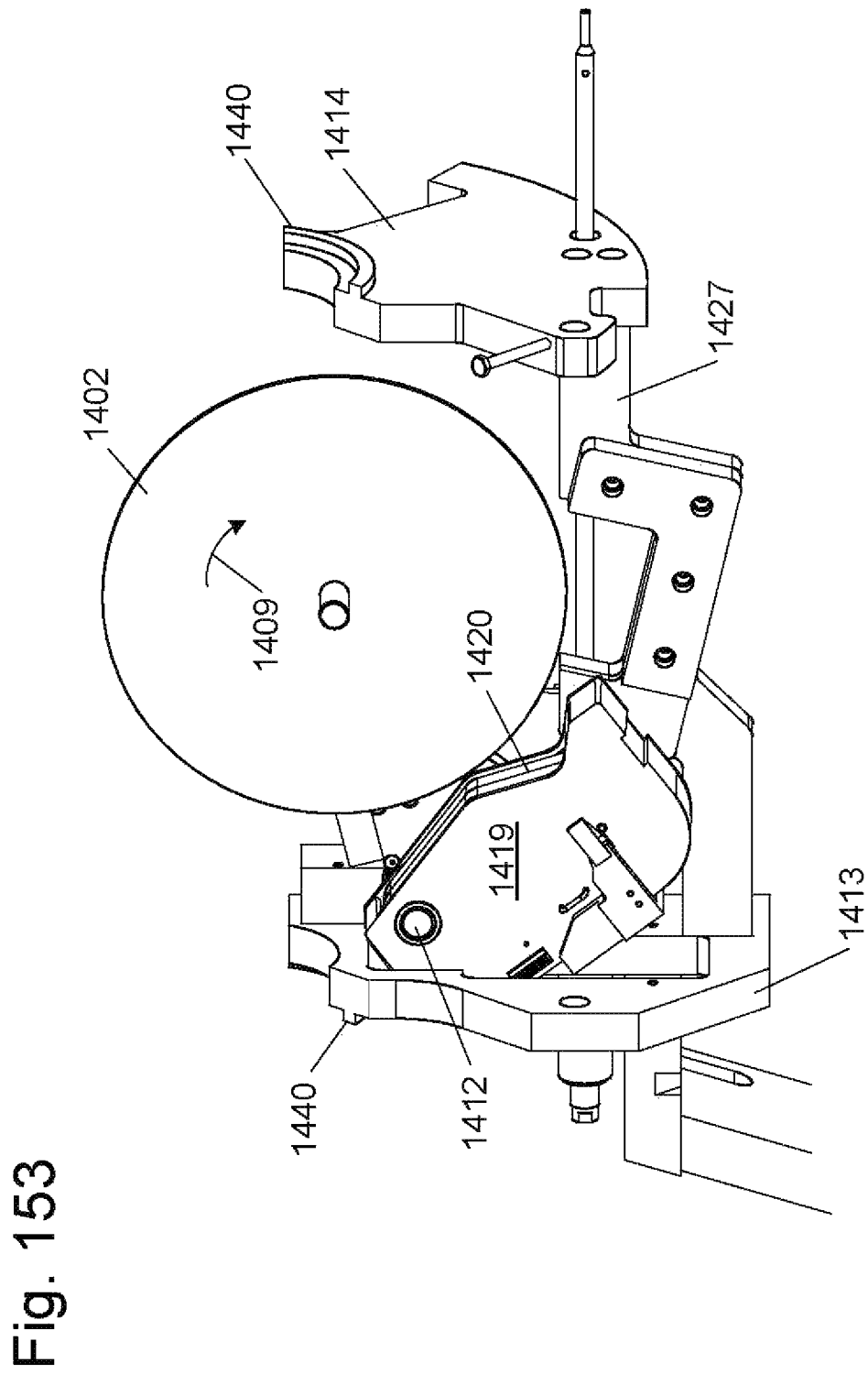

FIG. 153 is a schematic perspective view of the table saw of FIG. 150.

Figure 154:
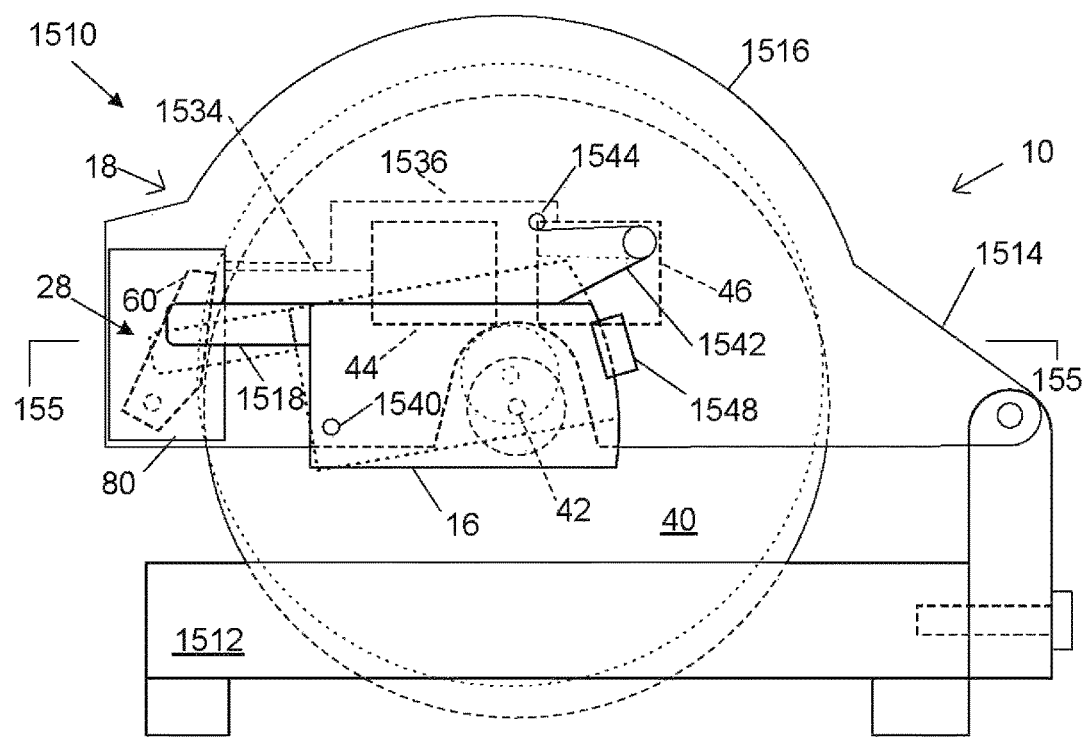

FIG. 154 is a side elevation view of a miter saw with an improved safety system.

Figure 155:
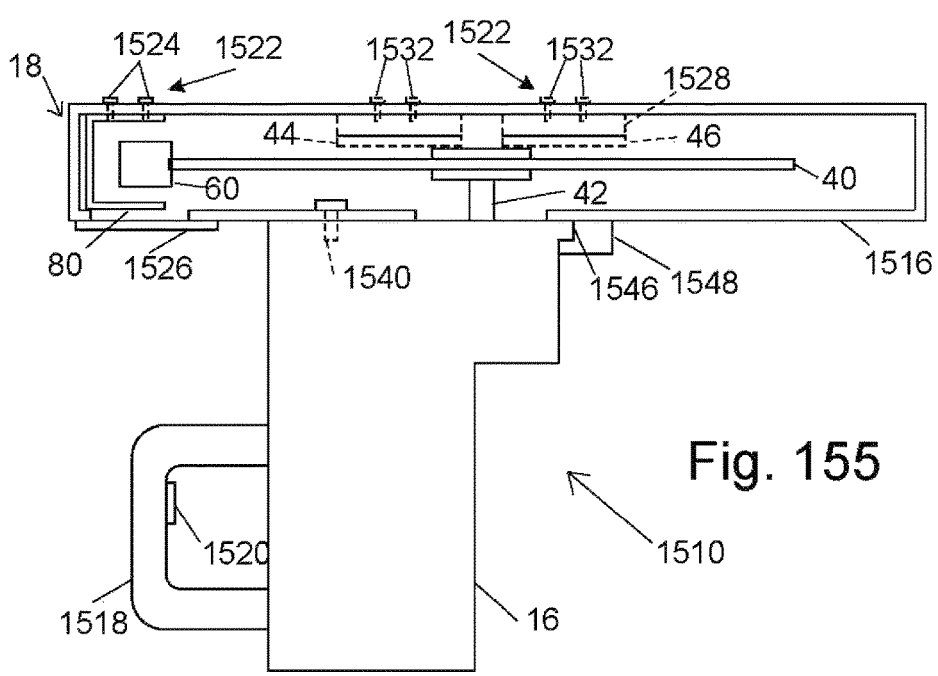

FIG. 155 is a cross-sectional top plan view of the miter saw of FIG. 154.

Figure 156:
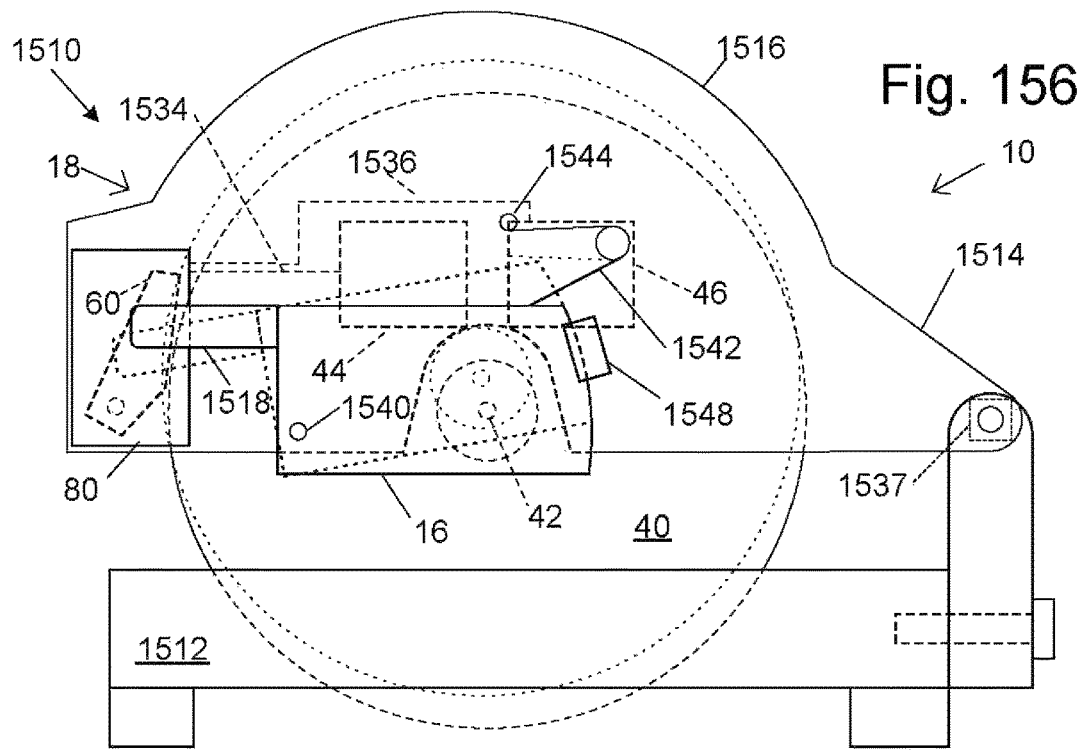

FIG. 156 is a side elevation view of another miter saw.

Figure 157:
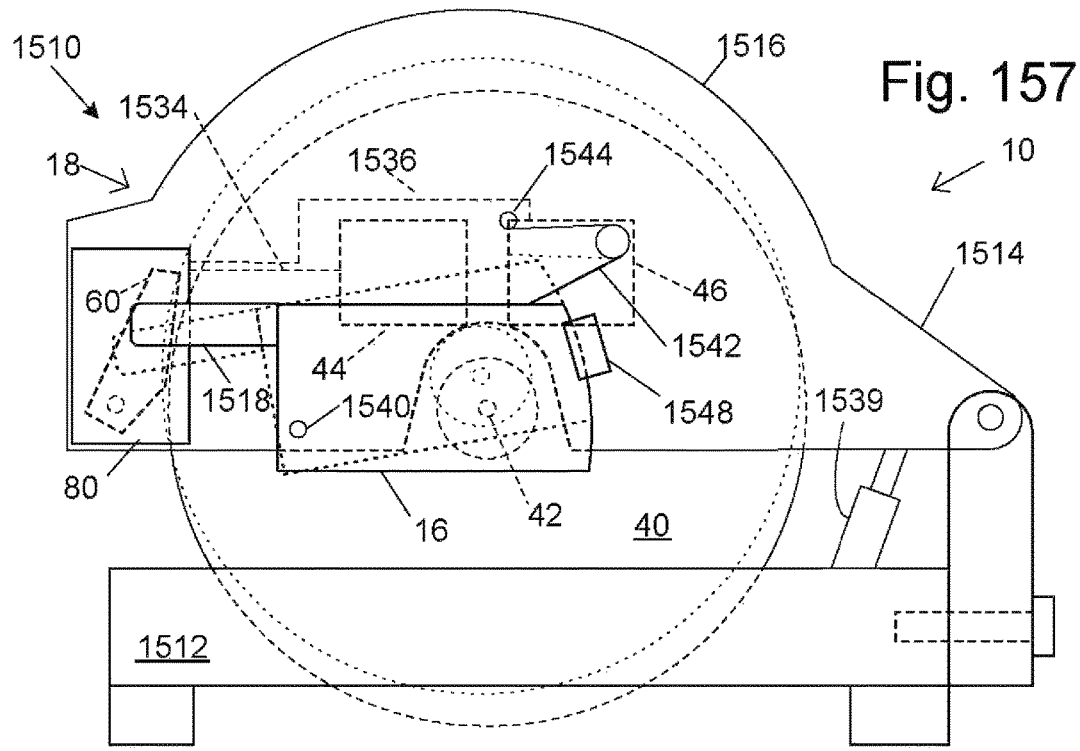

FIG. 157 is a side elevation view of another miter saw.

Figure 158:
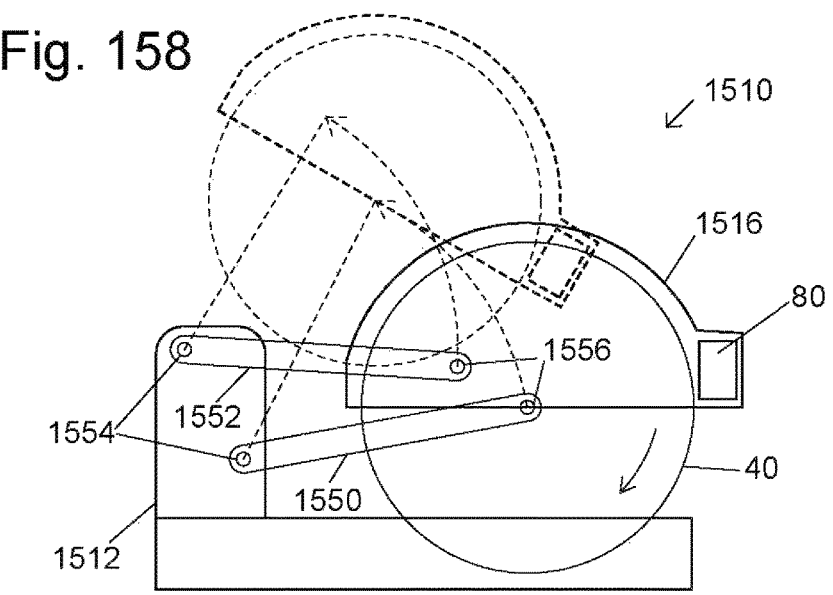

FIG. 158 is a side elevation view of another miter saw.

Figure 159:
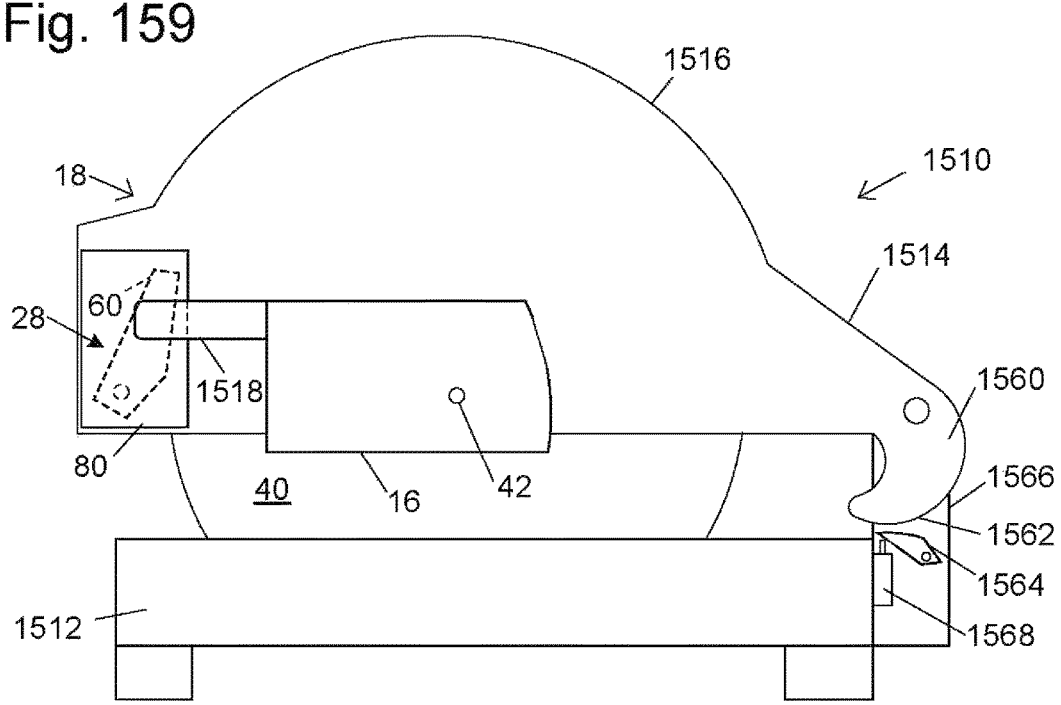

FIG. 159 is a side elevation view of another miter saw.

Figure 160:
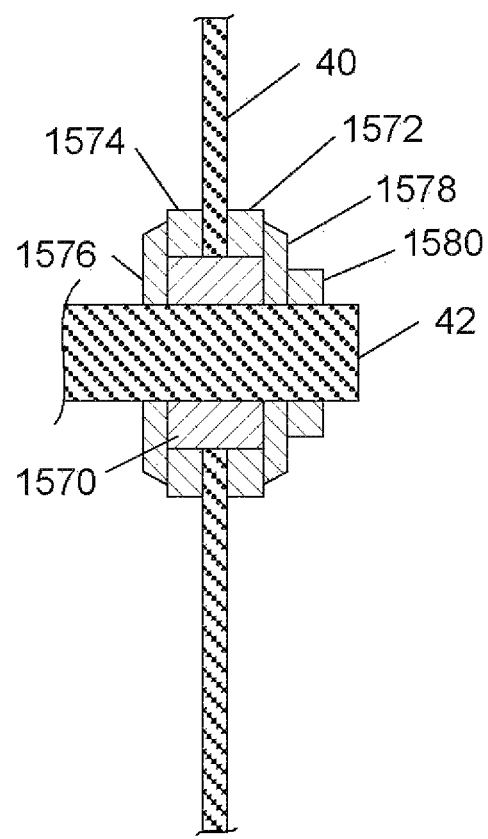

FIG. 160 is a fragmentary cross-sectional view of an electrically isolated blade.

Figure 161:
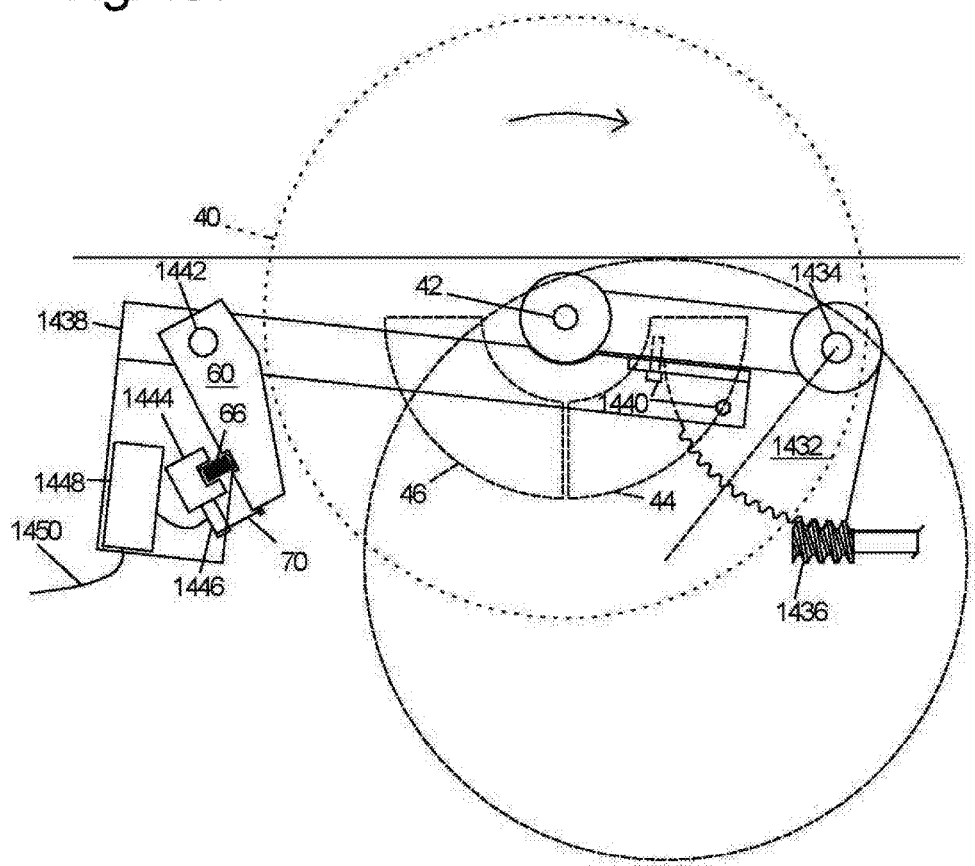

FIG. 161 is a side elevation of an exemplary implementation of a safety stop in the context of a table saw.

Figure 162:
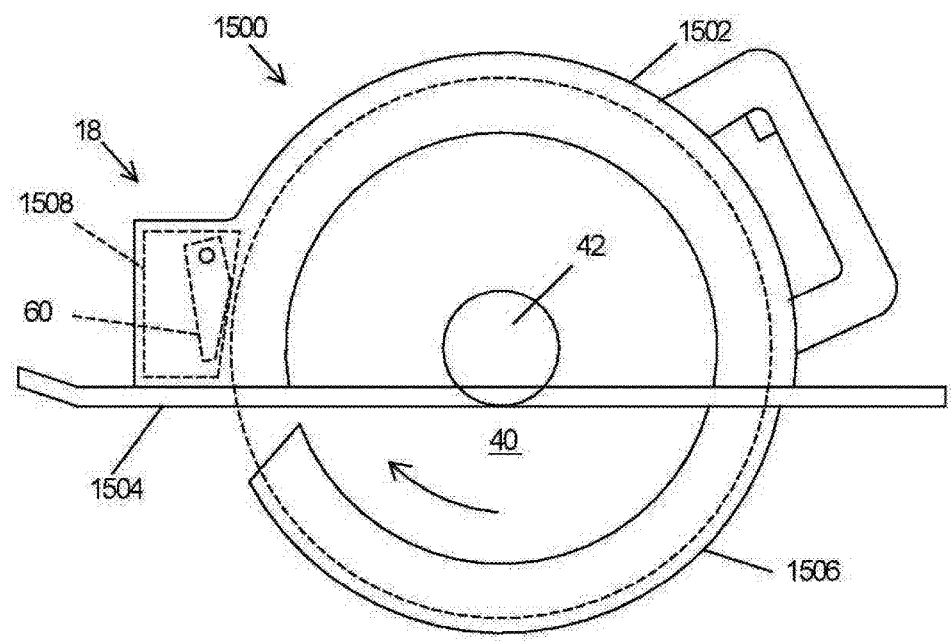

FIG. 162 is a side elevation of an exemplary implementation of a safety stop in the context of a circular saw.

Figure 163:
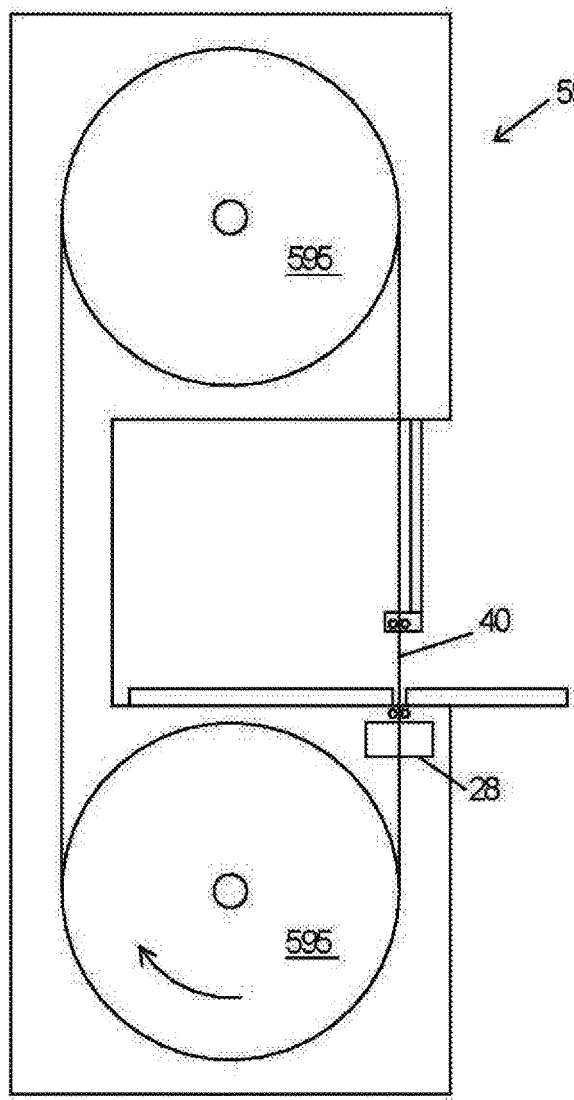

FIG. 163 is a side elevation of an exemplary implementation of a safety system in the context of a band saw.

Figure 164:
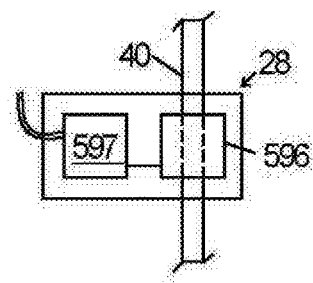

FIG. 164 is a close-up detail view of the safety system of FIG. 163.

DETAILED DESCRIPTION

Figure 1:
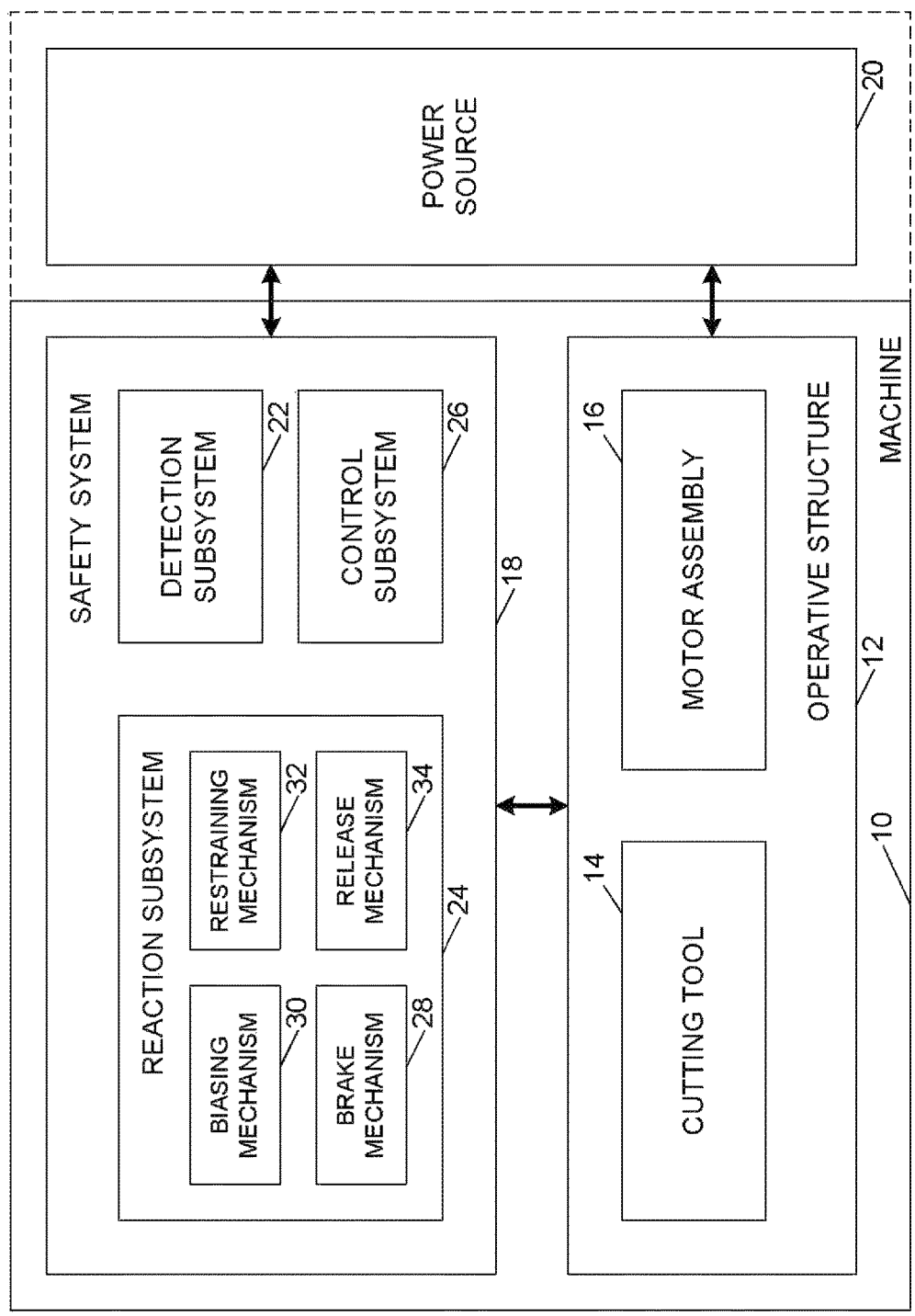
FIG. 1 is a schematic block diagram of a machine with a fast-acting safety system.

A machine embodying a safety system is shown schematically in FIG. 1 and indicated generally at 10. Machine 10 may be any of a variety of different machines adapted for cutting workpieces, such as wood, plastic, etc., including a table saw, miter saw, chop saw, radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, place a barrier between the cutting tool and the user, or retract the cutting tool from its operating position. The reaction subsystem may be configured to take any one or combination of various steps to protect the user from serious injury, as will be described in more detail below.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
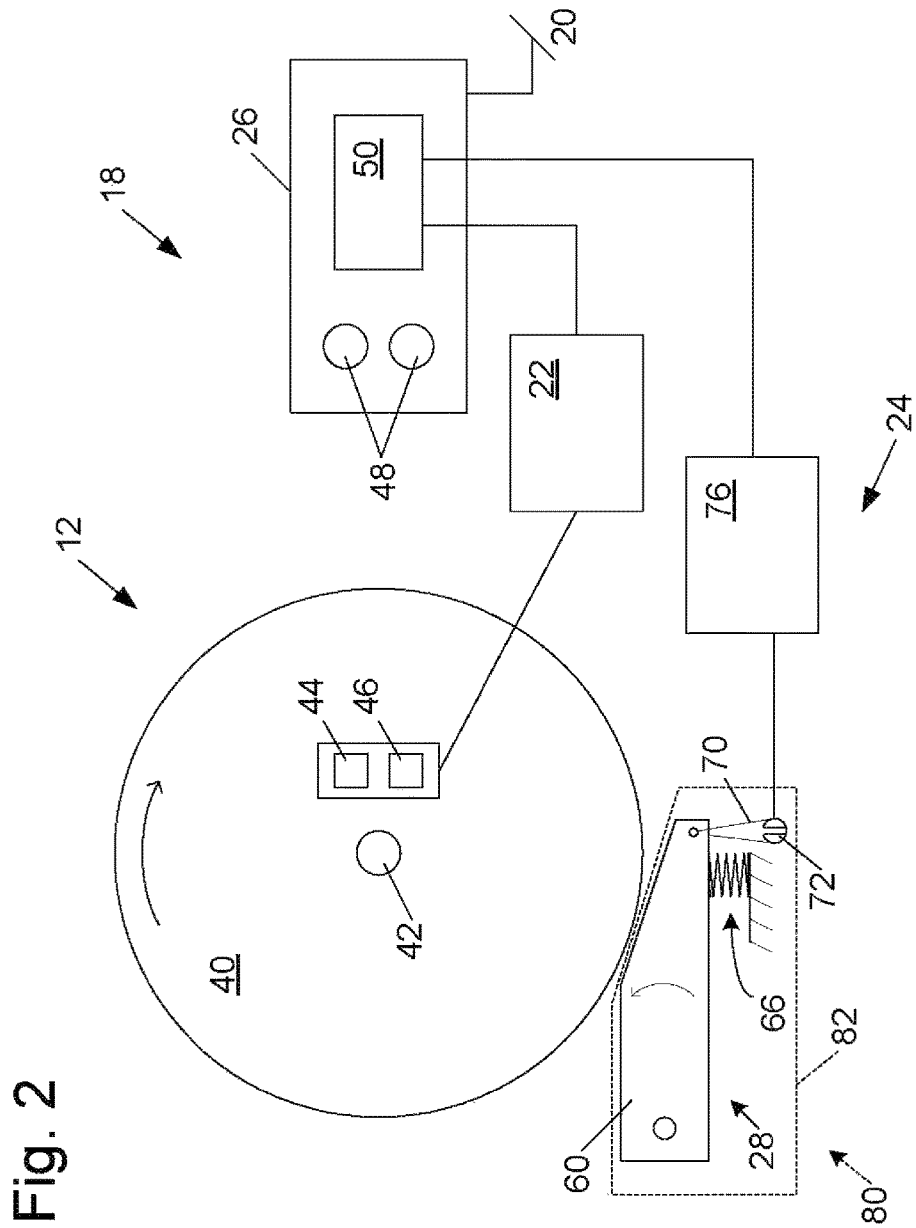
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. Other systems for stopping the movement of the cutting tool are also described below. Further, safety system 18 will be described below in the context of various particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. The detection subsystem is adapted to transmit a signal to control subsystem 26 when contact between the user and the blade is detected. Various exemplary embodiments and implementations of detection subsystem 22 are described in more detail below.

Control subsystem includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail below.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining member in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail below.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail below.

While a particular implementation of safety system 18 has been described, it will be appreciated that many variations and modifications are possible. Several exemplary embodiments of safety system 18 are described below to partially illustrate the many different configurations, arrangements, applications, and combinations of the disclosed safety systems. For clarity, the following description is arranged into sections having generally descriptive headings. The sections are:

Section 1: Detection Signal Properties and Circuits
Section 2: Detection of Dangerous Conditions
Section 3: Retraction System
Section 4: Spring-Biased Brake System
Section 5: Brake Mechanism
Section 6: Firing Subsystem
Section 7: Replaceable Brake Cartridge
Section 8: Brake Positioning
Section 9: Logic Control
Section 10: Motion Detection
Section 11: Translation Stop
Section 12: Cutting Tool Disablement
Section 13: Table Saw
Section 14: Miter Saw
Section 15: Circular Saw It will be understood that the sections and headings are intended merely to provide organization to the disclosure and should not be interpreted to limit the disclosure in any way. For example, while Section 7 describes various exemplary brake cartridges, Section 7 also describes other components as well. Further, several of the other sections will also describe exemplary embodiments of cartridges.

Section 1: Detection Signal Properties and Circuits

Figure 3:
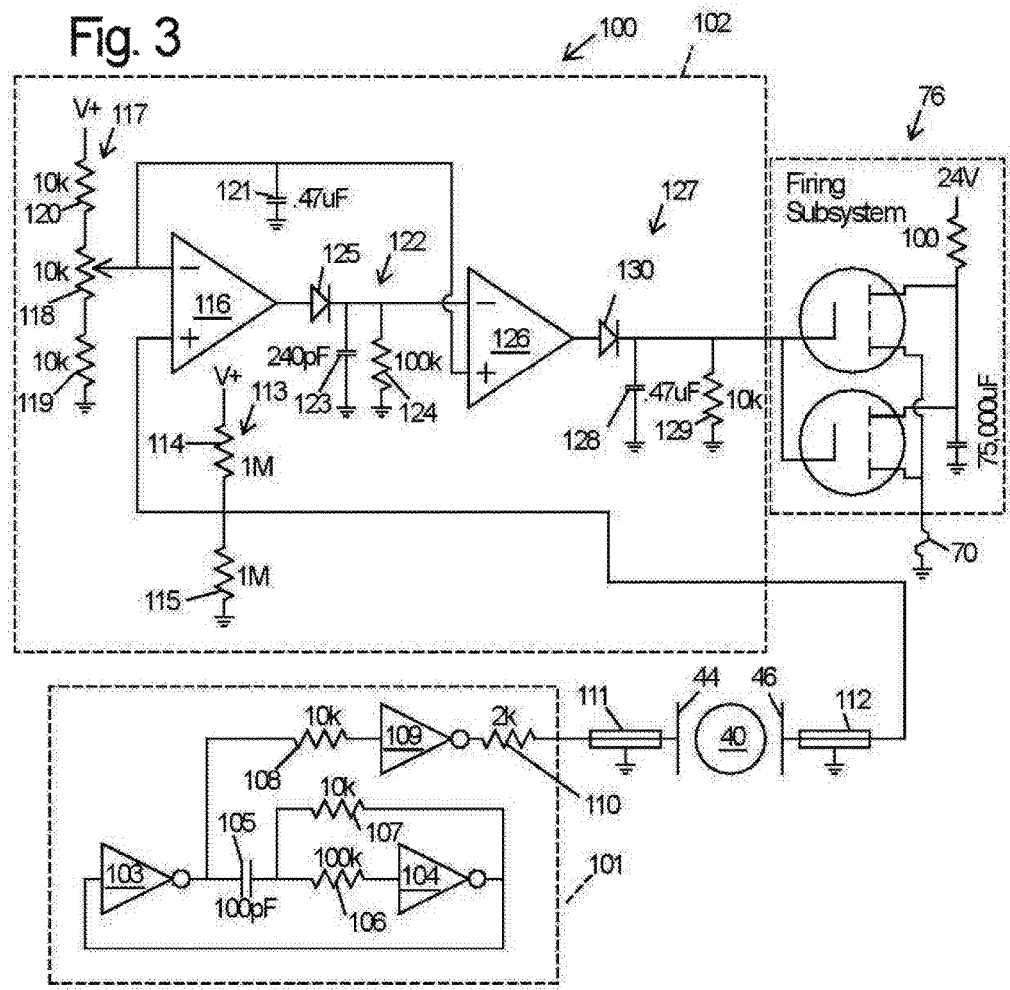
FIG. 3 is a schematic circuit diagram of an electronic subsystem for the safety system of FIG. 1, including an excitation system, a contact sense system and a firing system.

As mentioned above, some embodiments of safety system 18 include a contact detection subsystem 22. The contact detection subsystem may take any one of a variety of different forms. One exemplary contact detection subsystem includes an electronic subsystem 100, as shown in FIG. 3. Electronic subsystem 100 is adapted to work with the two-plate capacitive coupling system described in Section 2 below. Electronic subsystem 100 includes an excitation system 101 and a monitoring or contact sensing system 102. However, it will be appreciated by those of skill in the electrical arts that the exemplary configuration of electronic subsystem 100 illustrated in FIG. 3 is just one of many configurations which may be used. Thus, it will be understood that any suitable embodiment or configuration could be used.

As shown in FIG. 3, excitation system 101 includes an oscillator circuit that generates a wave input signal, such as a square wave signal, at a frequency of approximately 200 khz and voltage amplitude of 12 volts. Alternatively, excitation system 101 may be configured to generate a signal of a different frequency and/or a different amplitude and/or different waveform. The oscillator is formed by a pair of inverters 103, 104 from a CD4040 configured as a bistable oscillator. The output of inverter 103 is connected to a 100 pF capacitor 105, which is connected through a 100 kΩ resistor 106 to the input of inverter 104. A 10 kΩ resistor 107 is connected between the output of inverter 104 to the junction between capacitor 105 and resistor 106. The output of inverter 104 is connected to the input of inverter 103. A 10 kΩ resistor 108 connects the output of inverter 103 to the input of another inverter 109, which serves as an output buffer to drive the input wave signal onto the blade. A 2 kΩ series resistor 110 functions to reduce any ringing in the input signal by damping the high frequency components of the signal.

It will be appreciated that the particular form of the oscillator signal may vary and there are many suitable waveforms and frequencies that may be utilized. The waveform may be chosen to maximize the signal-to-noise ratio, for example, by selecting a frequency at which the human body has the lowest resistance or highest capacitance relative to the workpiece being cut. As an additional variation, the signal can be made asymmetric to take advantage of potentially larger distinctions between the electrical properties human bodies and green wood at high frequency without substantially increasing the radio-frequency power radiated. For instance, utilizing a square wave with a 250 khz frequency, but a duty cycle of five percent, results in a signal with ten times higher frequency behavior than the base frequency, without increasing the radio-frequency energy radiation. In addition, there are many different oscillator circuits that are well known in the art and which would also be suitable for generating the excitation signal.

The input signal generated by the oscillator is fed through a shielded cable 111 onto charge plate 44. Shielded cable 111 functions to insulate the input signal from any electrical noise present in the operating environment, insuring that a "clean" input signal is transmitted onto charge plate 44. Also, the shielded cable reduces cross talk between the drive signal and the detected signal that might otherwise occur should the cables run close together. Alternatively, other methods may be used to prevent noise in the input signal. As a further alternative, monitoring system 102 may include a filter to remove any noise in the input signal or other electrical noise detected by charge plate 46. Shielded cable 111 also reduces radio-frequency emissions relative to an unshielded cable.

As described in more detail below in Section 2, the input signal is coupled from charge plate 44 to charge plate 46 via blade 40. As shown in FIG. 3, the signal received on charge plate 46 is then fed via a shielded cable 112 to monitoring system 102. The monitoring system is configured to detect a change in the signal due to contact between the user's body and the blade. It will be appreciated that monitoring system 102 may be implemented in any of a wide variety of designs and configurations. In the exemplary embodiment depicted in FIG. 3, monitoring system 102 compares the amplitude of the input signal received at charge plate 46 to a determined reference voltage. In the event that the input signal received at charge plate 46 falls below the reference voltage for a determined time, the monitoring system produces an output signal to reaction subsystem 24. The reaction subsystem is configured to receive the output signal and immediately act to stop the blade.

The particular components of monitoring system 102 may vary depending on a variety of factors including the application, the desired sensitivity, availability of components, type of electrical power available, etc. In the exemplary embodiment, a shielded cable 112 is connected between charge plate 46 and a voltage divider 113. Voltage divider 113 is formed by two 1MΩ resistors 114, 115 connected in series between the supply voltage (typically about 12 volts) and ground. The voltage divider functions to bias the output signal from charge plate 46 to an average level of half of the supply voltage. The biased signal is fed to the positive input of an op-amp 116. Op-amp 116 may be any one of many suitable op-amps that are well known in the art. An example of such an op-amp is a TL082 op-amp. The negative input of the op-amp is fed by a reference voltage source 117. In the exemplary embodiment, the reference voltage source is formed by a 10 kΩ potentiometer 118 coupled in series between two 10 kΩ resistors 119, 120, which are connected to ground and the supply voltage, respectively. A 0.47 µF capacitor 121 stabilizes the output of the reference voltage.

As will be understood by those of skill in the art, op-amp 116 functions as a comparator of the input signal and the reference voltage. Typically, the voltage reference is adjusted so that its value is slightly less than the maximum input signal voltage from charge plate 46. As a result, the output of the op-amp is low when the signal voltage from the charge plate is less than the reference voltage and high when the signal voltage from the charge plate is greater than the reference voltage. Where the input signal is a periodic signal such as the square wave generated by excitation system 101, the output of op-amp 116 will be a similar periodic signal. However, when a user contacts the blade, the maximum input signal voltage decreases below the reference voltage and the op-amp output no longer goes high.

The output of op-amp 116 is coupled to a charging circuit 122. Charging circuit 122 includes a 240 pF capacitor 123 that is connected between the output of op-amp 116 and ground. A 100 kΩ discharge resistor 124 is connected in parallel to capacitor 123. When the output of op-amp 116 is high, capacitor 123 is charged. Conversely, when the output of op-amp 116 is low, the charge from capacitor 123 discharges through resistor 124 with a time constant of approximately 24 µs. Thus, the voltage on capacitor 123 will discharge to less than half the supply voltage in approximately 25-50 µs unless the capacitor is recharged by pulses from the op-amp. A diode 125 prevents the capacitor from discharging into op-amp 116. Diode 125 may be any one of many suitable diodes that are well known in the art, such as a 1N914 diode. It will be appreciated that the time required for capacitor 123 to discharge may be adjusted by selecting a different value capacitor or a different value resistor 124.

As described above, charging circuit 122 will be recharged repeatedly and the voltage across capacitor 123 will remain high so long as the detected signal is received substantially unattenuated from its reference voltage at op-amp 116. The voltage from capacitor 123 is applied to the negative input of an op-amp 126. Op-amp 126 may be any one of many suitable op-amps, which are well known in the art, such as a TL082 op-amp. The positive input of op-amp 126 is tied to a reference voltage, which is approximately equal to one-half of the supply voltage. In the exemplary embodiment depicted in FIG. 3, the reference voltage is provided by reference voltage source 117.

So long as charging circuit 122 is recharged, the output of op-amp 126 will be low. However, if the output of op-amp 116 does not go high for a period of 25-50 µs, the voltage across capacitor 123 will decay to less than the reference voltage, and op-amp 126 will output a high signal indicating contact between the user's body and the blade. As described in more detail in Sections 4-6 below, the output signal from op-amp 126 is coupled to actuate reaction subsystem 24 and stop the blade. The time between contact and activation of the reaction system can be adjusted by selecting the time constant of capacitor 123 and resistor 124.

It should be noted that, depending on the size, configuration and number of teeth on the blade and the position of contact with the operator, the electrical contact between the operator and blade will often be intermittent. As a result, it is desirable that the system detect contact in a period less than or equal to the time a single tooth would be in contact with a user's finger or other body portion. For example, assuming a 10-inch circular blade rotating at 4000 rpm and a contact distance of about one-quarter of an inch (the approximate width of a fingertip), a point on the surface of the blade, such as the point of a tooth, will be in contact with the user for approximately 100 µs. After this period of contact, there will normally be an interval of no contact until the next tooth reaches the finger. The length of the contact and non-contact periods will depend on such factors as, the number of teeth on the blade and the speed of rotation of the blade.

It is preferable, though not necessary, to detect the contact with the first tooth because the interval to the second tooth may be substantial with blades that have relatively few teeth. Furthermore, any delay in detection increases the depth of cut that the operator will suffer. Thus, in the exemplary embodiment, the charging circuit is configured to decay within approximately 25-50 µs to ensure that monitoring system 102 responds to even momentary contact between the user's body and the blade. Further, the oscillator is configured to create a 200 khz signal with pulses approximately every 5 µs. As a result, several pulses of the input signal occur during each period of contact, thereby increasing the reliability of contact detection. Alternatively, the oscillator and charging circuit may be configured to cause the detection system to respond more quickly or more slowly. Generally, it is desirable to maximize the reliability of the contact detection, while minimizing the likelihood of erroneous detections.

As described above, the contact between a user's body and the teeth of blade 64 might be intermittent depending on the size and arrangement of the teeth. Although monitoring system 102 typically is configured to detect contact periods as short as 25-50 µs, once the first tooth of the blade passes by the user's body, the contact signal received by the second electrical circuit may return to normal until the next tooth contacts the user's body. Thus, while the output signal at op-amp 126 will go high as a result of the first contact, the output signal may return low once the first contact ends. As a result, the output signal may not remain high long enough to activate the reaction system. For instance, if the output signal does not remain high long enough to actuate firing subsystem 76, fusible member 70, may not melt. Therefore, monitoring system 102 may include a pulse extender in the form of charging circuit 127 on the output of op-amp 126, similar to charging circuit 122. Once op-amp 126 produces a high output signal, charging circuit 127 functions to ensure that the output signal remains high long enough to sufficiently discharge the charge storage devices to melt the fusible member. In the exemplary embodiment, charging circuit 127 includes a 0.47 µF capacitor 128 connected between the output of op-amp 126 and ground. When the output of op-amp 126 goes high, capacitor 128 charges to the output signal level. If the output of op-amp 126 returns low, the voltage across capacitor 128 discharges through 10 k resistor 129 with a time constant of approximately 4.7 ms. A diode 130, such as an 1N914 diode, prevents capacitor 128 from discharging through op-amp 126. The pulse extender insures that even a short contact with a single tooth will result in activation of the reaction system.

The above-described system is capable of detecting contact within approximately 50 µs and activating the reaction system. As described in more detail in Sections 4-6 below, in the context of reaction system for braking a saw blade, a brake can be released in approximately less than 100 µs and as little as 20 µs. The brake contacts the blade in approximately one to approximately three milliseconds. The blade will normally come to rest within not more than 2-10 ms of brake engagement. As a result, injury to the operator is minimized in the event of accidental contact with the cutting tool. With appropriate selection of components, it may be possible to stop the blade within 2 ms, or less.

While exemplary embodiments of excitation system 101 and monitoring system 102 have been described above with specific components having specific values and arranged in a specific configuration, it will be appreciated that these systems may be constructed with many different configurations, components, and values as necessary or desired for a particular application. The above configurations, components, and values are presented only to describe one particular embodiment that has proven effective, and should be viewed as illustrating, rather than limiting, the invention.

Figure 4:
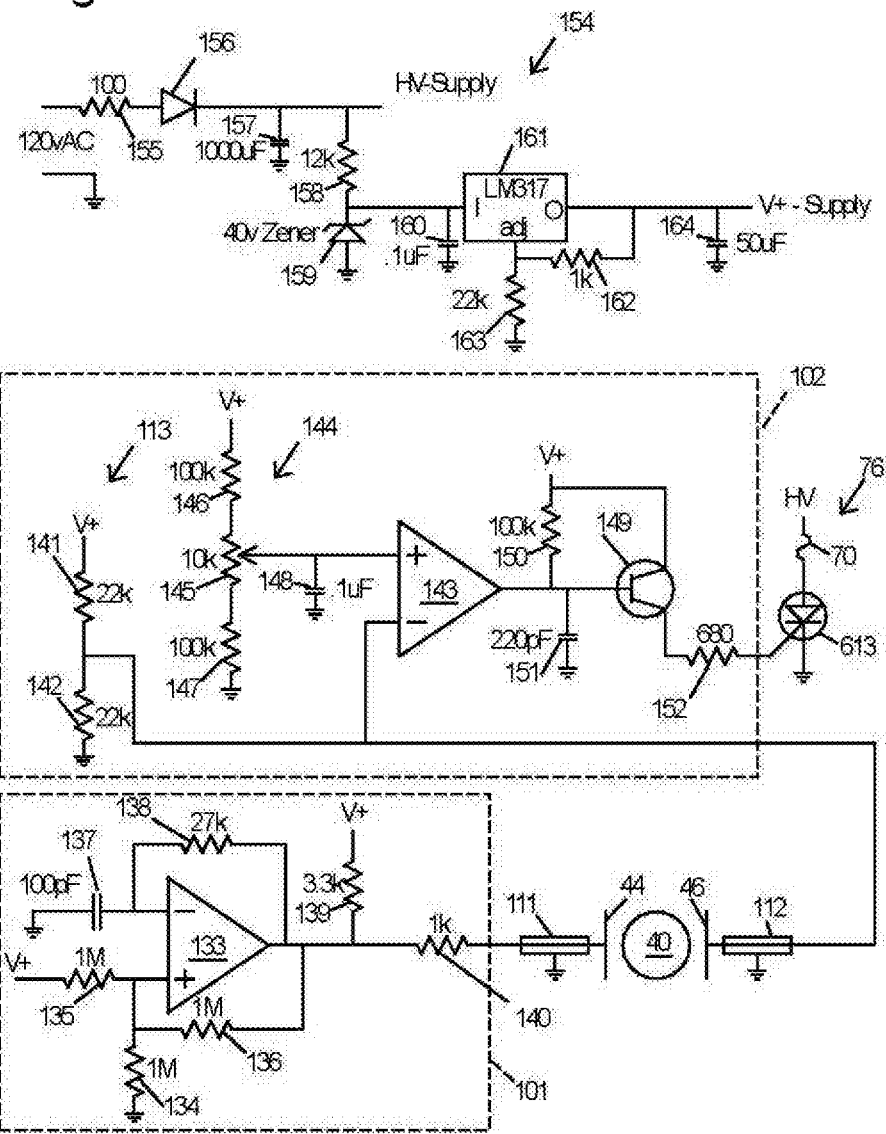
FIG. 4 is a schematic circuit diagram of a first alternative electronic subsystem for the safety system of FIG. 1, including an excitation system, a contact sense system and a firing system.

FIG. 4 shows alternative embodiments of excitation system 101 and monitoring system 102, as well as firing system 76, which is described in Section 6 below. Alternative excitation system 101 is configured to generate a square wave signal using only a single comparator 133 such as an LM393 comparator. A 1M resistor 134 is connected between the high input terminal of comparator 133 and ground. Another 1M resistor 135 is connected between the high input terminal of comparator 133 and a low voltage supply V. A 1M resistor 136 is connected between the high input terminal of the comparator and the output of the comparator. A 100 pF capacitor 137 is connected between the low input terminal of the comparator and ground. A 27 k resistor 138 is connected between the low input terminal of the comparator and the output of the comparator. A 3.3 k resistor 139 is connected between the low voltage supply V and the output of the comparator. The alternative oscillator circuit illustrated in FIG. 6 produces a square wave having a frequency of approximately 3-500 khz. A 1 k resistor 140 is connected between the output of the comparator and shielded cable 111 to reduce ringing. It will be appreciated that the values of one or more elements of alternative excitation system 101 may be varied to produce a signal having a different frequency, waveform, etc.

As in the exemplary embodiment described above, the signal generated by alternative excitation system 101 is fed through shielded cable 111 to charge plate 44. The signal is capacitively coupled to charge plate 46 via blade 40. Alternative monitoring system 102 receives the signal from charge plate 46 via shielded cable 112 and compares the signal to a reference voltage. If the signal falls below the reference voltage for approximately 25 μs, an output signal is generated indicating contact between the blade and the user's body.

Alternative monitoring system 102 includes a voltage divider 113, which is formed of 22 k resistors 141 and 142. The voltage divider biases the signal received via cable 112 to half the low voltage supply V. The lower resistance of resistors 141, 142 relative to resistors 114, 115 serves to reduce 60 hz noise because low-frequency signals are attenuated. The biased signal is fed to the negative input terminal of a second comparator 143, such as an LM393 comparator. The positive terminal of comparator 143 is connected to reference voltage source 144. In the depicted embodiment, the reference voltage source is formed by a 10 kΩ potentiometer 145 coupled in series between two 100 kΩ resistors 146, 147 connected to the low voltage supply V and ground, respectively. A 0.1 μF capacitor 148 stabilizes the output of the reference voltage. As before, the reference voltage is used to adjust the trigger point.

The output of second comparator 143 is connected to the base terminal of an NPN bipolar junction transistor 149, such as a 2N3904 transistor. The base terminal of transistor 149 is also connected to low voltage supply V through a 100 k resistor 150, and to ground through a 220 pF capacitor 151. Potentiometer 145 is adjusted so that the voltage at the positive terminal of comparator 143 is slightly lower than the high peak of the signal received at the negative terminal of the second comparator when there is no contact between the blade and the user's body. Thus, each high cycle of the signal causes the second comparator output to go low, discharging capacitor 151. So long as there is no contact between the blade and the user's body, the output of the second comparator continues to go low, preventing capacitor 151 from charging up through resistor 150 and switching transistor 149 on. However, when the user's body contacts the blade or other isolated element, the signal received at the negative terminal of the second comparator remains below the reference voltage at the positive terminal and the output of the second comparator remains high. As a result, capacitor 151 is able to charge up through resistor 150 and switch transistor 149 on.

The collector terminal of transistor 149 is connected to low voltage supply V, while the emitter terminal is connected to 680Ω resistor 152. When transistor 149 is switched on, it supplies an output signal through resistor 152 of approximately 40 mA, which is fed to alternative firing system 76. As described in more detail below in Section 6, the alternative firing circuit includes fusible member 70 connected between a high voltage supply HV and an SCR 613, such as an NTE 5552 SCR. The gate terminal of the SCR is connected to resistor 152. Thus, when transistor 149 is switched on, the approximately 40 mA current through resistor 152 turns on SCR 613, allowing the high voltage supply HV to discharge to ground through fusible member 70. Once the SCR is switched on, it will continue to conduct as long as the current through fusible member 70 remains above the holding current of approximately 40 mA, even if the current to the gate terminal is removed. Thus, the SCR will conduct current through the fusible member until the fusible member is melted or the high voltage source is exhausted or removed. The fact that the SCR stays on once triggered allows it to respond to even a short pulse through resistor 152.

FIG. 4 also illustrates an exemplary electrical supply system 154 configured to provide both low voltage supply V and high voltage supply HV from standard 120 VAC line voltage. Electrical supply system 154 is connected to provide low voltage supply V and high voltage supply HV to alternative excitation system 101, alternative monitoring system 102, and alternative firing system 76. The line voltage is connected through a 100Ω resistor 155 and a diode 156, such as a 1N4002 diode, to a 1000 μF charge storage capacitor 157. The diode passes only the positive portion of the line voltage, thereby charging capacitor 157 to approximately 160V relative to ground. The positive terminal of capacitor 157 serves as the high voltage supply HV connected to fusible link 70. When SCR 613 is switched on upon detection of contact between the blade and the user's body, the charge stored in capacitor 157 is discharged through the fusible link until it melts. It will be appreciated that the size of capacitor 157 may be varied as required to supply the necessary current to melt fusible member 70. As described in Section 6, use of a HV capacitor leads to a much higher current surge, and therefore a faster melting of the fusible member than is the case with a low voltage system.

The positive terminal of capacitor 157 also provides a transformer-less source of voltage for low voltage supply V, which includes a 12 k resistor 158 connected between the positive terminal of capacitor 157 and a reverse 40V Zener diode 159. Diode 159 functions to maintain a relatively constant 40V potential at the junction between the diode and resistor 158. It can be seen that the current through the 12 k resistor will be about 10 mA. Most of this current is used by the low voltage circuit, which has a relatively constant current demand of about 8 mA. Note that while resistor 158 and diode 159 discharge some current from capacitor 157, the line voltage supply continuously recharges the capacitor to maintain the HV supply. A 0.1 μF capacitor 160 is connected in parallel with diode 159 to buffer the 40V potential of the diode, which is then connected to the input terminal of an adjustable voltage regulator 161, such as an LM317 voltage regulator. The ratio of a 1 k resistor 162 connected between the output terminal and adjustment terminal, and a 22 k resistor 163 connected between the adjustment terminal and ground, set the output voltage of regulator 161 to approximately 30 VDC. A 50 μF capacitor 164 is connected to the output terminal of regulator 161 to buffer sufficient charge to ensure that low voltage supply V can provide the brief 40 mA pulse necessary to switch on SCR 613. The described low voltage source is advantageous because of its low cost and low complexity.

It should be noted that when high voltage supply HV is discharged through fusible member 70, the input voltage to voltage regulator 161 may temporarily drop below 30V, thereby causing a corresponding drop in the low voltage supply V. However, since the reaction system has already been triggered, it is no longer necessary for the detection system to continue to function as described and any drop in low voltage supply V will not impair the functioning of safety system 18.

It will be appreciated by those of skill in the electrical arts that the alternative embodiments of excitation system 101, monitoring system 102, firing system 76, and electrical supply system 154 may be implemented on a single substrate and/or in a single package. Additionally, the particular values for the various electrical circuit elements described above may be varied depending on the application.

One limitation of the monitoring systems of FIGS. 3 and 4 is that they actuate the reaction system whenever the incoming amplitude from charge plate 46 drops below a preset threshold. Under most circumstances this represents a reliable triggering mechanism. However, when cutting green wood, a substantial additional capacitive and resistive load is coupled to the blade. The moisture in green wood gives it a very high dielectric constant, and an increased conductivity relative to dry wood. In fact, when cutting very green wood, i.e. over 50% moisture content, the amplitude of the signal on charge plate 46 can drop to a level equivalent to what is seen when a user contacts the blade. Thus, the systems of FIGS. 3 and 4 are limited in their ability to offer protection while processing green wood.

Figure 5:
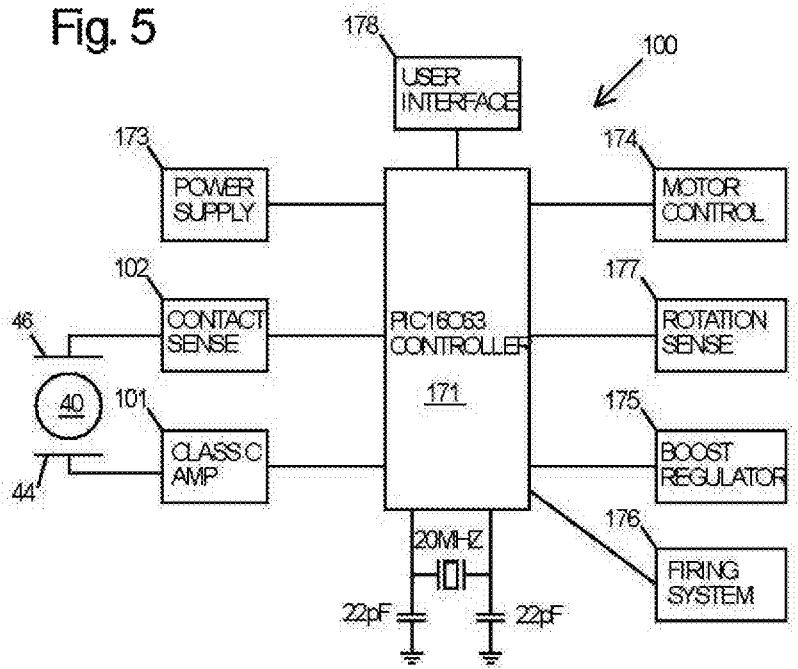
FIG. 5 is a block diagram illustrating the arrangement of a second alternative electronic subsystem.

Another embodiment of an electronic subsystem 100 adapted to accommodate green wood and offering certain other benefits is shown in FIGS. 5-13. As shown in FIG. 5, system 100 includes an excitation system 101 in the form of a class-C amplifier connected to a microcontroller 171. System 100 also includes a monitoring system 102 in the form of a contact sense circuit connected to controller 171. A power supply 173 supplies power to the various elements of system 100. A motor controller 174 is adapted to turn a motor off and on based on signals from the controller. A boost regulator 175 operates to charge a firing system 176. A rotation sense circuit 177 detects rotation of the cutting tool. Lastly, a user interface 178 is provided to allow a user to control operation of the saw and provide feedback on the status of the system.

A computer program listing for a controller as shown in FIG. 5 is submitted herewith as a Computer Program Listing Appendix.

Figure 6:
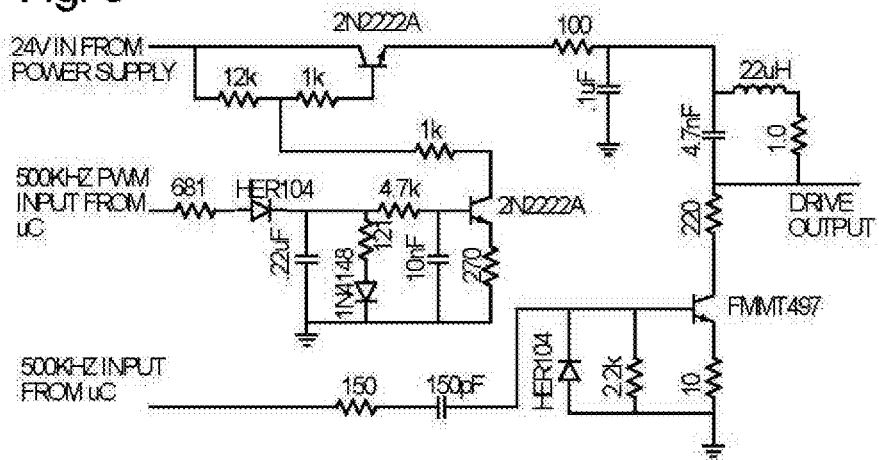
FIG. 6 is a schematic diagram of an excitation system of the subsystem of FIG. 5.

FIG. 6 illustrates the circuitry of the class-C amplifier in more detail. The amplifier includes a drive output that is coupled to plate 44 as shown in FIG. 5. The drive output is sinusoidal at about 500 khz and the amplitude is adjustable between about 3 volts and 25 volts. A 32-volt input supply line from the power supply provides power for the amplifier. The base frequency is provided by a 500 khz square wave input from the controller. The amplitude is controlled by pulse width modulation from the controller.

The controller is programmed to adjust the drive voltage output from the amplifier to maintain a predetermined amplitude at plate 46 under varying capacitive loads. Thus, when cutting green wood, the controller ramps up the drive voltage to maintain the desired voltage on plate 46. The controller is preferably capable of skewing the drive voltage between about 1 and 50% per millisecond, and more preferably between 1 and 10%. This allows the system to maintain a constant output level under the varying load created while sawing green wood, or such as might be created by placing a conductive member such a fence near the blade. The controller should preferably not skew the drive voltage by much more than 50% per millisecond, or it may counteract the drop in signal created by a user contact event.

Figure 7:
FIG. 7 shows an exemplary attenuation in signal that occurs when the finger of a user contacts a blade.

FIG. 7 illustrates the change in signal amplitude seen at plate 46 as the teeth of a 10-inch, 36-tooth saw blade spinning at 4000 rpm contacts a user's finger. Each of the drops in the signal amplitude is from a single tooth moving through the skin of the finger. It can be seen, for instance, that the signal amplitude drops by about 30% over about 50 µS as the second tooth strikes the finger. When cutting very green wood, the signal attenuation upon contact will be more like 15%, but will occur over the same 50 µS. Therefore, as long as the system can detect a contact event of a 5-25% or greater drop in less than 100 µS, providing a skew rate of around 10% per millisecond should not override an actual event. It will be understood that the skew rate and trigger thresholds can be adjusted as desired. The primary limiting factor is that the trigger threshold should not be so small that noise creates false triggers, unless false triggers are acceptable.

Figure 8:
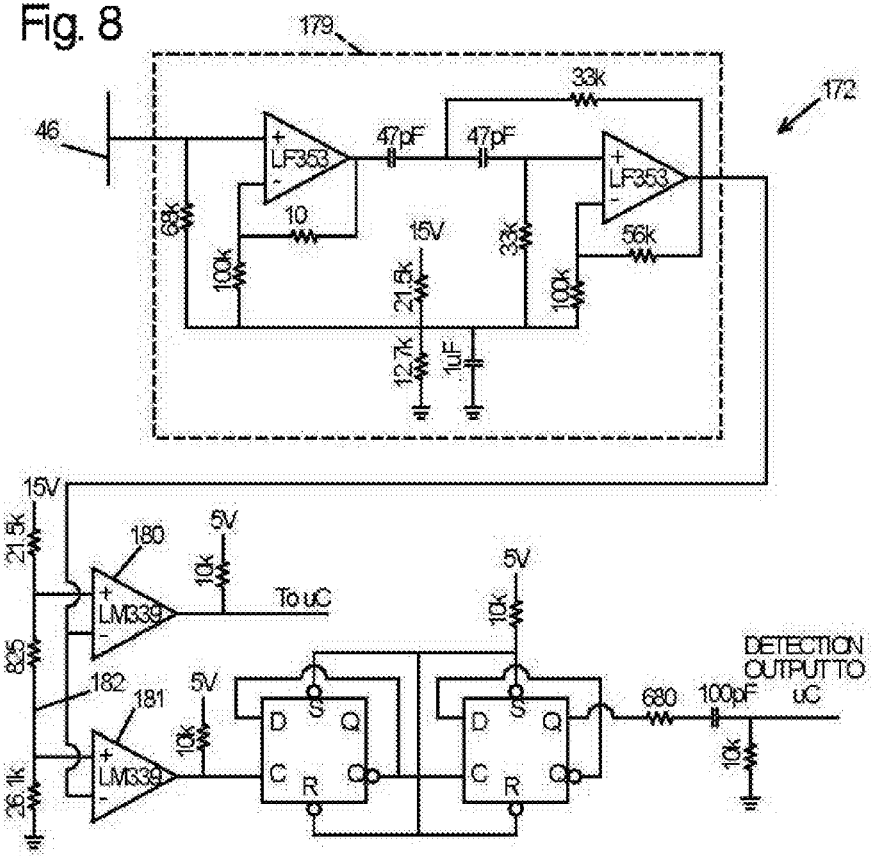
FIG. 8 is a schematic of a contact sense portion of the subsystem of FIG. 5.

FIG. 8 shows the details of the contact sense circuit. The contact sense circuit receives input from plate 46. In this embodiment, the preferred capacitive coupling between the blade and the plates is about 30 pF for the drive plate and about 10 pF for plate 46. The larger drive plate size improved signal transfer for a given total capacitance of both plates. The actual values are not critical, and equal values could be used as well. Generally speaking, the capacitance of the drive plate should be comparable to the human body capacitance to be detected, i.e. 10-200 pF.

The input from plate 46 is fed through a high-pass filter 179 to attenuate any low frequency noise, such as 60 hz noise, picked up by plate 46. Filter 179 can also provide amplification of the signal to a desired level as necessary. The output of the filter is fed into a set of comparators 180, 181. Comparator 180 pulses high briefly if the maximum signal amplitude from the filter exceeds the value at its positive input set by voltage divider 182. The output pulses from the comparator are fed to the controller. The controller samples over a 200 µS window and modulates the drive amplitude to attempt to maintain the sensed voltage at a level so that 50% of the waveform cycles generate a pulse through comparator 180. If less than 50% generate pulses, then the controller raises the drive voltage by a set amount. Likewise, if more than 50% generate pulses, the drive voltage is lowered. The system can be configured to step by larger or smaller amounts depending on the deviation from 50% observed during a particular window. For instance, if 45 pulses are observed, the system may step up the drive amplitude by 1%. However, if only 35 pulses are observed, the system may step by 5%. The system will continually "hunt" to maintain the proper drive level. By selecting the window duration and adjustment amount, it is possible to control the skew rate to the desired level as described above.

Comparator 181 pulses every cycle of the waveform so long as the sensed voltage exceeds a lower trigger threshold set by voltage divider 182. Therefore, under normal circumstances, this is a 500 khz pulse. The pulse output from comparator 181 is fed through a divide-by-four circuit formed by two D-flip flops to reduce the frequency to 125 khz—or an 8 µS period. The output of the divider is fed to the controller. The controller monitors this line to insure that a pulse occurs at least every 18 µS. Therefore, if more than about half of the pulse are missing in over an 18 µS period, the controller will trigger the reaction system. Of course, the particular period can be selected as desired to maximize reliability of contact detection and minimize false triggers. A benefit of the described arrangement is that a single pulse or even two may be missing, such as due to noise, without triggering the system. However, if more pulses are missing, the system will still be triggered reliably. The particular trigger level for missing pulses is set by the voltage divider. This level will typically be between 5 and 40% for the described system.

FIG. 9 illustrates the circuit of power supply 173. The power supply includes an unregulated 32-volt output and regulated 5, 15 and 24-volt outputs. The 24-volt output is used to power the excitation signal, which has a relatively large voltage, and the 32-volt output powers a capacitor charging circuit described below. The 5-volt output powers the controller and other logic circuitry, while the 15-volt output operates most of the analog electronics. A low-voltage output is monitored by the controller to insure that adequate voltage is present to operate the system.

Boost regulator 175 and firing system 176 are shown in FIG. 10. Boost regulator 175 includes a buck-boost charger 183 that steps up the 32-volt supply input to 180 volts for charging the firing circuit. The controller provides a 125 khz input to modulate the buck-boost cycle of the charger. A regulator circuit 184 monitors the voltage from the firing circuit and turns the charger on or off as necessary to maintain the charge near 180 volts. The regulator circuit is constructed with a predetermined amount of hysteresis so that the charger will turn on when the firing circuit voltage falls below 177 volts and turn off when the voltage reaches 180 volts, as set by the voltage divider inputs and feedback to comparator 185. The output of comparator 185 is fed to the controller. By monitoring the charge and discharge time based on the state of the output of comparator 185, the controller can verify that the capacitor in the firing circuit is operating properly and storing adequate charge. An overvoltage circuit uses a 220V transient suppressor to signal the controller if the voltage on the capacitor exceeds about 220V. This testing is described in more detail in Section 9 below. Additionally, the firing circuit is described in more detail in Section 6 below.

Figure 11:
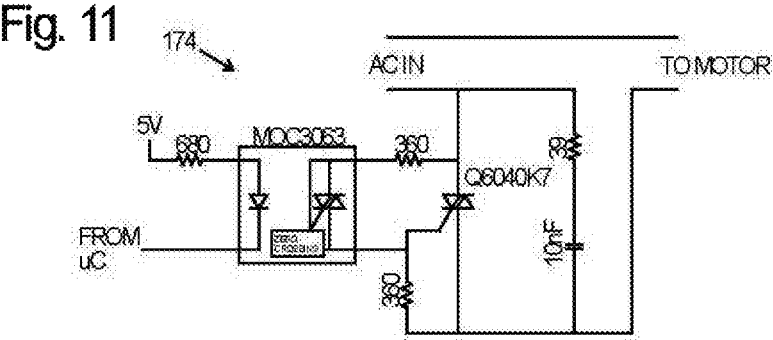
FIG. 11 is a schematic of a motor control portion of the subsystem of FIG. 5.

FIG. 11 illustrates the circuitry of motor control 174. The motor control receives a logic level control signal from the controller to turn the motor on and off based on input from the user interface, described in more detail below. The motor control also turns off the motor when a trigger event occurs. The logic signal is electrically isolated from the motor voltage by an optoisolated triac driver. This isolates the ground of the detection system from the ground of the motor power. A mechanical relay or similar device can also be used and will provide the same isolation. When the optoisolated triac drive receives a signal from the controller, it turns on Q6040K7 triac to provide power to the machine.

Figure 12:
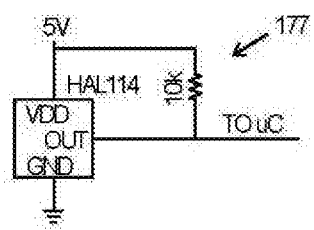
FIG. 12 is a schematic of a rotation sensor portion of the subsystem of FIG. 5.

The rotation sense circuit is shown in FIG. 12. The purpose of the rotation sense circuit is to insure that the contact detection system is not turned off until the cutter or blade as stopped. The rotation sense circuit utilizes a hall-effect sensor that is located adjacent a rotating portion of the machine. A small magnet is inserted in the rotating portion to signal the hall-effect sensor. Output of the hall-effect sensor is fed to the controller. As described in more detail Sections 9 and 10 below, the controller monitors the output of the hall-effect sensor to determine when the cutter has coasted to a stop. Once the cutter stops, any sensed contact will no longer trigger the reaction system. It should be noted that rotation of the cutter could be detected by other arrangements as well.

For instance, a small eccentricity can be placed on the cutter or some other isolated structure that rotates with the cutter, such as the arbor. This eccentricity can be placed to pass by sense plate 46 or by a separate sensing plate. The eccentricity will modulate the detected signal amplitude so long as the cutter is rotating. This modulation can be monitored to detect rotation. If the eccentricity is sensed by sense plate 46, it should be small enough that the signal modulation generated will not register as a contact event. As another alternative, rotation can be sensed by electromagnetic feedback from the motor. These and other examples are described in Section 10 below.

The controller may also be designed to monitor line voltage to insure that adequate voltage is present to operate the system. For instance, during motor start up, the AC voltage available to the safety system may drop nearly in half depending on the cabling to the saw. If the voltage drops below a safe level, the controller can shut off the saw motor. Alternatively, the controller may include a capacitor of sufficient capacity to operate the system for several seconds without power input while the saw is starting.

Figure 13:
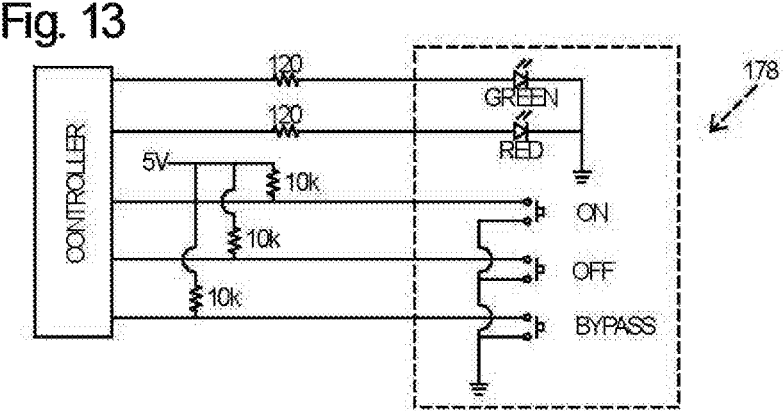
FIG. 13 is a schematic of a user interface portion of the subsystem of FIG. 5.

User interface 178 is shown in FIG. 13. The user interface includes start, stop and bypass buttons that are used to control the operation of the saw. The bypass button allows the user to disable the contact detection system for a single on/off cycle of the saw so as to be able to saw metal or other materials that would otherwise trigger the reaction system. The user interface also includes red and green LEDs that are used to report the status of the system to a user. More details on the operation of suitable user interfaces are described in Section 9 below.

Two additional electronic configurations for detection subsystem 22 are shown in FIGS. 14-18. As illustrated in FIG. 15, the alternative detection systems utilize a microcontroller 171 to manage and monitor various functions. An excitation system delivers a 350 khz sine wave drive signal through plate 44 to the blade. The circuit for generating the drive signal is illustrated in FIG. 15. The excitation circuit uses a 700 khz oscillator with an output fed into a double to generate a 1.4 Mhz signal. The output of the double is fed into a set of S-R flip-flops to extract phase signals at 90-degree intervals. The phase signals are used to drive a synchronous detection system that forms one of the two embodiments of FIGS. 14-18 and is shown in more detail in FIG. 17. The 350 khz square wave 180-degree phase signal is fed through an inverter and a buffer amplifier into a Q=10, 350 khz band pass filter.

Figure 16:
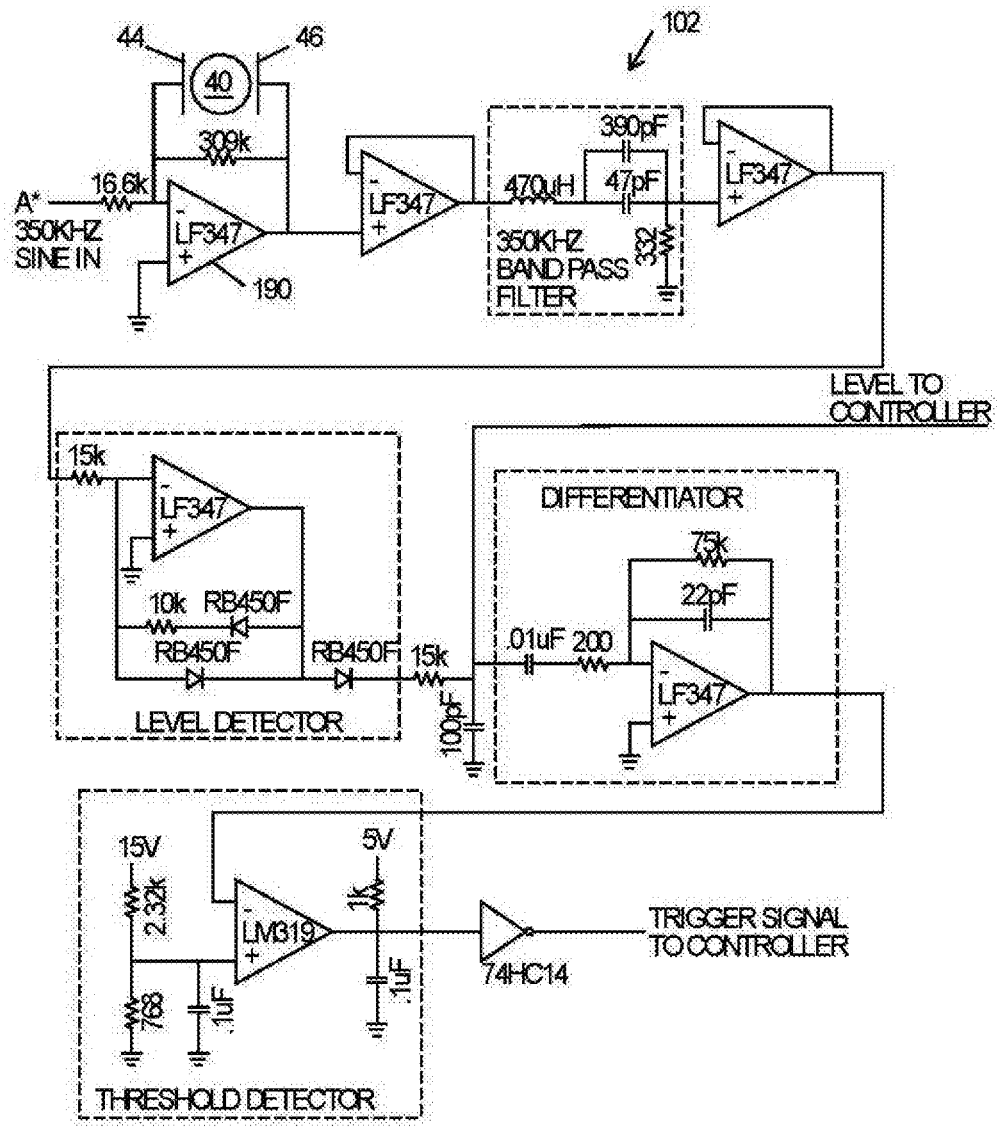
FIG. 16 is a schematic of a contact sense portion of the second alternative subsystem of FIG. 14.

The output of the band pass filter is a 350 khz sine wave that is fed through another buffer amplifier to a sense amplifier 190 shown in FIG. 16. The output of the sense amplifier is fed to plate 44 and the input from plate 46 is fed back to the negative input. When a user touches cutter 40, the feedback on the sense amplifier is reduced, thereby causing the output amplitude to go up. The result of this arrangement is that the drive amplitude on the blade is small during normal use and rises only when a user touches the blade or green wood is cut. In this embodiment, the preferred capacitive coupling of the plates to the blade is about 90 pF each, although other values could be used.

The output of the sense amplifier is fed through a buffer and into a 350 khz band pass filter to filter out any noise that may have been picked up from the blade or plates. The output of the band pass filter is fed through a buffer and into a level detector. The level detector generates a DC output proportional to the amplitude of the sense amplifier. The output of the level detector is smoothed by an RC circuit to reduce ripple and fed into a differentiator. The differentiator generates an output proportional to the rate of change of the sense amplifier output amplitude.

As mentioned above, the sense amplifier output only changes when a user touches the blade or green wood is cut. The change when cutting green wood is slow relative to what happens when a user touches the blade. Therefore, the differentiator is tuned to respond to a user contact, while generating minimal response to green wood. The output of the differentiator is then fed to a comparator that acts as threshold detector to determine if the output of the differentiator has reached a predetermined level set by the a voltage divider network. The output of the threshold detector is fed through a Schmitt-trigger that signals the controller that a contact event has occurred. An RC network acts as a pulse stretcher to insure that the signal lasts long enough to be detected by the controller.

The output from the level detector is also fed to an analog to digital input on the controller. It may be that the under some circumstances, such as while cutting extremely green wood, the response of the sense amplifier will be near saturation. If this happens, the amplifier may no longer be capable of responding to a contact event. In order to provide a warning of this situation, the controller monitors this line to make sure that the detected level stays low enough to allow a subsequent contact to be detected. If an excess impedance load is detected, the controller can shut down the saw without triggering the reaction system to provide the user with a warning. If the user wants to continue, they can initiate the bypass mode as described above.

Figure 17:
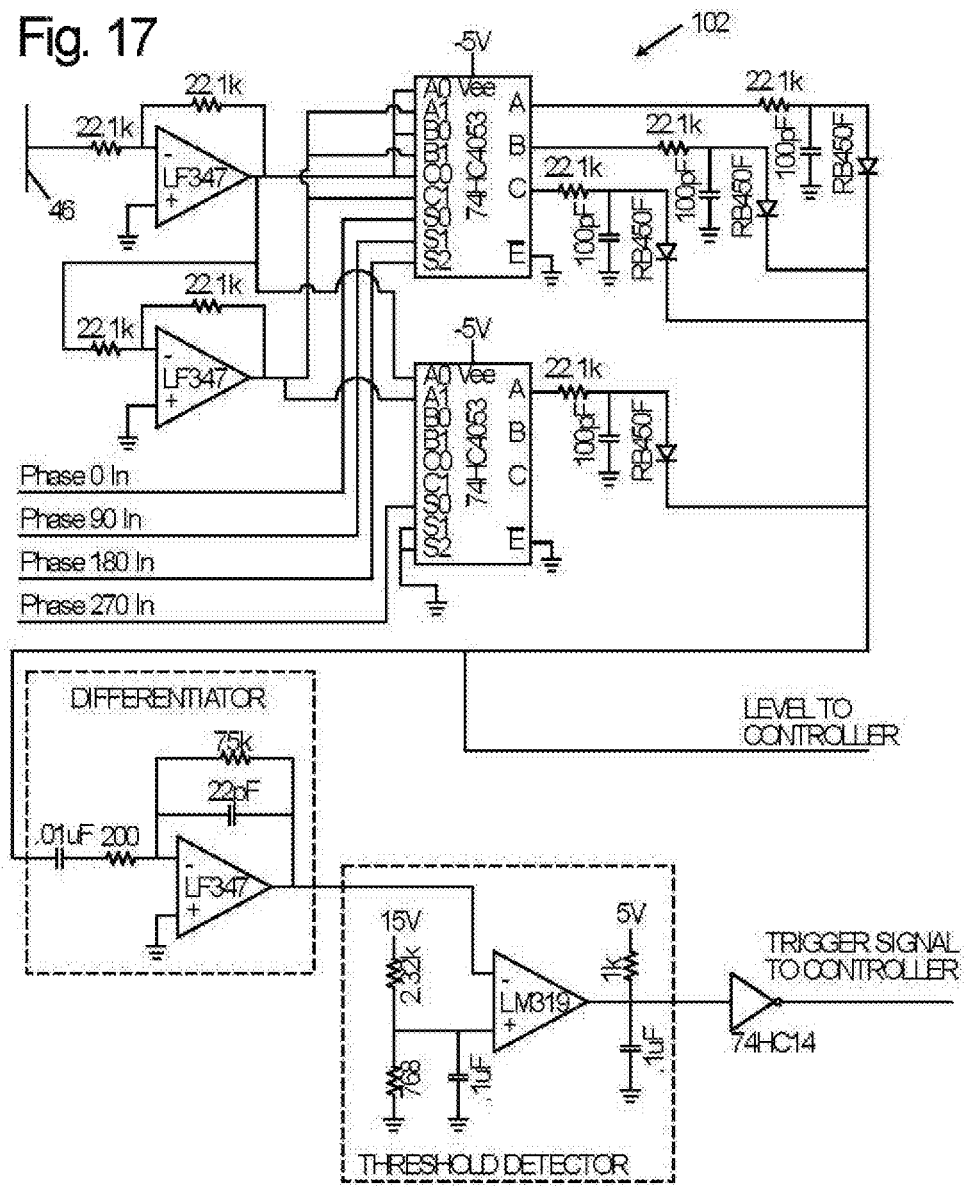
FIG. 17 is a schematic of a contact sense portion of the third alternative subsystem of FIG. 14.

The second of the two alternative detection systems of FIGS. 14-18 is a synchronous detector that uses the phase information generated by the flip-flops in FIG. 15. This system drives plate 44 through the ALT DRIVE circuit shown in FIG. 15. This ALT DRIVE circuit and the detection circuit of FIG. 17 are substituted for the circuit of FIG. 16. As shown in FIG. 17, the signal from plate 46 is fed through a pair of buffer/amplifiers into a set of analog switches. The switches are controlled by the phase information from the flip-flops. This arrangement generates an output signal that is proportional to the amplitude of the signal detected from plate 46 with improved noise immunity because of the synchronous detection. The output signal is fed into a differentiator and threshold detector circuit as previously described. These circuits send a trigger signal to the controller when the detected signal amplitude drops at a rate sufficient for the differentiator to have an output exceeding the threshold level.

Figure 18:
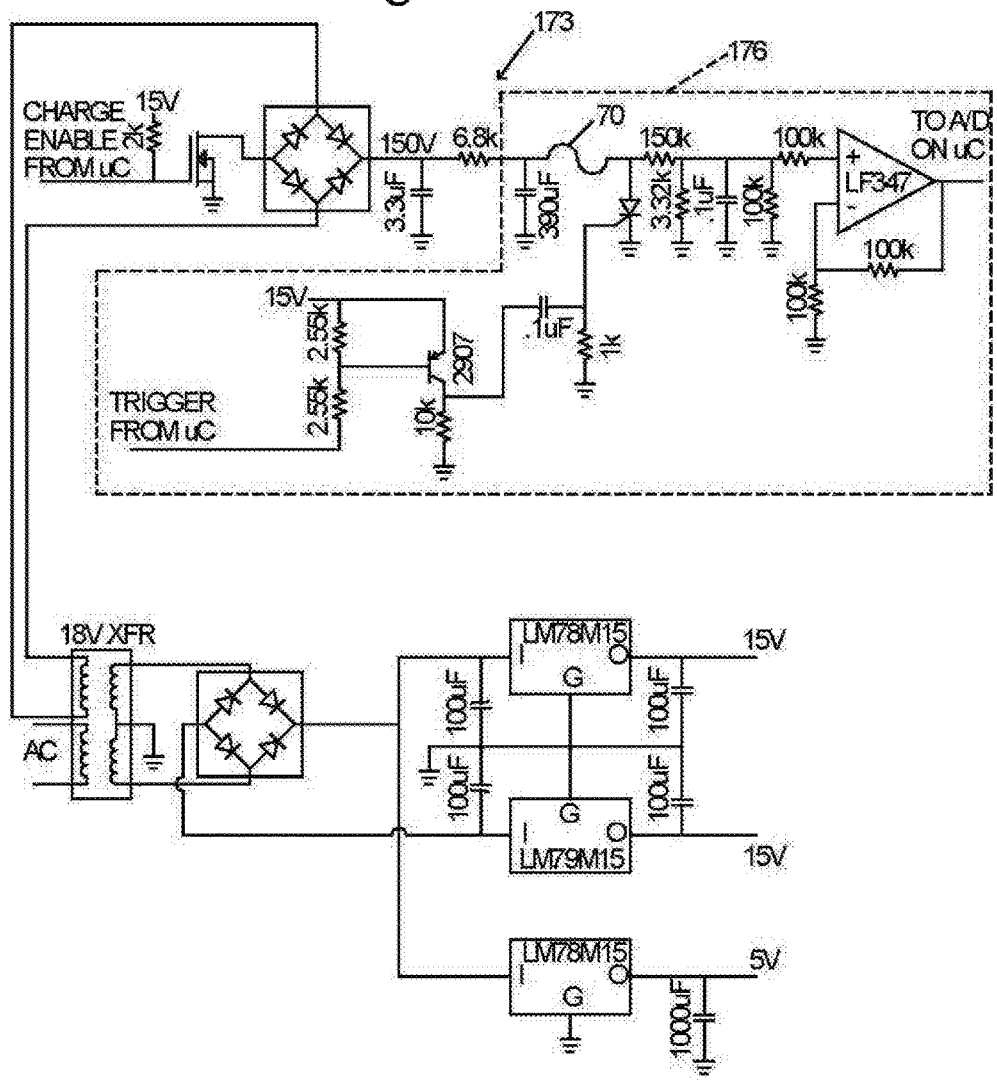
FIG. 18 is a schematic of a power supply and firing system portion of the subsystems of FIG. 14.

FIG. 18 illustrates a power supply and firing system suited for use in these two alternative arrangements. The power supply generates plus and minus 15-volt levels, as well as a 5-volts level. The capacitor in the firing circuit is charged by a secondary input winding on the power transformer. This arrangement provides for isolation of the system ground from the machine ground and avoids the need to step up power supply voltage to the capacitor voltage as accomplished by boost regulator 175. However, the capacitor charge voltage becomes dependent on the line voltage, which is somewhat less predictable.

The charging circuit for the capacitor is regulated by an enable line from the controller. By deactivating the charging circuit, the controller can monitor the capacitor voltage through an output to an A/D line on the controller. When the capacitor is not being charged, it should discharge at a relatively know rate through the various paths to ground. By monitoring the discharge rate, the controller can insure that the capacitance of the capacitor is sufficient to burn the fusible member. The trigger control from the controller is used to fire the SCR to burn the fusible member.

With any of the above electronic subsystems, it is possible to avoid triggering in the event metal or metal-foiled materials are cut by looking for the amplitude of the signal, or the rate of change, depending on the system, to fall within a window or band rather than simply exceeding or falling below a certain threshold. More particularly, when metal is cut, the detected signal will drop to almost zero, and will drop within a single cycle. Thus, the controller or threshold detection circuitry can be configured to look for amplitude change of somewhat less than 100%, but more than 10% as a trigger event, to eliminate triggering on metal or other conductive work pieces which would normally substantially completely ground the signal.

It should be noted that, although not essential, all of the described embodiments operate at a relatively high frequency—above 100 khz. This high frequency is believed to be advantageous for two reasons. First, with a high frequency, it is possible to detect contact more quickly and sample many cycles of the waveform within a short period of time. This allows the detection system to look for multiple missed pulses rather than just one missed pulse, such as might occur due to noise, to trigger the reaction system. In addition, the higher frequency is believed to provide a better signal to noise ratio when cutting green wood, which has a lower impedance at lower frequencies.

The contact detection subsystem, detection signal properties, circuits, methods and machines may be described as set forth in the following numbered paragraphs. These paragraphs are intended as illustrative, and are not intended to limit the disclosure or claims in any way. Changes and modifications may be made to the following descriptions without departing from the scope of the disclosure.

1.1 A machine adapted to process a workpiece and including a contact detection system, comprising:

an electrically conductive sensor positioned at a potentially dangerous location in the machine, where the sensor may contact the workpiece or a user;

a contact detection system connected to the sensor to receive a signal therefrom, where the contact detection system is configured to differentiate contact of the sensor with the user from contact of the sensor with the workpiece based on the rate at which the signal changes upon contact.

1.2 A woodworking machine, comprising:

a cutter adapted to cut a workpiece;

an excitation system adapted to supply an electrical signal having a first amplitude and period, the electrical signal being coupled to the cutter to induce a corresponding electrical signal of a second amplitude on the cutter, and a contact sensing system adapted to sense the electrical signal induced onto the cutter, where the contact sensing system is adapted to sense contact between a user and the cutter based on a change in the sensed electrical signal over a detection period, where the detection period is between 5 and 150 microseconds and at least twice the period of the electrical signal.

1.2.1 The machine of paragraph 1.2, wherein the excitation system is adapted to adjust the first amplitude based on the sensed electrical signal properties.

1.2.1.1 The machine of paragraph 1.2.1, wherein the excitation system is adapted to adjust the first amplitude to maintain a predetermined second amplitude.

1.2.1.2 The machine of paragraph 1.21, wherein the adjustment rate of the first amplitude is less than 10% per millisecond.

1.3 A woodworking machine, comprising:

a cutter adapted to cut a workpiece;

an excitation system with an electrical output adapted to induce an electrical signal having a first amplitude on the cutter, where the excitation system is adapted to adjust the amplitude of the electrical output to maintain the first amplitude substantially constant so long as the electrical load on the cutter changes within certain boundaries.

1.3.1 The woodworking system of paragraph 1.3, wherein the boundaries include a maximum rate of change of the electrical load.

1.4 A contact detection system, comprising:

a sensor;

an excitation system adapted to generate a drive signal, where the drive signal is coupled to the sensor to induce a corresponding induced signal on the sensor, where ratio of the amplitude of the drive signal to the induced signal varies depending on the objects in proximity to the sensor; and a control system adapted to adjust the amplitude of the drive signal to maintain the induced signal at a substantially constant amplitude as various objects come into proximity of the sensor.

Section 2: Detection of Dangerous Conditions

As mentioned above, contact detection plates 44 and 46 are used to detect contact between the user's body and cutting tool 14. It will be appreciated that detection subsystem 22 may employ any one or more of a wide variety of methods for detecting contact between the blade and a user's body. In view of the relatively high response speed of electronic signals and circuits, one suitable method includes using electrical circuitry to detect an electronic connection between a user and the cutting tool. It has been found that the capacitance of a user's body, as measured through dry contact with a portion of the user's body, is approximately 25 to 200 picofarads. The measured contact capacitance tends to increase with increasing body size and with increased coupling between the user's body and an electrical ground.

As a result of the inherent capacitance of a user's body, when the user touches cutting tool 14, the capacitance of the user's body is electrically coupled to the inherent capacitance of the cutting tool, thereby creating an effective capacitance that is larger than the inherent capacitance of the cutting tool alone. Thus, detection subsystem 22 may be electrically coupled to measure the capacitance of the cutting tool, so that any substantial change in the measured capacitance would indicate contact between the user's body and the cutting tool.

The exemplary implementation depicted in FIG. 2 illustrates a detection subsystem 22 that is configured to detect contact between a user and the cutting tool through a capacitive coupling between the blade and plates 44, 46. Detection system 22 includes suitable electrical circuitry (e.g., such as described in Section 1 above) to transmit an input signal to plate 44, and to detect the input signal through plate 46. Plate 44 is mounted close to, but spaced-apart from, blade 40. Plate 44 is capacitively coupled to the saw blade by virtue of its size and placement parallel to and spaced-apart from the saw blade. Plate 46 is also mounted close to, but spaced-apart from, the saw blade to establish a second capacitive coupling. It will be appreciated that the number, size and placement of charge plates may vary.

The effect of this arrangement is to form two capacitors in series through the blade, creating a capacitive shunt at the junction between the capacitors. Plates 44 and 46 function as charge plates of the capacitors. The input signal is capacitively coupled from charge plate 44 onto blade 40, and then capacitively coupled from the blade to charge plate 46. Any change in the capacitance of the blade changes the signal coupled to charge plate 46.

When a user touches blade 40, the capacitance of the user's body creates a capacitive load on the blade. As a result, the size of the capacitive shunt between the charge plates and the blade is increased, thereby reducing the charge that reaches plate 46. Thus, the magnitude of the input signal passed through the blade to plate 46 decreases when a user touches the blade. Detection subsystem 22 is configured to detect this change in the input signal and transmit a contact detection signal to logic controller 50.

In some cases, there may be a significant amount of resistance at the contact point of the user's dry skin and the blade. This resistance may reduce the capacitive coupling of the user's body to the blade. However, when the teeth on the blade penetrate the outer layer of the user's skin, the moisture inherent in the internal tissue of skin will tend to decrease the resistance of the skin/blade contact, thereby establishing a solid electrical connection. The sensitivity of detection subsystem 22 can be adjusted as desired to recognize even slight changes in the input signal.

Generally speaking, the spacing of the charge plates from the blade is not critical, and may vary depending on the charge plate area and the desired capacitive coupling with the blade. However, it may be desirable to separate the plates from the blade by a distance selected to reduce the effect of deflections in the blade on the capacitance between the blade and the plates. For instance, if the blade is displaced 1/32 of an inch toward one of the plates by loads created during cutting operations, the capacitance to that plate is increased. Since the capacitance is proportional to the area of the plate divided by the spacing, a relatively large spacing reduces the relative effect of a given blade displacement. Distances in the range of approximately 1/32 inch and approximately 1/2 inch have proven effective, although values outside this range could be used under appropriate circumstances.

It will be appreciated that the charge plates may be positioned at any point adjacent one or both sides and/or the perimeter of the blade. In the exemplary embodiment, the plates are disposed relatively close to the center of the blade. Since the deflection of the blade typically is at a minimum near the arbor upon which it is mounted, placing the charge plates close to the arbor has the advantage of minimizing the effect of blade deflection on the capacitive coupling between the plates and the blade. In various alternative embodiments, the outer edges of at least one of the charge plates is radially spaced within 50%, 40%, 30%, 20% or 10% of the blade's radius from the center of the blade.

The charge plates may be mounted within machine 10 in any suitable fashion known to those of skill in the art. For example, in the exemplary embodiment depicted in FIG. 19, operative structure 12 includes a pivotal arbor block 250 adapted to support arbor 42. The charge plates are mounted on a support member 251 (shown in dashed lines in FIG. 19), which is attached to arbor block 250. As a result, charge plates 44 and 46 pivot with the arbor block, thereby maintaining their position adjacent the blade. Alternatively, the charge plates may be mounted in a stationary configuration.

Figure 19:
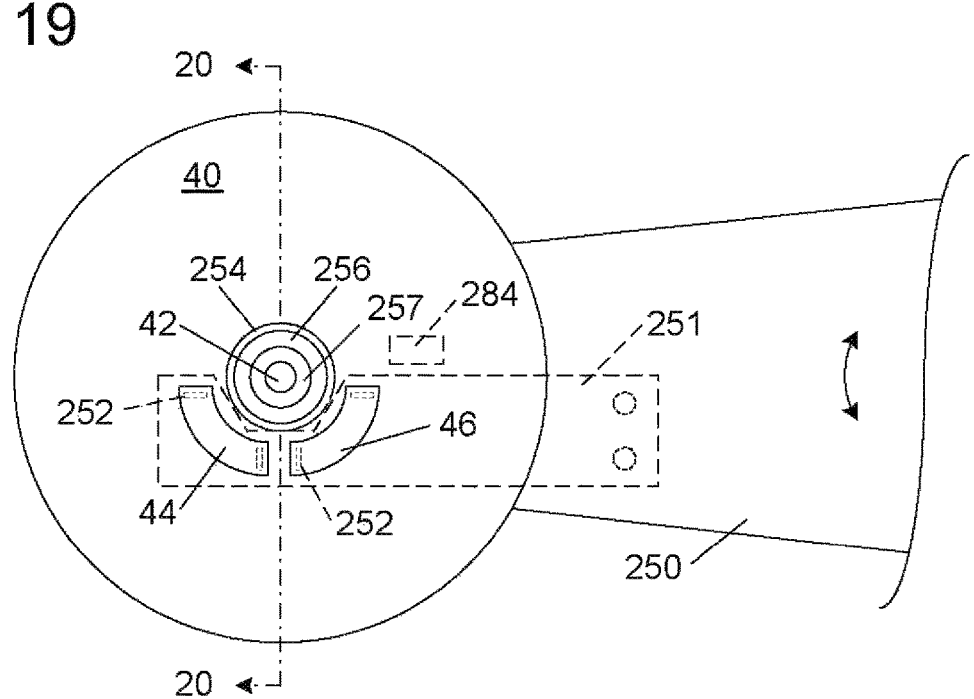
FIG. 19 is a schematic side elevation of an exemplary embodiment, showing the electrical isolation of the blade from the arbor and the mounting of the charge plates to capacitively couple to the blade. Indicated in dash lines are a bracket for mounting the charge plates, spacers between the charge plates and blade, and a brush contact mounted on the arbor block.
Figure 20:
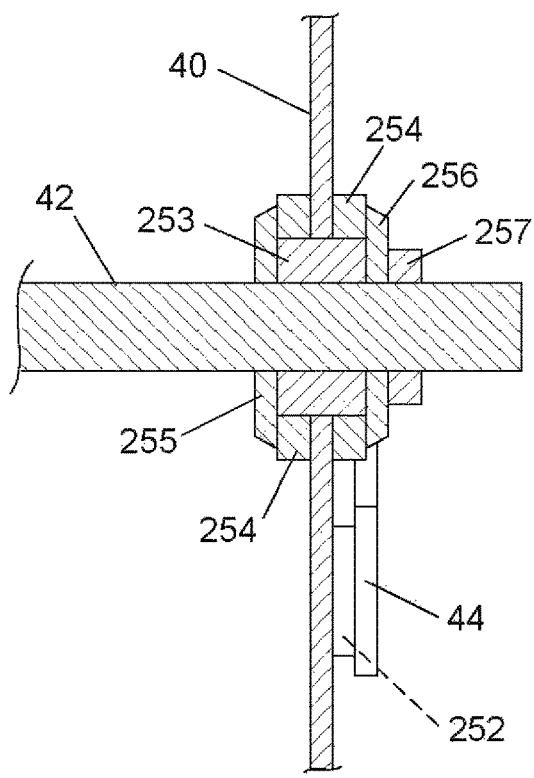
FIG. 20 is a magnified cross-sectional view taken generally along the line 20-20 in FIG. 19. For clarity, the mounting bracket indicated in FIG. 19 is not shown.

In an alternative embodiment, at least one of the charge plates may include one or more insulating spacers 252 mounted on the side of the charge plate adjacent the blade, such as shown in FIGS. 19 and 20. Spacers 252 act as physical barriers to prevent the blade from deflecting too close to the charge plate. This may be especially useful when the distances between the charge plates and the blade are relatively small. The spacers may be constructed of any suitable electrically insulating material, including ceramic, glass, plastic, etc. In the exemplary embodiment depicted in FIGS. 19 and 20, spacers 252 cover only a small portion of the area between the charge plates and the blade. As a result, the spacers have relatively little effect on the capacitance between the blade and the plate. Alternatively, the spacers may cover a substantially larger portion, or even all of the space between the charge plates and the blade. In this latter case, the spacer will function, at least partially, as the dielectric between the conductive surfaces of the charge plates and the blade. Thus, the capacitance between the blade and the charge plates will depend on the dielectric constant of the spacer.

In addition to the one or more spacers mounted between the charge plates and the blade, opposing spacers (not shown) may be mounted on the side of the blade opposite the charge plates to prevent the blade from deflecting too far from the charge plates. Alternatively, one charge plate may be mounted on the opposite side of the blade from the other charge plate. Further, the spacers may be designed to slide on the surface of the blade as it moves. Additionally, if the charge plates are mounted to move into and away from the side of the blade, and resiliently biased toward the blade, the charge plates and spacers will move with any deflections of the blade, thereby maintaining contact between the spacers and blade even when the blade is deflected. An advantage of this arrangement is the close spacing that can be established and maintained, thereby reducing the size of the plates and maintaining a constant capacitance between the charge plate and blade.

It will be appreciated that the size of charge plates 44 and 46 may also vary. Typical plate areas are between 1 and 10 square inches, although many different sizes may be used, including sizes outside of this typical range. In the exemplary embodiment, the charge plate sizes are selected, in conjunction with charge plate spacing and dielectric material, to provide a charge plate-to-blade capacitance that is comparable (e.g., within an order of magnitude) with the capacitance of the human body. This configuration serves to improve the signal-to-noise ratio of the input signal detected by charge plate 46. Furthermore, charge plate 44 may be a different size than charge plate 46 and/or be spaced closer or farther apart from the blade to provide different capacitances. For example, it may be desirable to size drive charge plate 44 larger than sense charge plate 46 to increase the coupling of the drive charge plate.

An example of a suitable charge plate material is copper-plated printed circuit board, which is relatively rigid, flat and thin. Other examples include any relatively electrically conductive material such as gold, aluminum, copper, steel, brass, etc. The charge plates may take any shape suitable for the particular clearances of machine 10. Where there are large grounded metal structures near the blade, a larger driving charge plate 44 can be used to partially shield the blade from capacitive coupling to the grounded structure. Although the larger plate also will have increased capacitive coupling to the grounded structure, this does not interfere with the operation of detection subsystem 22 because the detection subsystem is capable of driving much larger capacitance loads than are created under these circumstances.

It will be appreciated by those of skill in the art that blade 40 should be insulated from electrical ground to allow the input signal to be capacitively coupled from charge plate 44 to charge plate 46. In the exemplary embodiment depicted in FIGS. 19 and 20, blade 40 is electrically isolated from arbor 42 on which it rides, thus insulating the blade from ground and the remaining structure of the machine. There are a variety of suitable arrangements for providing electrical insulation between the blade and the arbor, which may vary depending on the particular configuration of machine 10. For example, in the case of a ⅝-inch arbor shaft 42, blade 40 can be formed with a one-inch diameter hole into which a 3/16-inch thick cylindrical plastic bushing 253 is fitted, such as shown in FIGS. 19 and 20. Insulating washers 254 are disposed on either side of the blade to isolate the blade from the arbor flange 255 and arbor washer 256. The insulating washers should be thick enough that only negligible capacitance is created between the blade and the grounded arbor flange and washer. A typical thickness is approximately ⅛-inch, although 1/32-inch or less may be suitable depending on other factors. In addition, it is possible to construct some or all of the arbor components from non-conductive materials, such as ceramic, to reduce or eliminate the need for electrical isolation from the arbor.

An arbor nut 257 holds the entire blade assembly on arbor 42. Friction established by tightening the arbor nut allows torque from the arbor to be transmitted to the saw blade. It is preferable, although not essential, that the blade be able to slip slightly on the arbor in the event of a sudden stop by the brake to reduce the mass that must be stopped and decrease the chance of damage to the blade, arbor, and/or other components in the drive system of the saw. Furthermore, it may be desirable to construct the bushing from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake, as is discussed in more detail in Section 3 below.

It will be appreciated that the blade insulation assembly described above does not require special saw blades such as are described in U.S. Pat. No. 4,026,177. Indeed, arbor 42 may be sized to fit within a plastic bushing 253 received within a standard saw blade 40 having a ⅝-inch diameter hole. Thus, an operator may use any standard blade on machine 10.

As an alternative to insulating the blade from the arbor, the arbor and/or part of its supporting framework may be electrically isolated from ground. One benefit of this embodiment is that if the blade is electrically connected to the arbor, then the arbor itself can be used to capacitively couple the input signal from charge plate 44 to charge plate 46. As a result, the charge plates are unlikely to interfere with installation and removal of the blade, and thus unlikely to be damaged or removed by a user. While the particular implementation of this alternative embodiment will vary with the configuration of the cutting tool, one exemplary implementation is depicted in FIG. 21.

As shown, blade 40 is mounted directly onto arbor 42. As in FIG. 20, the blade is secured to the arbor by arbor flange 255, arbor washer 256 and arbor nut 257. The arbor is supported for rotational movement relative to an arbor block 250 by one or more bearings 258 mounted in the arbor block and spaced along the elongate axis of the arbor. However, bearings 258 do not contact the arbor directly. Instead, electrically insulating sleeves 259 are disposed between the arbor and the bearings. Arbor block 250 is movable to allow the blade to be raised and lowered, as well as to be inclined for angled cuts. A motor (not shown) drives the arbor through a belt 260 that loops over a pulley 261 on the end of the arbor opposite the blade. The belt typically is non-conducting and thus does not electrically couple the arbor to ground.

Sleeves 259 may be constructed of any suitable material that is relatively durable and non-conductive, including plastic, ceramic, etc. The sleeves may be configured to fit over a constant-diameter arbor as shown, or the arbor may be notched to receive the sleeves so that the outer diameter of the sleeves are flush with the outer diameter of the arbor. Furthermore, it will be appreciated that there are many other arrangements for electrically insulating the arbor. As just a few examples, sleeves 259 may be disposed between bearings 258 and arbor block 250, or at least portions of the bearings may be constructed of non-conductive materials. For example, ceramic bearings may be used. Alternatively, larger portions of the arbor assembly may be isolated from the rest of the saw.

In any event, charging plates 44 and 46 are disposed alongside, but slightly spaced from, the arbor. The charging plates typically are shaped and arranged relative to the arbor to ensure adequate capacitive coupling. For example, the charging plates may be trough-shaped to conform to the cylindrical shape of the arbor, as illustrated in FIG. 21. Alternatively, the plates may be in the form of a ring or tube to completely surround axially-spaced portions of the arbor. The charging plates typically are supported on arbor block 250, such as by mounts 262 extending from the frame. This arrangement ensures that the charging plates will move in tandem with the arbor when the position or angle of the blade is adjusted. The mounts usually will be configured to electrically insulate the charging plates from the frame. The charge plates can be positioned very close to the arbor because it does not deflect during use like the blade, thereby allowing smaller charge plates to be utilized.

Figure 22:
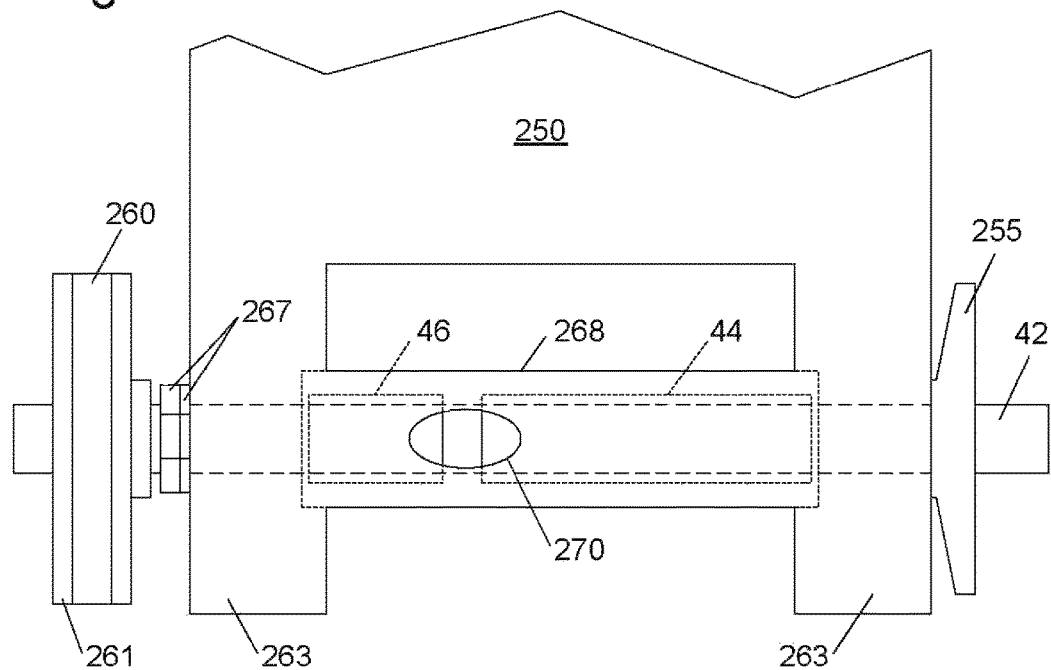
FIG. 22 is a top plan view showing the isolation of, and capacitive coupling to, an arbor on a contractor style table saw.
Figure 23:
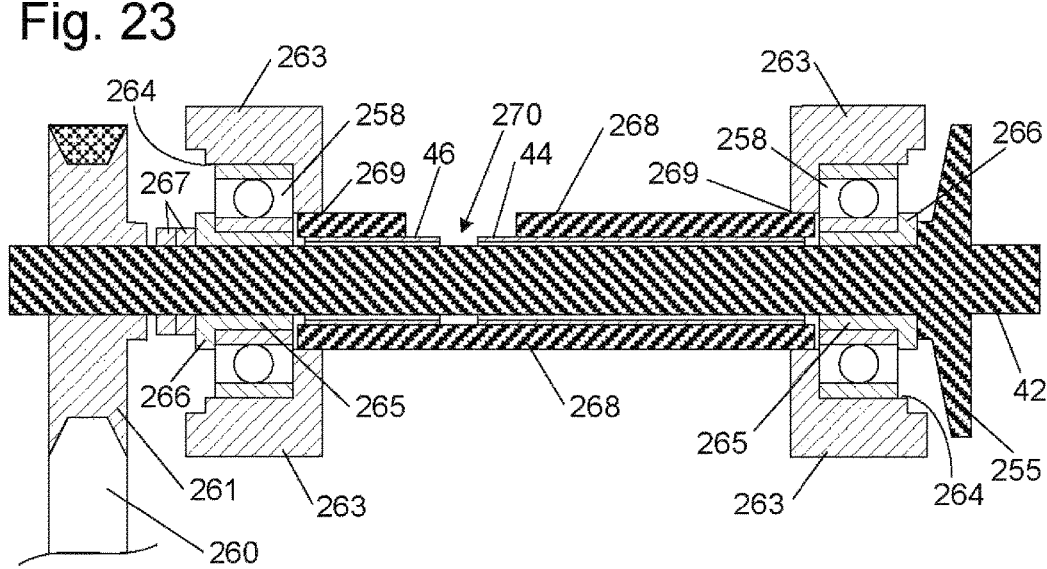
FIG. 23 is a cross-sectional view of the embodiment of FIG. 22 taken generally along the central elongate axis of the arbor and viewing away from the arbor block.

Turning attention to FIGS. 22 and 23, an alternative arrangement for capacitively coupling charge plates 44 and 46 to arbor 42 is shown. This arrangement has proven suitable for use with contractor style table saws which are available from a variety of manufacturers. Arbor block 250 includes two spaced-apart, and generally parallel support members 263 adapted to receive bearings 258 within central recesses 264. Electrically-insulating bushings 265 are disposed in the bearings and adapted to receive arbor 42. Each bushing 265 includes an outer lip or flange 266 which abuts the outer edges of the bearing. The bushings may be constructed of ERTYLITE™ (PET-P), or any other electrically-insulating material adapted to support the arbor within the bearings.

Arbor flange 255 is integrally formed with arbor 42 and abuts against the flange of one of bushings 265. The opposite end of arbor 42 is threaded to receive one or more locking nuts 267, which tighten against the flange of the other bushing 265 to retain arbor 42 within bearings 258. Pulley 261 is mounted on the arbor adjacent locking nuts 267.

As shown in FIG. 23, bushings 265 completely insulate the arbor from the bearings and the arbor block. Alternatively, the bushings could be configured to fit between bearings 258 and support members 263. In any event, the arbor remains securely and symmetrically positioned to rotate freely within the bearings.

Charge plates 44 and 46 take the form of electrically-conductive tubes having inner diameters larger that the diameter of arbor 42. Tubes 44, 46 may be constructed of any suitable material such as brass tube, copper pipe, etc. It will be appreciated that the size of charge tubes 44 and 46 may be selected to provide a desired capacitance with the arbor. Indeed, the size of the charge tubes may be different to provide different capacitances. For example, in the embodiment depicted in FIGS. 22 and 23, charge tube 44 is longer than charge tube 46, thereby providing a higher capacitance between charge tube 44 and the arbor, than between charge tube 46 and the arbor. Alternatively, or additionally, the inside diameters of the charge tubes may be different to provide different capacitances due to different blade-to-charge plate spacings.

Charge tubes 44 and 46 are received in an electrically-insulating support housing or tube 268, having an inner diameter adapted to receive charge tubes 44 and 46. Insulating tube 268 may be formed of any suitable electrically-insulating material such as polycarbonate, nylon, PVC, etc. The insulating tube serves to prevent the charge tubes from being grounded by the arbor block, bearings, etc. Insulating tube 268 is positioned around arbor 42 and received into inner apertures 269 in support members 263. Inner apertures 269 are axially colinear with arbor 42. Thus, where charge tubes 44 and 46 are centrally positioned within the insulating tube, the inner diameters of the charge tubes are automatically positioned by the insulating tube to be axially colinear or symmetrical with the arbor.

It will be appreciated that while the charge tubes and insulating tube in the exemplary embodiment are cylindrical, other shapes may also be used. For example, insulating tube 268 may have a rectangular outer cross-section while maintaining its circular inner cross-section. Likewise, charge tubes 44 and 46 may have any suitable outer cross-sectional shape to match the inner shape of the insulating tube. In any event, mounting the charge tubes to support members 263 ensures that the support tubes maintain the correct position about the arbor regardless of the movement of arbor block 250.

In addition to electrically insulating and automatically positioning the charge tubes, insulating tube 268 also serves to enclose and protect the charge tubes from damage and debris. In the exemplary embodiment, insulating tube 268 defines a hole 270 positioned between charge tube 44 and charge tube 46 to allow electrical cables (not shown) to be soldered or otherwise connected to the charge tubes to carry the signals to and from the detection circuitry of detector subsystem 22. Alternatively, two holes may be used, each positioned over one of the charge tubes.

Since the charge tubes should not come into contact with each other, the fit between the charge tubes and insulating tube is typically tight enough to frictionally prevent movement of the charge tubes along the axis of the insulating tube. Alternatively, a bump or ring may be formed or positioned on the inner diameter of the insulating tube between the charge tubes to prevent the charge tubes from coming into contact. As a further alternative, hole 270 may be used to apply a caulk, glue, epoxy, or similar material between the charge tubes and insulating tube to prevent the charge tubes from moving. As another alternative, one or more set-screws may be threaded through the insulating tube to bear against the charge tubes.

Figure 24:
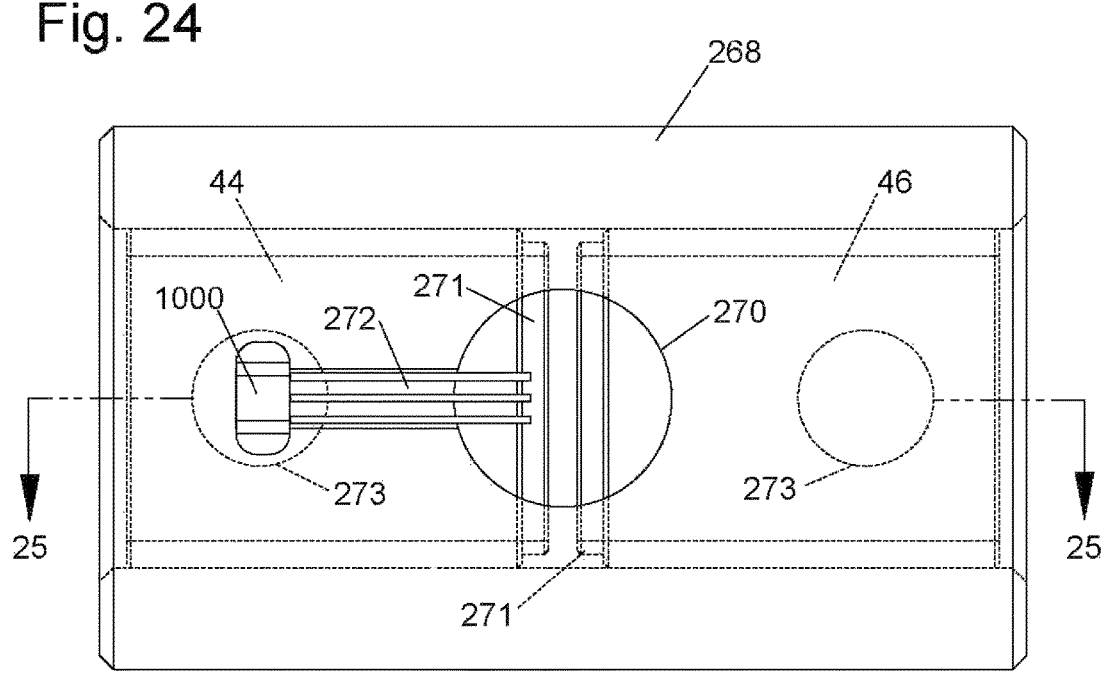
FIG. 24 is a top plan view showing an alternative assembly for coupling the charge plates to the arbor of a contractor style table saw.
Figure 25:
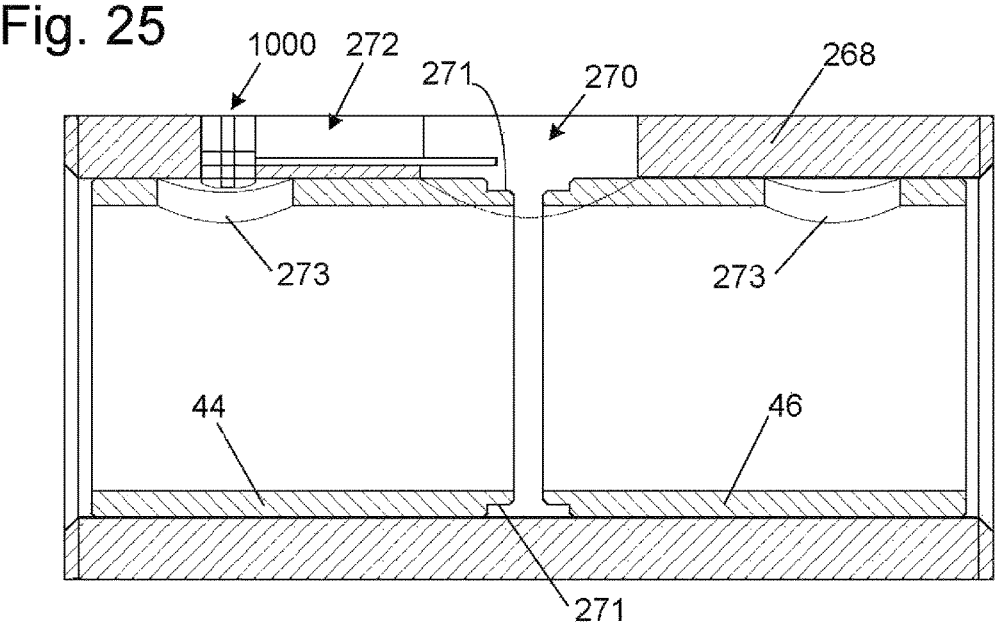
FIG. 25 is a cross-sectional view taken generally along the line 25-25 in FIG. 24.

Turning attention now to FIGS. 24 and 25, an alternative embodiment of the insulating tube and charge tubes for use with a contractor style saw is depicted. Insulating tube 268 includes a hollow bore with outwardly beveled ends to receive charge tubes 44 and 46. Each charge tube has an inner narrowed rim portion 271 to which an electrical cable (not shown) may be attached (e.g., by solder, etc.). The narrowness of rims 271 allow the cables to be attached before the charge tubes are inserted into the insulating tube. Typically, the cables are fed through hole 270.

Insulating tube 268 also includes a recessed region 272 adapted to receive a Hall Effect or similar sensor assembly 1000 for detecting blade/arbor rotation. Sensor 1000 is described in more detail below in Section 10. The sensor is aligned over a hole 273 in charge tube 44 to sense the passage of a magnet disposed on the arbor (not shown). Alternatively, the sensor may be aligned over a hole 273 in charge plate 46. In some cases, such as where charge plates 44 and 46 are identical, it may be desirable to place hole 273 in both charge plates to reduce the number of different parts for manufacture.

While a few exemplary arrangements for capacitively coupling the charge plates to the arbor have been described, it will be understood that there are many suitable arrangements and that the invention is not limited to any particular one. For example, if there is insufficient room between the bearings for the charge plates, one or both of the charge plates may be positioned between the bearings and the pulley, or on the side of the pulley opposite the bearings.

It will appreciated that one or both of the charge plates may be capacitively coupled to other portions of operative structure 12 rather than blade 40 or arbor 42. For example, charge plates 44 and 46 may be coupled to an arbor block 250 which is electrically insulated from the remainder of the operative structure and machine 10. In such a configuration, the blade should be electrically coupled to the arbor block. Therefore, insulating bushings between the blade and arbor, or between the arbor and arbor block, should be omitted. As additional examples, the charge plates may be coupled to the bearings, pulley, etc.

Figure 26:
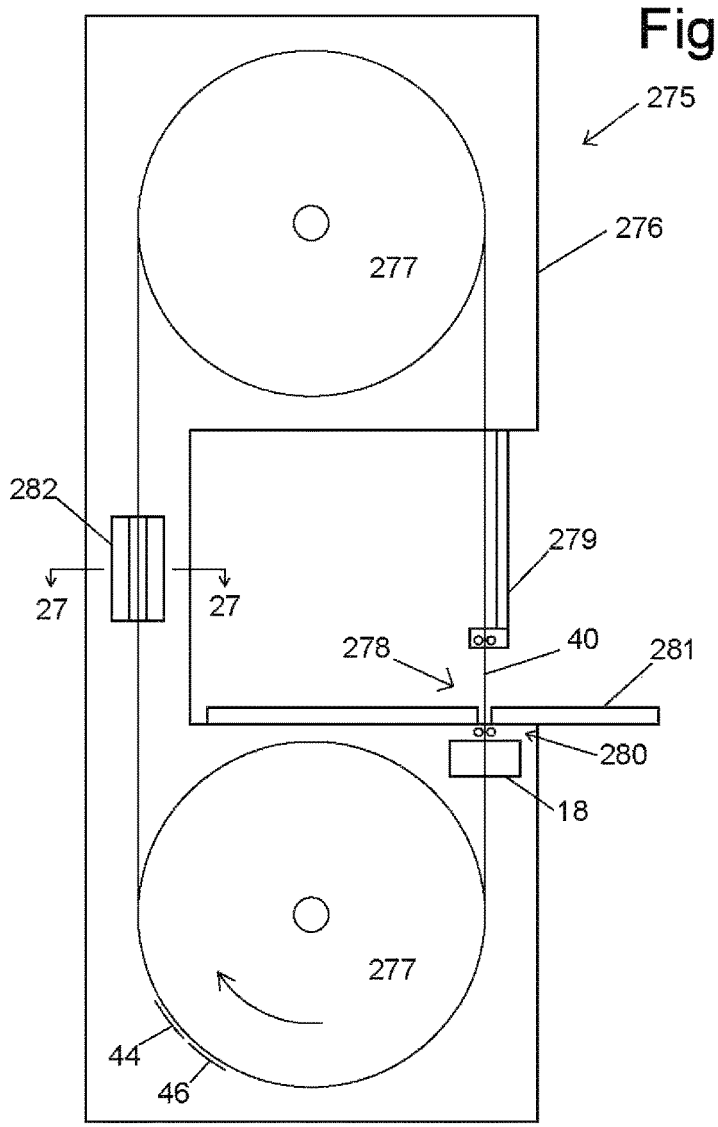
FIG. 26 is a schematic side elevation of a further embodiment in the context of a band saw.
Figure 27:
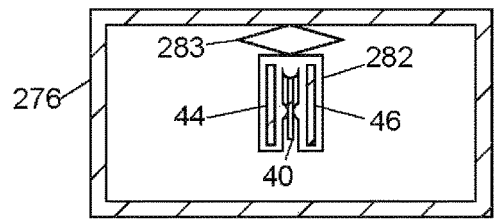
FIG. 27 is a magnified cross-sectional view taken generally along the line 27-27 in FIG. 26.

It also will be appreciated that charge plates 44 and 46 may be capacitively coupled to other types of cutting tools, including those with a non-circular blade or cutter. For example, FIGS. 26 and 27 depict an exemplary embodiment in which the charge plates are capacitively coupled to the blade of a band saw 275. Typically, band saw 275 includes a main housing 276 enclosing a pair of vertically spaced-apart wheels 277. The perimeter of each wheel 277 is coated or covered in a high-friction material such as rubber, etc. A relatively thin, continuous loop blade 40 tightly encircles both wheels. A workpiece is cut by passing it toward blade 40 in a cutting zone 278 between wheels 277. An upper blade-guide assembly 279 and a lower blade-guide assembly 280 maintain the revolving blade in a stable path within cutting zone 278. The workpiece is passed toward the blade on a table 281, which forms the bottom of the cutting zone.

The blade should be electrically insulated from the main housing, which usually is grounded. Thus, blade-guide assemblies 279 and 280, which may include ball-bearing guides and/or friction pads, etc., are constructed to electrically insulate the blade from the main housing. In addition, the high-friction coating on wheels 277 electrically insulates the blade from the wheels. Alternatively, the wheels may be constructed of electrically non-conductive material.

Charge plates 44 and 46 may be arranged in a variety of ways depending on the application and the space constraints within the main housing. Two possible arrangements are illustrated in FIG. 26. In the first arrangement, charge plates 44 and 46 are disposed closely adjacent the blade as it rides along one of the wheels 277. The charge plates may be formed in an arc to match the perimeter of the wheel and maintain a constant spacing with the blade. This arrangement has the advantage of easily maintaining a constant blade-to-charge plate spacing since the blade is held in a constant path against the perimeter of the wheel. The charge plates may be connected to the main housing via a non-conductive mount to maintain electrical insulation from the housing.

Another of the many possible arrangements for the charge plates includes a charge plate block 282 which is configured to extend along the blade as it travels between wheels 277. As can best be seen in the detail view of FIG. 27, the charge plate block includes charge plates 44 and 46. In the depicted implementation, the charge plate block has a substantially C-shaped cross-section sized to fit around the sides and back edge (i.e., non-toothed edge) of the blade. The charge plate block is mounted on main housing 276 and resiliently biased, such as by one or more springs 283, toward the moving blade. Since blade 40 may tend to move or deflect slightly in its path, springs 283 ensure that the charge plate block is able to move along with blade. Charge plate block 282 typically is made of a durable, electrically non-conductive material such as ceramic, plastic, etc. Charge plates 44 and 46 are disposed on or within the charge plate block. Although the charge plates are illustrated as being disposed on opposite sides of blade 40, the charge plates may alternatively be on the same side of the blade. The self-aligning configuration of the charge plate block ensures that the blade-to-charge plate spacing is substantially constant despite the motion of the blade.

In addition to band saws, the charge plates may be capacitively coupled to machines such as jointers, planers, etc., which have cylindrical cutter heads. The cutter heads typically are mounted to rotate about an arbor. Thus, charge plates 44 and 46 may be capacitively coupled to the arbor as described above, or to a flat end of the cutter head, etc.

While one exemplary system and method for detecting contact between the user's body and the blade is described herein, many other systems and methods may be used. For example, the detection system may sense the resistance of the human body upon contact between the user's body and the blade. As shown in FIG. 19, the sensor assembly of detection subsystem 22 may include a brush contact 284 or similar sensor to make direct electrical contact with the blade. Brush contact 284 may be mounted, for example, on arbor block 250. Typically, the blade and brush contact are electrically isolated from the arbor block. Alternatively, the brush contact may be configured to directly couple to the arbor or another portion of operative structure 12 as described above in connection with charge plates 44 and 46. In any event, contact between the user's body and blade would function as a switch to form a conductive path detectable by suitable circuitry in detection subsystem 22 and/or control subsystem 26. As a further alternative, brush contact 284 may be used to detect a capacitive rather than conductive load upon the blade.

As an alternative to detecting contact between the user and the blade, detection subsystem 22 may be configured to detect proximity of the user's body to the blade by detecting contact between the user's body and a guard adjacent the blade. If the guard is positioned so that the user's body must contact the guard before contacting the blade, then the blade may be stopped before the user comes into contact with the blade. It will be appreciated that this alternative detection subsystem may be implemented in a variety of different configurations and for any type of machine 10. As one example, FIG. 28 shows an exemplary embodiment for use on a radial arm saw 286.

Typically, radial arm saw 286 includes a horizontal base 287, a vertical support column 288 extending upward from base 287, and a guide arm 289 which extends from column 288 vertically spaced above base 287. A carriage 290 is slidably coupled to the underside of guide arm 289. The bottom end of carriage 290 is connected to a saw housing 291 and motor assembly 16, allowing blade 40 to be pulled across the base to cut workpieces (not shown) supported on the base. A guard member 292, such as those known in the art, is positioned on at least one side of blade 40. Guard member 292 is disposed relative to the blade so that any portion of the user's body approaching the blade will first strike against the guard member. Typically, guard member 292 is movably coupled to housing 291 to maintain its blade-shielding position as the blade passes over the workpiece.

The guard member is electrically insulated from housing 291 but electrically coupled to the detection subsystem (not shown). Thus, any contact between the user's body and the guard member is detected. The detection subsystem may be conductively coupled to the guard member by any suitable means (not shown) such as electrical cable, etc. Alternatively, the detection subsystem may be capacitively coupled to the guard member by one or more charge plates disposed adjacent the guard member such as described above.

The systems, methods and machines to detect dangerous conditions may be described as set forth in the following numbered paragraphs. These paragraphs are intended as illustrative, and are not intended to limit the disclosure or claims in any way. Changes and modifications may be made to the following descriptions without departing from the scope of the disclosure.

2.1 A woodworking machine comprising:
a conductive cutter;
an excitation system adapted to adapted to induce an electrical signal on the cutter;
a first capacitive coupling adapted to electrically connect the excitation system to the cutter;
a contact sense system adapted to monitor the electrical signal induced on the cutter; and
a second capacitive coupling adapted to electrically connect the contact sense system to the cutter.

2.2 A woodworking machine, comprising:
a motor;
an electrically isolated rotatable arbor configured to be driven by the motor;
a circular saw blade;
an excitation system adapted to generate an electrical signal; and
a capacitive coupling adapted to capacitively couple the excitation system to the arbor to transfer a portion of the electrical signal to the blade.

2.3 A woodworking machine, comprising:
a conductive cutter;
an excitation system adapted to generate an electrical signal;
a capacitive coupling linking the excitation system to the cutter, where the capacitive coupling has a capacitance of at least 10 picofarads.

Section 3: Retraction System

As briefly mentioned above, reaction subsystem 24 can be configured with a retraction system to retract or move a cutting tool away from the point of accidental contact with a user. Moving away from the point of accidental contact reduces the time the cutting tool is in contact with the user, thereby minimizing any injury to the user. Moving the cutting tool away from the point of accidental contact also prevents the cutting tool from moving toward the user, which could increase any injury to the user. For example, a spinning blade in a miter saw has substantial angular momentum, and that angular momentum could cause the blade to move downward toward a user when a brake pawl hits the blade. The spinning blade in a table saw also has substantial angular momentum that could cause the blade to move upward toward a user when a brake pawl hits the blade, depending on the position of the brake, the weight of the blade and the amount of play in the structure supporting the blade. Preventing any such movement lessens the potential injury to the user. A retraction system may be used in addition to or instead of other safety mechanisms.

Figure 29:
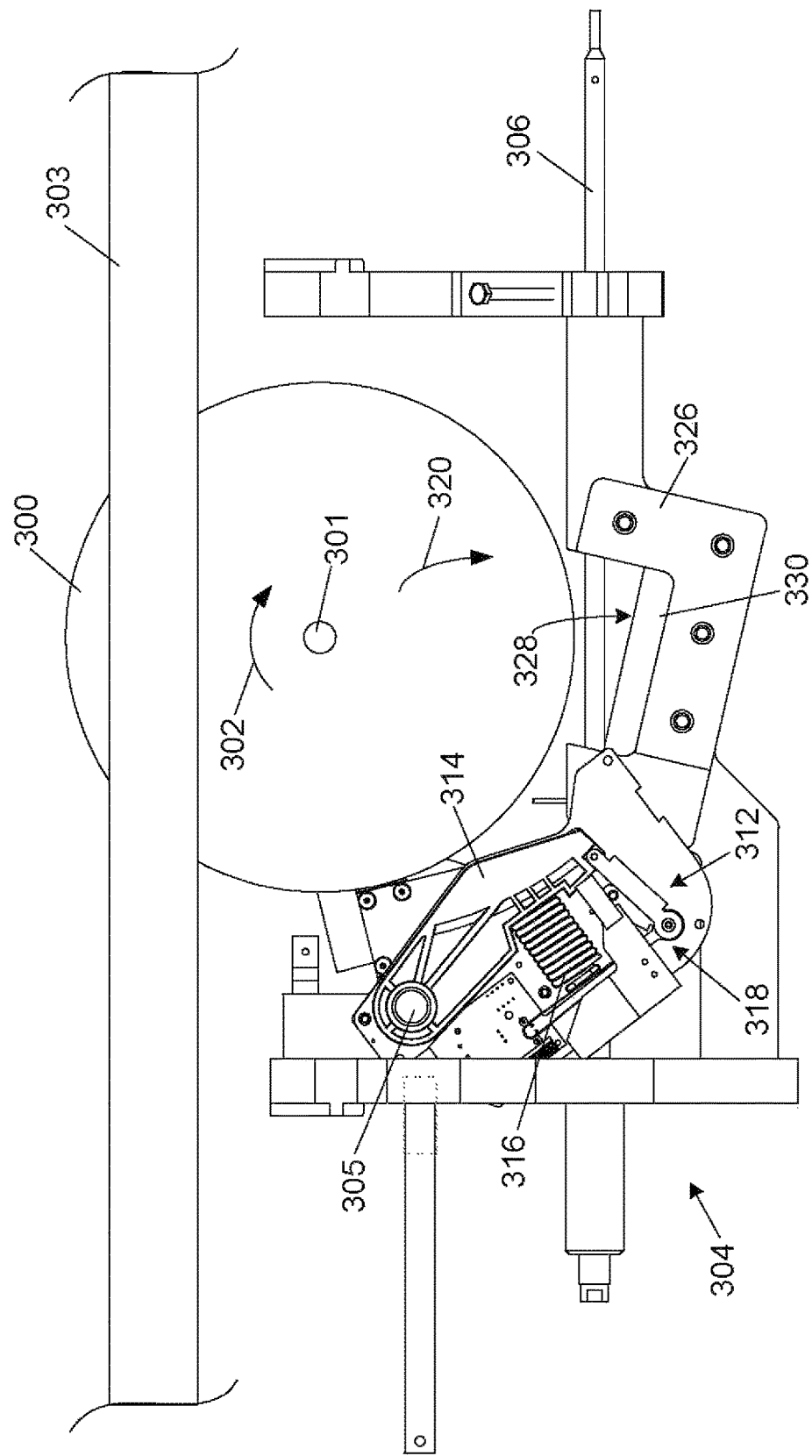
FIG. 29 is a schematic side view of a table saw with a retraction system.
Figure 30:
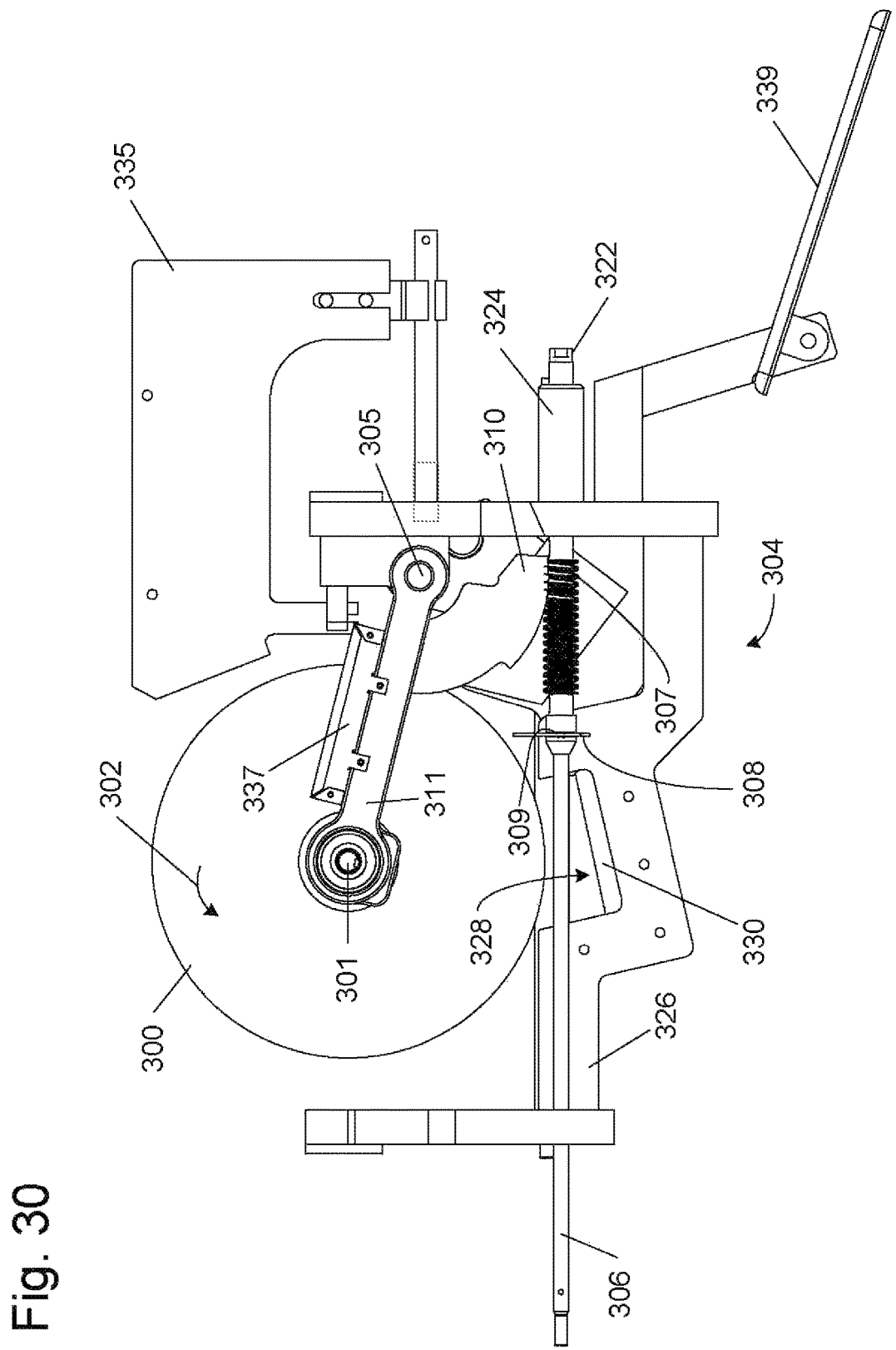
FIG. 30 is a schematic side view of a second side of a table saw with a retraction system.

FIGS. 29 and 30 show sectional views of a table saw configured with both a retraction system and a braking mechanism. A blade 300 is mounted on an arbor 301 to spin in the direction of arrow 302. A table 303 (not shown in FIG. 30), which defines the work surface for the table saw, is adjacent the blade and the blade extends above the table. A support structure 304 may support blade 300 and arbor 301 in any known way, or as described in more detail in Section 13 below.

Blade 300 is configured to pivot up and down so that a user can position the blade to extend above the table as needed. The blade pivots around a pin 305. A user may pivot the blade to adjust its position by turning a shaft 306 on which a worm gear 307 is mounted. The worm gear is mounted on the shaft so that it turns with the shaft, but so that it may slide on the shaft when necessary, as explained below. Worm gear 307 is mounted on shaft 306 like a collar, with the shaft extending through a longitudinal hole in the worm gear. The worm gear is held in place during normal operation of the saw by a spring clip 308, which is positioned in a groove or channel 309 on the worm gear and which also engages a detent or shoulder on shaft 306 to hold the worm gear in place. The worm gear engages an arcuate rack 310 that supports an arbor block 311, which in turn supports arbor 301 and blade 300. Thus, when a user turns shaft 306, such as by turning a knob attached to the shaft (not shown), worm gear 307 moves arbor block 311 and the blade up or down, depending on the direction that the worm gear is turned.

A brake cartridge 312 is mounted in the saw adjacent blade 300. The brake cartridge includes a pawl 314 biased toward blade 300 by a spring 316. The pawl is held away from blade 300 by a release mechanism 318, as described generally above and as described in more detail in Sections 4-5 and 7-8 below. The cartridge is configured so that the release mechanism releases the pawl into the blade upon the receipt of a detection signal, as described in Section 6 below.

Brake cartridge 312 is positioned on the blade's pivot axis so that pawl 314 can move around pin 305. Thus, when pawl 314 hits the blade, the angular momentum of the blade is transferred to the arbor block, and the blade, arbor block, rack and cartridge try to retract or move down in the direction of arrow 320. Alternatively, the cartridge may be positioned on a pin different from pin 305, but that still pivots with the blade.

The blade will move down to the extent permitted by the contact between rack 310 and worm gear 307. If the worm gear is fixed in place, the downward movement of the blade may strip teeth on the rack and/or worm gear, and may prevent the blade from moving down as far as desired. In the embodiment shown in FIGS. 29 and 30, the worm gear is adapted to snap free and move on shaft 306 when the pawl hits the blade.

When the pawl hits the blade, the resultant angular momentum impulse causes spring clip 308 to snap loose, allowing the worm gear to slide down the shaft toward an end 322 of the shaft. The spring clip snaps loose because the rack moves down when the blade is stopped, and the rack contacts the worm gear and forces the worm gear to move. The force of the rack against the worm gear causes the spring clip to snap loose. The worm gear is put back in place by moving it back along shaft 306 until the spring clip snaps into place on the shaft.

The table saw shown in FIGS. 29 and 30 also includes a support 326 configured with a seat or region 328 in which is placed an impact-absorbing material 330. The support is positioned under the arbor and arbor block so that when the blade retracts, the arbor block strikes impact-absorbing material 330. Support 326 and impact absorbing material 330 act as a barrier to stop the downward movement of the blade. The support is positioned so that blade 300 may retract a sufficient distance. The impact-absorbing material can be any one of a number of cushioning materials, such as rubber, dense foam, plastic, etc. One material found to be suitable is available under the part number C-1002-06 from AearoEAR, of Indianapolis, Ind. Alternatively, impact-absorbing material 330 may be attached to the undersurface of the arbor block instead of on support 326. Additionally, support 326 may take many forms. In fact, shaft 306 may be configured and positioned so that it provides a surface to stop the downward movement of the blade.

FIG. 30 also shows a splitter 335 that extends above table 303 behind blade 300 to prevent kickback. A blade guard may also substantially enclose blade 300. FIG. 30 further shows a housing 337 for electronic components relating to the safety system, and a motor mount 339, which are not shown in FIG. 29.

In the construction described above, the angular momentum of the blade causes the blade, arbor block and cartridge to all pivot down when the pawl strikes the blade. Thus, the angular momentum of the blade causes the retraction. Blade 300 is permitted to move downward a sufficient distant so that the blade is completely retracted. The ability of the blade to retract minimizes any injury from accidental contact with the blade.

Figure 31:
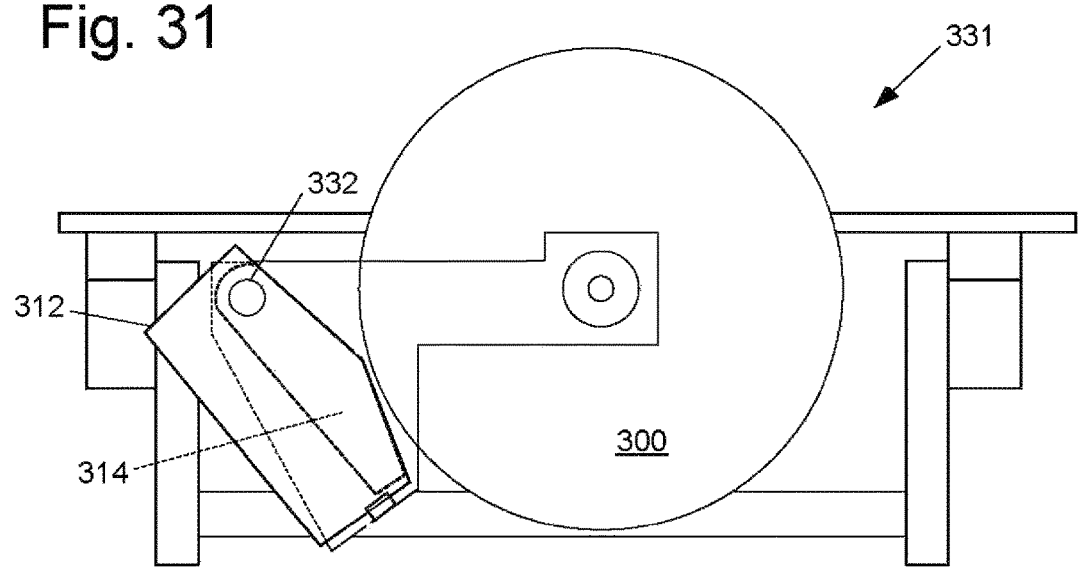
FIG. 31 is a schematic side view of a saw with another embodiment of a retraction system.

FIG. 31 shows another embodiment of a retraction system used with a brake pawl. A saw 331 includes a blade 300 and a brake cartridge 312 housing a brake pawl 314. The cartridge and pawl are mounted to the frame of the saw by a pin 332. The pin is mounted to the saw in such a way that it may not pivot up and down with the blade. When the blade hits the pawl, the blade climbs down the pawl, or in other words, moves generally around the point of contact with the pawl. The pawl and blade do not pivot downward together, as in the embodiment shown in FIGS. 29 and 30, because the pawl is fixed to the frame of the saw. In this embodiment, the blade retracts by "climbing" down the pawl.

Figure 32:
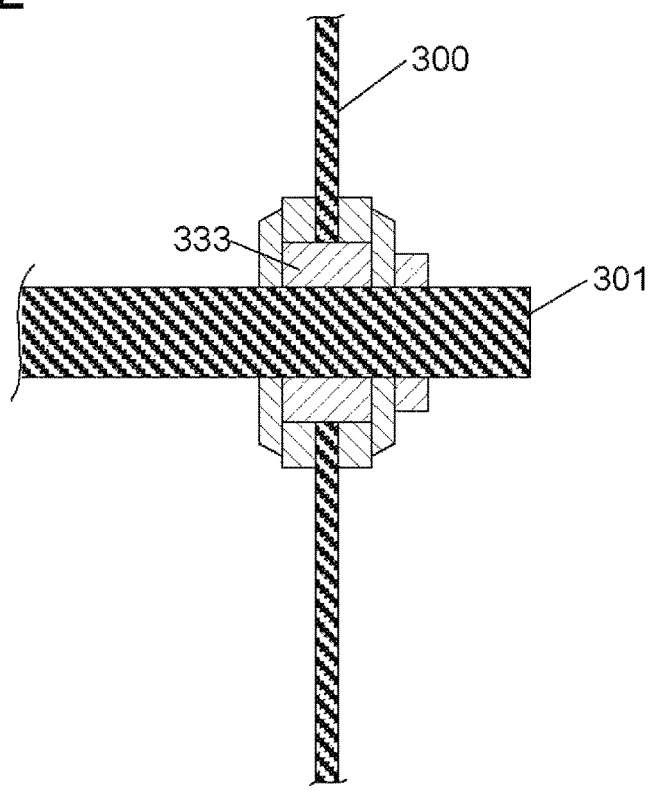
FIG. 32 is a section view of a retraction system using a deformable bushing.

Another embodiment of a retraction system comprises a compressible bushing. Typically, a blade 300 in a table saw, miter saw or other machine is mounted to an arbor over a bushing 333, as shown in FIG. 32. A locking nut, washers and an arbor flange are used to secure the blade to the arbor. Bushing 333 may be constructed from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake. Where a plastic bushing is placed between the blade and the arbor, the substantial force created by stopping the blade almost instantly may cause the bushing to deform. Typically, the edge of the mounting hole of the blade will bite into the bushing as the blade attempts to rotate about the pawl. Therefore, if the pawl is mounted at the back of the blade, then the blade will tend to move downward into the bushing and away from the user when the pawl engages the blade.

Figure 33:
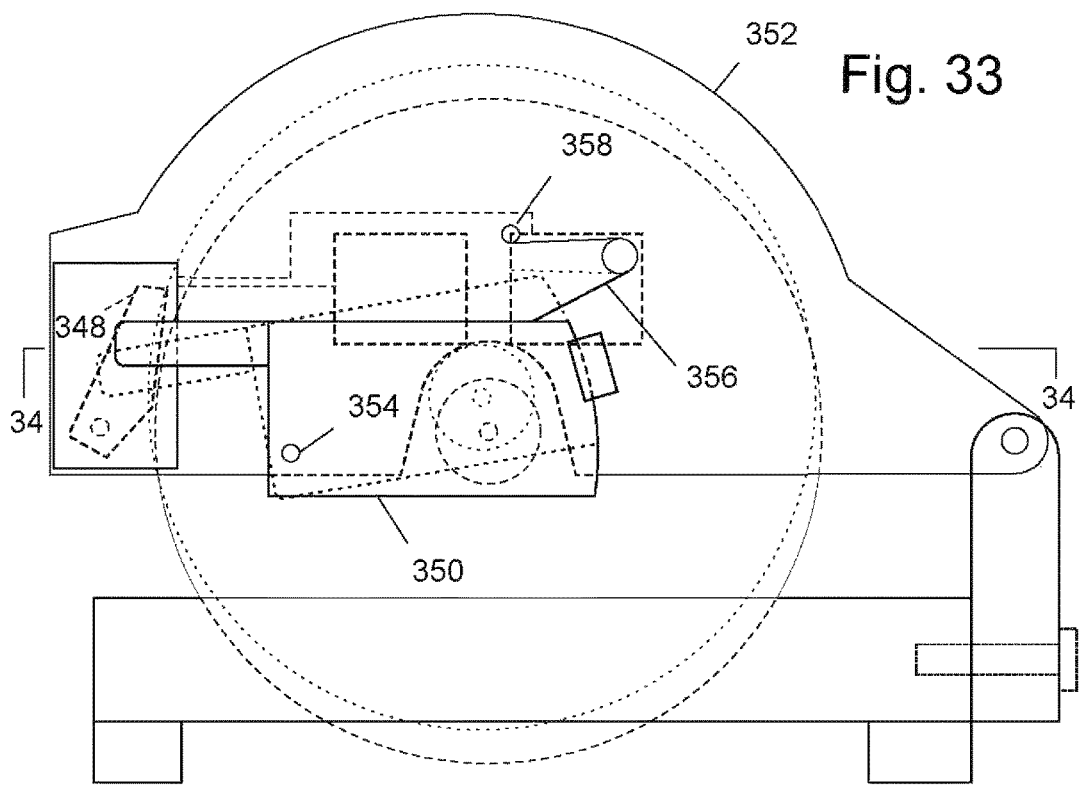
FIG. 33 is a schematic side view of a miter saw with a retraction system.
Figure 34:
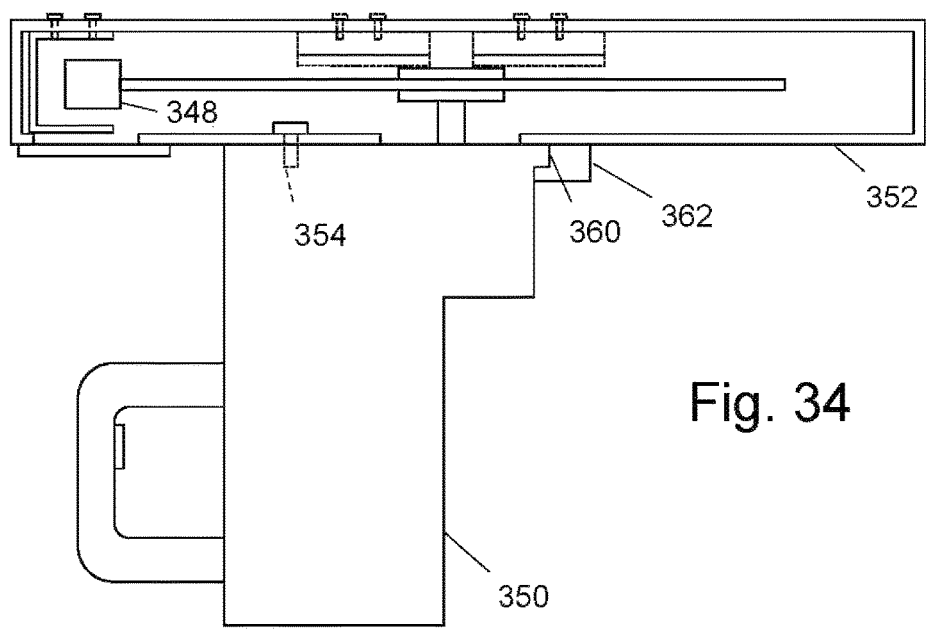
FIG. 34 is a section view of the miter saw shown in FIG. 33.

FIGS. 33 and 34 show a miter saw equipped with both a brake and a retraction system. The miter saw is configured with a pivotal motor assembly to allow the blade to move upward into the housing upon engagement with a brake pawl 348. Motor assembly 350 is connected to housing 352 via pivot bolt 354, allowing the motor assembly to pivot about bolt 354 in the direction of blade rotation. A spring 356 is compressed between the housing and an anchor 358 to bias the motor assembly against the direction of blade rotation. The motor assembly may include a lip 360, which slides against a flange 362 on the housing to hold the end of the motor assembly opposite the pivot bolt against the housing.

When the saw is in use, spring 356 holds the motor assembly in a normal position rotated fully counter to the direction of blade rotation. However, once the pawl is released to engage the blade, the motor assembly and blade pivot upward against the bias of the spring. In this embodiment, the pawl is positioned at the front of the blade so that the pivot bolt 354 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped. Of course, the blade and motor assembly may be configured in any of a variety of ways to at least partially absorb the angular momentum of the blade.

Figure 35:
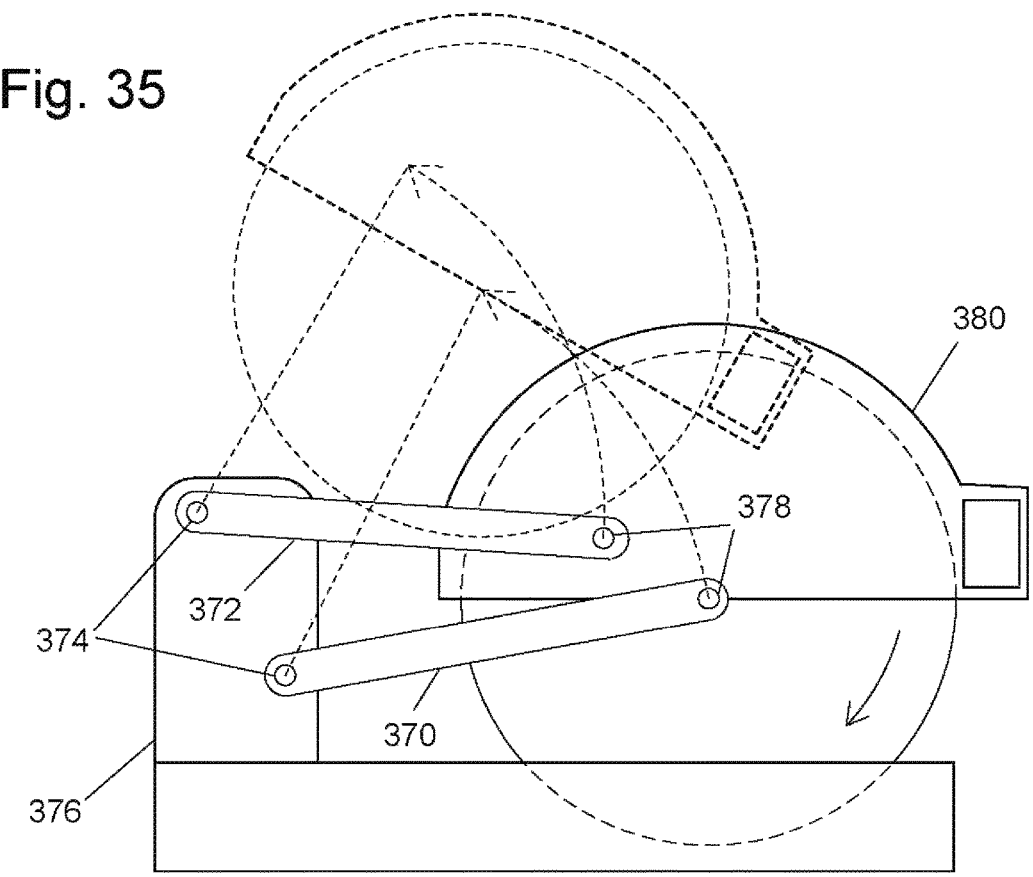
FIG. 35 shows another embodiment of a miter saw with a retraction system.

FIG. 35 shows an alternative configuration of a miter saw adapted to move away from an accidental contact with a user by absorbing the angular momentum of the blade. In this configuration, the miter saw includes two swing arms 370 and 372. One end 374 of each swing arm 370, 372 is connected to base 376, and the opposite end 378 of each swing arm is connected to housing 380, the blade, and/or the motor assembly (not shown). The position of the swing arms relative to each other may vary depending on the swing arm motion desired. In FIG. 34, swing arm 370 is connected to base 376 somewhat below and forward of swing arm 372. Typically, the motor assembly is rigidly attached to end 378 of swing arm 370, while housing 380 is connected to rotate about end 378 of swing arm 370. End 378 of swing arm 372 is connected only to the housing. Alternatively, the motor assembly may be connected to rotate about end 378 of swing arm 370 along with the housing.

The geometry of the configuration shown in FIG. 35 causes the housing and/or motor assembly to rotate as the swing arms pivot. Significantly, when the swing arms move upward, the housing and/or motor assembly rotate in the same direction in which the blade rotates during cutting. As a result, when a brake pawl engages the blade and transfers the angular momentum of the blade to the housing and/or motor assembly, the housing and/or motor assemblies tend to rotate in the same direction as the blade. This causes the swing arms to pivot upward, drawing the blade away from the workpiece and the user's body. Thus, the miter saw configuration illustrated in FIG. 35 is adapted to absorb the angular momentum of the blade and translate that angular momentum into an upward force on the swing arms.

Figure 36:
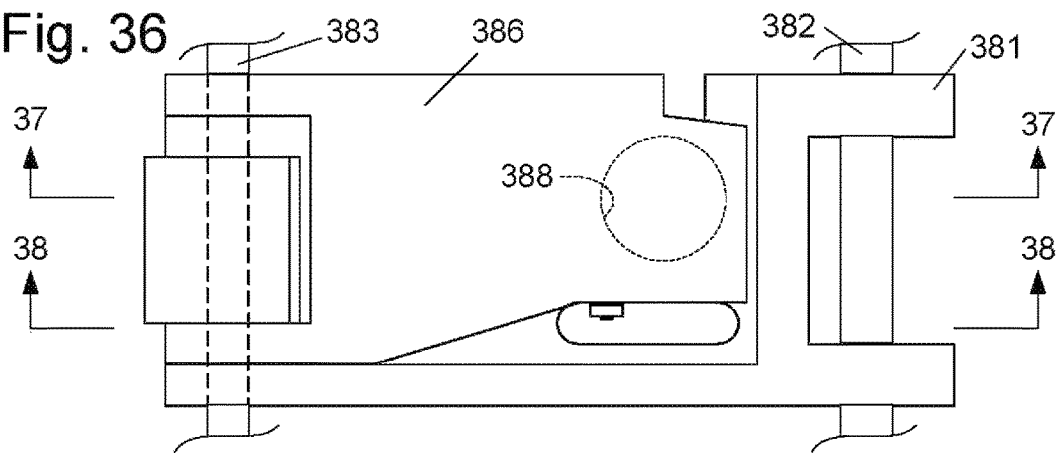
FIG. 36 shows a schematic drawing of a retraction system using a spring to retract a cutting tool.
Figure 37:
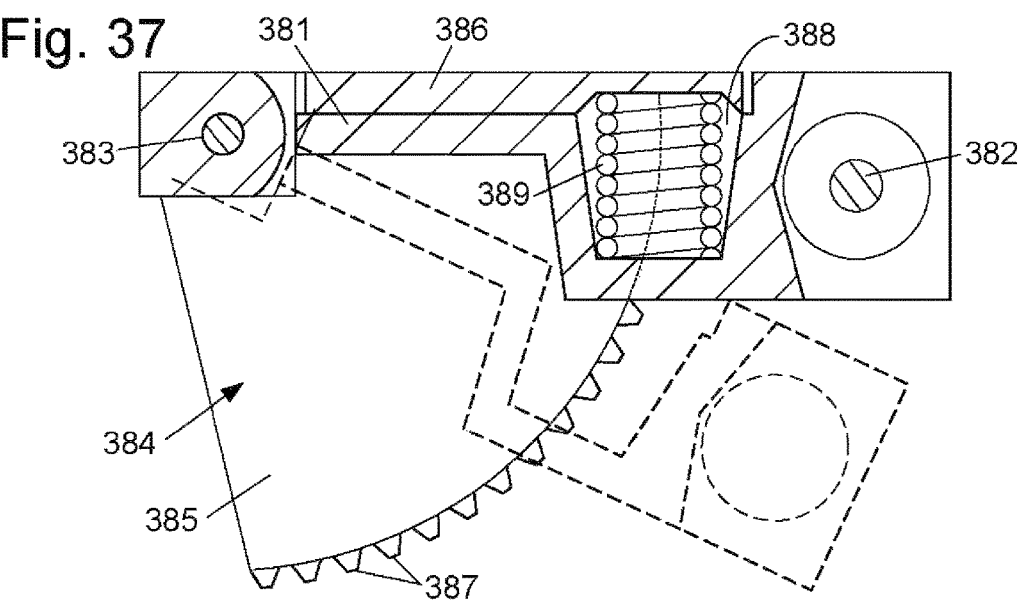
FIG. 37 is a sectional view of the retraction system shown in FIG. 36.
Figure 38:
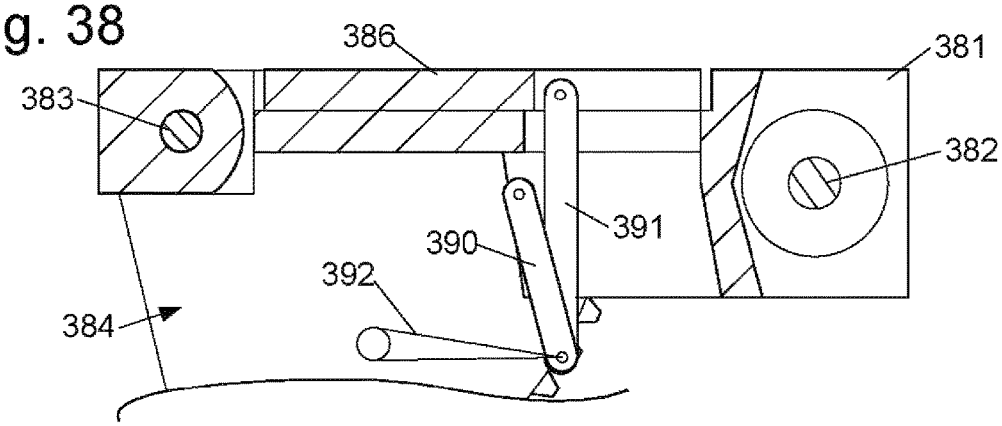
FIG. 38 also is a sectional view of the retraction system shown in FIG. 36.

In any of the systems described above, a spring or other force can be used to push the blade away from the point of contact with the user. The spring could be released by a mechanism similar to the mechanism that releases the pawl to strike the blade. FIGS. 36-38 show how a spring may be used to retract a blade in a table saw. FIG. 36 is a top view and FIGS. 37 and 38 are side views of an arbor block 381 holding an arbor 382 used to drive a blade (not shown). Arbor block 381 is pivotally mounted to pin 383 so that the arbor block and blade may pivot up and down to adjust the position of the blade in the saw.

A segment gear 384, like rack 310 described above in connection with FIGS. 29 and 30, is also mounted on pin 383, and is connected to arbor block 381 in the manner described below, to raise and lower the arbor. Segment gear 384 includes a side portion 385 positioned substantially perpendicularly to the plane of arbor block 381, and a top portion 386 positioned over arbor block 381. The side portion 385 includes gear teeth 387 to engage a worm gear to raise and lower the arbor block. Side portion 385 and top portion 386 are connected to each other and move together. Top portion 386 extends over the top of the entire arbor block, as shown. The arbor block is constructed with a region to accommodate top portion 386 so that top portion 386 does not extend substantially above the arbor block, which could limit the ability of the arbor block and blade to pivot upward when desired, such as by contacting the underside of a table in a table saw.

A pocket 388 is formed in arbor block 381 to house a spring 389. In the position shown in FIG. 37, spring 389 is compressed between top portion 386 of segment gear 384 and arbor block 381 because the segment gear and arbor block are coupled together.

The segment gear and arbor block are coupled by a compound linkage having, as shown in FIG. 38, a first arm 390 attached at one end to the arbor block and at its other end to a second arm 391. The second arm, in turn, is attached to top portion 386 of segment gear 384, as shown. First and second arms 390 and 391 are hingedly connected to each other, and to the arbor block and segment gear. The arms are configured so that the force of the spring pushing apart the arbor block and the top portion of the segment gear biases the first and second arms in such a way that the arms want to move. A fusible member 392, which may take the form of a wire as described above, restrains the arms from movement. Of course, numerous different linkages may be used, and numerous types and configurations of fusible members or other release mechanisms may be used. The linkage may be selected to provide a sufficient mechanical advantage so that the arbor block and top portion of the segment gear may be held together with as thin a fusible member as possible, so that the fusible member may be burned as easily as possible. Various analogous compound linkages are described in Section 4 below. The fusible member may be burned by a system as described above, or as described in more detail in Section 6 below. The compound linkage and the fusible member are preferably configured so that they accommodate spring forces of 100 to 500 pounds or more.

When the fusible member is burned, the compound linkage is free to move, and the spring pushes arbor block 381 down, away from top portion 386 of the segment gear, as shown by the dashed lines in FIG. 37, thereby retracting the blade. The stronger the spring, the faster the blade will be retracted. The segment gear does not move because it is coupled through teeth 387 to a worm gear or some other structure.

Retracting a blade by a spring or some other force may be thought of as direct retraction. A spring or other force may be used with some other retraction system to increase the speed that a cutting tool retracts, or a spring or other force may be used as the sole means of retraction. The systems for direct retraction described above may be used on various pieces of equipment, including table saws, miter saws and band saws.

Figure 39:
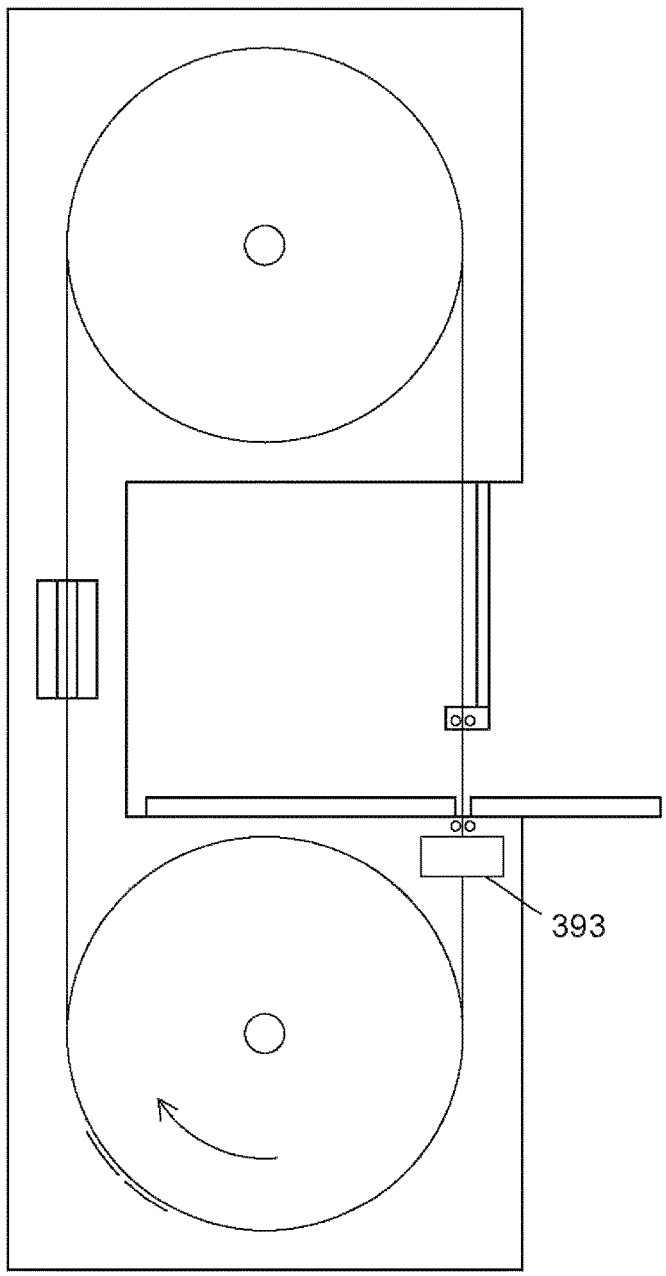
FIG. 39 is a schematic view of a band saw with a retraction system.

FIG. 39 is a schematic diagram of a system to retract the blade of a band saw. Typically, a band saw includes a main housing enclosing a pair of vertically spaced-apart wheels. The perimeter of each wheel is coated or covered in a high-friction material such as rubber, etc. A relatively thin, continuous loop blade tightly encircles both wheels. A workpiece is cut by passing it toward blade in a cutting zone between the wheels. The workpiece is passed toward the blade on a table, which forms the bottom of the cutting zone.

Figure 40:
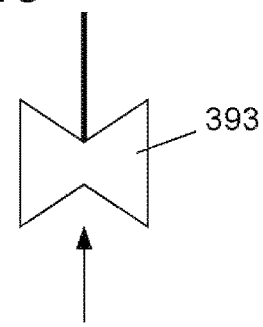
FIG. 40 is a top view of a roller used in the system shown in FIG. 39.

The band saw shown in FIG. 39 includes roller 393 positioned adjacent the blade. The roller is configured to contact the blade and push the blade away from the point of accidental contact with a user. In addition, the roller may be configured to push the blade off the wheels, thereby stopping the motion of the blade. A top view of the roller is shown in FIG. 40 pushing against a blade in the direction of the arrow. The roller may be part of a cartridge, and may be released into the blade just as the pawls described above are released. The roller should have a diameter large enough so that the roller can roll over the teeth of the blade.

The systems for direct retraction of a cutting tool may also be implemented on hand-held circular saws. Such saws typically include a base plate that contacts a workpiece during sawing. The base plate supports the saw on the workpiece. The base plate may be configured so that it is pushed down when the blade contacts a user. The result of that action is to effectively retract the blade because the base plate would push the user away from the blade.

The retraction systems, methods and machines may be described as set forth in the following numbered paragraphs. These paragraphs are intended as illustrative, and are not intended to limit the disclosure or claims in any way. Changes and modifications may be made to the following descriptions without departing from the scope of the disclosure.

3.1 A woodworking machine comprising:
a working portion;
a detection system adapted to detect a dangerous condition between a person and the working portion; and
a retraction system associated with the detection system to cause the working portion to retract upon detection of the dangerous condition.

3.1.1 The woodworking machine of paragraph 3.1 where the working portion is a spinning blade having angular momentum, and where the retraction system is adapted to retract the blade by using, at least partially, the angular momentum of the blade.

3.2 A table saw comprising:
a worksurface; and
a rotatable blade adapted to raise and lower relative to the worksurface around a pivot point, where the rotation of the blade defines a feed direction for a workpiece to be fed into the saw, and where the pivot point is downstream of the blade relative to the feed direction.

3.3 A table saw comprising:
a worksurface;
a rotatable blade adapted to raise and lower relative to the worksurface around a pivot point;
a gear system adapted to raise and lower the blade;
a release in the gear system adapted to allow the blade to drop down relative to the worksurface upon the occurrence of a specified event.

3.3.1 The table saw of paragraph 3.3 where the specified event is braking the blade.

3.3.2 The table saw of paragraph 3.3 further comprising a stop to limit the dropping down of the blade.

3.4 A saw comprising:
a rotatable blade adapted to raise and lower around a pivot point, where the blade is mounted on an arbor;
an arbor block adapted to hold the arbor, and further adapted to retract the arbor and blade upon the occurrence of a specified event.

3.4.1 The saw of paragraph 3.4 where the arbor block comprises first and second pieces held together until the occurrence of the specified event, and further comprising stored mechanical energy that is released to move the first and second pieces apart upon the occurrence of the specified event.

3.5 A miter saw comprising:
a base having a cutting region;
a blade;
a brake system adapted to brake the blade; and
a linkage between the blade and base, where the linkage is configured to cause the blade to move away from the cutting region when the brake system brakes the blade.

3.5.1 The miter saw of paragraph 3.5 where the linkage is configured so that the angular momentum of the blade causes the blade to move away from the cutting region when the brake system brakes the blade.

3.6 A miter saw comprising:
a base;
a housing pivotally connected to the base;
a blade;
a mounting system holding the blade in the housing; and
a brake system adapted to brake the blade;
where the mounting system is configured so that the blade pivots into the housing when the brake system brakes the blade.

3.7 A band saw comprising:
a worksurface having a cutting zone;
a blade adjacent the cutting zone;
a detection system adapted to detect a dangerous condition between a person and the blade; and
a retraction system associated with the detection system to push the blade away from the cutting zone upon detection of the dangerous condition.

Section 4: Spring-Biased Brake System

As discussed above, safety system 18 includes a brake mechanism 28 that is adapted to stop the cutting tool, thereby preventing or reducing injury to the user. As also discussed previously, the brake mechanism may include at least one pawl 60 adapted to engage the cutting tool to stop the rotation thereof. Illustrative examples of suitable pawls are described in Section 5 below. For purposes of the following discussion, cutting tool 14 will be described in the context of a blade 40, such as on a table saw, miter saw, circular saw or the like. It should be understood that blade 40 may include single blades, such as plywood or carbide-tipped blades, or an assembly of several blades, such as a dado blade.

Figure 41:
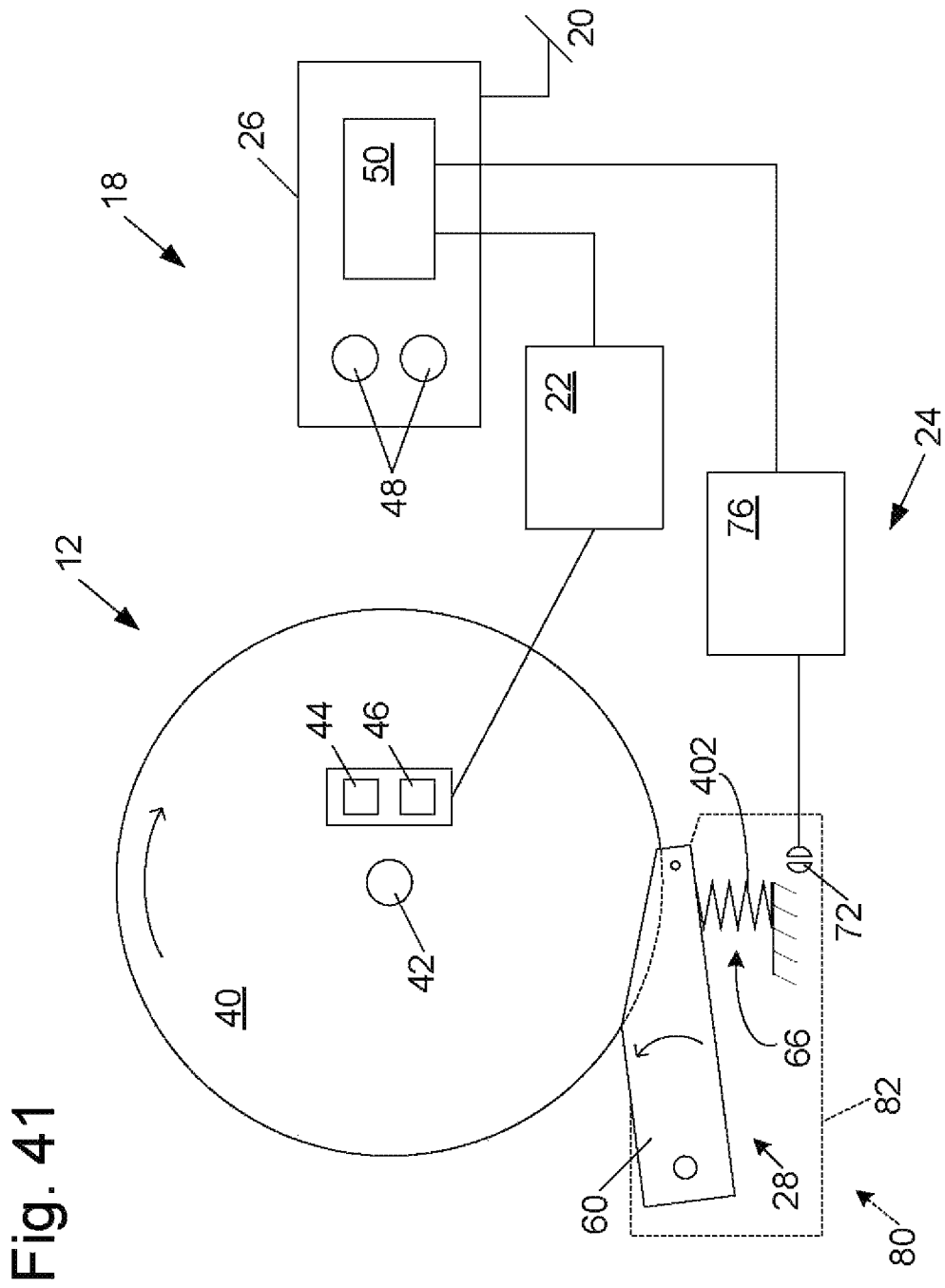
FIG. 41 is a schematic diagram of the safety system of FIG. 2 including another spring-biased brake mechanism.

As further discussed, pawl 60 is urged from its cocked, or restrained, position toward blade 40 or other cutting tool by biasing mechanism 30. In FIG. 2, biasing mechanism 30 includes a spring 66. From its compressed position shown in FIG. 2, spring 66 biases the pawl to move into engagement with blade 40. In FIG. 2, a restraining mechanism 32 is shown restraining pawl 60 from moving toward the blade under the biasing force exerted by spring 66. However, upon release of restraining mechanism 32, the pawl is no longer retained in its cocked position. As such, the pawl moves quickly into engagement with the blade under the force exerted by spring 66, such as shown in FIG. 41. An example of how restraining mechanism 32 may release the pawl is when a sufficiently high current is passed through fusible member 70. Other suitable release and restraining mechanisms are described in more detail below in Section 6.

In FIG. 2, the particular embodiment of spring 66 shown is a coiled compression spring. As used herein, spring 66 will be used to refer to any suitable spring generally, such as any of the particular types of springs discussed herein or other suitable spring mechanisms known in the art. Particular types of springs are referred to herein with particular reference numbers, such as coiled compression spring 402. In FIG. 2, as well as in FIGS. 41-59, various embodiments of spring-biased brake mechanisms are shown and described and include various elements, subelements and possible variations. It should be understood that spring-biased brake mechanisms may include any one or more of these elements, subelements and variations, regardless of whether those elements, subelements are variations are shown in the same or different figures or descriptions.

The speed at which the pawl will engage and stop the blade is dependent upon the force exerted upon pawl 60 by the spring. Therefore, the more force the spring exerts upon the pawl, the faster the pawl will travel the distance from its restrained position to the blade. In experiments, springs that exert forces in the range of 10 pounds to 500 pounds upon the pawl have proven effective, with springs that exert forces in the range of 50 and 200 pounds being preferred, and a 100-pound force proving particularly effective. However, it should be remembered that the restraining mechanism not only must counteract the force exerted by the spring, but also must be able to quickly release the pawl from its cocked position. Therefore, there may be a tradeoff between increasing the spring force and increasing the complexity, strength and cost of the restraining mechanism to be able to restrain the increase in spring force. Also, any mechanical advantage from the placement and associated structure, if any, coupling the spring to the pawl should be taken into account.

Figure 42:
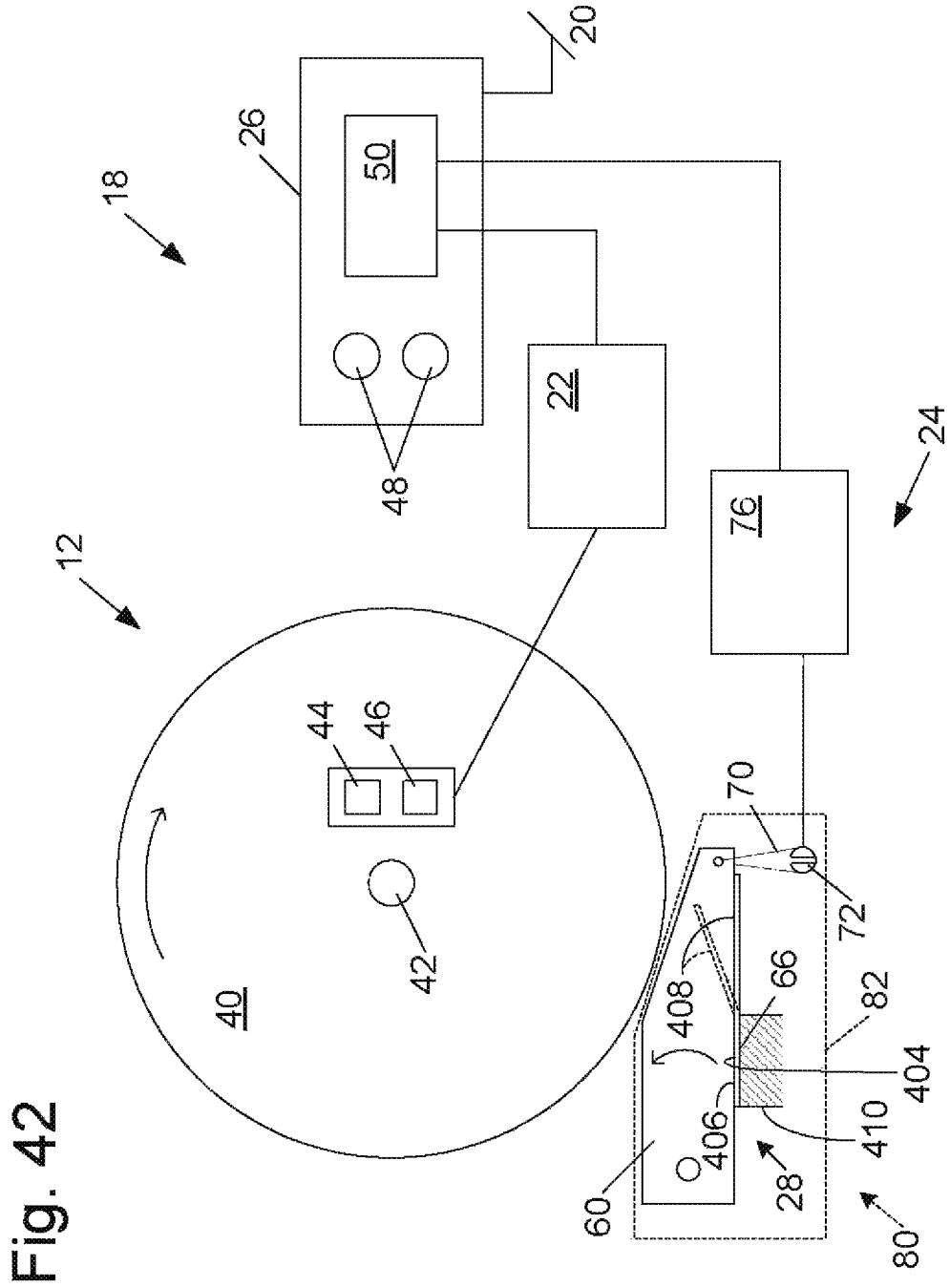
FIG. 42 is a schematic diagram of the safety system of FIG. 2 including another spring-biased brake mechanism.
Figure 43:
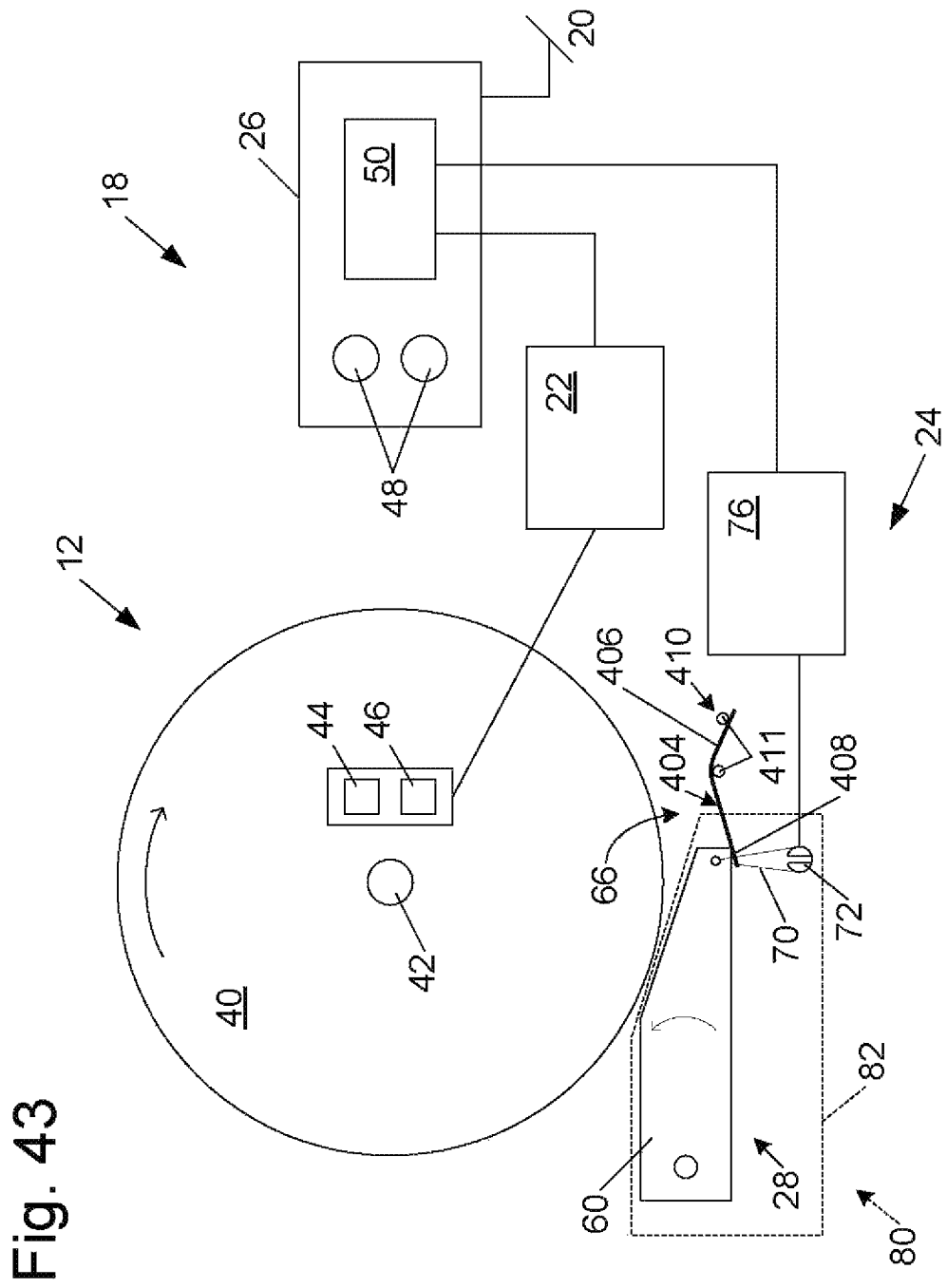
FIG. 43 is a schematic diagram of the safety system of FIG. 2 including another spring-biased brake mechanism.
Figure 44:
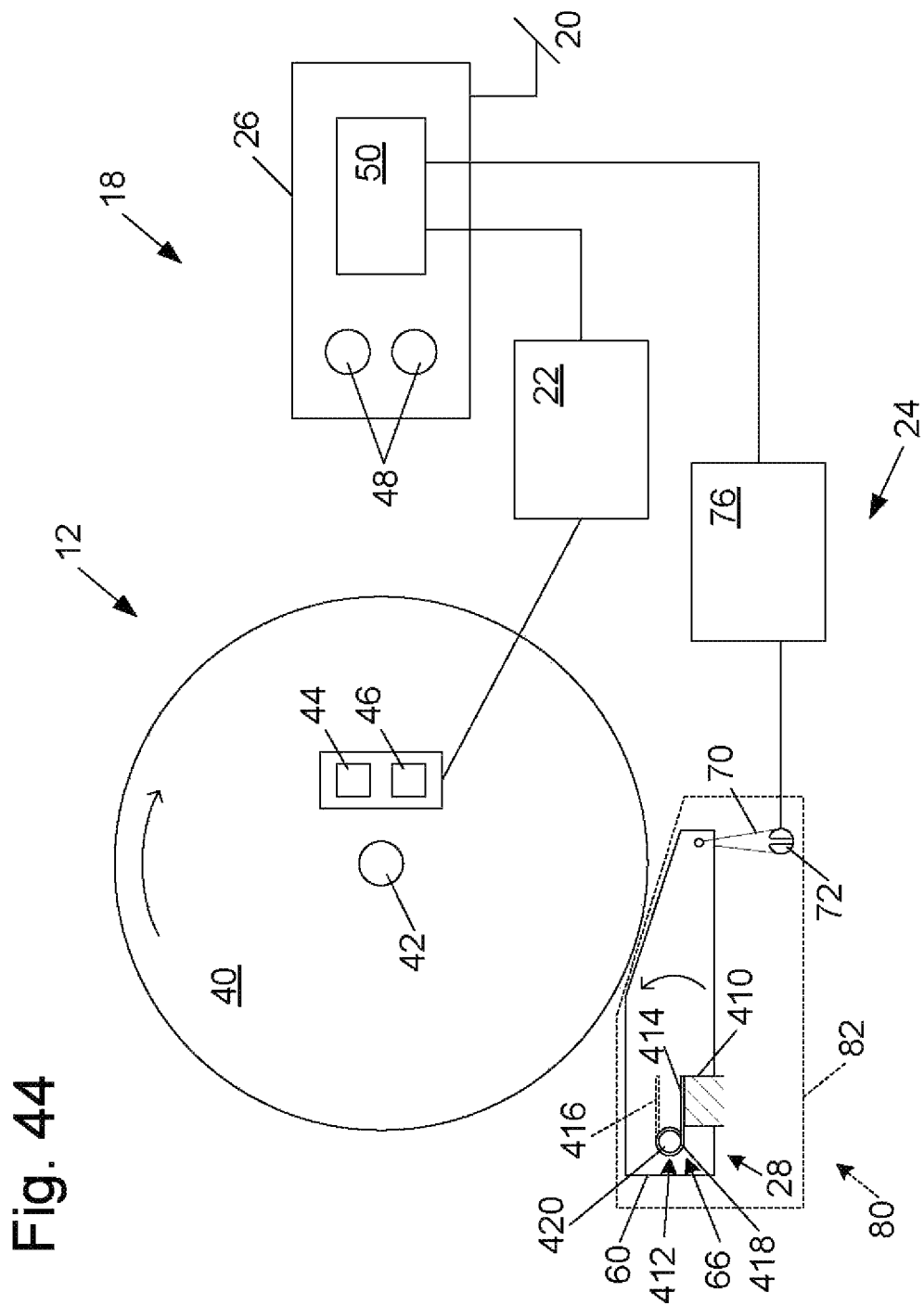
FIG. 44 is a schematic diagram of the safety system of FIG. 2 including another spring-biased brake mechanism.

Brake mechanisms 28 utilizing other springs 66 are shown in FIGS. 42-44. In FIG. 42, spring 66 takes the form of a leaf spring 404, which has base portion 406 and a pawl-engaging portion 408 adapted to engage and urge pawl 60 toward blade 40. Base portion 406 is secured to a suitable mounting assembly 410. Mounting assembly 410 may be any suitable structure that supports the base portion of the leaf spring to bias the pawl-engaging portion 408 toward the pawl. As shown, leaf spring 404 is a cantilevered leaf spring. Another example of a suitable mounting assembly 410 is shown in FIG. 43, in which the mounting assembly includes a plurality of spaced-apart supports 411.

In FIG. 44, a torsion spring 412 is utilized to bias pawl 60 into engagement with blade 40. Spring 412 includes a fixed end 414, a biasing end 416 adapted to engage pawl 60, and a coiled portion 418 intermediate the ends. As shown, torsion spring 412 is mounted on the same pin or axle 420 that pawl 60 is mounted upon. It will be appreciated that spring 412 may be interposed between the axle and the pawl, mounted on the axle adjacent or spaced-apart from the pawl, or mounted on structure other than axle 420.

Figure 45:
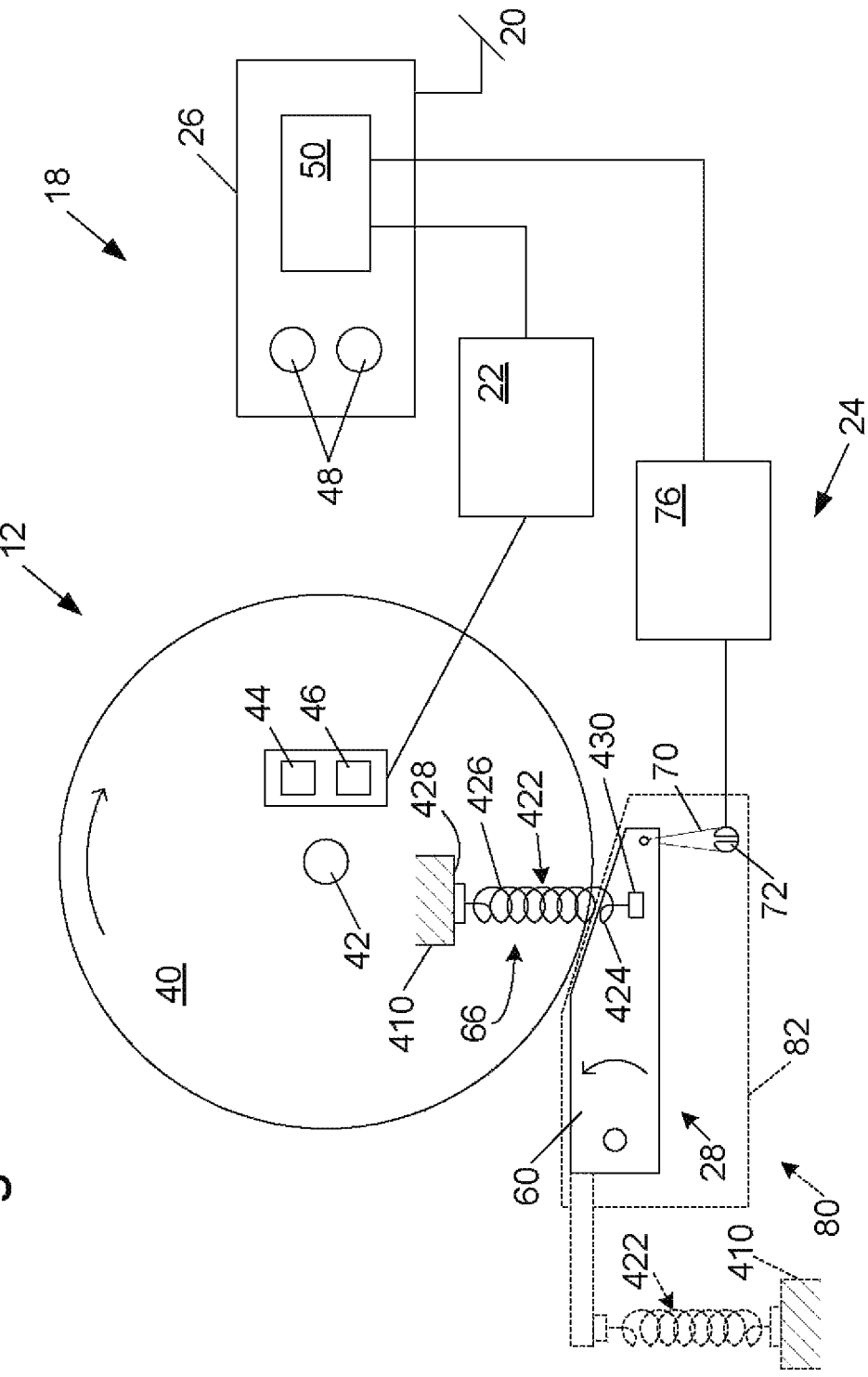
FIG. 45 is a schematic diagram of the safety system of FIG. 2 including another spring-biased brake mechanism.

In FIG. 45, an extension spring 422 is shown. Unlike a compression spring that resists compressive forces, extension spring 422 resists being elongated from its resting, or zero load, position. Therefore, instead of pushing or urging pawl 60 toward the blade by pushing upon the pawl, extension spring 422 pulls the pawl toward the blade or other cutting tool. As shown, extension spring 422 includes a biasing end portion 424 coupled to the pawl and a fixed end portion 426 coupled to a suitable mounting assembly 410 generally toward the blade relative to the biasing end portion. The mounting assembly to which fixed end portion 426 is coupled may include a linkage, or mount, 428 that couples the end portion to the mounting assembly. Similarly, biased end portion 424 may be coupled to the pawl or other structure that moves with the pawl by a linkage or mount 430. Mounting assembly 410 may include any suitable structure able to support fixed end portion 426 without interfering with the operation of operative structure 12. For example, it may be mounted adjacent blade 40, coupled to the blade's arbor, mounted on structure that moves with the blade as the blade is tilted, raised or lowered, etc. Alternatively, extension spring 422 may act upon a portion of the pawl, or linkage coupled thereto, that is on the other end of the pawl's pivot axis than the blade-engaging portion of the pawl. This configuration is illustrated in dashed lines in FIG. 45. This configuration may be preferred because mounting assembly 410 is spaced further away from the blade, and may be more easily positioned.

Figure 46:
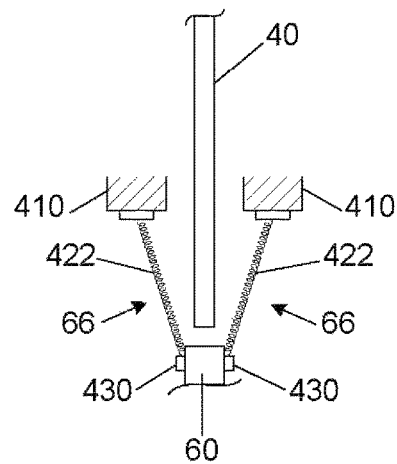
FIG. 46 is a fragmentary top plan view of another spring-biased brake mechanism.

Although a single spring 66 is shown in FIGS. 2 and 41-45, it should be understood that brake mechanism 28 may include more than one spring. For example, in the illustrative embodiment shown in FIG. 45, a pair of extension springs 422 may be used, such as shown in FIG. 46. When two or more springs are used, they may be of similar or different types and strengths.

In FIGS. 2 and 41-46, springs 66 are shown directly engaging pawls 60. It should be understood that the springs may alternatively engage other structure in communication with pawl 60. For example, springs 66 may engage one or more linkages through which the spring's biasing force is passed to the pawl. In such a configuration, restraining mechanism 32 may restrain any suitable portion of the biasing mechanism and pawl assembly to prevent the pawl from being moved into engagement with the blade or other cutting tool. For example, in the context of a restraining mechanism that includes a fusible member 70, the fusible member may be coupled to pawl 60, spring 66, or the one or more linkages interconnecting the spring and pawl.

Figure 47:
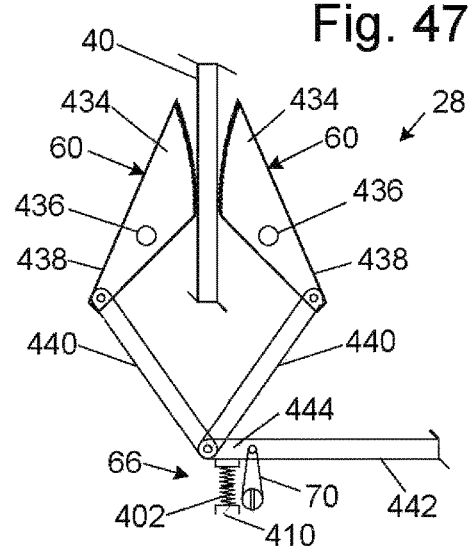
FIG. 47 is a fragmentary top plan view of another spring-biased brake mechanism.

An example of a brake mechanism 28 in which spring 66 directly engages a linkage instead of pawl 60 is shown in FIG. 47 in the context of a brake mechanism having a pair of pawls 60 adapted to engage a blade 40. As shown, pawls 60 include blade-engaging portions 434 adapted to engage blade 40. Pawls 60 are pivotal about axles or pins 436 and include distal portions 438 to which linkages 440 are coupled. Linkages 440 are further coupled to a spring-engaging linkage 442, which as shown, includes an end 444 adapted to be moved toward blade 40, thereby drawing the blade-engaging portions of the pawls into contact with the blade. In FIG. 47, a compression spring 402 is shown engaging linkage 442, however, any of the springs described herein could be used.

Springs 66 may also exert a biasing force upon an engagement mechanism instead of pawl 60. In such an embodiment, the force of the spring is not applied to the pawl unless restraining mechanism 32 releases the engagement mechanism or biasing mechanism to urge the pawl into engagement the blade or cutting tool of machine 10. An advantage of such a brake mechanism is that the biasing mechanism is not exerting force upon the pawl until the pawl is urged into contact with blade 40. This may, but does not necessarily, enable pawl 60 to be selectively removed and replaced from the brake mechanism without disabling biasing mechanism 30.

Additionally, or alternatively, biasing mechanism 30 may be self-contained as a module or cartridge that can be selectively removed and replaced from the rest of the brake mechanism when the fusible member or other portion of restraining mechanism 32 that counteracts the force of spring 66 is secured between portions of this module.

Figure 48:
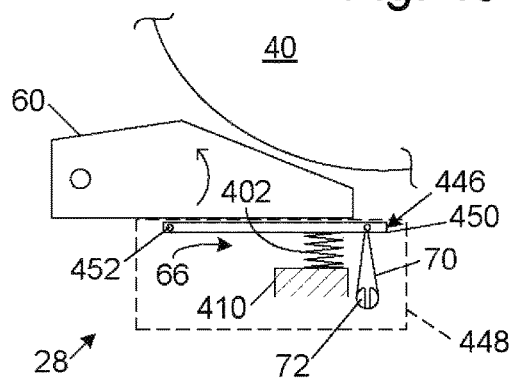
FIG. 48 is a fragmentary side elevation view of another spring-biased brake mechanism.

An example of a brake mechanism with an engagement mechanism 446 is shown in FIG. 48. As shown, spring 66 acts upon engagement mechanism 446, which is depicted to include a pivotal plate 450. Plate 450 selectively prevents the spring's biasing force from being exerted upon pawl 60. As shown, restraining mechanism 32, such as fusible member 70, prevents plate 450 from pivoting about its axle 452 under the biasing force of spring 66. As a result, the pawl is not urged toward the blade. Module or cartridge 448 is shown schematically in dashed lines, and is a possible rather than necessary element of brake mechanism 28. Module 448 typically will be mounted upon a suitable support or receiver in the machine, and may also include a connection with a suitable mechanism for releasing restraining mechanism 32. For example, contact mount 72 may be electrically connected to a portion of the release mechanism that does not form part of the replaceable module.

Figure 49:
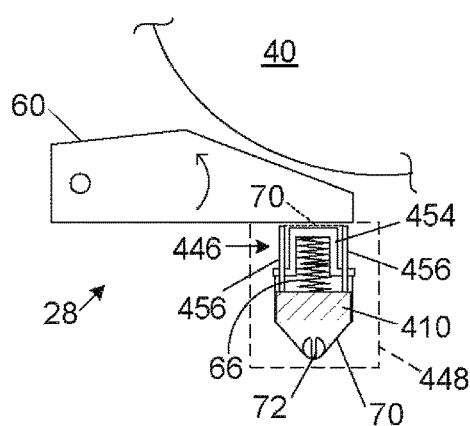
FIG. 49 is a fragmentary side elevation view of another spring-biased brake mechanism.
Figure 50:
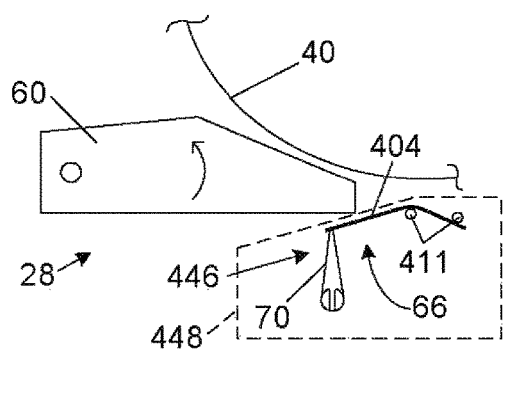
FIG. 50 is a fragmentary side elevation view of another spring-biased brake mechanism.

A variation of this brake mechanism is shown in FIG. 49, in which engagement mechanism 446 takes the form of a slidable member 454 that is adapted to translate, or slide, along tracks 456 toward and away from blade 40. As shown, fusible member 70 restrains the slidable member 454 from moving toward the blade, thereby preventing the spring from urging pawl 60 into contact with blade 40. Also shown in FIG. 49, is a variation of this brake mechanism, in which fusible member 70 extends across the travel path of slidable member 454 to prevent member 454 from moving under the force exerted by spring 66. In fact, fusible member 70 may itself form engagement mechanism 446, such as shown in FIG. 50, where the fusible member extends across the path of spring 66, thereby preventing the spring from urging pawl 60 into the blade or other cutting tool.

The brake mechanisms shown in FIGS. 47-49 may also be understood as including biasing mechanisms 30 with compound release mechanisms because there is more than one step for the brake mechanism to be actuated and pawl 60 to engage the blade or other cutting tool. Unlike the brake mechanisms shown in FIGS. 41-46, in which the release of restraining mechanism 32 was all that was required for spring 66 to urge pawl 60 into the blade or other cutting tool, the brake mechanisms shown in FIGS. 47-49 utilize a compound release to engage blade 40 with pawl 60. For example, the release of restraining mechanism 32 may free a portion of biasing mechanism 30 to move, such as to engage engagement mechanism 446 or a linkage, which in turn transfers this force to pawl 60.

Figure 51:
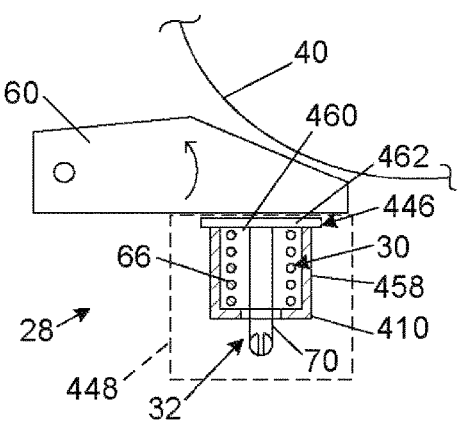
FIG. 51 is a fragmentary side elevation view of another spring-biased brake mechanism.

In FIG. 51, another example of a brake mechanism 28 with a compound release, or compound release mechanism, is shown. In FIG. 51, an illustrative embodiment of a self-contained actuator assembly is shown. As shown, spring 66 is housed in a shell 458 with an open end 460 through which the spring, or a suitable linkage coupled to the spring, may extend upon release of restraining mechanism 32. In the illustrative embodiment shown in FIG. 51, end 460 is at least partially covered by a spanning member 462 positioned between the spring and pawl 60. Member 462 does not need to completely close end 460, however, it should prevent spring 60 from passing through end 460 and engaging pawl 60. Fusible member 70, or another suitable embodiment of restraining mechanism 32, is coupled to member 462 and prevents spring 66 from urging the spanning member into contact with pawl 60. As shown, member 70 passes through shell 458, and in the illustrated embodiment, spring 66. It should be understood that shell 458 may be used with embodiments of brake mechanism 28 that do not include a compound release, in which case pawl 60 would typically abut the open end of the shell.

Figure 52:
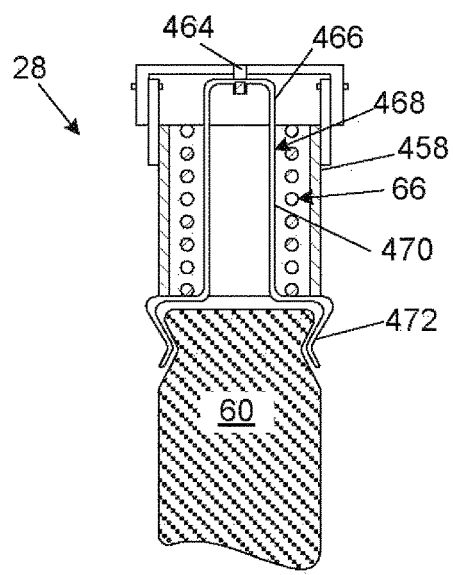
FIG. 52 is a cross-sectional side elevation view of another spring-biased brake mechanism.
Figure 53:
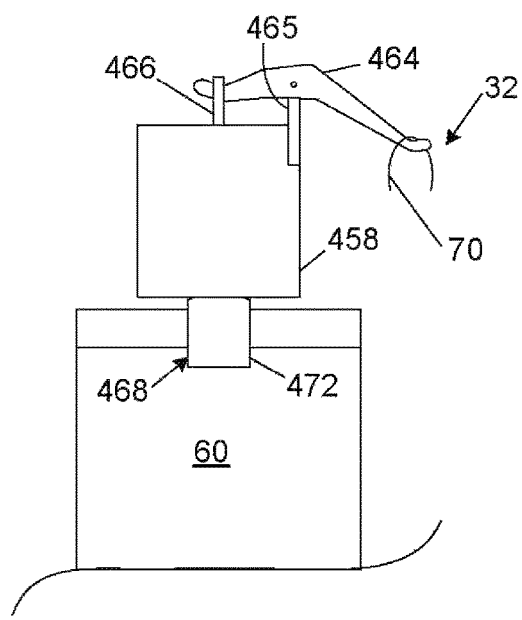
FIG. 53 is an end elevation view of the brake mechanism of FIG. 52.

Other exemplary embodiments of self-contained actuator assemblies are shown in FIGS. 52 and 53, where restraining mechanism 32 is releasably coupled to a lever arm 464 that in turn is coupled to an end portion 466 of a carrier 468. Lever, or pivot, arm 464 pivots about a pivot axis defined by a projecting portion 465 on shell 458. It should be remembered that arm 464, carrier 468 and shell 458 (including portion 465) must be sufficiently strong to withstand the force of spring 66. End portion 466 of carrier 468 should be mounted on arm 464 so that it will release relatively immediately upon release of restraining mechanism 32 and initial pivoting of arm 464 about portion 465. Alternatively, arm 464 should be able to pivot without obstruction until pawl 60 is fully engaged with blade 40 so that the pivot arm does not impede the motion of pawl 60, and thereby increase the time required to stop blade 40. In such a configuration where arm 464 pivots without restricting the motion of the pawl, arm 464 does not need to release from carrier 468, and instead these portions may remain coupled together.

Carrier 468 includes an elongate support 470 that extends through shell 458 and further includes a pawl-receiving portion 472 that is adapted to releasably receive pawl 60, thereby allowing the pawl to be selectively removed and replaced without dismantling or otherwise disassembling the rest of brake mechanism 28. As shown, pawl-receiving portion 472 also forms a spanning member in that it prevents the spring from urging the pawl into engagement with blade 40. In FIGS. 52 and 53, portion 472 and pawl 60 are shown having complimentary configurations so that the pawl may be coupled to the pawl-receiving portion without requiring additional securing mechanisms. In the embodiment shown, the pawl may be either slid onto portion 472 from an end, or alternatively by briefly deflecting portion 472 outwardly as the pawl is inserted into its mounted position. It will be appreciated, however, that additional securing mechanisms may be used, such as screws, pins, and other releasable fasteners. Because neither spring 66 nor fusible member 70 act directly upon the pawl or pawl-receiving portion, the coupling between these portions does not have to be strong. As a further variation, pawl 60 may be fixedly secured to, or even integrally formed with, carrier 468, or at least the pawl-engaging portion thereof.

A variation of a self-contained actuator is shown in FIG. 54, in which the length of carrier 468 is selectively adjustable, thereby allowing the relative positioning of the pawl relative to blade 40 to also be adjustable. As shown, support 470 includes a threaded portion 474 that is threadingly received into pawl-receiving portion 472. The length of carrier 468 may be adjusted by rotating support 470, such as via a user-manipulable portion 476, to increase or decrease the extent to which portion 474 is received into pawl-receiving portion 472. In FIG. 54, pawl-receiving portion 472 is also shown including key structure 478 that prevents pawl 60 from being installed into the pawl-receiving portion other than in a position defined by key structure 478.

Another embodiment of a spring-biased brake mechanism is shown in FIG. 55. As shown, lever arm 464 includes an end portion 480 that couples to shell 458 proximate open end 460. In the embodiment shown, end portion 480 is received into a notch 481 in the shell, and includes a shoulder 482 about which the arm pivots upon release of restraining mechanism 32. Alternatively, shell 458 may include a ledge or projection upon which arm 464 is seated. Preferably, at least an end region 483 of elongate support 470 generally conforms to the inner diameter of spring 66 to resist shifting or tilting of the carrier when in the restrained position shown in FIG. 55.

As shown, support 470 includes an edge 471 that extends generally parallel and against spring 66, with a generally opposed edge 473 tapering from pawl-receiving portion 472 toward end portion 466. Also shown in FIG. 55 is another example of a pawl-engaging portion 472 with a key structure 478. Edge 471 is on the side of support 470 distal pivot arm 464 to stabilize the carrier during installation and while in the restrained position. Edge 473 is on the side of support 470 distal the lever arm 464 to allow the support to tilt as it is urged from shell 458 upon release of restraining mechanism 32. This configuration of carrier is an example of a carrier that may be integrally formed, or monolithic, with pawl 60.

In the brake mechanisms shown in FIGS. 52-55, the portion of fusible member 70 not coupled to pivot arm 464 may be secured to any suitable supporting structure to allow the fusible member to counteract the force of spring 66. This supporting structure may form part of the brake mechanism shown in FIGS. 52-55, such as securing the fusible member to shell 458 or pawl-receiving portion 472. In such a configuration, the portions of the brake, biasing and restraining mechanisms shown in FIGS. 52-55 form a self-contained module or self-contained actuator.

In FIG. 56, an embodiment of a shell and pivot arm assembly is shown in which the distance between the pivot axis 484 of arm 464 and the region upon which arm 464 supports carrier 468 is reduced from the embodiments shown in FIGS. 42-54. As shown, arm 464 is pivotally coupled to shell 458 by a pair of mounts 485 and includes a carrier-receiving portion 486. In the embodiment shown in FIG. 56, arm 464 may have a generally planar configuration that allows the arm to extend against a portion of the shell's end 487. Upon release of the restraining mechanism, arm 464 pivots relative to shell 458 and portion 486 pivots into the shell and releases the carrier to move under the force of spring 66. As shown, end 487 of shell 458 is sufficiently open to permit portion 486 to pivot into the shell and release carrier 468. As shown, end 487 is also sufficiently obstructed to prevent spring 66 from passing therethrough. Also illustrated in FIG. 56 is an embodiment of support 470 that generally conforms to the inner dimension of spring 66, thereby supporting carrier 468 against axial tilting within the shell as the carrier passes through the shell. Another suitable configuration for support 470 is shown in dashed lines in FIG. 56.

In FIGS. 57 and 58, another example of a spring-biased brake mechanism with a lever arm 464 that releases from open end 460 of shell 458 is shown. As shown, arm 464 is pivotally coupled to shell 458 by pins 488 and includes a pair of catches 489 that engage a spanning member 462. As shown, spanning member 462 includes a cover 490 that covers open end 460 of shell 458 and includes projections 491 that are engaged by catches 489. Alternatively, spanning member 462 may include any other suitable configuration sufficient to prevent spring 66 from passing through, or urging another member through, end 460 prior to release of restraining mechanism 32. Preferably, catches 489 are shaped to release spanning member 462 as arm 464 begins to pivot upon release of restraining mechanism 32.

In FIG. 59, another example of a spring-biased brake mechanism is shown. As shown, lever arm 464 and shell 458 are adapted to facilitate more uniform positioning of carrier 468, and thereby pawl 60, as arm 464 is secured in a cocked, or restrained, position by restraining mechanism 32, such as fusible member 70. Prior to attachment of fusible member 70, lever arm 464 is pivoted about edge 492 of shell 458 as the arm is pivoted to the position shown in solid lines in FIG. 59. In this interval, there is a mechanical advantage achieved because the distance 493 between edge 492 and the proximate edge 494 of carrier 468 is much less than the distance 495 between edge 492 and fusible member 70. However, to continue pivoting arm 464 downward, this mechanical advantage is lost because the fulcrum about which the arm is pivoted changes, as reflected by distances 493' and 495'. As shown, arm 464 now pivots about the edge 496 of extension 498. The corresponding amount of force required to pivot arm 464 may be used as an indicator of when arm 464 is positioned properly, at which point fusible member may be attached. Of course, if fusible member is a preformed member of fixed length, then precise positioning of the lever arm 464 and pawl 60 are achieved simply by the attachment of the fusible member.

It will be appreciated that the spring-biased brake mechanism described above may be implemented with many variations. For example, the spring-biased mechanisms disclosed herein may be used to drive the retraction of blade 40 on a table saw, miter saw or other machine, such as described in Section 3 above and Sections 13 and 14 below.

The brake systems and methods may be described as set forth in the following numbered paragraphs. These paragraphs are intended as illustrative, and are not intended to limit the disclosure or claims in any way. Changes and modifications may be made to the following descriptions without departing from the scope of the disclosure.

4.1 A woodworking machine comprising:
a working portion;
a detection system adapted to detect a dangerous condition between a person and the working portion; and
a reaction system associated with the detection system to cause a predetermined action to take place relative to the working portion upon detection of the dangerous condition, where the reaction system includes stored mechanical energy to cause the predetermined action to take place.

4.1.1 The woodworking machine of paragraph 4.1 where the reaction system includes a spring as the repository of the stored mechanical energy.

4.1.2 The woodworking machine of paragraph 4.1 where the reaction system includes a brake and a spring to cause the brake to engage the working portion.

4.2 A woodworking machine comprising:
a cutter;
a detection system adapted to detect contact between a person and the cutter;
a brake pawl to stop the cutter upon the detection by the detection system of contact between the person and the cutter; and
stored mechanical energy to cause the brake pawl to engage the cutter.

4.2.1 The woodworking machine of paragraph 4.2 where the stored mechanical energy is a spring.

4.2.2 The woodworking machine of paragraph 4.2.1 where the spring pushes the brake pawl into contact with the cutter.

4.2.3 The woodworking machine of paragraph 4.2 where stored mechanical energy is in a self-contained cartridge.

4.3 A woodworking machine comprising:
a working portion;
a detection system adapted to detect a dangerous condition between a person and the working portion; and
a brake system adapted to engage and brake the working portion upon detection by the detection system of the dangerous condition, where the brake system includes a brake pawl and a spring module adapted to move the brake pawl into engagement with the working portion.

4.4 A brake cartridge for a woodworking machine, the cartridge comprising:
a housing;
a brake pawl in the housing; and
a spring module in the housing adapted selectively to move the brake pawl, where the biasing module is self-contained.

4.4.1 The brake cartridge of paragraph 4.4 where the spring module includes a coil spring held in compression by a mechanism.

Section 5: Brake Mechanism

As described above, safety system 18 includes a brake mechanism 28 that is adapted to stop the cutting tool, thereby preventing or reducing injury to the user. As also discussed previously, the brake mechanism may include at least one pawl 60 adapted to engage the cutting tool to stop the rotation thereof. For purposes of the following discussion, cutting tool 14 will be described in the context of a blade 40, such as on a table saw, miter saw, circular saw or the like. It should be understood that blade 40 may include single blades, such as plywood or carbide-tipped blades, or an assembly of several blades, such as a dado blade.

As discussed, pawl 60 may be made of any suitable material that is capable of quickly stopping the blade or other cutting tool within the desired time increment, such as less than 5 milliseconds, and preferably, 3 milliseconds or less. The above examples of thermoplastic and metallic materials have proven effective, although other materials may be used so long as they are able to stop the blade within the desired time increment. Preferably, the pawl is formed of a material that does not damage the machine, and even more preferably, the pawl is formed of a material that does not damage the cutting tool. The pawl may be formed by any suitable method, such as by cutting sheets of the desired material to size or by molding. Similarly, the pawls may be annealed to increase their strength.

It should be understood that the heavier the pawl, the more force it will take to urge the pawl into contact with the blade or other cutting tool within the selected time increment and the more restraining force that restraining mechanism 32 will need to exert to counteract the biasing mechanism. On the other hand, the pawl must have sufficient mass and strength to withstand the forces exerted upon the pawl by the blade. It should also be understood that the longer it takes for pawl 60 to engage the blade after detection of a dangerous, or triggering, condition by detection subsystem 22, the longer the blade will rotate and potentially cut the user's hand or other body part. Therefore, it is preferred that this time be minimized, such as by decreasing the distance pawl 60 must travel to engage the blade and increasing the speed at which the pawl moves to travel this distance. The speed at which the pawl travels is largely dependent upon the weight of the pawl, the force with which biasing mechanism 30 urges the pawl toward the blade upon release of restraining mechanism 32, and any friction in the mechanism.

There is not a specific pawl size, geometry or weight that is required to be suitable for use to stop the blade or other cutting tool. Instead, the size, geometry and weight may vary, depending upon such factors as the particular type of machine and cutting mechanism with which the pawl is used, the pawl material or combinations of materials, the corresponding structure of biasing mechanism 30 and restraining mechanism 32, etc. As such, the following discussion of materials, sizes and geometries are meant to provide illustrative examples of some suitable materials, geometries and sizes. Similarly, pawls may be formed with any combination of one or more of the subsequently discussed elements, subelements and possible variations, regardless of whether the elements, subelements and possible variations are shown together in the same figure.

The thickness of pawl 60 may vary. Thicknesses in the range of approximately ½ inch and approximately 1 inch have proven effective, although thicknesses outside of this range may be used so long as the pawl may reliably stop the blade. When thicker blades, such as dado blades are used, the pawl is more likely to have a thickness greater than 1 inch.

Figure 60:
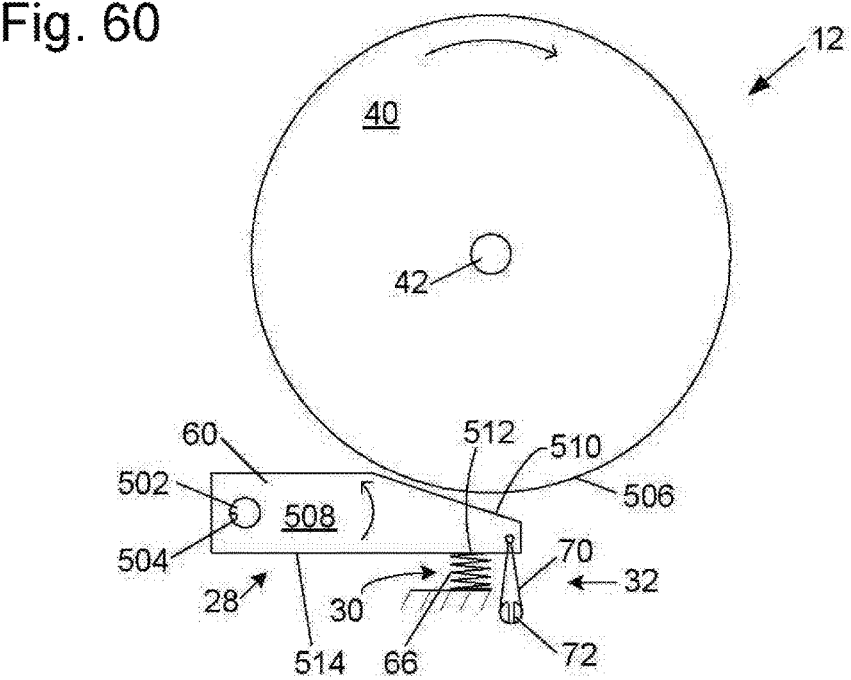
FIG. 60 is a side elevation view of a brake mechanism, including a pawl.

Pawl 60 engages the blade to quickly stop the rotation of the blade. Pawl 60 may engage the blade in several different configurations, such as engaging the side of the blade or the teeth of the blade. As shown in FIG. 60, pawl 60 is pivotally mounted on an axle 502 that extends through a bore 504 in the pawl, and pawl 60 is adapted to pivot into the teeth 506 of blade 40 under the influence of biasing mechanism 30, such as spring 66. It will be appreciated that the pivotal pawls described herein may alternatively pivot with an axle upon which the pawl is secured, as opposed to pivoting about the axle. Other suitable biasing mechanisms are described above in Section 4. Preferably, pawl 60 is adapted to be self-locking, i.e., drawn into tighter engagement with the teeth of blade 40 due to the relative geometry of the blade and pawl as they are drawn together. For example, when blade 40 is spinning in the indicated direction in FIG. 60, the blade will draw the pawl into tighter engagement with the blade when the blade contacts the pawl.

The spacing from pawl 60 to blade 40 when the pawl is in its restrained, or cocked, position may vary. For example, this spacing may vary depending on the configuration of the particular cutting tool, the detection system, and/or the brake system. Preferably, this distance is minimized to reduce the time required for the pawl to travel across this distance and engage the blade. It has been found that a space of approximately 1/32-inch to 1/4-inch between the pawl and blade provides suitable results. A spacing of approximately 1/8-inch has proven particularly effective, although larger and smaller distances may be used. Because many cutting tools such as saw blades do not have precisely uniform dimensions, it may be necessary to position the pawl sufficiently away from the blade to account for variations or irregularities in a particular blade, such as described in Section 8 below. Also it may be necessary to adjust the position of the pawl whenever a blade is replaced to account for variations between particular blades. For example, for circular saw blades having a nominal diameters of 10-inches and nominal thicknesses of 0.125-inch, actual blades from various manufacturers or for different applications may have diameters that range between 9.5-inches and 10.5-inches and thicknesses that range between 0.075-inch and 0.15-inch.

In the illustrative embodiment of pawl 60 shown in FIG. 60, it can be seen that pawl 60 includes a body 508 with a contact surface 510 that is adapted to engage blade 40. Pawl 60 also includes an engagement member 512 that is adapted to be engaged by biasing mechanism 30. As shown engagement member 512 forms part of the face 514 of the pawl that faces generally away from the cutting tool. Engagement member 512 may also include a recess into or protrusion from the body of the pawl. In the mounting position shown in FIG. 60, pawl 60 pivots into the blade upon release of restraining mechanism 32, such as when the safety system sends a current through fusible member 70. When the pawl contacts the blade, the contact surface extends generally tangential to the blade, and the teeth of the blade embed into the pawl.

Figure 61:
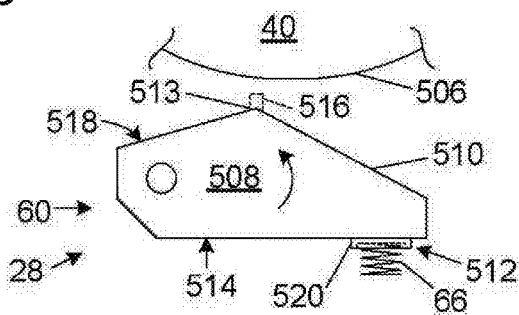
FIG. 61 is a side elevation view of a portion of another brake mechanism.

Another illustrative example of pawl 60 is shown in FIG. 61. As shown, the pawl is somewhat smaller than the pawl shown in FIG. 60. An advantage of a smaller pawl is that it will be lighter than a larger pawl constructed from the same material, and therefore it will not require as great of spring force to urge the pawl into the blade in a selected time interval as a heavier pawl. On the other hand, a smaller pawl will tend to, but not necessarily, have a smaller contact surface 510. In FIG. 61, the pawl includes a blade-engaging shoulder 513 that is adapted to engage the blade before the contact surface, or at least a substantial portion of the contact surface, engages the blade. Shoulder 514 may include a protrusion 516 that extends from the surface 518 of the pawl generally facing the blade. Shoulder 514 and/or protrusion 516 engage the blade prior to the contact surface of the pawl, and this contact quickly pivots the contact surface of the pawl into engagement with the blade. In essence, the shoulder or protrusion reduce the time and/or spring force required to quickly move the pawl into a position to stop the blade by using the blade momentum, transferred by contact with the shoulder, to draw the pawl into the blade. Also shown in FIG. 61 is another embodiment of engagement member 512, which as shown includes a collar 520 extending from surface 514 and into which a portion of spring is received. Collar 520 has an inner diameter that is greater than the diameter of the portion of the spring received therein. Collar 520 facilitates the positioning of the spring during assembly, or cocking, of the brake mechanism.

Figure 62:
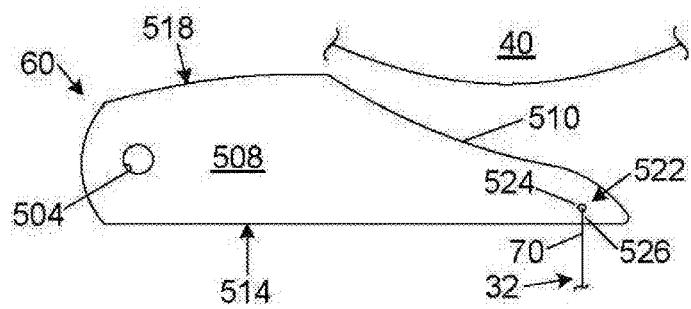
FIG. 62 is a side elevation view of another pawl.

Another illustrative example of a suitable pawl 60 is shown in FIG. 62. As shown, the pawl is somewhat larger than the previously illustrated pawls and includes a contact surface 510 that generally conforms to the outer diameter of the blade. Also shown in FIG. 62 is a mounting assembly 522 for restraining mechanism 32. As shown, mounting assembly 522 includes an aperture 524 through which a portion of the restraining mechanism, such as a portion of fusible member 70, extends. Fusible member 70 may also be described as extending around a portion 526 of the pawl. Other suitable fusible members and restraining mechanisms are described in more detail below in Section 6.

Figure 63:
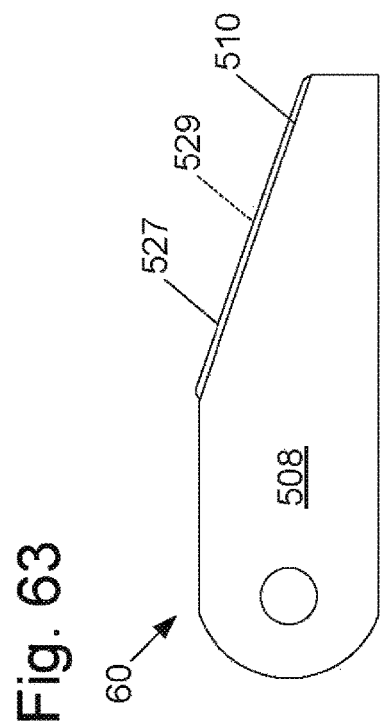
FIG. 63 is a side elevation view of another pawl.

To increase the gripping action of the pawls on the blade, the contact surface 510 of the pawls may be coated with a performance-enhancing material 527, such as shown in FIG. 63. An example of a performance-enhancing material is a relatively high-friction material such as rubber or a material that "tangles," or snares, in the teeth of the blade or other cutting tool, such as Kevlar cloth or metal mesh. Alternatively, the pawls may be constructed of a harder material than the blade and have a ridged surface to "bite" into the blade. Alternatively, or additionally, the pawl may be configured with grip structure 529 such as coatings of high-friction material, grooves, notches, holes, protuberances, etc., to further increase the gripping action of the pawls.

Pawl 60 may include one or more removed regions. These regions may take any suitable form, such as depressions that extend partially through the pawl or bores or other apertures that extend completely through the pawl. An example of a pawl showing plural removed regions 528 in the form of depressions 530 is shown in FIG. 64. The removed regions reduce the overall weight of the pawl, thereby decreasing the relative force that biasing mechanism 30 needs to exert on the pawl to move the pawl into contact with the blade within a selected time interval, as compared to a similar pawl of greater weight. Depressions, or recesses, 530 may also improve the grip of the pawl on the teeth of the blade by allowing the teeth to bite more deeply into the pawl.

An example of another embodiment of engagement member 512 is also shown in FIG. 64 in the form of a depression 532 that extends into the body 508 of the pawl and into which a portion of spring 66 extends. Depression 532 may be laterally open, or may include sidewalls 534, such as indicated in dashed lines. Also shown in FIG. 64 is a mount 535 adapted to be coupled to biasing mechanism 30. As shown, mount 535 takes the form of a projection around which a portion of a coil spring (such as spring 66 shown in FIG. 61) extends. It should be understood that mount 535 may be used independent of depression 532 and/or side walls 534. The pawl shown in FIG. 64 also shows another suitable embodiment of a mounting assembly 522 for restraining mechanism 32. As shown, the mounting assembly includes a mount 536 for a linkage 538, which is coupled to a fusible member that is not physically in contact with pawl 60.

The pawl shown in FIG. 64 may also be described as having a body 508 with a blade-engaging portion 540 and at least one region of reduced thickness compared to the blade-engaging portion. For example, the previously described depressions 530 have a reduced thickness compared to blade-engaging portion 540. The increased thickness of the blade-engaging portion provides additional strength to that portion of the pawl, while the reduced-thickness portions reduce the overall mass of the pawl. Pawl 60 may also be described as including one or more ribs, or supports 542 extending generally between bore 504 and blade engaging portion 540 to strengthen the pawl.

Figure 65:
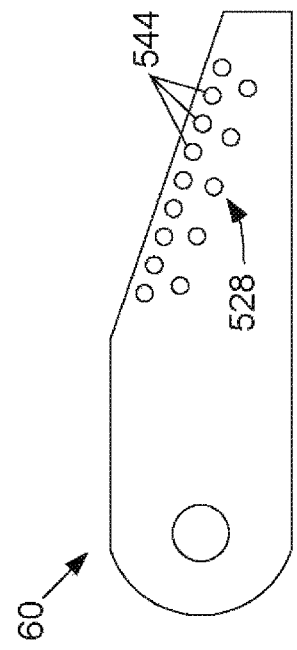
FIG. 65 is a side elevation view of another pawl.

An example of a pawl having plural removed regions 528 in the form of apertures 544 is shown in FIG. 65. Apertures 544 reduce the comparative weight of the pawl compared to a similar pawl that does not include apertures or other removed regions. Apertures 544 also provide regions into which the material forming pawl 60 may deform, or flow, into as the blade or other cutting tool strikes the pawl. Having these deformation regions reduces the stress to the pawl as it engages the blade. It should be understood that the size and positioning of the removed regions 528 discussed herein are for purposes of illustration and that these regions may be positioned in any suitable location on the pawl in a variety of shapes, sizes and configurations.

Figure 66:
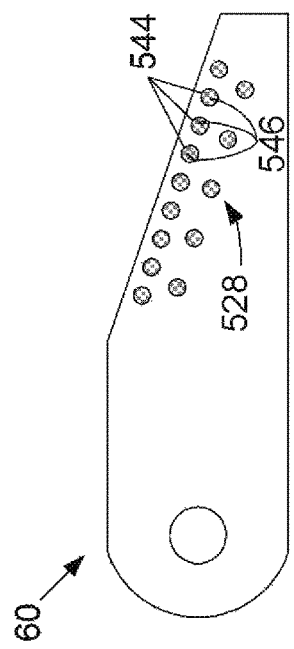
FIG. 66 is a side elevation view of another pawl.

A variation of the pawl of FIG. 65 is shown in FIG. 66, in which the apertures 544 have been filled with another material 546. It should be understood that some or all of the apertures may be partially or completely filled with material 546. For example, the body of pawl 60 may be formed from one of the previously described materials, with the apertures filled with another of the previously described materials or a material other than those described above. As a particular example, the body of the pawl may be formed from polycarbonate or ABS, with apertures 544 filled with aluminum or another suitable metal.

Another variation of the pawl of FIG. 65 is shown in FIG. 67. In FIG. 67, pawl 60 includes a plurality of apertures 544 through which one or more wires 548 are passed. As shown, a single wire 548 is looped through the apertures and also extends across a portion of contact surface 510. Although illustrated schematically with the number of wires or wire strands shown in FIG. 67, there may preferably be many strands of wire, such as in the range of approximately 20 and approximately 500 strands. It should be understood that a "strand" of wire is meant to refer to a length of wire extending across the pawl, such as transverse to the plane of the blade or other cutting tool, regardless of whether the strand is connected to other strands or formed from the same unitary length of wire as other strands. Alternatively, the wire or wires could be threaded through one or more of the apertures without extending across the contact surface. An example of a suitable material for wire 546 is high tensile strength stainless steel, which is available in a variety of diameters. In experiments, diameters of 0.01 inch have proven effective, but larger or smaller diameter wires 548, as well as wires formed of other materials may be used.

Other forms of composite pawls include pawls formed from two or more regions of different materials. An example of such a composite pawl 60 is shown in FIG. 68, in which the body 508 of the pawl includes a region 550 of material that is a different material than the rest of the body and which forms at least a portion of blade-engaging portion 540. It should be understood that the region 550 may have a variety of shapes, including layers of generally uniform thickness, such as shown in solid lines in FIG. 68, or less uniform shapes, such as layer 550' shown in dashed lines in FIG. 68.

Pawl 60 may also be formed as composites of materials, such as by layers of different materials or by impregnating or embedding a particular material of construction with another material to add or enhance a desired property. For example, a thermoplastic material may include a framework or dispersion of fibers or other materials. An example of a pawl constructed of such a composite is shown in FIG. 69, in which the body of the pawl is formed of a core material 552 into which a filler material 554 is added. Filler material 554 may take the form of particulates, fibers, woven fibers, pellets and the like.

Pawl 60 may also include a removable blade-engaging portion 540. This allows the pawl to be recharged for reuse after the pawl is used to stop blade 60 and the blade-engaging portion is damaged by the blade. It should be understood that "removable" means that the blade-engaging portion may be selectively removed and reattached to the rest of the pawl. An example of such a pawl is shown in FIG. 70, in which the pawl includes body 508 and removable blade-engaging portion 540'. Portion 540' may be formed of the same or a different material or combination of materials as body 508. Blade-engaging portion 540' may be attached to body 508 by any suitable attachment mechanism 556, which is only schematically illustrated in FIG. 70. Examples of suitable attachment mechanisms 556 include interlocking portions on the body and blade-engaging portion and/or mechanical linkages coupled between the body and blade-engaging portion.

In FIG. 71, pawl 60 includes a sheath, or cover, 558 that overlies at least the blade-engaging portion of the pawl. Sheath 558 is formed of a material that enhances the pawl's ability to stop blade 40, preferably without damaging the blade. For example, sheath 558 may be formed of Kevlar cloth. Similarly, such a material may be embedded into the thermoplastic or other material forming pawl 60, such as schematically illustrated in FIG. 69. Sheath 558 may extend completely or partially around the pawl, or alternatively may be partially embedded in the pawl, such as shown in FIG. 72. Furthermore, Kevlar cloth, or pieces thereof may be embedded into the thermoplastic or other material forming the pawl, such as discussed previously with respect to FIG. 69, regardless of whether this material extends across the blade-engaging portion of the pawl.

A variation of a pawl that includes sheath 558 is shown in FIG. 73. In FIG. 73, the body of the pawl defines a frame 560 that includes spaced-apart side walls 562 defining a channel 564 therebetween. Sheath 558 extends across the channel and is positioned to engage and stop the blade as the pawl is urged into the blade.

Figure 74:
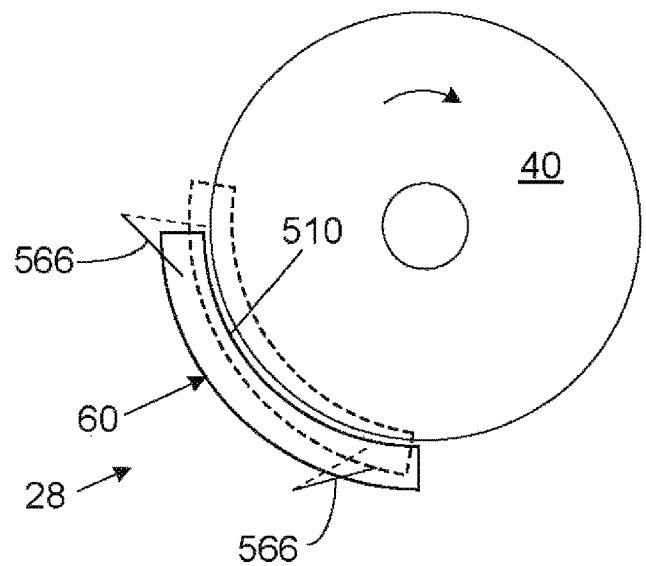
FIG. 74 is a side elevation view of another brake mechanism.
Figure 75:
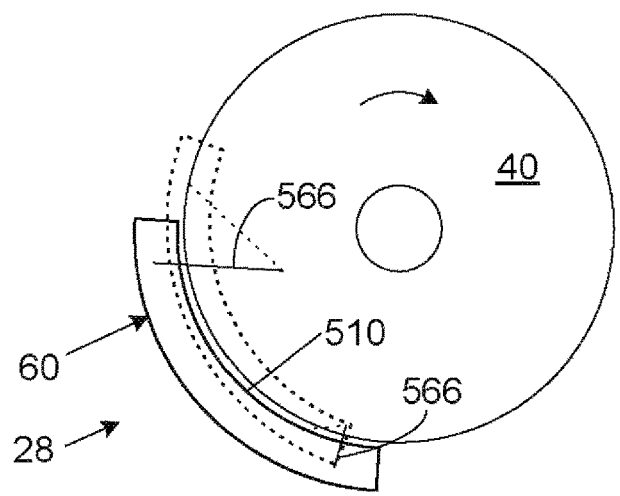
FIG. 75 is a side elevation view of another brake mechanism.
Figure 76:
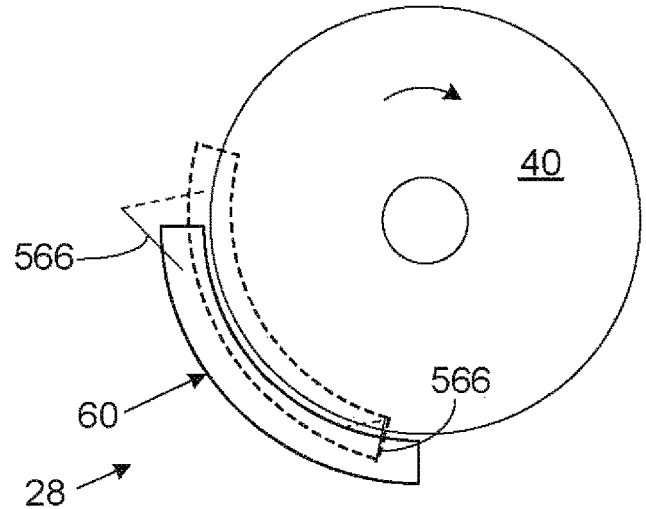
FIG. 76 is a side elevation view of another brake mechanism.

When pawl 60 is mounted to pivot into engagement with a blade or other cutting tool, the pawl may include more than one pivot axis. An example of such a pawl is shown in FIGS. 74-76, in which the pawl is mounted on a pair of pivot arms 566. As shown, pawl 60 has an elongate contact surface 510 that engages a large portion of the blade. Arms 566 may have the same or different lengths, and can be mounted to pivot anchors (not shown) positioned outside or inside the perimeter of the blade. An advantage of a pawl with an elongate contact surface is that the force exerted by the pawl is distributed across a larger portion of the blade, thereby allowing the blade to be stopped more quickly. The longer contact surface can also be used to reduce the chance of damage to the blade because the braking force is spread over more teeth.

In FIG. 74, arms 566 are mounted to suitable portions of machine 10 distal the blade relative to pawl 60, while in FIG. 75, the arms are mounted proximate the blade relative to pawl 60. In FIG. 76, one of the pivot arms extends distal the blade, while the other extends proximate the blade relative to the pawl. An advantage of pivot arms that extend toward, or proximately, the blade relative to the pawl is that the pawl cannot be pivoted to a point after which the pawl will pivot away from the blade rather than toward the blade. In the embodiment of pawl 60 shown in FIG. 75, for example, the pawl will always be drawn into tighter engagement with the blade when the blade is rotating in the direction shown and strikes the pawl.

It should be understood that the previously described axle 502 or other structure to which the pawls are mounted may be fixed relative to the housing of the machine. In embodiments of the machine in which the position of the blade is adjustable, the pawl is preferably mounted to move with the blade as the blade's position is adjusted. This latter arrangement ensures that the pawl is maintained in a predetermined position relative to the blade.

Figure 77:
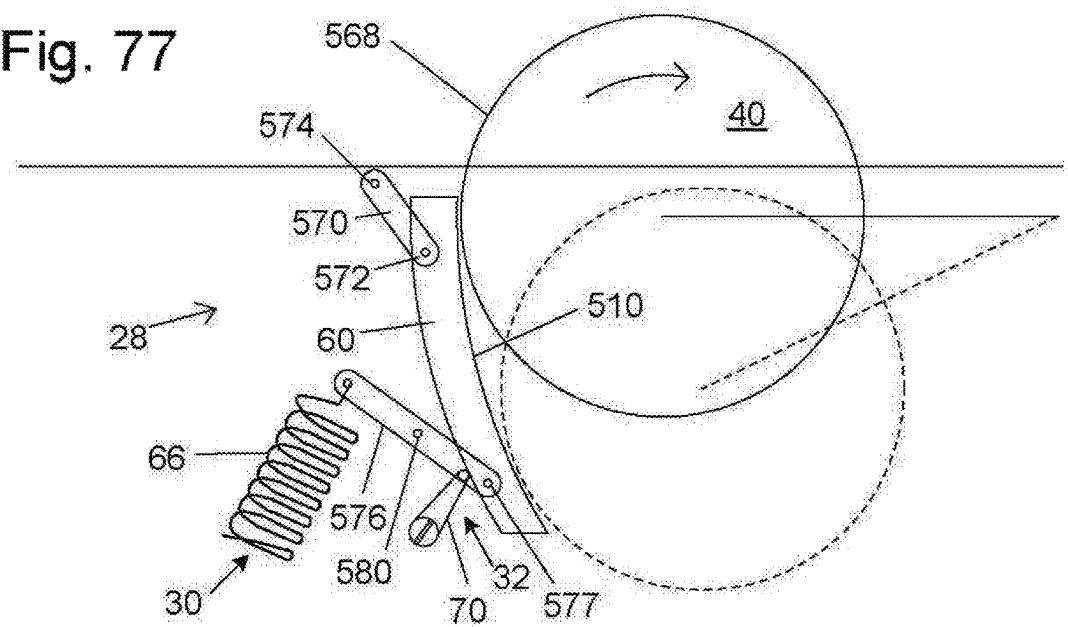
FIG. 77 is a side elevation view of another brake mechanism.
Figure 78:
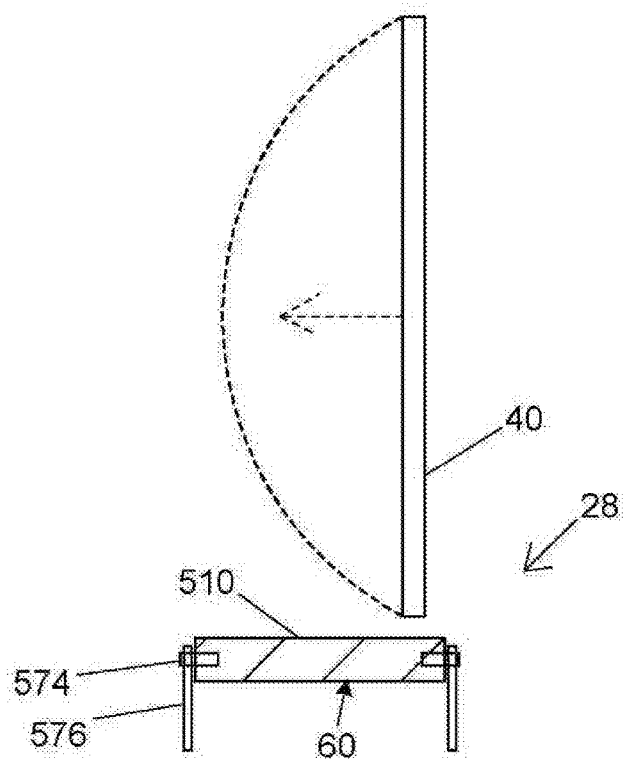
FIG. 78 is a top plan view of the brake mechanism of FIG. 77.

Alternatively, the pawl may be mounted on a portion of the machine that does not adjust with the blade, but in a mounting orientation suitable for use with the blade regardless of the blade's mounting position. An illustrative example of such a "stationary" pawl is shown in FIGS. 77 and 78. By "stationary," it is meant that the position of the pawl does not move with the blade as the relative position of the saw is moved. However, upon actuation of the reaction subsystem, pawl 60 will still move into engagement with the blade. Alternatively, with machines in which the blade may raise and lower as well as tilt, the pawl may be adapted to move with one adjustment, such as tilting with the blade, but remain fixed with the other, such as when the blade is raised or lowered.

As shown in FIGS. 77 and 78, pawl 60 is elongate and sized and shaped to extend along the outer perimeter 568 of blade 40 as the blade is adjusted vertically. Similarly the width of pawl 60 is sized to extend the breadth of the incline of blade 40. As shown in FIGS. 77 and 78, pawl 60 is mounted generally parallel with the vertical axis of travel of the blade, and generally normal to the axis of incline of the blade. As a result, the spacing between the blade and contact surface 510 remains constant regardless of the position or orientation of the blade.

The upper end portion of pawl 60 is pivotally attached to upper pivot arms 570 by pivot pins 572 that pass through one end of arms 570 into the sides of the pawl. The other ends of pivot arms 570 are pivotally attached to one or more mounts (not shown), by pivot pins 574. The lower end portion of pawl 60 is pivotally attached to lower pivot arms 576 by pivot pins 577 that pass through one end of arms 576 into the sides of the pawl. The lower pivot arms are pivotally attached to mounts (not shown) by pivot pins 580. Biasing mechanism 30, such as one or more springs 66, is attached to the lower pivot arms on the side of pivot pins 580 opposite pivot pins 577. Thus, pawl 60 is configured to pivot toward or away from blade 40. Upon release of restraining mechanism 32, such as fusible member 70, the biasing mechanism urges the upper ends of pivot arm 576 downward, thereby drawing the lower end of the pivot arms and the corresponding end portion of pawl 60 into engagement with the blade.

Pivot arms 570 and 576 are sized and arranged such that pawl 60 cannot pivot up past the blade without striking the edge of the blade. When the pawl strikes the blade while the blade is rotating, the movement of the blade causes the pawl to continue pivoting upward until the pawl is firmly wedged between the blade and pivot arms, thereby stopping the blade. The contact surface 510 of the pawl may be textured, coated, etc., to enhance the gripping action between the pawl and the blade.

Pawl 60 is biased upward to pivot toward the blade by biasing mechanism 30, which for example includes one or more springs 66 that are anchored to the saw frame or other suitable mounting structure. Thus, when the pawl is free to pivot, springs 66 drive the pawl quickly toward the blade. Similar to the exemplary embodiment described above, fusible member 70 is connected to the pawl to hold it away from the blade. The fusible member is sized to hold the pawl spaced slightly away from the edge of the blade. However, when a sufficient current is passed through the fusible member the fusible member will melt, causing the pawl to pivot toward the blade under the bias of mechanism 30.

It will be appreciated that many variations to the exemplary embodiment depicted in FIGS. 77 and 78 are possible. For example, the pawl may be configured to pivot toward the blade solely due to gravity. Alternatively, springs 66 may be compression springs which normally hold the pawl away from the blade until it is pivoted upward under the force of another spring, an explosive charge, a solenoid, gas pressure, etc. Further, the pawl may be mounted on the other side of the blade to pivot downward into the blade under the force of a spring, an explosive charge, a solenoid, gas pressure, etc.

Figure 79:
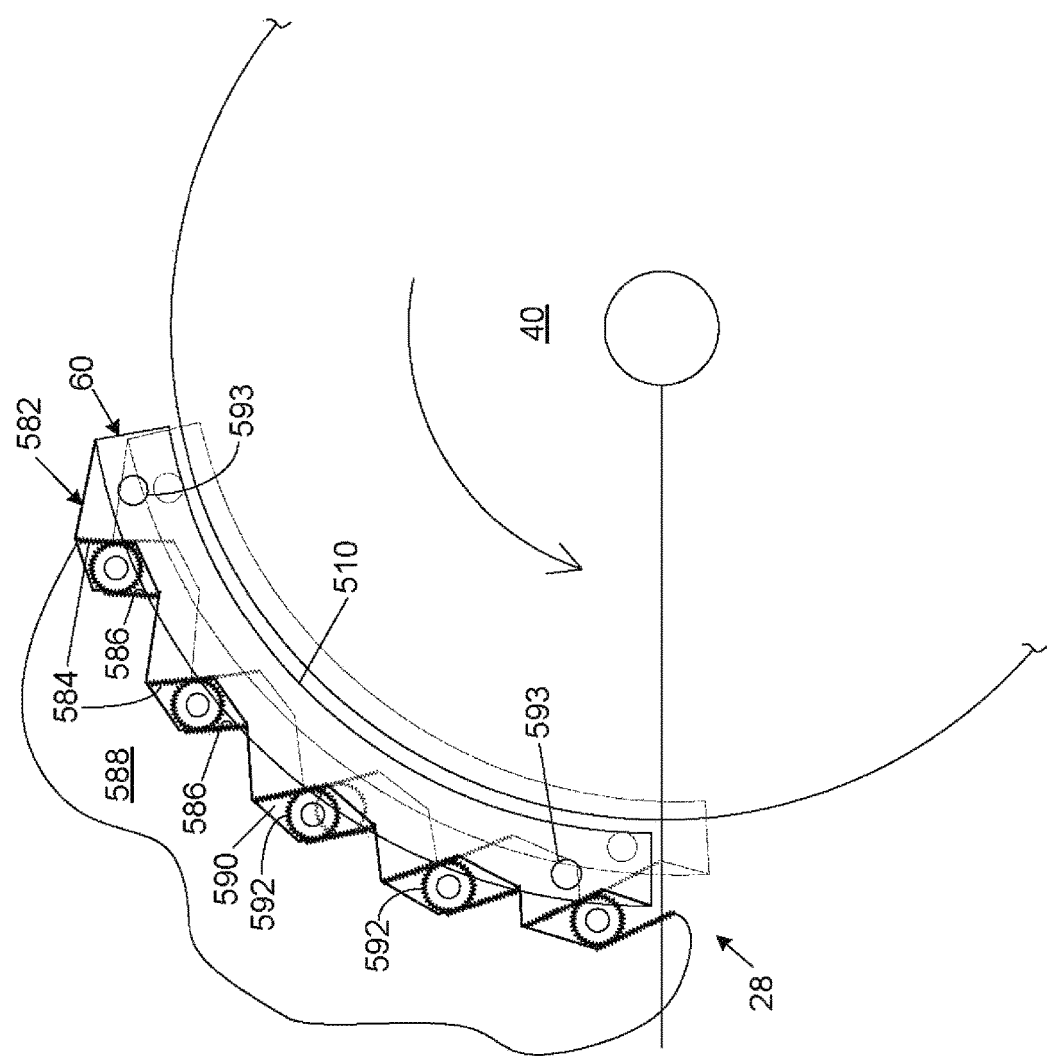
FIG. 79 is a side elevation view of a brake mechanism with a translational pawl.

Another example of a suitable pawl 60 is shown in FIG. 79. As shown, pawl 60 includes a rearward portion 582 facing generally away from contact surface 510. Portion 582 includes a plurality of race portions 584 that in cooperation with a corresponding plurality of race portions 586 on a suitable mounting structure 588 forming part of machine 12, define races 590 within which rollers 592 are housed. Toothed rollers 592 are rotatable within races 590 and direct the translational movement of pawl 60 toward blade 40 when the blade strikes pawl 60. The rollers also reduce the friction of moving the pawl under braking load relative to a sliding surface. Preferably, pawl 60 includes guide pins 593 that travel within tracks (not shown), which define the range of translational positions of pawl 60 while maintaining the rollers in contact with the races.

Figure 80:
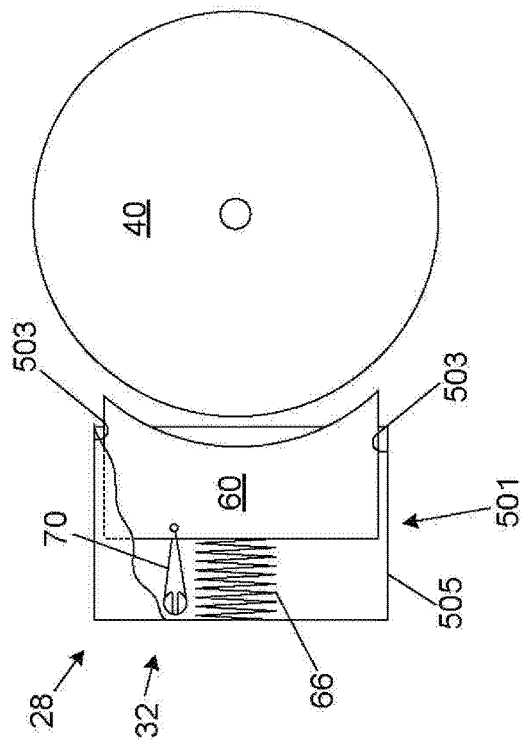
FIG. 80 is a side elevation view of another brake mechanism with a translational pawl.

In FIG. 80, another illustrative embodiment of a brake mechanism 28 that includes a pawl 60 that moves via translation into engagement with the blade or other cutting tool is shown. Pawl 60 includes a contact surface that preferably, but does not necessarily, conform to the outer diameter of blade 40. Pawl 60 is retained in its cocked, or restrained, position by restraining mechanism 32, which as shown, includes one or more fusible members 70. Preferably, brake mechanism includes guide structure 501 that defines a track 503 along which the pawl travels as it is urged toward the blade or other cutting tool by biasing mechanism 30. An example of such a guide structure is shown in FIG. 80, in which the guide structure includes a housing 505 into which the pawl is at least partially received in its cocked, or restrained, position, and from which the pawl at least partially projects upon release of restraining mechanism 32. Much like a piston moving within a cylinder, pawl 60 travels in a translational path defined by the inner dimensions of housing 505 under the urging of biasing mechanism 30.

Figure 82:
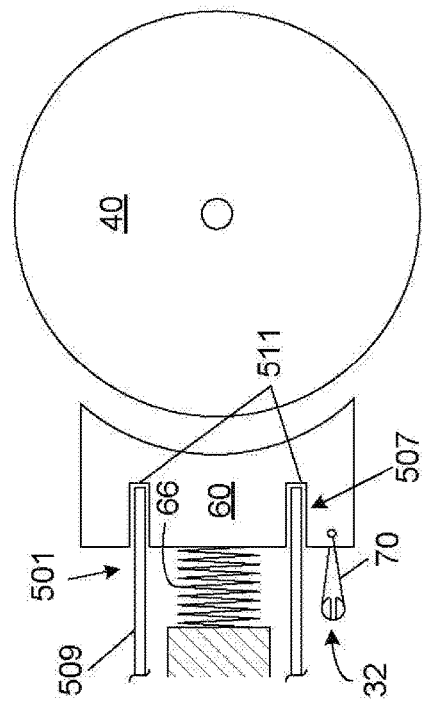
FIG. 82 is a side elevation view of another brake mechanism with a translational pawl.
Figure 81:
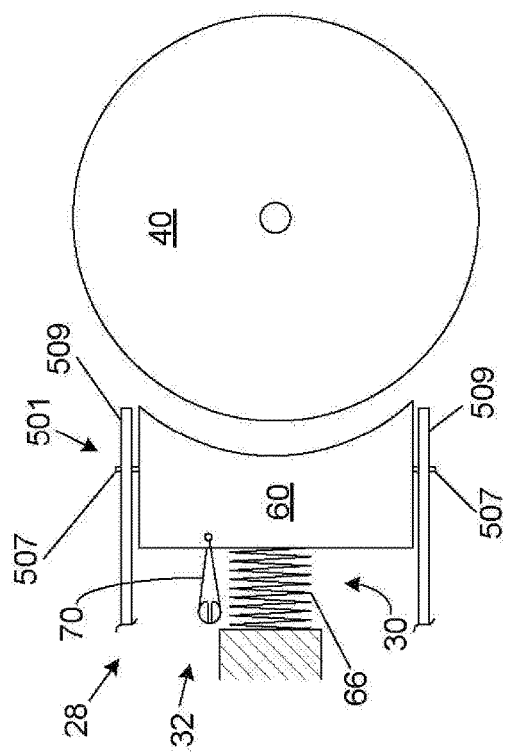
FIG. 81 is a side elevation view of another brake mechanism with a translational pawl.

Other illustrative examples of brake mechanisms 28 with translational pawls are shown in FIGS. 81 and 82. In FIG. 81, guide structure 501 includes two or more guide-engaging members 507 that project from pawl 60 to engage a corresponding number of guides 509. Guides 509 are spaced apart from the pawl and define the translational path of the pawl. In FIG. 82, pawl 60 includes internal guide-engaging members 507, such as one or more internal bores 511 extending parallel to the translational path of the pawl. A corresponding number of guides 509 extend at least partially within the bores to define the travel path of the pawl. In FIGS. 80-82, pawls 60 are urged along a translational path directly into blade 40. It should be understood that the pawls and/or the guide structure may be inclined at an angle relative to the blade, such as to counteract the angular momentum of the blade or to utilize the braking force to draw the pawl more tightly against the blade.

Figure 83:
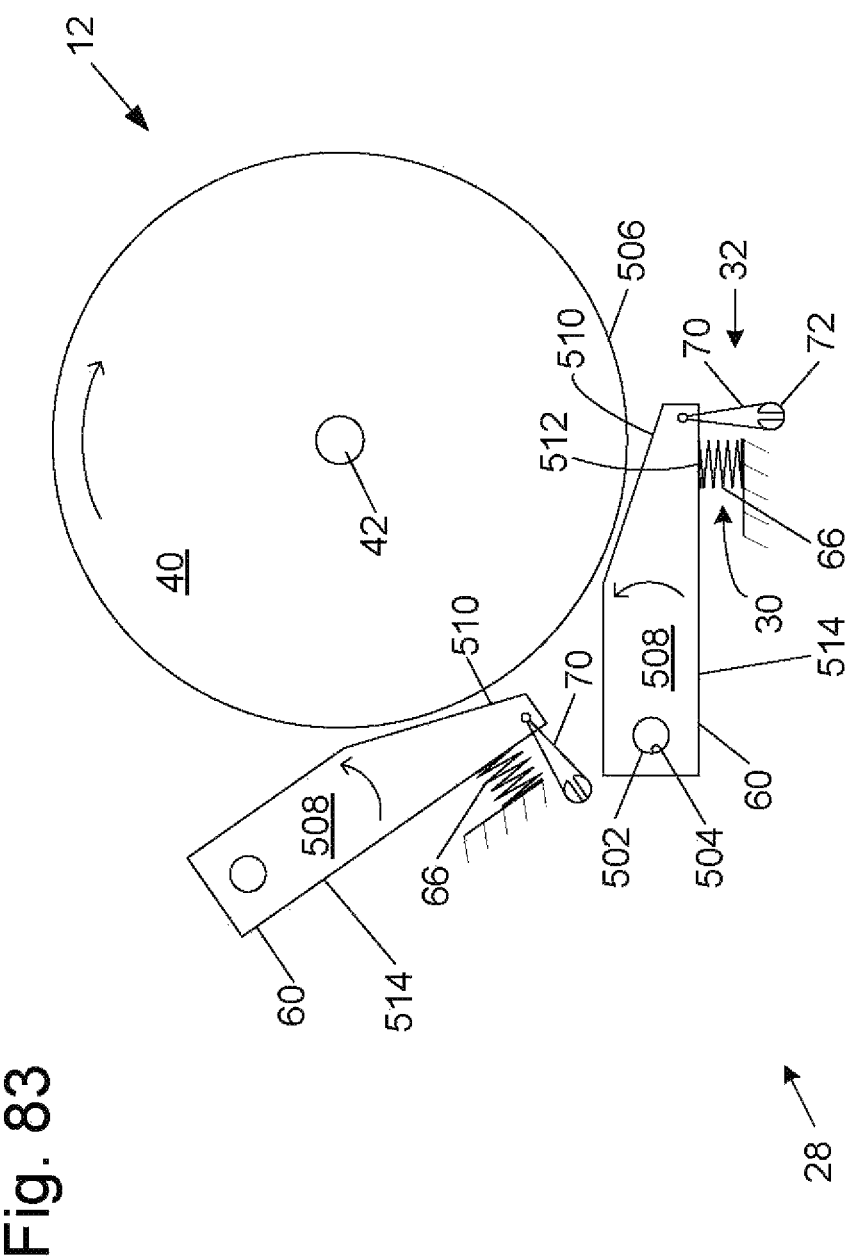
FIG. 83 is a side elevation view of a brake mechanism that includes plural pawls.

Although the exemplary embodiments are described above in the context of a single brake pawl that engages the teeth of a blade, the brake system may incorporate a brake mechanism with two or more pawls that engage two or more locations on the perimeter of the blade to decrease the stopping time and/or spread the stopping forces. An example of such a brake mechanism is shown in FIG. 83, in which brake mechanism 28 includes two spaced-apart pawls 60 adapted to engage the perimeter of blade 40. Pawls 60 are only schematically illustrated in FIG. 83 and could include any of the previously described pawl or pawls incorporating one or more of the features, elements, subelements and variations described above. The pawls may be released from their cocked, or restrained, positions by a common release mechanism, or each pawl may have its own release mechanism. When brake mechanism 28 includes plural pawls, it may be desirable to position the pawls on opposite sides of the arbor about which the blade rotates to reduce the load on the arbor when brake mechanism 28 is actuated and pawls 60 engage the blade.

When brake mechanism 28 includes plural pawls, the pawls may also be constrained or interconnected to act together. An example of such a brake mechanism is shown in FIG. 84, in which the brake mechanism includes a plurality of interconnected pawls 60. As shown, each pawl 60 includes one or more toothed regions 513 having a plurality of teeth 515. Regions 513 of adjacent pawls 60 are interconnected by toothed gears, or linkages, 517 that communicate the rotation of one pawl to the other pawls so that the pawls move as a unit. It should be understood that one or more of the pawls or gears are coupled to a suitable biasing mechanism and restraining mechanism to bias the pawls into contact with blade 40 and to selectively restrain the movement of the pawls until safety system 18 actuates the reaction subsystem. In a variation of the brake mechanism shown in FIG. 84, gears 517 may be omitted, in favor of links interconnecting the pawls.

As discussed, the pawl or pawls of brake mechanism 28 may contact any suitable portion of blade 40 or other cutting tool 14. In the illustrative embodiments shown in FIGS. 2 and 60-84, the pawls were mounted to engage the teeth or outer perimeter of the blade. An example of another suitable contact portion of the blade is the side of the blade. Specifically, brake mechanism 28 may include two or more pawls adapted to engage opposed sides of the blade. An example of such a brake mechanism is illustrated in FIG. 85. As shown, pawls 60 are pivotally mounted on either side of blade 40. Each pawl includes a blade-engaging portion 540 adjacent the blade, and a distal portion 519. The pawls are pivotally mounted on pins 521 that pass through pivot apertures 523 in the pawls intermediate the blade-engaging portion and the distal portion. Lever arms 525 are coupled to distal portions 519. Thus, when the lever arms of each pawl are pivoted upward (as shown in FIG. 85), the blade-engaging portions close together. The pawls are mounted relative to the blade so that the contact surfaces pivot toward the blade in the direction of blade travel. Once the pawls contact and grip the blade, they continue to pivot inward pulled by the downward motion (as shown in FIG. 85) of the blade. As a result, the blade is pinched more and more tightly between the contact surfaces 510 of the pawls until the pawls can close no further, at which point the blade is stopped between the pawls.

To ensure that both pawls close together on the blade, a linkage 527 is attached, at either end, to lever arms 525. Linkage 527 is coupled to a biasing mechanism, not shown, which urges the pawls into contact with the blade, through force exerted through linkage 527 and lever arms 525.

It will be appreciated that the dual-pawl system described above may be implemented with many variations. For example, the linkage may be driven upward by any of the other actuating means described above, including an explosive charge, solenoid, compressed gas, etc. As another example, one or more pawls may be positioned to contact only one side of the blade. Additionally, the linkage may be omitted, and each pawl actuated by a separate spring, explosive charge, solenoid, etc. Similarly, although a circular blade 40 was used to illustrate one type of cutting tool for which the brake system may be used, it may also be used with other shapes of blades, such as blades used in jointers, shapers and band saws.

For example, an alternative embodiment of brake mechanism 28 in the context of a band saw 594 is depicted in FIGS. 163 and 164. In this embodiment, brake mechanism 28 severs the blade upon receipt of a contact detection signal. By severing the blade, the tension fit of the blade around wheels 595 is released, allowing the blade to be stopped or moved without stopping the wheels.

As can best be seen in the detail view of FIG. 164, alternative brake mechanism 28 includes an explosive cable- or bolt-cutting device 596 positionable adjacent blade 40 to sever the blade upon receipt of a detection signal. Suitable cable cutting devices 596 are available from a variety of sources, including Cartridge Actuated Devices, Inc., of Fairfield, N.J. The size and configuration of device 596 may vary depending on such factors as the size and width of blade 40, the blade material, blade speed, etc. Typically, cutting device 596 will be positioned closely adjacent the underside of the band saw table to block the continued downward movement of the blade after it is severed. An electronics unit 597 similar to those described above is operatively coupled to device 596 to transmit an activation signal to the device once contact between the user's body and the blade is detected by the electronics unit. Device 596 then severs the blade virtually instantaneously, thereby releasing the tension fit of the blade around wheels 595. Once severed, the blade substantially stops moving even though the wheels continue to turn. As described above, the safety stop may optionally be configured to shut off the motor to band saw 594 as well as to sever the blade. Additionally, one or more pawls (not show) may be configured to engage and stop the blade at the same time device 596 severs the blade, thereby ensuring the blade does not continue to move after being severed.

The brake systems, components and methods may be described as set forth in the following numbered paragraphs. These paragraphs are intended as illustrative, and are not intended to limit the disclosure or claims in any way. Changes and modifications may be made to the following descriptions without departing from the scope of the disclosure.

5.1 A woodworking machine comprising:
   a cutter adapted to cut a workpiece and including at least two cutting surfaces;

a brake system adapted to stop the cutter, where the brake system includes a thermoplastic pawl adapted to engage the cutting surfaces on the cutter.

5.1.1 The brake system of paragraph 5.1, wherein the pawl is self locking against the cutter upon contact with the cutting surfaces.

5.1.2 The brake system of paragraph 5.1, wherein the pawl is pivotally mounted to the machine.

5.2 A brake system adapted to stop a circular saw blade with plural teeth disposed around a perimeter, comprising:
a first brake pawl adapted to contact the teeth of the blade at a first location on its perimeter;
a second brake pawl adapted to contact the teeth of the blade at a second location on its perimeter different from the first location; and
an actuation mechanism adapted to urge both pawls into the teeth of the blade simultaneously.

5.3 A brake system adapted to stop a circular saw blade, comprising:
a brake pawl with a blade contacting region shaped to simultaneously engage a region of the circular saw blade including at least 30 degrees of the perimeter of the blade; and
an actuation system adapted to selectively drive the brake pawl into the blade.

5.4 A woodworking machine comprising:
a cutter adapted to cut a workpiece and including at least two cutting surfaces;
a brake system adapted to stop the cutter, where the brake system includes a pawl adapted to engage the cutting surfaces on the cutter and constructed of two different materials having different physical properties.

5.4.1 The machine of paragraph 5.4, wherein at least one of the materials is a thermoplastic.

5.4.2 The machine of paragraph 5.4, wherein at least one of the materials is a metal.

5.5 A woodworking machine comprising:
a cutter adapted to cut a workpiece and including at least two cutting surfaces;
a brake system adapted to stop the cutter, where the brake system includes a metal pawl adapted to engage the cutting surfaces on the cutter.

5.5.1 The machine of paragraph 5.5, wherein the pawl is formed primarily of aluminum.

Section 6: Firing Subsystem

In many embodiments of safety system 18, a fusible member, such as member 70 shown in FIG. 2, will be used to restrain some element or action, such as to hold a brake or pawl away from a blade, as explained above. Such a fusible member may take different forms, but typically is a wire that will melt when a given amount of electrical current is passed through the wire, also as explained above. Once the wire melts, the brake or pawl is released to stop the blade.

When a pawl is used as a brake, the fusible member may be attached between the pawl and an anchor or mount, such as contact mount 72 shown in FIG. 2, to prevent the pawl from moving into the blade. In that embodiment, the pawl is biased by a spring toward the blade, so the pawl constantly pulls against the fusible member. Therefore, the fusible member should have a high tensile strength to bear the constant pull of the pawl and to prevent the fusible member from accidentally breaking. Additionally, the fusible member should have a high tensile strength so that the strength is maximized relative to the heat that is required to melt the member. Fusible members with high resistance are also preferred because of the more rapid heat build up for a given current. It will be appreciated that the size of the fusible member will depend, at least partially on the force required to restrain the spring. In general, greater spring forces are desirable to increase the speed and force with which the pawl contacts the blade. Where more pressure is required, a larger diameter fusible member may be needed, thereby requiring a larger amount of current to melt the fusible member. A greater amount of current, in turn, may require a firing system with more expensive electronic components. Thus, a safety system using a fusible member to release a brake or pawl must consider factors such as the amount of force applied to the fusible member and the size of the fusible member.

In the arrangement of a pawl and a fusible member shown in FIG. 2 and discussed above, spring 66 biases pawl 60 toward blade 40 with a specified force, and fusible member 70 is wire that has a tensile strength sufficient hold the pawl against the force of the spring. For example, the fusible member may be a 0.010-inch nichrome wire or a steel strand, and the spring may have a spring force of between approximately 5 and 25 pounds.

In FIG. 2, the fusible member is generally less than about 1 to 3 inches in length, and is wrapped around contact mount 72. Contact mount 72 is often generally circular in cross-section so that it does not present any edges that would concentrate stress to a specific section of the fusible member. Alternatively, a contact mount may include an edge to focus stress at a desired section of the fusible member. The contact mount may take many forms. It may be a stud or projection around which a fusible member is wrapped, it may be a screw with a radial hole through which the fusible member is threaded so that the screw can be turned to wrap the fusible member around the screw, it may be clamps, or it may be some other structure.

In FIG. 2, mount 72 includes a break region or gap of about 0.010 to 0.5-inch (or less) between halves of the mount. Current flows from one half of the mount, through the fusible member, to the other half of the mount and then to ground. The short break region is beneficial to focus the power to a small region to help melt the fusible member. The two halves of the mount may be thought of as two closely spaced electrodes, where the electrodes also serve as mounts for the fusible member. When electrodes also act as mounts, they must be strong enough to support the load of the fusible member.

Mounts to anchor the fusible member, alternatively, can be separate from the electrodes, and the electrodes may simply contact the fusible member. For example, in FIG. 2, contact mount 72 may be an anchor, and electrodes may be positioned against fusible member 70 between mount 72 and pawl 60.

It will be appreciated that the fusible member can be arranged in many alternative ways. As one example, one loop of wire can be attached to a contact stud and the opposite loop attached to a grounded stud. If the middle of the wire is placed over the end of the spring adjacent the pawl, the spring will be released when the wire is melted. In this arrangement, the current to melt the fusible member travels only from the contact stud, through the fusible member and into the grounded stud.

Figure 86:
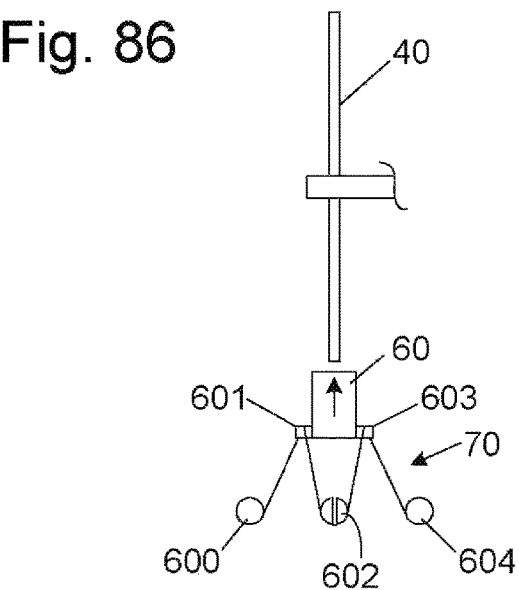
FIG. 86 shows a possible configuration of a fusible member.

In other embodiments, a wire with a relatively low tensile strength may be used to hold a pawl against a large spring force by looping the wire so that different portions of the wire work together to hold the pawl. For example, a wire may be looped in the configuration of the letter "M" or "W", as shown in FIG. 86. In this arrangement, fusible member 70 is fastened at one end to anchor 600. From there the fusible member wraps around a first post 601 on one side of pawl

60, then around mount 602, then around a second post 603 on the opposite side of the pawl, after which the fusible member is fastened to second anchor 604. In this manner, the sections of the fusible member between anchor 600 and post 601, between post 601 and mount 602, between mount 602 and post 603, and between post 603 and anchor 604 act like four separate strands that together hold the pawl away from the blade. Thus, a fusible member with tensile load strength of 30 pounds may hold a pawl biased toward the blade with a force of up to 120 pounds. In FIG. 86, mount 602 is configured to pass a surge of electrical current through a portion of the fusible member to melt the member. The fusible member then breaks apart at mount 602 and releases the pawl. This embodiment allows for the use of a fusible member with a relatively small diameter that may be melted with less current.

In some embodiments a fusible member will be used to hold a two-stage linkage, trap or compound release. The linkage or compound release, in turn, would restrain some action or hold some element such as a pawl. By holding the linkage or compound release, the fusible member effectively restrains an action or holds an element. Using a linkage or a compound release provides a mechanical advantage that allows the system to use a fusible member with a smaller diameter and lesser tensile strength to hold forces up to hundreds of pounds or more. This may allow use of a smaller fusible wire that can be melted more quickly and/or with a smaller current surge. Various linkages and compound releases are described in more detail in Section 4 above.

Figure 87:
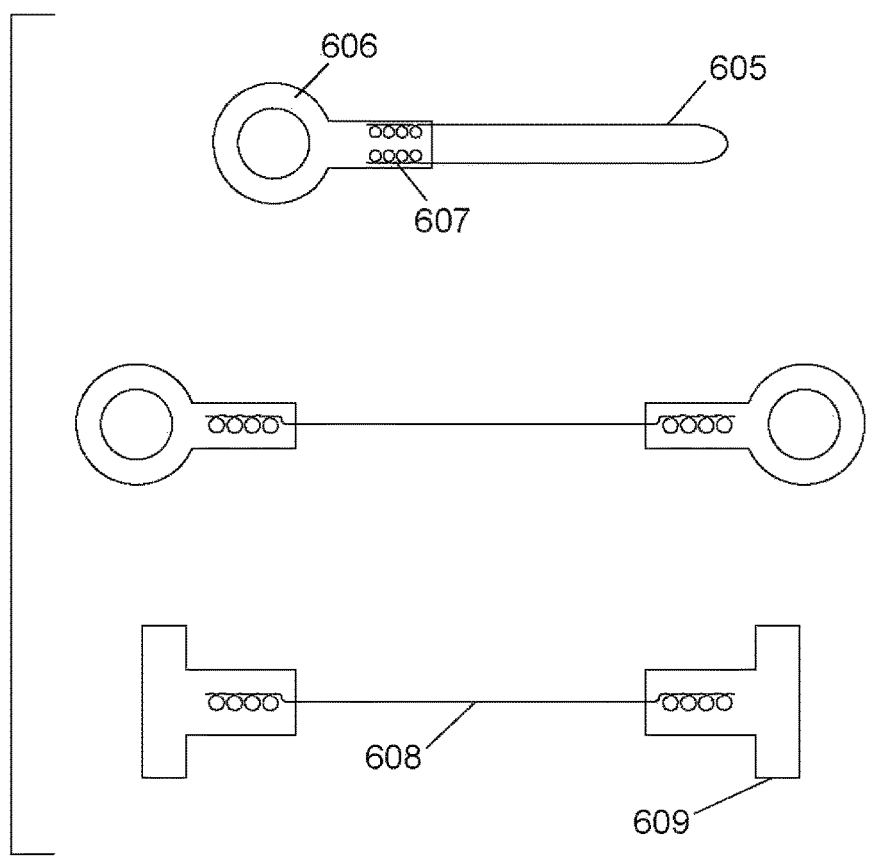
FIG. 87 shows various embodiments of fusible members.

The fusible member also may be formed from a wire overmolded with end caps or crimp blocks to establish a given length. Overmolding the ends of a wire with caps or crimp blocks provides an effective way to grip and hold the wire. FIG. 87 shows three such fusible members. First, a wire 605 is doubled back, and both ends of the wire are secured in loop 606. Loop 606 is a molded plastic element, and wire 605 is crimped or kinked at its ends 607 to keep the wire from breaking free of the loop. Loop 606 would typically be molded or pressed over the ends of the wire. Wire 605 may extend around electrodes, and loop 606 may extend over a pin on a pawl or a pin in a compound release.

The second fusible member shown in FIG. 87 is similar to the one just described, except that it has two loops, one at each end of the wire. As mentioned, the ends of the wire are crimped or kinked to secure the wire to the loops and to prevent the wire from being pulled away from loops.

Another wire 608 is also shown in FIG. 87, having caps 609 molded over the ends of the wire. The caps may be used to secure the wire in some embodiments.

Fusible members like those shown in FIG. 87 would be advantageous in a system employing cartridge 80 because the cartridge could simply be reloaded with a new fusible member after firing, and the fusible member would fit in the cartridge because it is of a given length and construction.

Of course, it will be understood by one of skill in the art that fusible members may be configured in numerous ways to hold a pawl or brake, and that the specific embodiments described simply illustrate possible ways. The fusible members themselves also may take different forms, such as a wire or a foil sheet. In some embodiments, it may be desirable to form the fusible member from a larger wire, sheet or strip with a reduced waist section of small size/width to achieve a higher current density at in the waist section for more focused heating.

As explained above, the fusible member is connected to a firing system 76 that produces a sudden current surge to melt the fusible member in response to an output signal from the contact detection system. For the exemplary fusible member described above in connection with FIG. 2, approximately 20-100 Amps are required to ensure complete and rapid melting. As will be appreciated by those of skill in the art, there are many circuits suitable for supplying this current surge.

Figure 88:
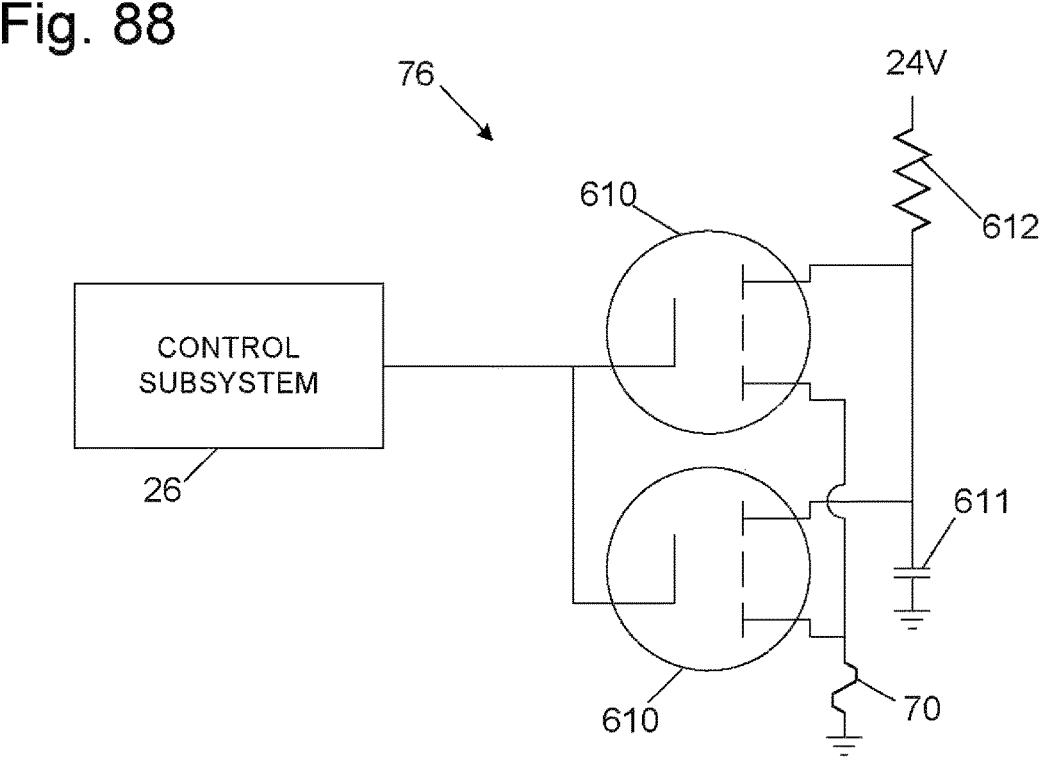
FIG. 88 shows an embodiment of a firing subsystem used with a machine having a fast-acting safety system.

One embodiment of firing system 76 is illustrated in FIG. 88. That exemplary embodiment includes one or more charge storage devices that are discharged through the fusible member in response to an output signal from the control subsystem. (The output signal from the control subsystem is dependant on detection of contact between the user and a blade, as explained above.) The use of charge storage devices obviates the need for a large current supply to melt the fusible member. It will be appreciated, however, that a current supply may be used instead of charge storage devices. Alternatively, other devices may be used to supply the necessary current, including a silicon-controlled rectifier or triac connected to a power supply line.

The firing system shown in FIG. 88 includes a pair of relatively high-current transistors 610 coupled to pass the current stored in the storage devices to fusible member 70. Transistors 610 are switched on by the output signal from control subsystem 26. As illustrated in FIG. 88, the output signal from control subsystem 26 is connected to the gates of transistors 610. Any suitable transistors may be used, such as IRFZ40 MOSFET transistors, which are well known in the art. The transistors are connected in parallel between charge storage devices 611 and fusible member 70. In the exemplary embodiment, charge storage devices 611 are in the form of a 75,000 µF capacitor bank. A 100-ohm resistor 612 connected to a 24-volt supply voltage establishes and maintains the charge on the capacitor bank. When the output of control subsystem 26 goes high, transistors 610 allow the charge stored in the capacitor bank to pass through the fusible member. The sudden release of the charge stored in the capacitor bank heats the fusible member to its melting point in approximately 1 to 5 ms. Alternatively, one or more of the transistors may be replaced by other switching devices such as SCRs. One advantage of using stored charge to fuse the fusible member is that the firing system does not rely on the capacity of line power or the phase of the line voltage.

Figure 89:
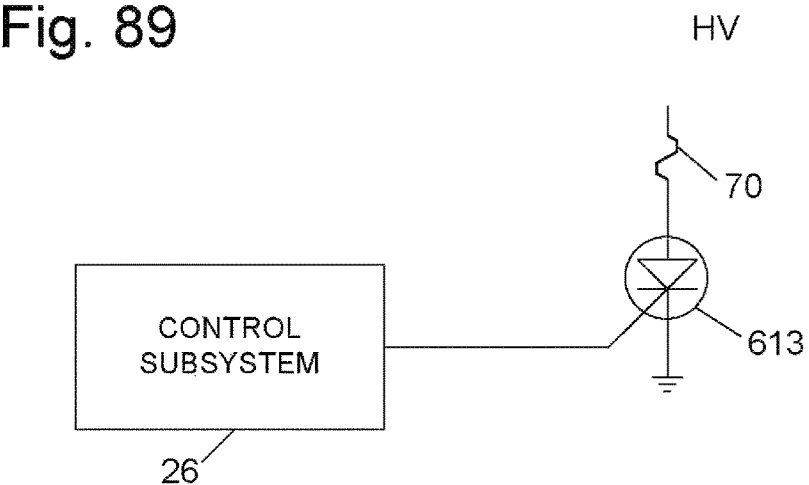
FIG. 89 shows another embodiment of a firing subsystem.

FIG. 89 shows an alternative embodiment of firing system 76. The alternative firing circuit includes fusible member 70 connected between a high voltage supply HV and an SCR 613, such as an NTE 5552 SCR. The gate terminal of the SCR is connected to control subsystem 26. Control subsystem 26 turns on SCR 613 by supplying approximately 40 mA of current, thereby allowing the high voltage supply HV to discharge to ground through fusible member 70. Once the SCR is switched on, it will continue to conduct as long as the current through fusible member 70 remains above the holding current of approximately 40 mA, even if the current to the gate terminal is removed. Thus, the SCR will conduct current through the fusible member until the fusible member is melted or the high voltage source is removed. The fact that the SCR stays on once triggered allows it to respond to even a short pulse from control system 26. It should be noted that a high voltage (HV) capacitor might supply the high voltage pulse. Use of a HV capacitor leads to a much higher current surge, and therefore a faster melting of the fusible member than is the case with a low voltage system. It will be appreciated that the size of the HV capacitor may be varied as required to supply the necessary current to melt fusible member 70.

Figure 90:
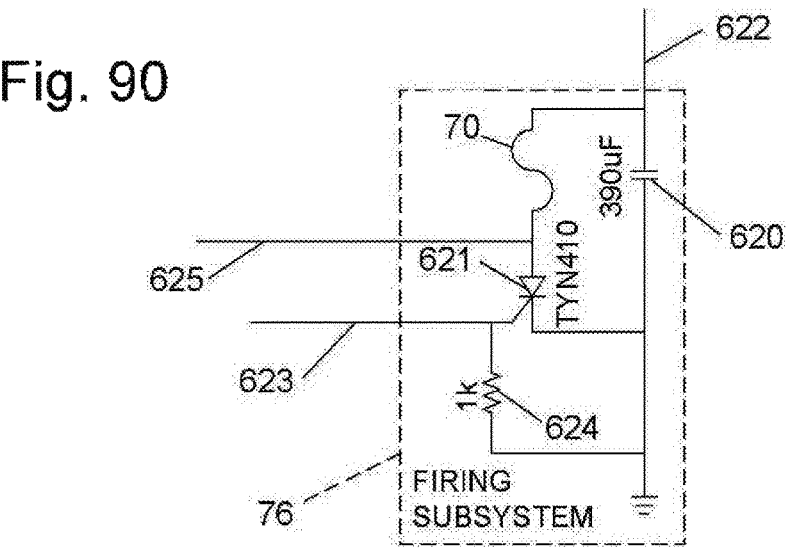
FIG. 90 shows still another embodiment of a firing subsystem.

FIG. 90 shows yet another embodiment of firing system 76. This embodiment includes a fusible member 70 connected between a 390 µF capacitor, identified by reference number 620, and a TYN410 SCR, identified by reference number 621. In embodiments like the one shown in FIG. 90, the capacitor 620 may range in value from approximately 100 µF to 5000 µF. Capacitor 620 is connected between a high voltage charging line 622 (from a buck-boost charger, for example), which charges the capacitor to approximately 180-200 volts, and ground. The gate terminal of the SCR is connected to the control subsystem at 623. A signal from the control subsystem at 623 turns on SCR 621, allowing the capacitor to discharge to ground through fusible member 70. In this embodiment, the capacitor is believed to provide a pulse of approximately 1000 to 1500 amps. As explained above, once the SCR is switched on, it will continue to conduct as long as the current through fusible member 70 remains above the holding current, so the SCR will conduct current through the fusible member until the fusible member is melted or the high voltage source is removed. Firing system 76 also includes a 1 k resistor 624 connected between the gate of the SCR and ground to hold the signal at 623 to ground until a signal from the control subsystem draws it up so that the firing system is not triggered by noise. A sense line 625 is connected between SCR 621 and fusible member 70 so that the control system can monitor the charge on capacitor 620 to insure that the capacitor is charged and functioning. Connecting sense line 625 downstream from fusible member 70 relative to capacitor 620 allows the control system to check the capacitor through the fusible member, which means that the control system also checks that fusible member 70 is intact and functioning. It should be noted that the sense line could also be used to charge the capacitor.

It will be appreciated by those of skill in the electrical arts that the exemplary embodiments of the firing system discussed above are just several of many configurations that may be used. Thus, it will be understood that any suitable embodiment or configuration could be used. The control systems, power supplies, sense lines and other items related to or used with firing systems are discussed in more detail in Sections 1 and 2 above, and Section 9 below.

Figure 91:
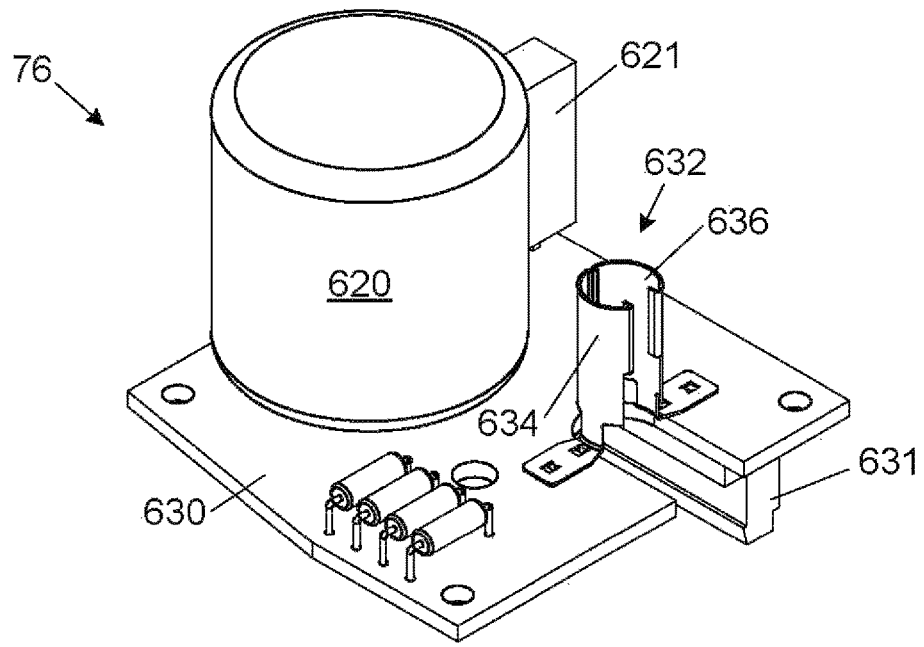
FIG. 91 shows a firing subsystem mounted on a printed circuit board.

FIG. 91 shows a firing system 76 assembled on a printed circuit board 630. The firing system is similar to the circuit shown in FIG. 90, and includes capacitor 620 and SCR 621. A socket 631 is associated with the printed circuit board so that the circuit can be connected to the control system, sensor line and power supply. A contact mount 632, made from spaced apart electrodes 634 and 636, is mounted on the printed circuit board. A fusible member extends around the contact mount in use.

Figure 92:
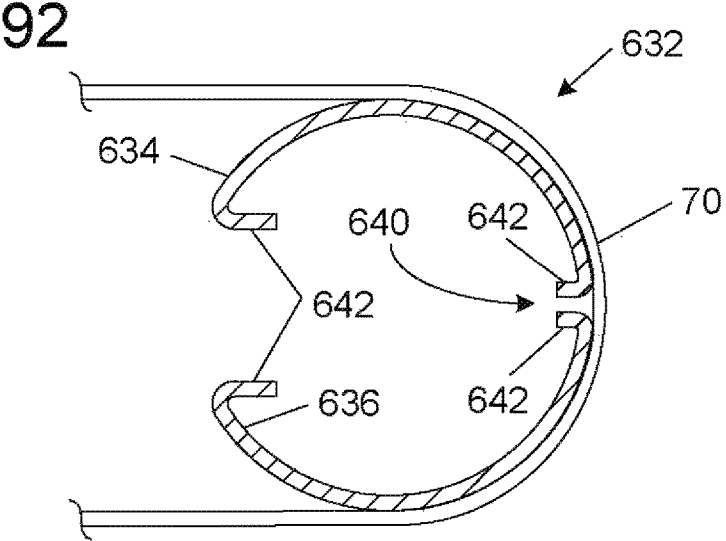
FIG. 92 shows a sectional view of electrodes used in a firing subsystem.

A top, sectional view of contact mount 632 and electrodes 634 and 636 is shown in FIG. 92, and fusible member 70 is wrapped over the electrodes. The electrodes are constructed with a small gap 640, as described above, and it is at that gap that the fusible member breaks or burns when current passes from one electrode to the other through the fusible member. Contact mount 632 is configured to fit over a supporting plug, and flanges 642 help hold the mount on the plug.

Figure 93:
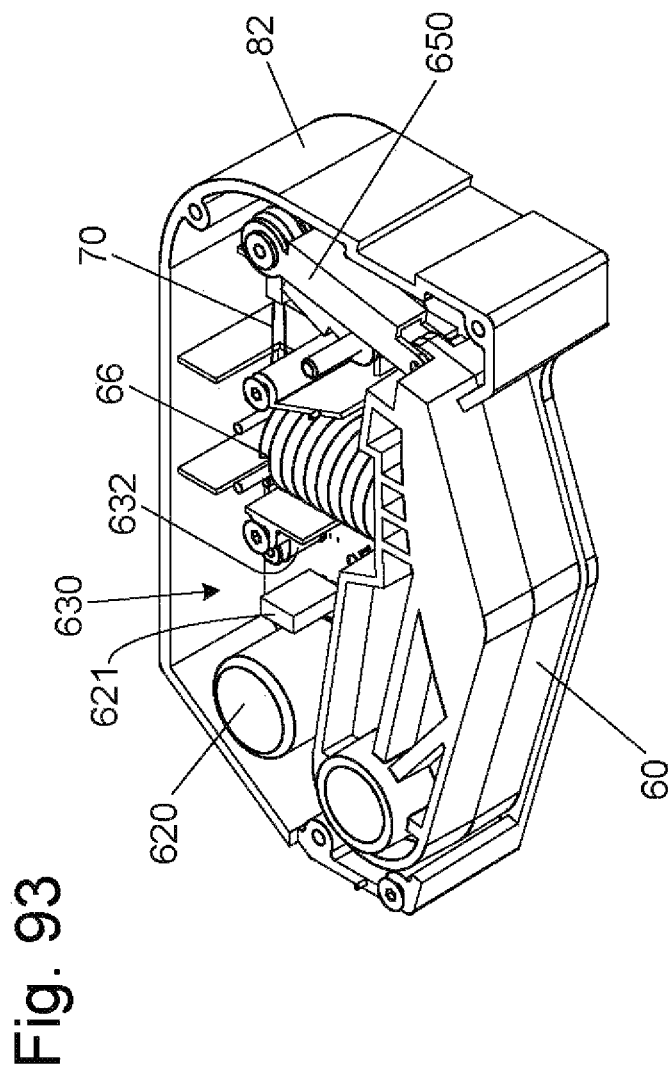
FIG. 93 shows a firing subsystem in a cartridge used with a machine having a fast-acting safety system.
Figure 95:
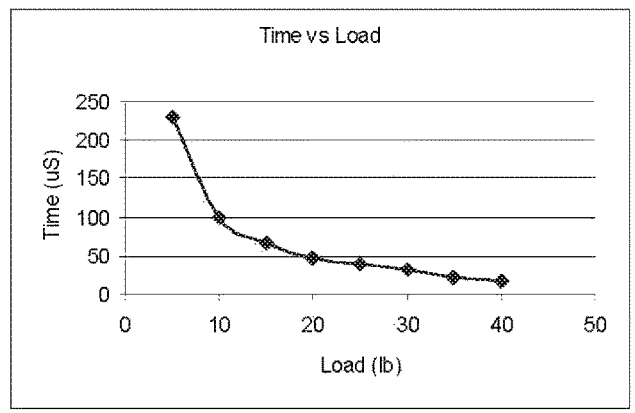
FIG. 95 shows a graph of data concerning the time to burn a wire under various conditions.

FIG. 93 shows printed circuit board 630, including capacitor 620 and SCR 621, mounted in cartridge housing 82. The cartridge houses pawl 60, spring 66, and fusible member 70. Fusible member 70 restrains pawl 60 from moving outwardly by restraining the motion of compound linkage 650. Fusible member 70 extends around contact mount 632. Contact mount 632 fits over a supporting plug that is part of the cartridge housing. Fusible member 70 burns when firing system 76 on printed circuit board 630 sends a surge of current through the fusible member. Compound linkage 650 and pawl 60 are then free to move, and spring 66 quickly forces pawl 60 outwardly. The cartridge can be configured to fit into various types of power equipment, such as table saws, jointers, etc. Additionally, the cartridge can be "re-loaded," or replenished with a new pawl and fusible member, and reused after the firing system has fired.

Figure 94:
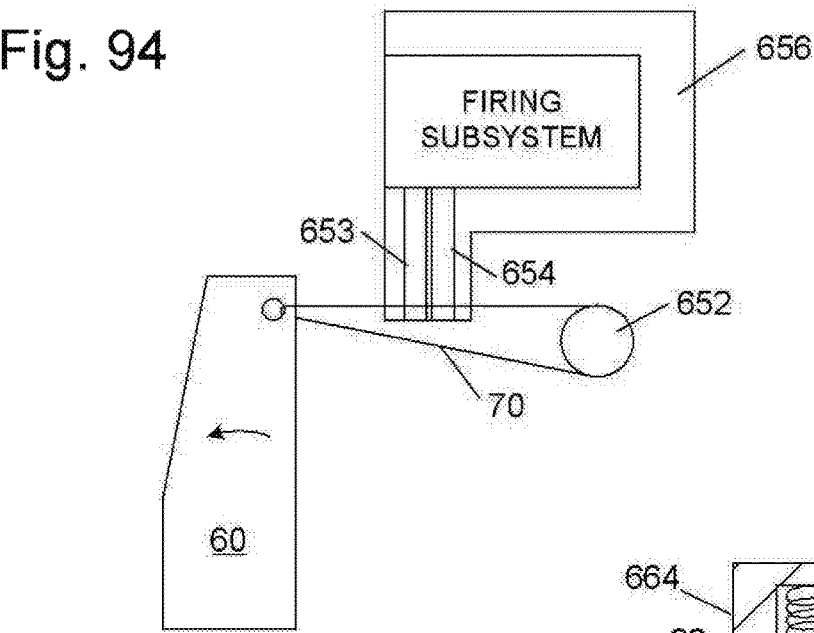
FIG. 94 shows two electrodes contacting a fusible member.

FIG. 94 shows an embodiment in which a fusible member 70 is mounted between an anchor 652 and a pawl 60. Two electrodes 653 and 654 contact the fusible member between the anchor and pawl, but do not support the fusible member. Electrodes 653 and 654 may take the form of conductive traces on a printed circuit board 656. The conductive traces are formed on the surface of the printed circuit board and extend slightly above that surface, so that fusible member 70 can contact them by extending across them. The printed circuit board can be positioned so that electrodes 653 and 654 apply some pressure against fusible member 70 to insure contact with the fusible member. Electrodes 653 and 654 are connected to a firing subsystem, as described. Of course, the configuration and orientation of electrodes 653 and 654 can vary.

FIGS. 95 through 98 show data concerning the time it takes for a firing subsystem to burn a wire given varying factors, such as the firing system, the wire size, the load on the fusible member, etc. FIG. 94 shows the approximate time it takes to burn a wire as the load on the wire varies. The wire tested was stainless steel, ASTM 302/304, spring tempered, with a diameter of 0.010 inches and was wrapped over brass electrodes with a 0.044 inch gap. The firing system used a 390 µF capacitor charged to 163 volts to burn the wire. The wire burned in approximately the following times for the specified loads: 231 µs with a 5 pound load, 98 µs with a 10 pound load, 68 µs with a 15 pound load, 48 µs with a 20 pound load, 39 µs with a 25 pound load, 33 µs with a 30 pound load, 22 µs with a 35 pound load, and 18 µs with a 40 pound load. This data shows that the time to burn a fusible member decreases as the load on the member increases.

Figure 96:
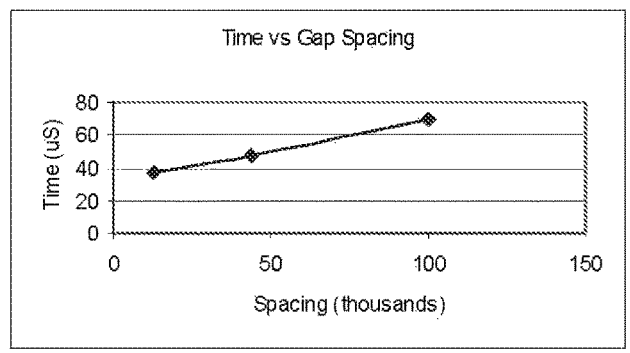
FIG. 96 also shows a graph of data concerning the time to burn a wire under various conditions.

FIG. 96 shows the approximate time it takes to burn a wire as the spacing between electrodes varies. The wire tested was stainless steel, ASTM 302/304, spring tempered, with a diameter of 0.010-inches and was wrapped over brass electrodes. The firing system used a 390 µF capacitor charged to 163 volts to burn the wire. The wire had a load of 20 pounds. The wire burned in approximately the following times for the specified gaps: 70 µs with a 0.1 inch gap, 47 µs with a 0.044 inch gap, and 37 µs with a 0.013 inch gap. This data shows that the time to burn a fusible member decreases as the gap between electrodes decreases.

Figure 97:
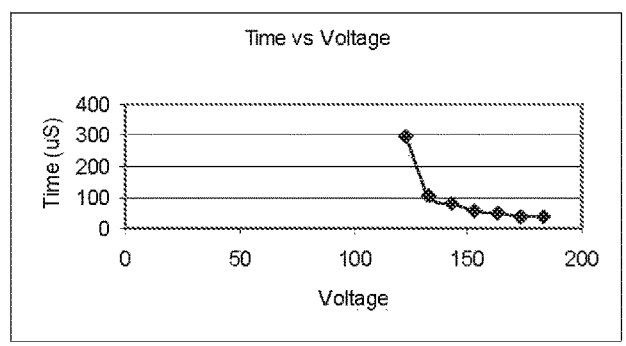
FIG. 97 also shows a graph of data concerning the time to burn a wire under various conditions.

FIG. 97 shows the approximate time it takes to burn a wire as the voltage on the capacitor in the firing system varies. The wire tested was stainless steel, ASTM 302/304, spring tempered, with a diameter of 0.010 inches and was wrapped over brass electrodes with a 0.044 inch gap. The firing system used a 390 µF capacitor. The wire burned in approximately the following times for the specified voltages: 296 µs with 123 volts, 103 µs with 133 volts, 81 µs with 143 volts, 57 µs with 153 volts, 47 µs with 163 volts, 40 µs with 173 volts, and 39 µs with 183 volts. The wire did not burn with voltages of only 103 or 113 volts. This data shows that the time to burn a fusible member decreases as the voltage increases.

Figure 98:
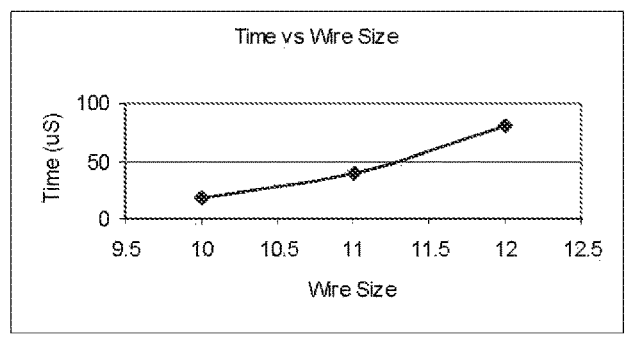
FIG. 98 shows a graph of data concerning the time to burn a wire under various conditions.

FIG. 98 shows the approximate time it takes to burn wires of varying sizes. The wires tested were all stainless steel, ASTM 302/304, spring tempered, wires. The wires were wrapped over brass electrodes with a 0.044 inch gap. The firing system used a 390 µF capacitor with 163 volts. The wire had a load of 40 pounds. The wire burned in approximately the following times for the specified diameter sizes: 18 μs with a 0.010 inch diameter, 39 μs with a 0.011 inch diameter, and 81 μs with a 0.012 inch diameter. A wire with a 0.013 inch diameter did not burn. This data shows that the time to burn a wire decreases as the diameter of the wire decreases.

This data shows that a system as described above can apply a load of 25 to 200 pounds to move a pawl toward a blade in less than 200 μs, and preferably in less than 50 μs. Stainless steel is a good material for fusible members because it has high resistance, high strength and good corrosion resistance.

Figure 99:
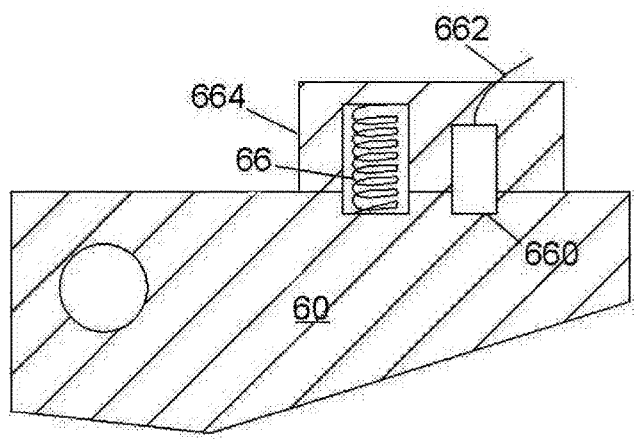
FIG. 99 shows an explosive charge that can be triggered by a firing subsystem.

Firing system 76 may also be used to trigger some action other than burning a fusible member. For example, firing system 76 can fire a small explosive charge to move a pawl. FIG. 99 shows a relatively small, self-contained explosive charge 660 in the form of a squib or detonator that can be used to drive pawl 60 against a blade. An example of a suitable explosive charge is an M-100 detonator available, for example, from Stresau Laboratory, Inc., of Spooner, Wis. The self-contained charge or squib focuses the force of the explosion along the direction of movement of the pawl. A trigger line 662 extends from the charge, at it may be connected to firing system 76 to trigger detonation.

Explosive charge 660 can be used to move pawl 60 by inserting the charge between the pawl and a stationary block 664 adjacent the charge. When the charge detonates, the pawl is pushed away from the block. A compression spring 66 is placed between the block and pawl to ensure the pawl does not bounce back from the blade when the charge is detonated. Prior to detonation, the pawl is held away from the blade by the friction-fit of the charge in both the block and pawl. However, the force created upon detonation of the charge is more than sufficient to overcome the friction fit. Alternatively, the pawl may be held away from the blade by other mechanisms such as a frangible member, gravity, a spring between the pawl and block, etc.

Firing system 76 may also trigger a DC solenoid, which can be over-driven with a current surge to create a rapid displacement, a pressurized air or gas cylinder to supply the pressure in place of the spring or charge, or an electromagnet to either repel the pawl against the blade or to release a spring-loaded pawl toward the blade.

The firing and release systems and methods may be described as set forth in the following numbered paragraphs. These paragraphs are intended as illustrative, and are not intended to limit the disclosure or claims in any way. Changes and modifications may be made to the following descriptions without departing from the scope of the disclosure.

6.1 A mechanical release comprising:
an electrode system including first and second electrodes electrically connected to a current source;
a fusible member electrically interconnecting the electrodes;
a electrical gate system interposed between at least one of the electrodes and the current source to selectively control flow of current from the current source to the at least one electrode, where the fusible member carries a tensile load of at least 10,000 psi between the electrodes.

6.1.1 The mechanical release of paragraph 6.1, wherein the fusible member has a tensile strength of at least 100,000 psi.

6.1.2 The mechanical release of paragraph 6.1, wherein the fusible member is formed from a material chosen from the group consisting of stainless steel and nichrome.

6.1.3 The mechanical release of paragraph 6.1, wherein the fusible member is spring tempered.

6.2 A woodworking machine, comprising:
a cutter;
a brake adapted to stop the cutter, where the brake has an idle position and a braking position;
a biasing system adapted to urge the brake from the idle position to the braking position; and
a release mechanism adapted to selectively hold the brake in the idle position against the bias of the biasing mechanism.

6.2.1 The machine of paragraph 6.2, wherein the release mechanism is a single use device.

6.2.1.1 The machine of paragraph 6.2.1, wherein the release mechanism includes a fusible member.

6.2.1.1.1 The machine of paragraph 6.2.1.1, wherein the release mechanism includes first and second electrodes connected to a current source and the fusible member electrically interconnects the electrodes.

6.2.2 The machine of paragraph 6.2, wherein the release mechanism includes an electromagnet.

6.3 A woodworking machine, comprising:
a cutter;
a brake adapted to stop the cutter, where the brake has an idle position and a braking position; and
an actuation system adapted to selectively move the brake from the idle position to the braking position, where at least a portion of the actuation system must be replaced after moving the brake from the idle position to the braking position.

6.3.1 The machine of paragraph 6.3, wherein the actuation system includes an explosive device.

6.3.2 The machine of paragraph 6.3, wherein the actuation system includes a fusible member that is melted to allow the brake to move from the idle position to the braking position.

6.3.3 The machine of paragraph 6.3, wherein the brake and at least part of the actuation system are housing in a replaceable cartridge.

Section 7: Replaceable Brake Cartridge

As described above and depicted in FIG. 2, a portion of safety system 18 may be contained in a replaceable cartridge 80. In FIGS. 100-109, various embodiments of cartridges 80 are shown having various elements, subelements and possible variations. It should be understood that cartridges may include any one or more of these elements, subelements and variations, regardless of whether those elements, subelements are variations are shown in the same or different figures or descriptions.

Examples of suitable brake and biasing mechanism 28 and 30, including suitable pawls 60 that may be used with the cartridges described herein are described above in Sections 4 and 5.

Cartridge 80 should include or be in communication with the operative portions of release mechanism 34 required to cause restraining mechanism 32 to release pawl 60 to engage the blade or other cutting tool of the machine. For example, in FIG. 2, it can be seen the mounts 72 are in electrical communication with firing subsystem 76. Upon activation of detection subsystem 22, such as upon detection of a dangerous or triggering condition, firing subsystem 76 actuates release mechanism 32, such as by melting fusible member 70 with a surge of current stored by subsystem 76. Examples of suitable restraining mechanisms 32 and firing subsystems 76 for use in cartridges 80 are described above in Section 6.

The communication between the firing subsystem and mounts 72 may be by any suitable electrical linkage. Preferably, the electrical connection between mounts 72 and subsystem 76 is automatically established when cartridge 80 is installed within machine 10. For example, housing 82 may include contacts that engage corresponding contacts associated with the firing subsystem when the cartridge is installed in its mounting position with the machine. Alternatively, a plug and socket assembly may be used to electrically interconnect the mounts 72 and firing subsystem 76.

Cartridge 80 is removably installed in machine 10 so that brake mechanism 28, and more particularly pawl 60, is positioned near the blade or other cutting tool of the machine. Cartridge 80 may include a brake positioning system or other suitable mechanism for selectively adjusting the position of the pawl and/or cartridge relative to blade 40. For example, the position of the cartridge relative to the blade or other cutting tool may be adjustable such as by pivoting or sliding the cartridge relative to one or more of the mounting bolts. In which case, pawl-to-blade spacing may be determined indirectly by measuring the blade-to-cartridge spacing if desired. Alternatively, the cartridge may be stationary and the pawl may be adjustable within the cartridge. As a further alternative, both the cartridge and pawl are adjustable. Similarly, the position of the mounting bracket may be adjustable relative to the blade. Examples of suitable brake positioning systems are described below in Section 8.

As shown in FIG. 100, machine 10 includes a support structure 702 adapted to receive cartridge 80 and operatively position the cartridge for use in safety system 18. Support structure 702 may extend from or be mounted on any suitable structure forming part of machine 10. When blade 40 is adjustable, it may be preferable for cartridge 80 and/or support structure 702 to move with the blade so that the desired positioning of pawl 60 to blade 40 is maintained. Alternatively the cartridge may include a pawl 60 sized to accommodate adjustments to the position of the blade without requiring corresponding adjustments to the cartridge and/or mounting structure.

Examples of suitable support structures include one or more mounting brackets 704 to which the cartridge is attached by any suitable releasable fastening mechanism, such as bolts, pins or screws. Support structure 702 may additionally, or alternatively, include one or more axles 706 upon which the cartridge is mounted. For example, pawl 60 is shown in FIG. 100 pivotally mounted on an axle 706 that passes through pawl 60 and at least a portion of cartridge 80. Also shown in FIG. 100, is mounting bracket 704 that supports and positions cartridge 80 relative to blade 40. Another example of a suitable support structure is a socket or other receiver within machine 10. Typically, cartridge 80 will be supported in sufficient directions and/or positions to retain the cartridge in its intended mounting position and orientation. Cartridge 80 and support structure 702 preferably include key structure 703 that prevents the cartridge from being installed within machine 10 other than in its intended mounting position. An example of a suitable key structure 703 is shown in FIG. 100, in which housing 82 of cartridge 80 includes a bevel 705 that mates with mounting bracket 704. It should be understood that key structure 703 may include any suitable mechanism, including the relative size, shape and positioning of cartridge 80 and support structure 702, that prevents the cartridge from being installed in a position other than its intended mounting position.

Figure 101:
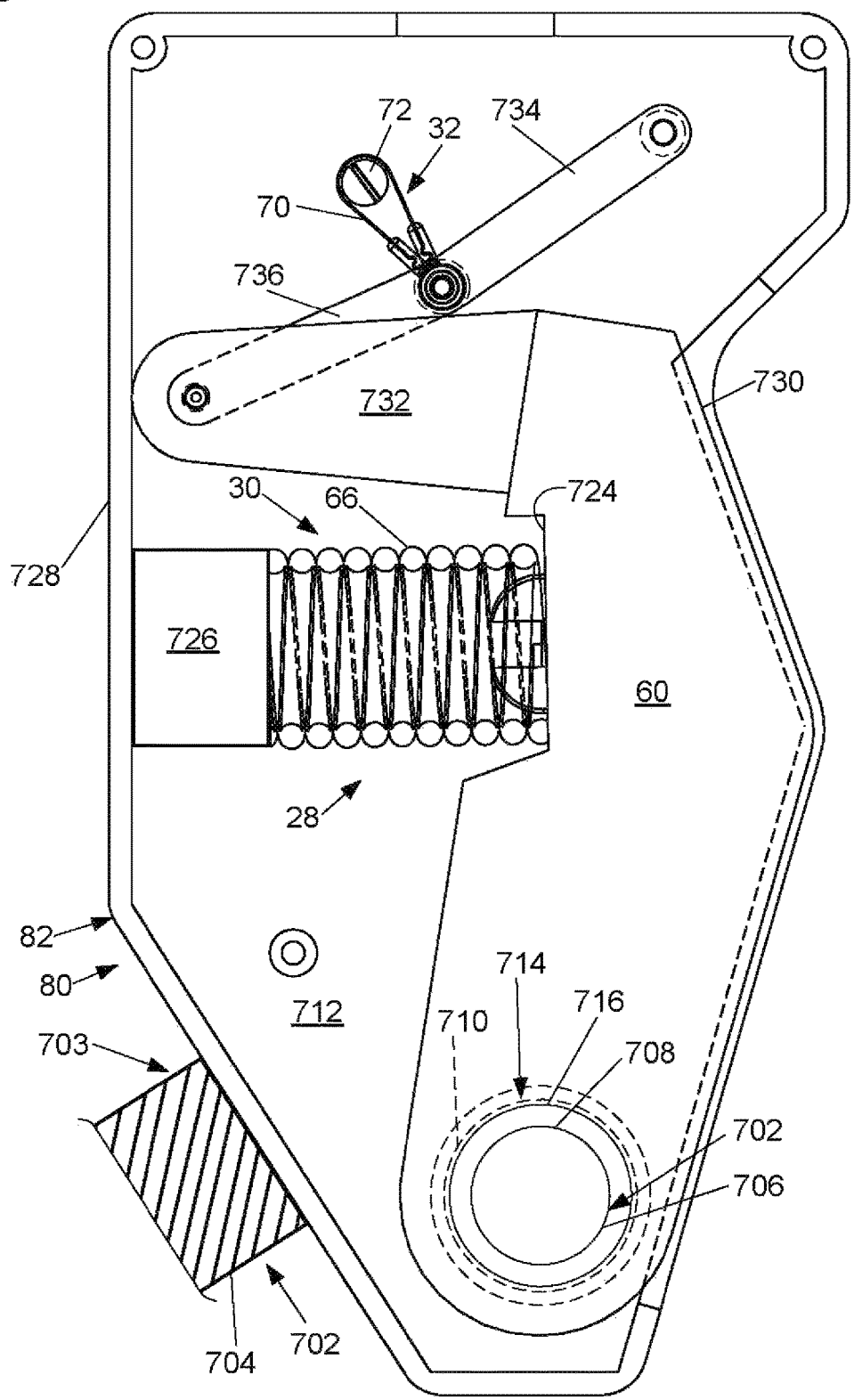
FIG. 101 is a side elevation view of the interior of another cartridge.

Another cartridge is shown in FIG. 101. Similar to the cartridge shown in FIGS. 2 and 100, cartridge 80 includes a housing 82, a brake mechanism 28 having a pawl 60, a biasing mechanism 30 such as spring 66, and a restraining mechanism 32 such as fusible member 70. Also shown is another example of a suitable key structure 703, namely, the irregular shape of housing 82 and mounting bracket 704 against which the housing is supported.

As shown, pawl 60 includes an aperture, or bore, 708 through which an axle or pin 706 may extend to support the pawl and cartridge within machine 10. Also shown is an aperture 710 in one or more of the cartridge's side walls 712 through which axle 706 extends. Alternatively, cartridge 80 may be supported by a support structure 702 that does not directly support pawl 60. For example, pawl 60 may pivot about an axle forming part of cartridge 80, which in turn is supported by support structure 702, such as pins, mounting brackets or the like. However, it may be preferable to support pawl 60 with at least one of support structures 702 to increase the supporting force provided other than by cartridge 80. Similarly, this reduces the strength required for cartridge 80 because support structures 702 absorb much of the force imparted on pawl 60 as the pawl engages the blade or other cutting tool of the machine.

Figure 102:
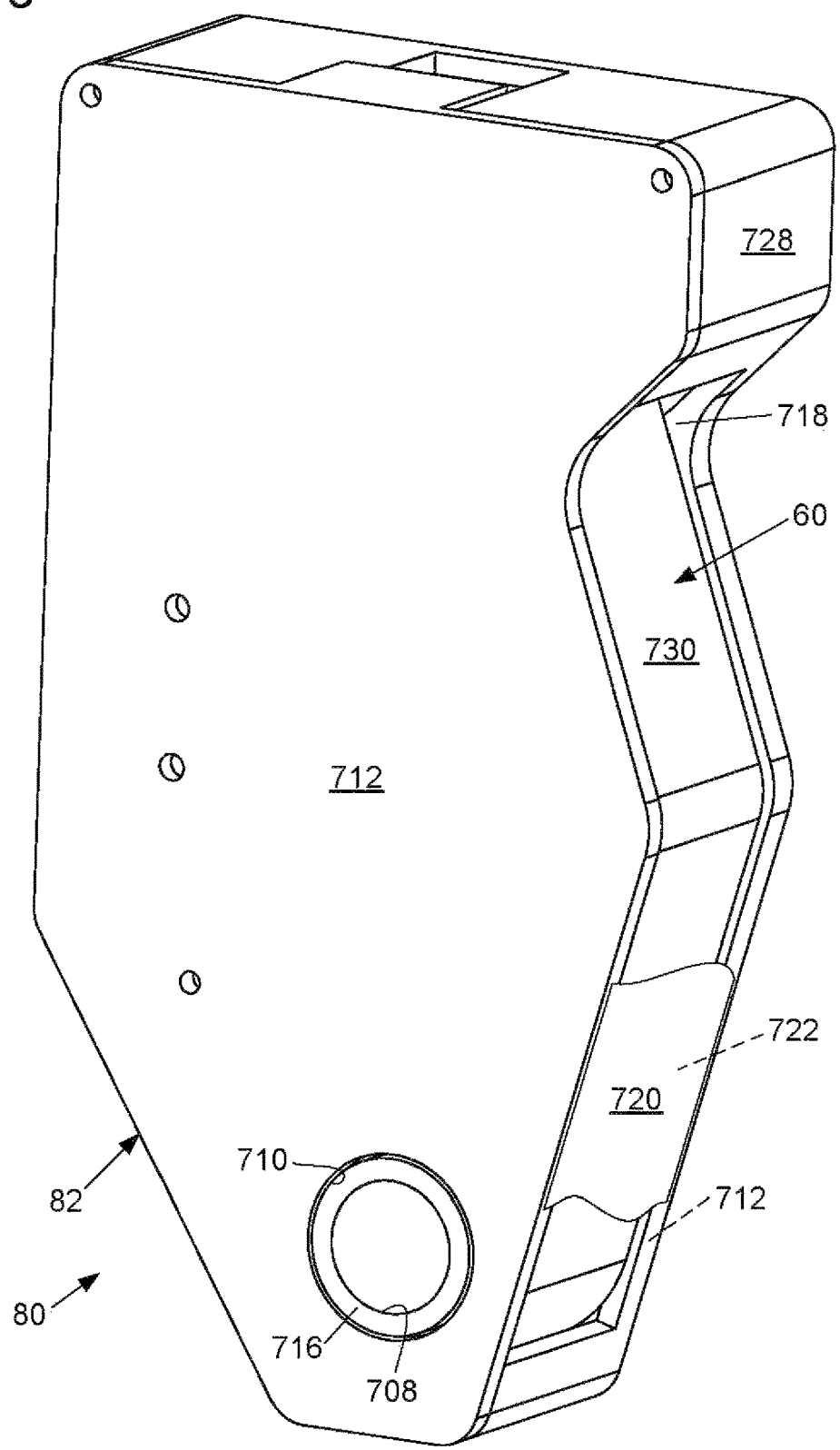
FIG. 102 is an isometric view of the cartridge of FIG. 101.

Pawl 60 should be retained in its mounting position within cartridge 80 when the cartridge is not installed within the machine. An example of a suitable coupling 714 between the pawl and cartridge is shown in FIG. 102, in which the aperture 710 through cartridge 80 is larger than the corresponding aperture 708 through pawl 60. Pawl 60 includes an outwardly extending bushing, or carrier, 716 that extends at least partially through the sidewalls of the cartridge to position the pawl relative to the cartridge. It should be understood that this configuration could be reversed, with pawl 60 having a larger aperture than cartridge 80 and with the cartridge having an inwardly extending bushing or carrier that passes at least partially through the aperture in pawl 60.

Also shown in more detail in FIG. 102 is the cartridge's opening 718 through which at least a portion of pawl 60 projects upon release of restraining mechanism 32. Although pawl 60 is shown completely within housing 82 in FIG. 102, it should be understood that at least a portion of pawl 60 may project from housing 82 when the pawl is in its cocked, or restrained, position. Opening 718 may include a cover 720 that seals the opening and thereby prevents contaminants such as dust, particulate, water, grease and the like from entering the cartridge and possibly interfering with the operation thereof. Although only a portion of cover 720 is shown in FIG. 102, it should be understood that the cover preferably covers the entire opening 718. Cover 720 may be formed of any suitable material to prevent contaminants from entering the cartridge through opening 718, while not interfering with the operation of brake mechanism 28. Examples of suitable materials for cover 720 include tape and thin metal, paper or plastic films. When a cover 720 is used that completely closes opening 718, the entire cartridge is preferably, but not necessarily, sealed against the entry of contaminants. Cover 720 may be attached to cartridge 80 through any suitable mechanism, such as with an adhesive 722. In embodiments of the cartridge in which the pawl is not prevented from pivoting or otherwise moving by restraining mechanism 32, cover 720 may also function as a pawl-restraining mechanism that prevents the pawl from extending through opening 718 until release of biasing mechanism 30 by the restraining mechanism.

Returning briefly to FIG. 101, it can be seen that biasing mechanism 30 includes spring 66, which is compressed between a spring-receiving portion 724 of the pawl and a support 726 forming part of cartridge 80. As shown, support 726 extends from the housing of the cartridge, although any suitable support may be used, including the end wall 728 of the cartridge, a support that extends from the end wall, and a support that extends from at least one of the cartridge's side walls 712.

In the embodiment of pawl 60 shown in FIG. 101, the pawl includes a blade-engaging surface 730 and a distal portion 732 that is coupled to linkages 734 and 736. Linkage 734 is pivotally coupled to housing 82, and linkage 736 interconnects distal portion 732 of pawl 60 to linkage 734. As shown, both linkages are in compression when pawl 60 is in its cocked, or restrained, position. It should be understood, however, that any suitable number and type of linkage may be used. Alternatively, restraining mechanism 32 may retain the pawl directly, such as shown in FIGS. 2 and 100. As a further alternative, restraining mechanism 32 may restrain a support positioned intermediate spring 66 and pawl 60 and upon which biasing mechanism 32 acts, thereby leaving pawl completely or relatively free from the bias of spring 66 until the release of restraining mechanism 32.

Figure 103:
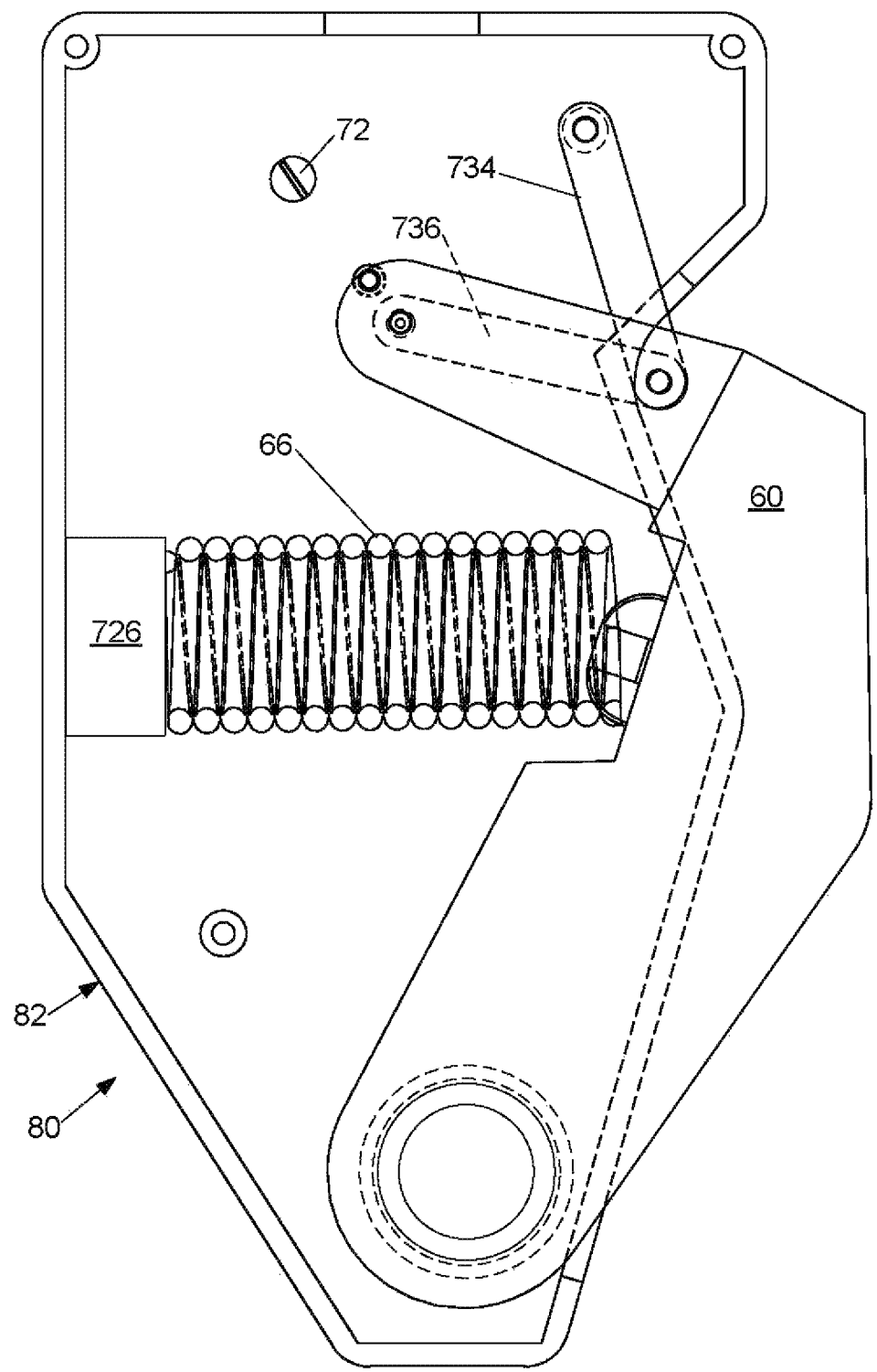
FIG. 103 is a side elevation view of the cartridge of FIG. 101 with the pawl in its blade-engaging position.

Fusible member 70 extends around contact mount 72 and at least a portion of one of the linkages to prevent pawl 60 from pivoting under the force of biasing mechanism 32. As shown, the ends of fusible member 70 are coupled to the linkages. Upon release of restraining mechanism 32, such as when a sufficient current is passed through fusible member 70 via contact mount 72, the fusible member no longer retains the linkages and pawl in the position shown, and the pawl pivots to its blade-engaging position, which is shown in FIG. 103.

Figure 104:
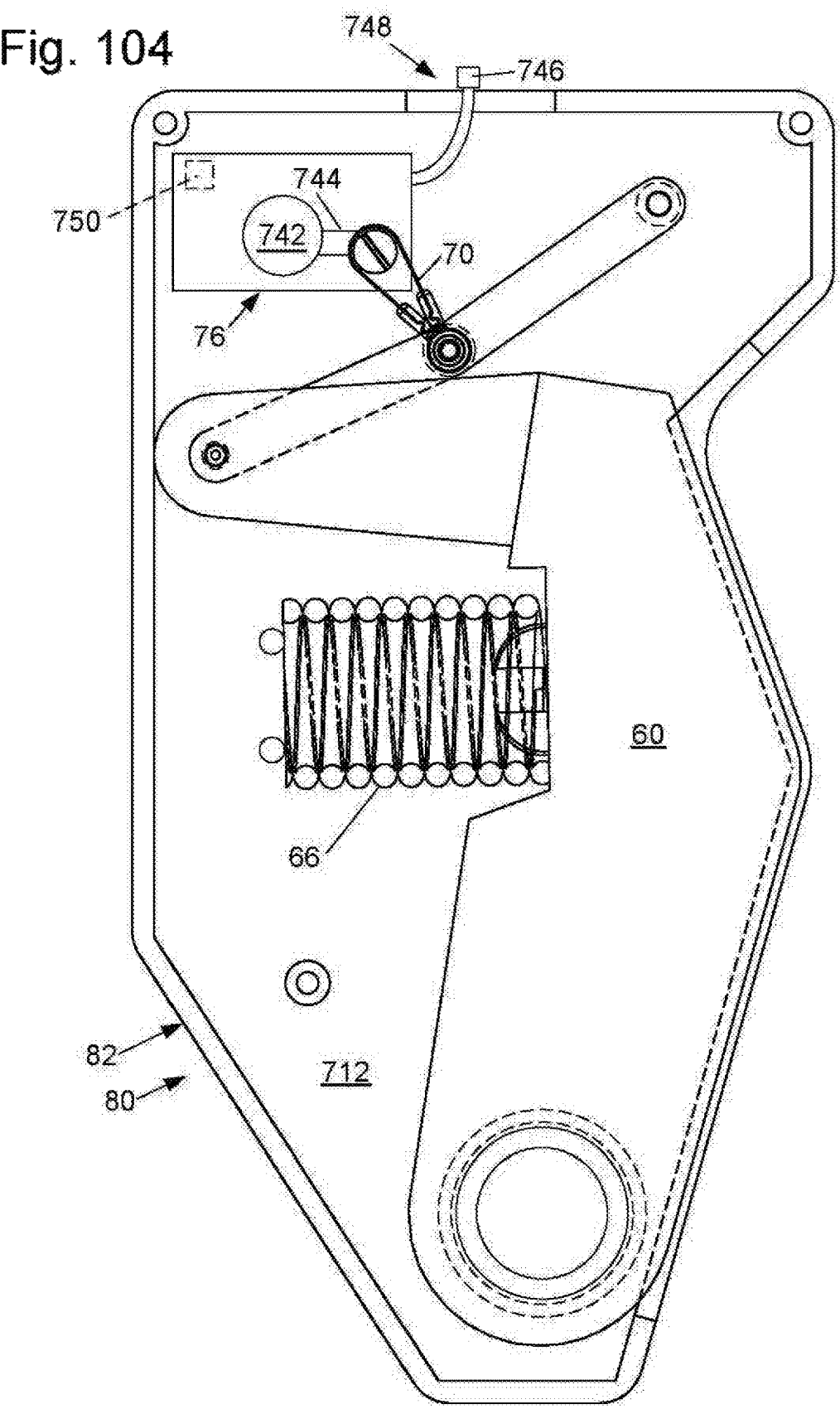
FIG. 104 is a side-elevation view of another cartridge.

Firing subsystem 76 may alternatively be located within housing 80, such as schematically illustrated in FIG. 104. An advantage of locating firing subsystem 76 within cartridge 80 is that the firing subsystem may be replaced with the rest of the cartridge. It also enables the capacitor or other current-storing or current-generating device 742 used to release fusible member 70 to be housed near contact mounts 72 and connected thereto by a direct linkage 744, instead of by wires. Also shown in FIG. 104 is plug 746 that extends through a port 748 in housing 82 and which is adapted to electrically connect firing subsystem 76 with controller 50 or another suitable portion of control subsystem 26. Alternatively, contacts 750 are shown extending from or forming a portion of housing 82.

Figure 105:
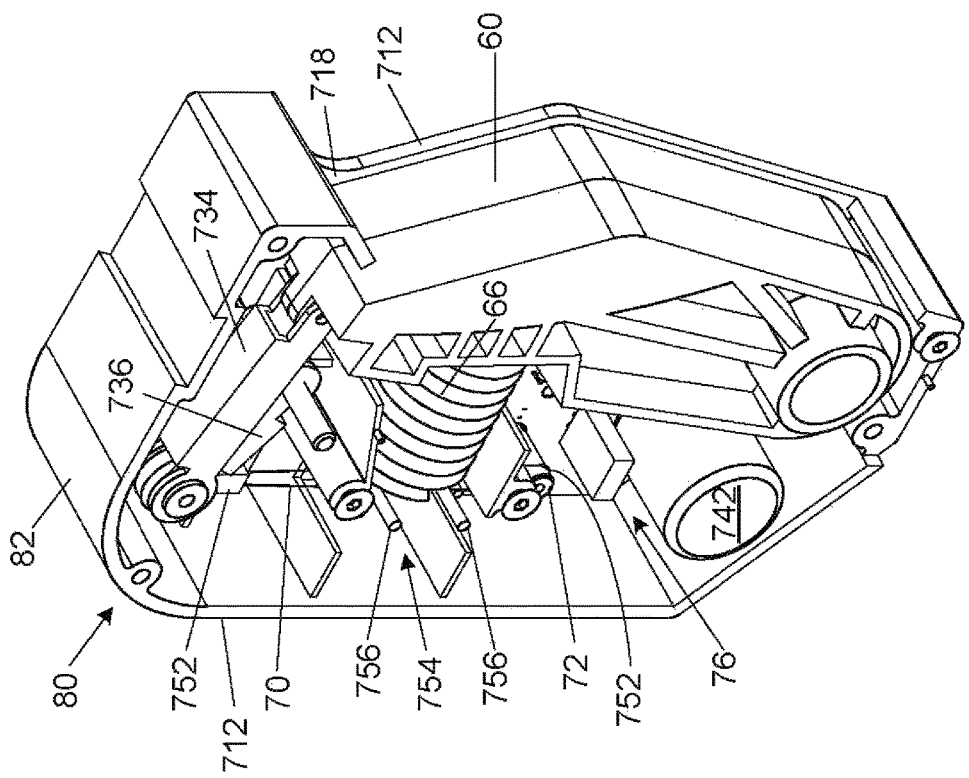
FIG. 105 is an isometric view of the interior of another cartridge.

Another exemplary cartridge is shown in FIG. 105. As shown, cartridge 80 includes firing subsystem 76 of release mechanism 34. Also shown in FIG. 105 is another version of linkages 734 and 736, in which linkage 734 is in tension instead of compression. The linkage assemblies shown in FIGS. 101 and 105 may both be referred to as over-center linkages. In FIG. 105, fusible member 70 is shown having a fixed length defined by end portions 752 that are adapted to be coupled to contact mount 72 and linkages 734 and 736, respectively. An advantage of a fixed length fusible member is that it facilitates easier assembly of cartridges with uniform pawl positions.

Figure 106:
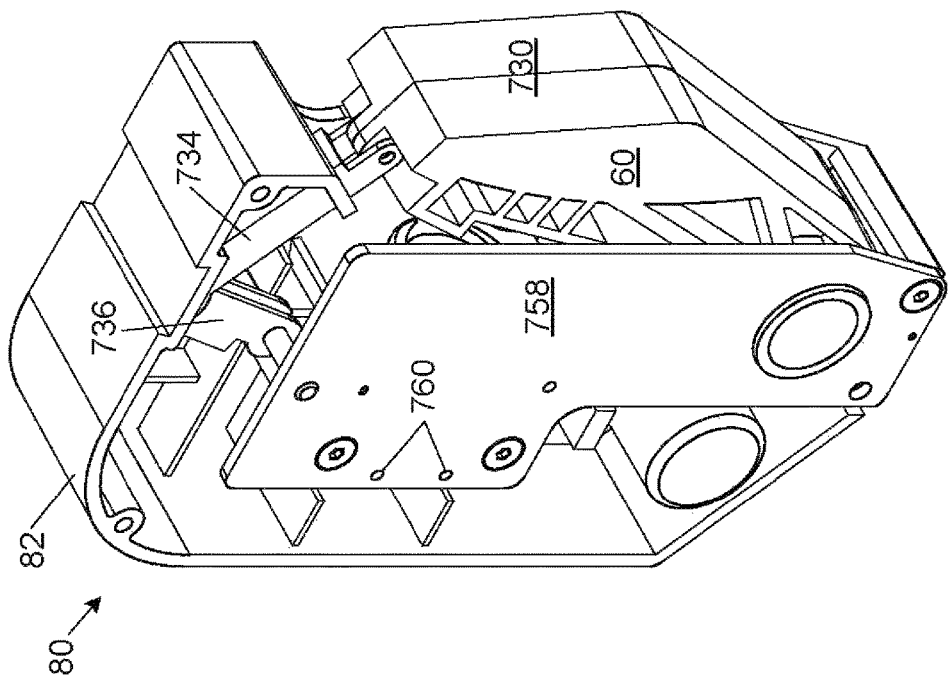
FIG. 106 is an isometric view of a variation of the cartridge of FIG. 105.

Unlike support 726, which is shown in FIG. 101 supporting the end of spring 66 distal pawl 60, in FIG. 105, cartridge 80 includes a removable support 754. Support 754 may be selectively removed from cartridge 80 to release, or at least substantially reduce, the biasing force exerted by spring 66 upon pawl 60. For example, support 754 may be removed after actuation of brake mechanism 28 to remove the spring force so that it is easier to remove and replace the cartridge. An example of a suitable support 754 is a clip 756 that extends through at least one of the cartridge's side walls 712. Clip 756 may be supported between both of the cartridge's side walls. Alternatively, cartridge 80 may include an internal support 758 adapted to support the ends 760 of clip 756, such as shown in FIG. 106, in which the pawl is shown in its blade-engaging position. Preferably clip 756 or other support 754 may be removed from the cartridge without having to first remove the cartridge from machine 10. For example, clip 756 may include a portion 762 that extends external cartridge 80 and which may be grasped by a tool to withdraw the clip from the cartridge, such as shown in FIG. 107. A benefit of the embodiment shown in FIG. 106 is that pulling clip 756 releases spring 66, which in turn breaks fusible member 70. The safety system's controller may be configured to detect this break in fusible member 70, and respond accordingly to the fault in the system.

In FIGS. 104-06, firing subsystem 76 is shown housed within cartridge 80. It should be understood that other components of the safety system's electronics may also be housed within cartridge 80. For example, the cartridge may include a sensing assembly to determine if the cartridge is properly installed within machine 10, with operation of the machine being prevented until the safety system receives a signal that the cartridge is properly installed.

Figure 108:
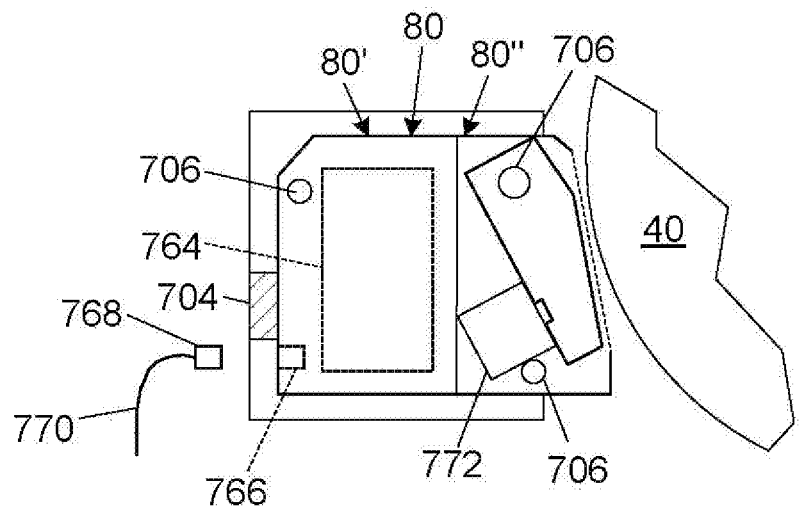
FIG. 108 is a fragmentary side elevation view of another cartridge.

Placing most of the safety stop in the cartridge allows manufacturers to develop improved electronics, additional functions, etc., without requiring significant, if any, changes to the machine. As a further alternative, safety system 18 may include a plurality of cartridges, including at least one cartridge that contains pawl 60 and at least one cartridge that contains electronics, such as firing subsystem 76 and/or other electronic portions of the safety system. An example of such a cartridge assembly is shown in FIG. 108. As shown, a pair of cartridges 80 are shown and indicated generally at 80' and 80". Cartridges 80' and 80" may also be described as subcartridges or modules that are united to form cartridge 80. Cartridge 80' includes an electronics unit 764, such as firing subsystem 76 or control subsystem 26, and an electrical connector 766 configured to operably engage plug 768, attached to cable 770. The cable includes conductors for supplying electrical power to the electronic unit. The cable may also conduct output signals from the electronics unit, such as a cutoff signal to stop motor assembly 16, or a signal to control subsystem 26, depending upon the particular electronics housed in cartridge 80'. Although plug 768 and cable 770 are shown as being freely movable, it will be appreciated that plug 768 may be rigidly mounted to the support surface upon which cartridge 80 is mounted. Further, plug 768 may be rigidly positioned to ensure that the cartridge is properly aligned and oriented when the connector is engaged with the plug. Cartridge 80", on the other hand, includes pawl 60 and the biasing and restraining mechanisms, which are collectively indicated as module 772 to indicate that the biasing and restraining mechanisms may also form a cartridge or module that may be selectively removed and replaced. Preferably, the cartridges are in communication with each other, such as to release the restraining mechanism responsive to a signal from electronics unit 764.

Figure 109:
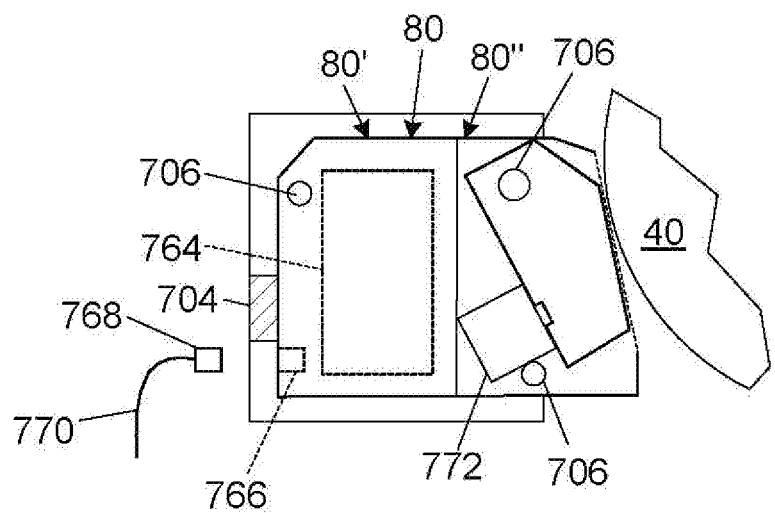
FIG. 109 is a fragmentary side elevation view of another cartridge.

Optionally, cartridge 80", or any of the previously described cartridges, may be provided in different sizes or configurations to accommodate different blade sizes. For example, a longer version of the cartridge, such as shown in FIG. 109, may be used for a smaller diameter blade 40. Furthermore, different cartridges may be provided for different applications that use different types of blades (e.g., dado, cross-cutting, ripping, plywood, etc.). For example, a first cartridge having a first type pawl may be provided for a first type blade, while a second cartridge having a second, different pawl may be provided for a second, different blade.

Alternatively, the electronics of one cartridge may be different from those of another cartridge to allow for different applications (e.g., cutting plastic rather than wood). Additionally, plural cartridges may be used simultaneously to ensure the safety stop responds optimally for each material.

The brake cartridges and related machines and methods may be described as set forth in the following numbered paragraphs. These paragraphs are intended as illustrative, and are not intended to limit the disclosure or claims in any way. Changes and modifications may be made to the following descriptions without departing from the scope of the disclosure.

7.1 A woodworking machine comprising:
a working portion;
a detection system adapted to detect a dangerous condition between a person and the working portion; and
a brake system to brake the working portion upon the detection by the detection system of the dangerous condition, where the brake system is housed in a cartridge.

7.1.1 The woodworking machine of paragraph 7.1 where the cartridge is configured to be replaced after the brake system has braked the working portion.

7.1.2 The woodworking machine of paragraph 7.1 where cartridge houses a brake pawl adapted to contact the working portion, a biasing mechanism adapted to move the brake pawl into contact with the working portion, and a release system adapted to release the biasing mechanism.

7.1.2.1 The woodworking machine of paragraph 7.1.2 where the biasing mechanism includes a spring.

7.1.2.2 The woodworking machine of paragraph 7.1.2 where the biasing mechanism includes a spring and a mechanical linkage restraining the brake pawl against the spring.

7.1.2.3 The woodworking machine of paragraph 7.1.2 where the release system includes a fusible member.

7.1.2.4 The woodworking machine of paragraph 7.1.2 where the release system includes a fusible member and a firing circuit to melt the fusible member.

7.1.2.5 The woodworking machine of paragraph 7.1.2 where the cartridge is sealed.

7.1.2.6 The woodworking machine of paragraph 7.1.2 where the cartridge is made of plastic, where the cartridge includes an opening through which the brake pawl may move, and where the opening is covered until the brake pawl moves through the opening.

7.1.3 The woodworking machine of paragraph 7.1 further comprising a worksurface adjacent the working portion, where the working portion is a blade, where the blade is configured to raise and lower relative to the worksurface, and where the cartridge is mounted to raise and lower with the blade.

7.1.4 The woodworking machine of paragraph 7.1 where the cartridge mounts on a shaft in the machine.

7.2 A brake cartridge for a woodworking machine, the cartridge comprising:
a housing;
a brake pawl in the housing; and
a mechanism to move the brake pawl.

Section 8: Brake Positioning

Figure 110:
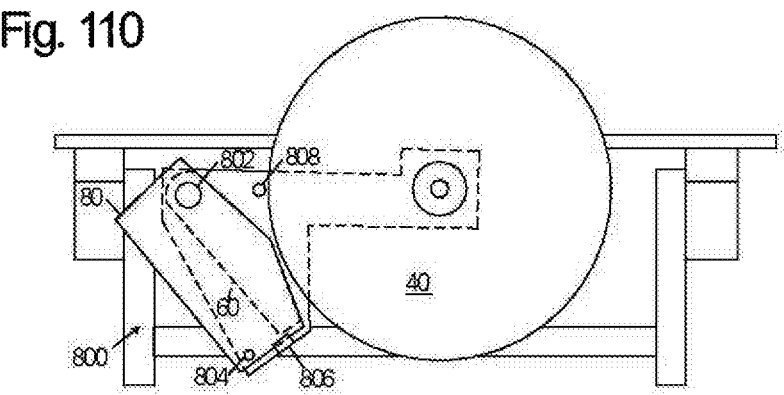
FIG. 110 is a side elevation view of a brake positioning system.

Brake mechanisms, such as described above, may be positioned relative to the blade in a variety of ways. For example, one exemplary brake positioning system is shown generally at 800 in FIG. 110. Cartridge 80 and brake pawl 60 are typically pivotally mounted on a large axle or pin 802. The cartridge and pawl are fixed together until the brake is fired, at which time the brake pawl is shoved rapidly into the blade. The motion of the blade and geometry of the pawl then cause the blade to drive deeply into the pawl creating tremendous deceleration. Pin 802 is sufficiently large, typically 0.75 inches, to absorb the impact of deceleration without damage. The large diameter of pin 802 also reduces the chance that it will fracture brake pawl 60 during braking. The pivotal mounting of the cartridge on the pin permits the spacing between the blade and the face of the brake pawl to be adjusted by rotating the cartridge around the pin. The brake position system serves to establish and maintain the proper spacing between the face of the pawl and the perimeter of blade 40.

In its simplest form, brake positioning system 800 incorporates a fixed pin 804 to position cartridge 80, and thereby brake pawl 60. This arrangement is generally sufficient where the size of the blade is known and sufficiently fixed for all blades that might be used. Pin 804 is arranged parallel to pin 802 to allow cartridge 80 to be slid onto both pins simultaneously. A flexible snap clip 806 snaps over the edge of cartridge 80 to retain it on the pins. When the cartridge is to be removed, the clip is lifted away from the cartridge, and the cartridge is slipped off of the pins. A clearance pin 808 is preferably mounted at a fixed radius from the arbor axis, $5\frac{1}{16}^{th}$ inches for instance, to insure that no larger blade than will clear the pawl will fit on the saw. The clearance pin is preferably located at a just slightly smaller radial position from the arbor than the nearest portion of the pawl so that the blade will contact the pin prior to contacting the pawl. Alternatively, the pin may take the form of a curved arc that is sufficiently large to insure that at least one tooth of the blade will engage it.

Figure 111:
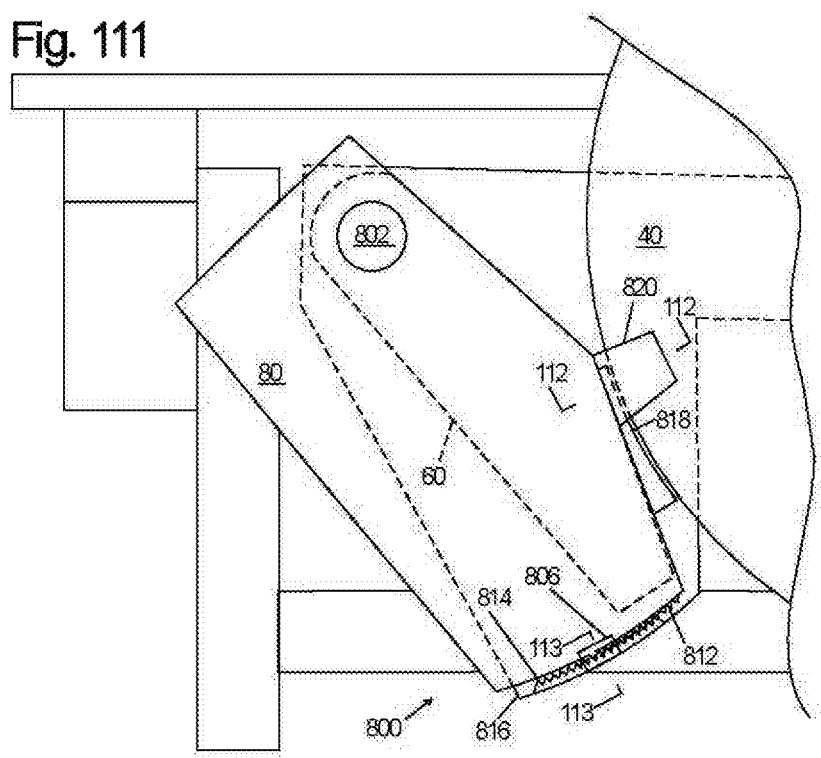
FIG. 111 is a side elevation view of an adjustable brake positioning system.
Figure 112:
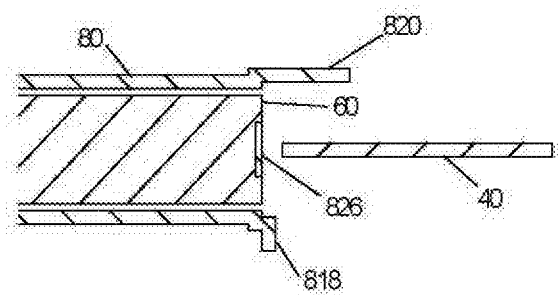
FIG. 112 is cross-sectional view of a portion of the brake positioning system of FIG. 111, taken along line 112-112.
Figure 113:
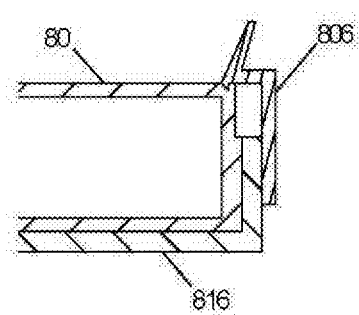
FIG. 113 is a cross-sectional view of a portion of the brake positioning system of FIG. 111, taken along line 113-113.

An adjustable brake positioning system 800 is shown in FIGS. 111-113. Brake positioning system 800 includes a plurality of positioning teeth 812 formed on the back of cartridge 80. A corresponding plurality of positioning teeth 814 are formed on a cartridge mounting surface 816. The teeth preferably have a pitch of approximately $\frac{1}{32}$nd to $\frac{1}{4}^{th}$ of an inch. The teeth are spaced so that relatively small adjustments can be made by selecting where to engage the teeth. A curved wall 818 is formed along part of the inside front edge of the cartridge. The curved wall is positioned to engage the perimeter of the blade just prior to the positioning teeth engaging each other as the cartridge is slipped onto pin 802. This insures that the pawl will be spaced back from the blade by at least the distance the wall projects forward from the pawl—typically $\frac{1}{16}$ to $\frac{1}{8}^{th}$ inch. Once the positioning teeth are engaged, the rotational position of the cartridge is fixed. The cartridge is then slid the rest of the way onto the pin. Snap clip 806 retains the cartridge against the mounting surface and in proper position. A tab 820 formed on the edge of the cartridge extends over the blade. The tab blocks the blade from being removed unless the cartridge is partially disengaged and rotated back away from the blade. Thus, the tab insures that the blade cannot be removed and replaced with a new blade without resetting the position of the cartridge. It can be seen that by making the cartridge pivotal on pin 802, adjustable positioning of the brake pawl relative to the blade is simplified.

Figure 114:
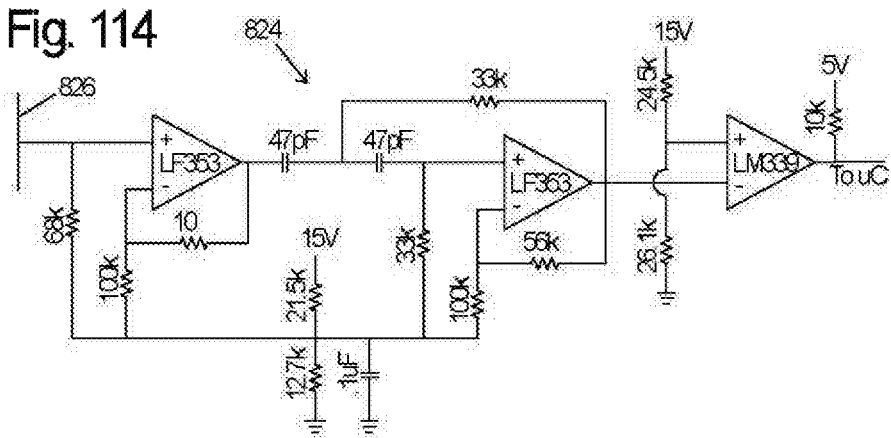
FIG. 114 is a circuit diagram of a blade-to-pawl spacing measurement system.

Because of the importance of establishing correct pawl-to-blade spacing, it may be desirable to incorporate a spacing detection system to insure correct spacing. One example of such a system is shown at 824 in FIG. 114. System 824 includes an electrode 826 located on the face of the pawl adjacent the blade. As described in Sections 1 and 2 above, in one contact detection system suitable for use with the present invention, an electrical signal is applied to the blade via a drive electrode. This signal can be picked up by electrode 826 and monitored to ensure that it has an amplitude in a predetermined range. In particular, the amplitude detected by electrode 826 will fall off rapidly with distance from the blade. Therefore, by monitoring the detected amplitude, proper spacing can be verified. The system preferably deactivates or prevents initial actuation of the machine if the detected spacing is outside normal range. The user is then signaled to make appropriate adjustment.

Figure 115:
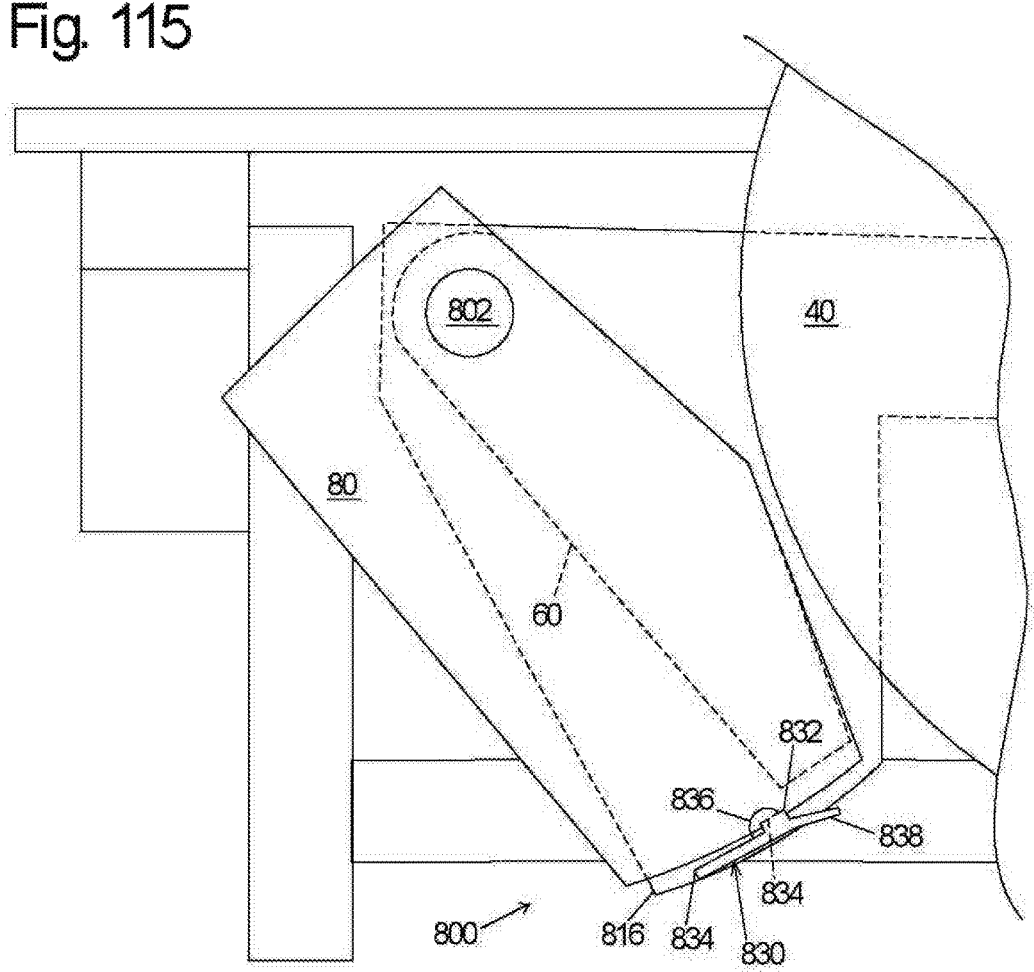
FIG. 115 is a side elevation view of an alternative brake positioning system.

An alternative brake positioning system 800 is shown in FIG. 115. The position system of FIG. 115 utilizes a snap catch 830 with a rib 832 facing the cartridge. The catch is mounted to cartridge support surface 816 and is biased to push against the cartridge. The end face of the cartridge includes a groove 834 adapted to receive rib 832. In use, the cartridge is slipped over pin 802 while rotated back from the blade. Once the cartridge is fully installed on the pin, it is rotated forward until rib 832 snaps into groove 834. A small ledge 836 projects over the edge of cartridge 80 when the rib is engaged in the groove to prevent the cartridge from vibrating off along the axis of the pin. Once the cartridge is fired, the user can lift tab 838 to disengage the rib and allow the cartridge to rotate back. The backward rotation can be used to release any remaining pressure from the actuation spring in the cartridge.

Figure 116:
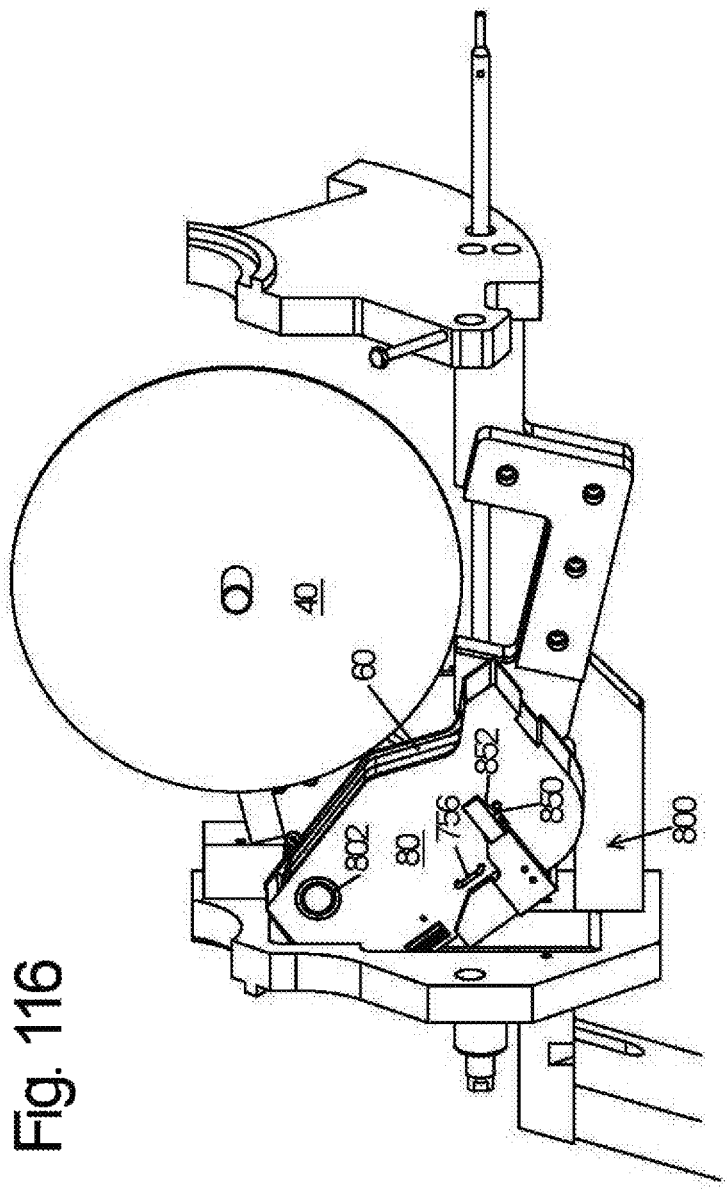
FIG. 116 is an isometric view of an alternative brake positioning system.

FIG. 116 shows another brake positioning system 800. In the system of FIG. 116, cartridge 80 includes a recess 850 formed on one side. A spring latch 852 is positioned to engage recess 850 as cartridge 80 is rotated back away from the blade. The latch is positioned to locate the face of the pawl approximately $\frac{1}{8}^{th}$ of an inch away from the perimeter of the blade, although different spacing could of course be used. The user can remove the cartridge by lifting the latch, rotating the cartridge forward until it clears the latch and then sliding the cartridge off pin 802. As described in more detail in Section 7 above, when the cartridge is fired, the pawl will normally be somewhat embedded on the blade and biased toward the blade by a spring 66. A release pin 756 is removable to release the back of the spring and remove the biasing pressure. This allows the pawl to be loosened from the blade more easily and eliminates the pressure on the blade that would otherwise make removal of the blade more difficult.

Figure 117:
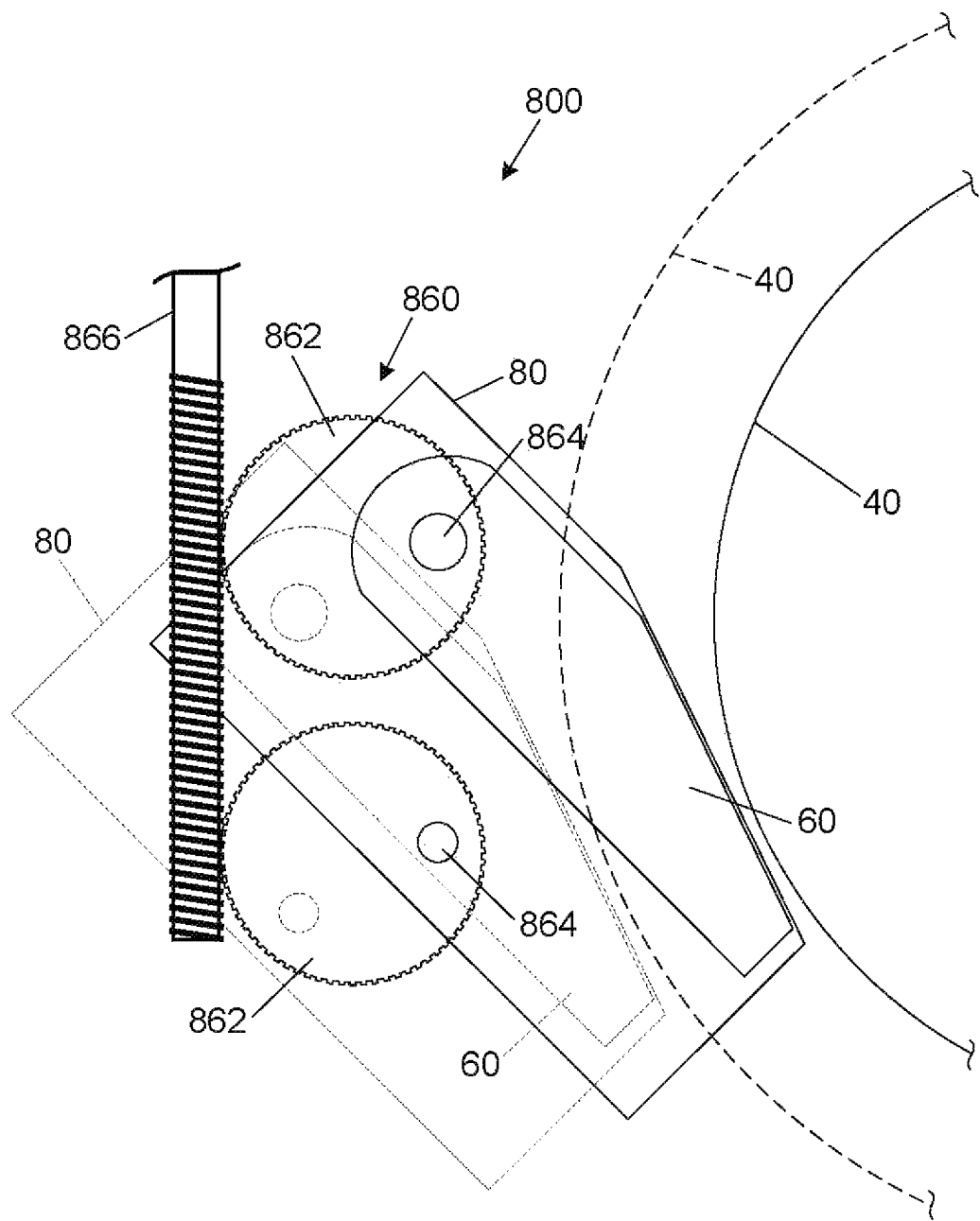
FIG. 117 is a fragmentary side elevation view of an alternative brake positioning system.

FIG. 117 shows a further brake positioning system 800. In this embodiment, pawl 60 and brake cartridge 80 are mounted on a support assembly 860 that is selectively movable to adjust the position of the pawl and/or cartridge. It will be appreciated that support assembly 860 may be configured in a variety of different ways. In the exemplary embodiment depicted in FIG. 117, assembly 860 includes a plurality of gears 862 having toothed perimeters. Each gear includes a support post 864 extending outward therefrom. Cartridge 80 is mounted on assembly 860 so that a first one of the posts passes through the brake pawl 60 and cartridge, while the second post passes only through the cartridge. The pawl is adapted to pivot about the first post, which supports the pawl and absorbs the energy of the blade during braking. The second post functions to angularly position the pawl relative to the blade and prevent the cartridge from rotating about the first post.

When the cartridge and pawl are mounted on the first and second posts, the pawl may be correctly positioned relative to the blade by rotating gears 862. Assembly 860 also includes a worm screw 866 or other suitable mechanism to rotate the gears. A handle or similar device may be mounted on the worm screw to facilitate turning. In the exemplary embodiment, worm screw 866 is adapted to simultaneously engage both gears so that the gears turn in tandem. As a result, cartridge 80 and brake pawl 60 maintain a constant angular position relative to the blade as the gears are turned. However, as shown in FIG. 117, the cartridge and pawl move toward and away from the blade when the worm screw is turned. This allows the brake to be correctly positioned for different sized blades. Further, this embodiment alleviates the need for different sized pawls and/or cartridges for different sized blades.

In alternative embodiments, gears 862 may be different sizes so as to rotate different amounts when the worm screw is turned. This may be useful where it is desirable to change the angular position of the pawl relative to the blade when the pawl is moved toward and away from the blade.

In the embodiment depicted in FIG. 117, the pivot point of the pawl is translated as the pawl is moved toward and away from the blade. In a further alternative embodiment, the position of the pawl may be adjusted by simply pivoting the pawl about its pivot post. In such an embodiment, it may be desirable to have a relatively long pawl to accommodate blades of substantially different sizes.

The brake positioning systems, methods and related machines may be described as set forth in the following numbered paragraphs. These paragraphs are intended as illustrative, and are not intended to limit the disclosure or claims in any way. Changes and modifications may be made to the following descriptions without departing from the scope of the disclosure.

8.1 A woodworking machine, comprising:
a cutter;
a brake cartridge including a brake pawl adapted to selectively engage and stop the cutter, and
a brake positioning system adapted to receive and adjustably position the brake cartridge relative to the cutter.

8.1.1 The machine of paragraph 8.1, wherein the brake positioning system allows the cartridge to be adjusted to accommodate different sized cutters.

8.1.2 The machine of paragraph 8.1, wherein the brake positioning system includes a pivot on which the cartridge is mounted and the position of the brake cartridge relative to the cutter is adjusted by rotating the cartridge on the pivot.

8.2 A woodworking machine, comprising:
a cutter;
a motor adapted to drive the cutter;
a brake adjustably positionable adjacent the cutter;
a sensor system adapted to sense the spacing between the cutter and the brake; and
a control system configured to control the operation of the motor and to receive a signal from the sensor system representative of the spacing between the cutter and the brake, where the control system is further configured to selectively prevent operation of the motor dependent on the signal received from the sensor.

8.2.1 The machine of paragraph 8.2, wherein the sensor system includes an electrode mounted on the brake pawl proximal to the cutter and the signal is dependant on the electrical coupling of the electrode and the cutter.

Section 9: Logic Control

Considering logic controller 50 now in more detail, it will be appreciated that the logic controller may be configured to perform a variety of functions depending on the particular type of machine 10 and/or the application. For example, logic controller 50 may be configured to conduct various self-test safety checks when the machine is switched on or off and during use, to ensure that detection subsystem 22 is operating properly and to prevent inadvertent triggering of reaction subsystem 24. Additionally, the logic controller may be configured to control one or more display devices to inform a user of the status of machine 10 and safety system 18. Furthermore, logic controller 50 may be implemented in a variety of ways including using one or more custom application specific integrated circuits (ASICs), microprocessors, microcontrollers, digital logic circuits, and/or analog circuits, etc.

Figure 118:
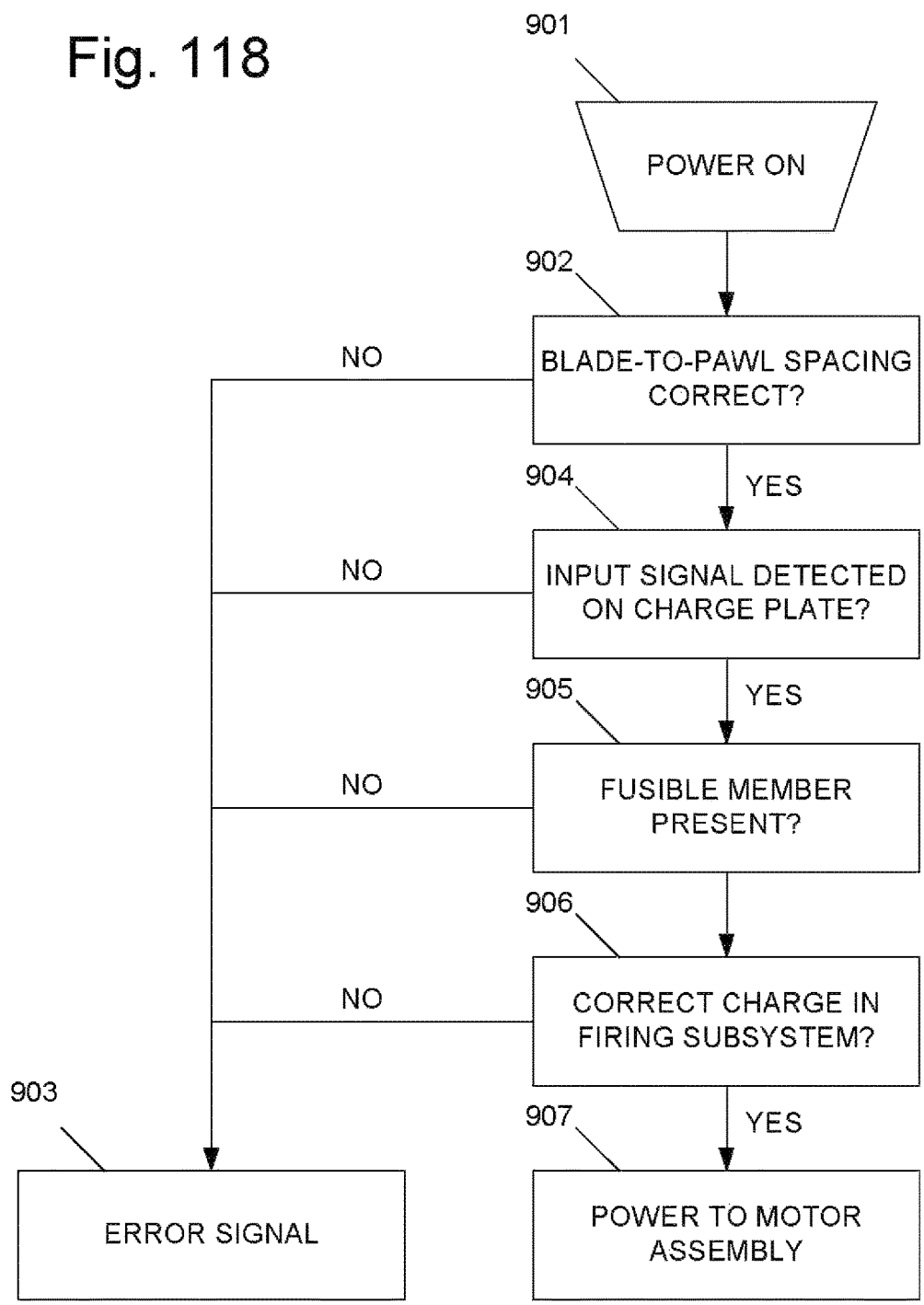
FIG. 118 is a flowchart diagram of an exemplary self-test logic sequence.

In one exemplary embodiment, logic controller 50 is configured to perform the self-check logic sequence shown in FIG. 118. The exemplary sequence begins when the user initially supplies power to the system, indicated at 901. The logic system first checks to determine whether the spacing between the blade and pawl is correct, as indicated at 902. The blade-to-pawl spacing may be measured by any suitable mechanism such as described in more detail below. If the spacing is outside acceptable limits, the system responds with an error signal, indicated at 903. The error signal may be an audible and/or visible signal, etc. In one embodiment described in more detail below, the control subsystem includes a user interface adapted to indicate the status of the machine and annunciate any error conditions. Preferably, the logic system remains in the error state and prevents further operation of the machine until the correct blade-to-pawl spacing is detected.

If the blade-to-pawl spacing is acceptable, the logic system determines whether the input signal produced on charge plate 44 by detection subsystem 22 is being detected at a sufficient amplitude on charge plate 46, as indicated at 904. This step ensures that the reaction subsystem will not be triggered accidentally upon start-up due to a fault in the detection subsystem, a grounded blade, incorrectly placed charge plates, etc. If the proper input signal is not detected, logic controller 50 responds with an error signal 903. It will be appreciated that either the same or a different error signal may be produced for each fault condition.

If the proper input signal is detected, the logic controller proceeds to determine whether a fusible member is present, as indicated at step 905. The presence of a fusible member may be determined by any suitable means such as described in more detail below. If no fusible member is present, logic controller 50 returns an error signal 903. If a fusible member is detected, the logic controller then checks the electrical charge stored by firing subsystem 76, as indicated at 906. This step ensures that sufficient charge is present to melt the fusible member if the dangerous condition is detected. Exemplary circuitry for detecting sufficient charge is described in more detail below. If sufficient charge is not detected within a determined time period, the logic controller responds with an error signal 903.

In the sequence depicted in FIG. 118, after the predetermined checks are completed, logic controller 50 allows power to be sent to motor assembly 16, as indicated at 907. It will be appreciated that the electrical sequence described above typically is completed within no more than a few seconds if no faults are detected. In addition to an initial power-up sequence, logic controller 50 may be configured to perform any of a variety of checks during operation. For example, the rotation of the blade may be monitored by known mechanisms and the firing system may be disabled when the blade is not moving. This would allow the user to touch the blade when it is stopped without engaging brake mechanism 28. Various exemplary embodiments and implementations of a blade motion detection system are described in Section 10 below.

It will appreciated that many variations on the logic sequence described above may be implemented. For example, some embodiments of logic controller 50 may include a battery, a capacitor or other charge storage device to ensure the detection and reaction subsystems will continue to function at least temporarily after power to the machine is turned off. As another example, power to the motor assembly may be shut off if an error occurs other than contact detection such as incorrect blade-to-charge plate spacing, insufficient charge on the charge storage devices, etc. Thus, logic controller 50 may be implemented to provide any of a variety of safety and/or operational functions as desired.

Additionally, since reaction subsystem 24 is configured to stop cutting tool 14 upon contact with a user's body, it may also be desirable to stop motor assembly 16, or at least the portion of the motor assembly adapted to drive the cutting tool, to prevent damage to the motor as it tries to drive the stalled cutting tool. However, since machine 10 typically is designed with the expectation that the cutting tool may stop due to binding, etc., it will usually be sufficient to turn off the motor assembly within a few seconds. This can be accomplished simply by cutting power to the motor. For example, when machine 10 includes a magnetic contractor switch 48, the logic controller may be adapted to interrupt the circuit holding the magnetic contractor closed so that power to the motor is interrupted. It should be understood that this step is optional, in that interrupting power to the machine's motor assembly is neither necessary nor sufficient to prevent serious injury to the user when the user touches the machine's cutting tool. Therefore, the principal benefit of this step is to reduce the likelihood of damaging the motor assembly or drive system while the brake system is preventing rotation or other movement of the cutting tool. It will be appreciated that there are many other suitable ways of stopping motor assembly 12. As one example, power to the motor assembly may be controlled directly by a safety stop (e.g., through solid state on/off switches, etc.). This embodiment is described in more detail in Section 1 above. Also, it is possible to simply allow existing overload circuitry to trip in and turn off the stalled motor.

Since the contact detection subsystem described above relies on certain electrical properties of the human body, the use of safety system 18 while cutting some materials, such as foil-coated insulation, may cause the detection circuitry to falsely register contact with a user. In addition, as described above in Section 1, extremely green wood may cause false triggers in some types of detection subsystems due to the relatively high dielectric constant of green wood. Therefore, it may be desirable to provide a manual bypass or override control that prevents the brake from operating for a particular cutting operation. A suitable override control may include a mechanical switch between fusible member 70 and firing system 76. Alternatively, the switch may be a single-use switch configured to reset itself after each use. As a further alternative, safety system 18 may include sensors adjacent the workpiece to detect the presence of foil, green wood, etc., and disable the reaction subsystem automatically. This latter alternative relieves the user of having to remember to disable and re-enable the brake system.

In any event, the override control may be configured in a variety of ways depending on the application and the level of safety desired. For example, the override control may be configured to time-out (i.e., turn off) if the user does not switch the machine on within a predetermined time (e.g., 3, 5 or 10 seconds, etc.). This would prevent the user from actuating the override control and then becoming distracted before proceeding to cut the workpiece and forgetting the safety system had been disabled. In some embodiments, it may be desirable to allow a user to override the error caused by a failed self-test (e.g., no fusible member, insufficient stored charged, missing or incorrectly installed cartridge 80, etc.). In other embodiments, logic controller 50 may be configured to require that the detection and reaction subsystems are operational before allowing the user to engage the override.

Typically, the override control is configured to reduce the likelihood that it will be actuated accidentally by the user. For example, the override control switch may be located away from the remaining operator switches and away from an area on machine 10 where the user is likely to accidentally bump against while using the machine. Alternatively or additionally, override control switch 48 may include a cover or similar barrier which the user must remove or overcome before the switch can be actuated. Such covered switches are known to those of skill in the art. As an additional safety measure, logic controller 50 may be configured to produce a visual and/or audible alarm or warning when the override is actuated. Furthermore, where logic controller 50 is adapted to control the supply of power to motor assembly 16, the logic controller may be configured to "pulse" the motor one or more times to alert the user that the blade is about to begin moving with the safety system disabled. This would alert a user, who accidentally actuated the override while in contact with the blade, to quickly move away from the blade.

Figure 119B:
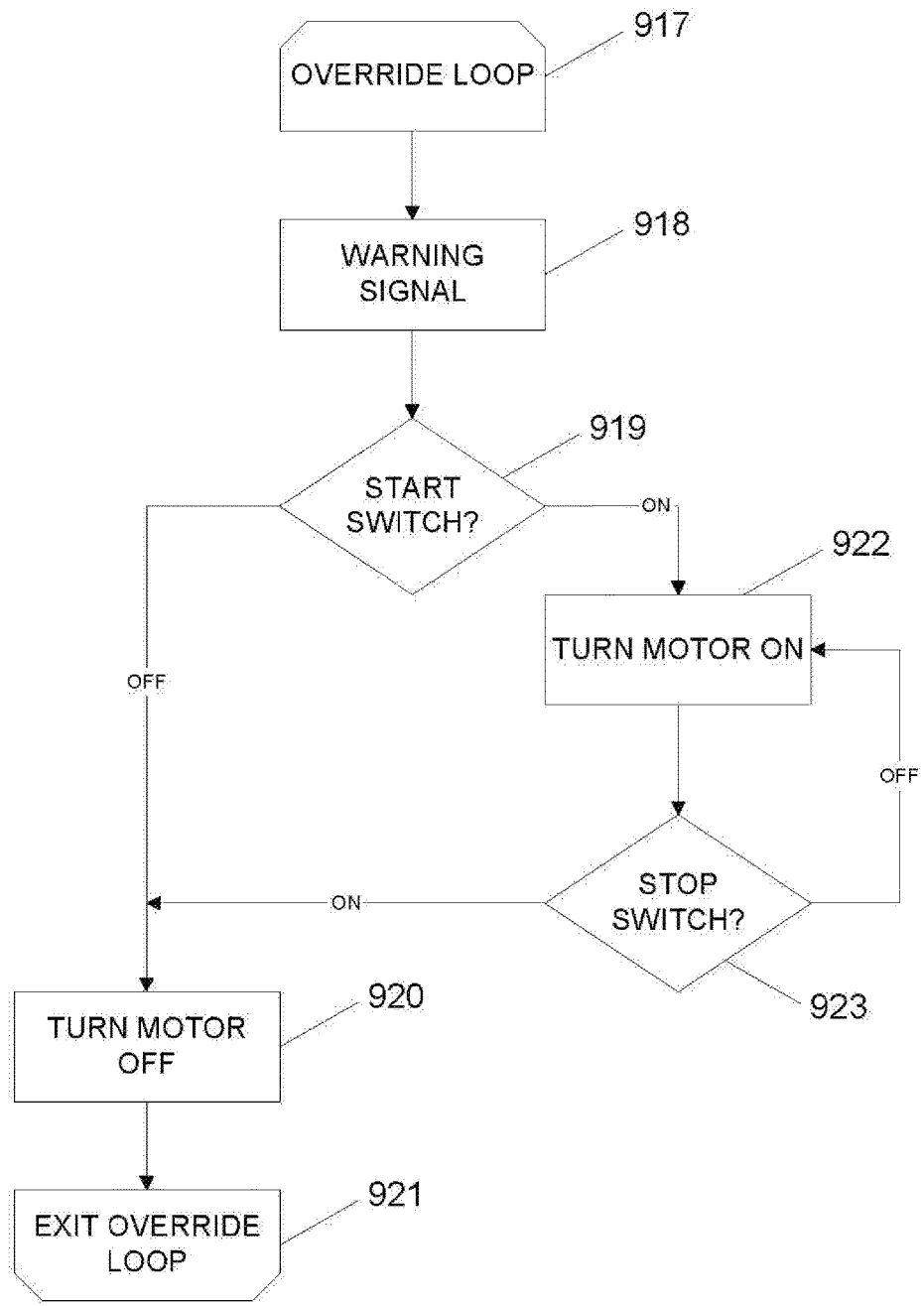

In view of the above considerations, an alternative embodiment of logic controller 50 may be configured to perform the self-test and detection logic shown schematically in FIGS. 119A-C. The main logic sequence, indicated generally at 910 in FIG. 119A, begins when machine 10 is first connected to power source 20, as indicated at 911. Logic controller 50 begins sequence 910 by performing a system integrity check, as indicated at 912. The system integrity check may include any one or more of a variety of checks which typically will vary depending on the particular type and configuration of machine 10. In the exemplary embodiment, system integrity check 912 includes testing the sufficiency of power source (here, standard line current) by any suitable means which are known to those of skill in the art. The system integrity check may also include driving the detection signal onto charge plate 44 and attempting to detect the signal at charge plate 46. Failure to detect the detection signal at charge plate 46 may indicate a number of problems such as an electronic failure in detection subsystem 22, a mis-positioned or grounded charge plate, grounded blade, etc. Exemplary system integrity check 912 also includes a pawl-to-blade spacing test to ensure that pawl 60 is properly positioned adjacent blade 40 so that the pawl will engage and stop the blade if released. Exemplary mechanisms for detecting correct blade-to-pawl spacing are described in more detail below. If any of the tests performed during system integrity check 912 is negative, logic controller turns motor assembly 16 off (if on), as indicated at 913, and outputs an error signal to the user, as indicated at 914. Once the user corrects the error and resets the logic controller (e.g., by disconnecting and then reconnecting the power to machine 101 the system integrity check is repeated.

If system integrity check 912 is successful, logic controller 50 proceeds to check fusible member 70 as well as the stored charge in firing subsystem 76, as indicated at 915. If either the fusible member test or the stored charge test is negative, the logic controller turns off the motor assembly, indicated at 913, and then outputs an error signal, indicated at 914. It may be desirable to repeat step 915 one or more times, or provide a delay between steps 912 and 915 to ensure that firing subsystem 76 has sufficient time to build up the electrical charge.

If both the fusible member and firing subsystem tests are successful, the logic controller then proceeds to one of two operational loops depending on whether the user-operable override switch has been activated, as indicated at 916. It will be appreciated that testing for a user override signal after performing the fusible member/charge storage test prevents a user from overriding safety system 18 unless the safety system is functional. Thus, for example, if a contact detection occurs and the brake is triggered, the user cannot proceed to operate the system until the fusible member, and/or pawl, and/or firing subsystem, etc., is replaced (typically by replacing cartridge 80). Alternatively, step 915 may be eliminated from the main operational loop. This would allow machine 10 to be operated regardless of whether safety system 18 was completely functional by engaging the override.

In any event, if the override has been actuated, logic controller 50 proceeds to operate in an override loop, as indicated at 917 and detailed in FIG. 119B. Typically, logic controller 50 first outputs a warning signal, as indicated at 918 and described above. Next, at step 919, the logic controller checks the status of START switch 48, which is operable by a user to turn on motor assembly 16. As described above, the logic controller may be configured to read START switch 48 as being "on" only if it is actuated within a predetermined period after the override is enabled. If the START switch is "off," logic controller 50 turns off the motor assembly (if on), as indicated at 920, and exits the override loop as indicated at 921. As shown in FIG. 119A, the logic controller returns to the system integrity check at the end of the override loop. Thus, the logic controller will continue to perform the system integrity check and the fusible member/stored charge tests until the START switch is actuated. This ensures that if a user engages the override and then delays actuating the START switch, the system will not turn on the motor assembly if a failure occurs between the time the override is enabled and the time the START switch is actuated.

If, at step 919, the START switch is on, logic controller proceeds to turn on motor assembly 16, as indicated at 922. The motor assembly remains on until STOP switch 48 is actuated by the user, as indicated at 923. Once the STOP switch is actuated, logic controller 50 turns off the motor assembly, as indicated at 920, and exits the override loop at 921. As mentioned above, the logic controller returns to step 912 after exiting the override loop.

If, at step 916, the override has not been engaged by the user, logic controller 50 proceeds to the detection loop 925, which is shown in detail in FIG. 119C. In the exemplary embodiment, detection loop 925 is depicted with two logic paths which are executed simultaneously. In a first path 926 the logic controller monitors detection subsystem 22, while in a second path 927 the logic controller continually rechecks the fusible member and stored charge in firing subsystem 76. This dual-path operation ensures that machine 10 will be shut down if a failure occurs while the blade is in motion. It will be appreciated by those of skill in the art that the dual-path operation may be implemented in a variety of ways including the use of interrupts, state machines, etc. Alternatively, the two paths may be implemented in a single sequential loop. However, since testing of the stored charge consumes several milliseconds or even several seconds in some embodiments, it is typically desirable, in those embodiments, to execute both paths simultaneously so that several milliseconds or more do not pass between successive contact detection measurements.

Path 927 includes testing fusible member 70 and the charge stored by firing subsystem 76, as indicated at 928. This test is continuously repeated unless and until either the fusible member test or the stored charge test fails, at which point logic controller 50 turns the motor assembly off, as indicated at 929, and outputs an error message, as indicated at 930. The logic controller also stops executing test 928 when it exits the detection loop or when an error in path 926 occurs, as described below. The tests of fusible member 70 and firing subsystem 76 at step 928 may be the same as, or different than, the tests that are used in the main loop at step 915. In any event, the logic controller must be reset from step 930, as described above.

Path 926 is the contact detection path and includes testing for excessive impedance loading on the blade, as indicated at 931. Step 931 ensures that power will not be supplied to the motor assembly if the capacitive load on the blade is so high that the detection subsystem might not be able to detect a contact between the blade and the user. This might occur for a variety of reasons. For example, if the blade is cutting highly dielectric materials (e.g., green wood), the capacitive load on the blade will increase. This issue is described in more detail in Section 1 above.

As another example, the user might accidentally actuate the START switch while in contact with the blade. Since some exemplary detection subsystems rely on a sudden change (rather than an absolute level) in the signal detected at charge plate 46, step 931 ensures that the safety system will not allow the blade to begin rotating if the user is touching the blade when the START switch is actuated. In this embodiment, the logic controller is configured to set the value for excessive capacitive loading at approximately at least that amount of loading caused when a user contacts the blade. However, it will be appreciated that logic controller 50 may be configured to recognize any desired amount of capacitive loading as being excessive.

If the capacitive load on the blade is too high, logic controller 50 outputs an error signal, at 932, and turns off motor assembly 16 (if on), as indicated at step 933. The logic controller then exits the detection loop, at 934, and returns to system integrity check 912 in the main operational loop shown in FIG. 119A. It will be appreciated that safety system 18 will not be enabled during the several seconds it takes the blade to spin down. This is because the capacitive loading is too high to accurately detect contact with the user, and is likely to trigger even though no contact has occurred. In alternative embodiments, the logic controller may continue to monitor for contact detection while the blade is rotating and actuate the firing system if contact is detected. Alternatively, the logic controller may be configured to actuate the firing system if the loading becomes too high.

Once the logic controller returns to the main loop after detecting a high capacitive loading error, the user may nevertheless operate machine 10 by engaging the override. If the user does not actuate the override, safety system 18 will not supply power to motor assembly 16 until the capacitive loading problem is corrected.

If, at step 931, the capacitive loading on the blade is within defined limits, the logic controller proceeds to test the contact detection signal from detection subsystem 22, as indicated at 935. If contact is detected, the logic controller determines whether the blade is rotating, as indicated at 936. If the blade is rotating, the logic controller actuates the firing subsystem, at 937, turns off motor assembly 16, at 929, and outputs an error, at 930. The logic controller must then be reset as described above.

However, if the blade is not rotating at step 936, then the logic controller outputs an error signal, at step 932, turns off the motor assembly (if on), at 933, and exits the detection loop, at 934. Thus, if a user touches the blade when it is not rotating, the safety system will detect the contact but will not actuate the firing subsystem. This allows a user to change or adjust the blade without actuating the brake. However, the user would typically remove power from machine 10 before adjusting or replacing the blade, in which case, neither safety system 18 nor motor assembly 16 would be operable.

If no contact is detected at step 935, logic controller 50 checks the status of STOP switch 48, as indicated at 938. If the STOP switch is actuated, the logic controller turns off the motor assembly (if on), as indicated at 939, and checks for blade rotation, as indicated at 940. If the blade is rotating, the logic controller loops back to step 931 so that the contact detection is active as long as the blade continues to rotate. Thus, if a user actuates the STOP switch and then contacts the blade before it spins down, safety system 18 will react to stop the blade. Once the blade ceases to rotate, the logic controller exits the detection loop, as indicated at 934.

If the STOP switch has not been actuated at step 938, the logic controller checks the status of START switch 48, as indicated at 941. If the START switch has been actuated, the logic controller turns the motor assembly on (if off), and loops back to repeat the contact detection, as indicated at 942. If the START switch has not been actuated, the logic controller turns off the motor assembly (if on), as indicated at 939, and checks for blade rotation, at 940. The logic controller continues to execute the detection loop until the blade stops, at which point the logic controller exits the detection loop, as indicated at 934. Thus, the logic controller is configured to continuously monitor for contact detection whenever the blade is rotating and the user has not engaged the override.

Those of skill in the art will appreciate that control subsystem 26 and logic controller 50 may be implemented using many different components and many different configurations. Therefore, while two exemplary implementations are described below, it should be understood that any other suitable implementation may be used.

Figure 120:
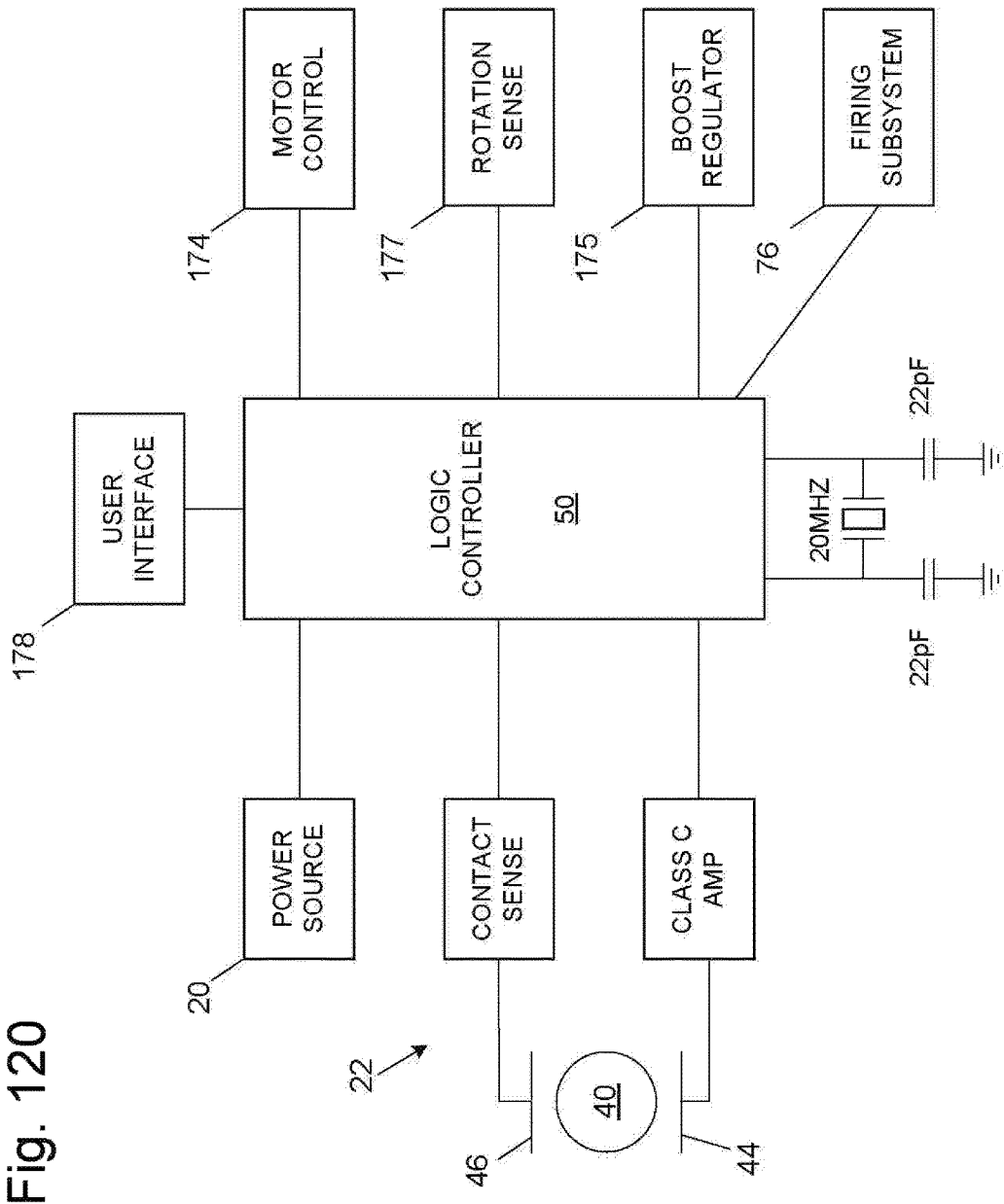
Figure 121:
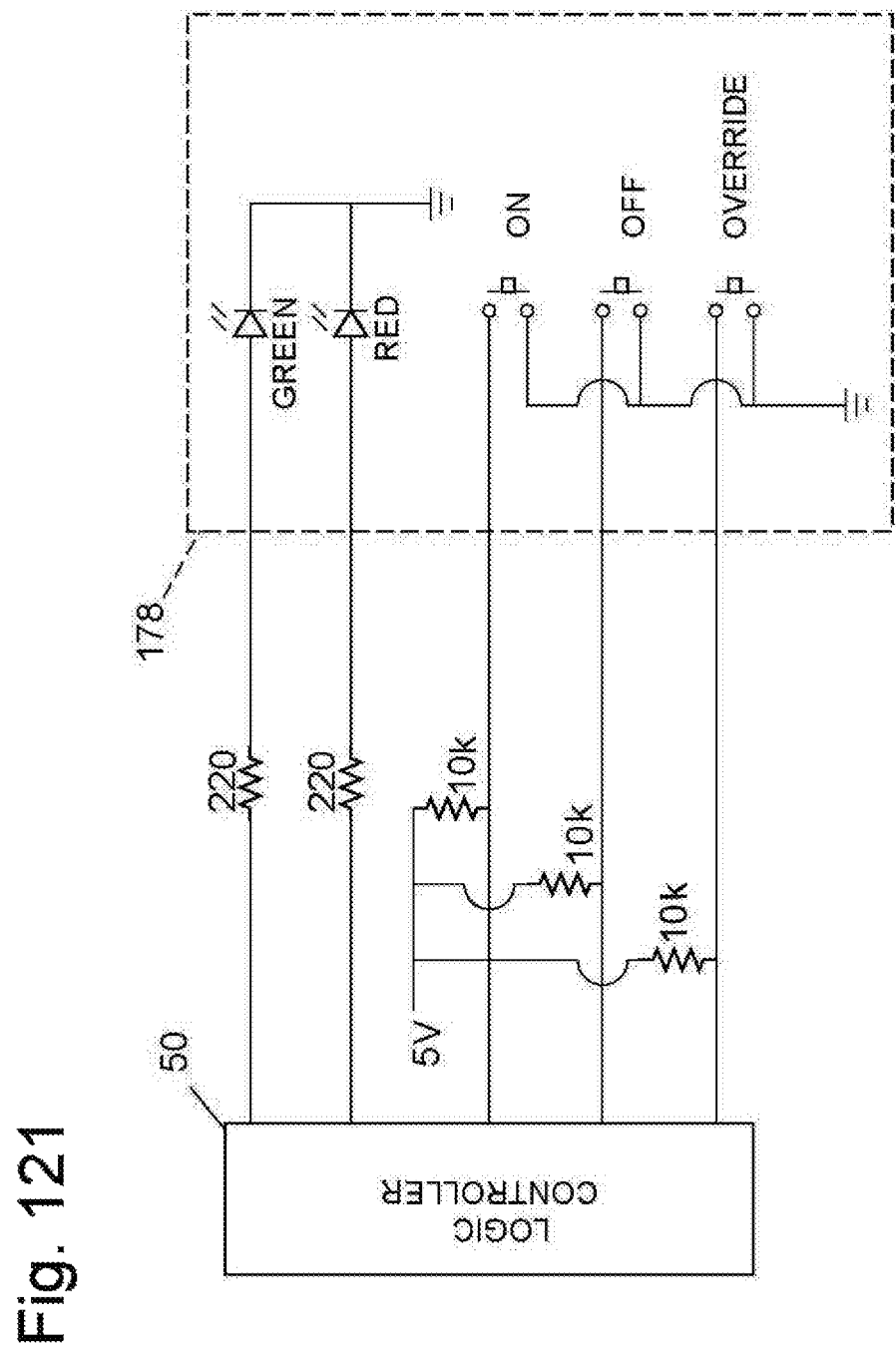

A first exemplary implementation is illustrated schematically in FIG. 120. Logic controller 50 takes the form of a PIC16C63A-20/SO controller available from Microchip Technology, Inc., of Chandler, Ariz. The logic controller is coupled to power source 20, contact detection subsystem 22, and a user interface 178. The user interface may include any suitable mechanism adapted to display signals to a user and to allow a user to input signals to the logic controller. Examples of suitable user interface mechanisms which are known to those of skill in the art include lights, display screens, buzzers, sirens, switches, buttons, knobs, etc. In one exemplary embodiment depicted in FIG. 121, user interface 178 includes START, STOP, and OVERRIDE switches to allow the user to input control commands, and a pair of LED lights which indicate the system status. The LED lights may indicate system status in a variety of ways such as color, blinking, etc.

The logic controller is also connected to control motor assembly 16 via a suitable motor control circuit 174, such as is described in more detail in Section 1 above, and to firing subsystem 76. When the logic controller receives a signal from detection subsystem 22 that contact between the user and blade has occurred, the logic controller actuates firing subsystem 76 and stops motor assembly 16. The operation and testing sequences are implemented by software instructions stored within, and executable by, the logic controller. It will be appreciated that the software instructions may take a variety of forms.

The logic controller of the exemplary implementation depicted in FIG. 120 is configured to conduct a variety of self-tests before enabling power to motor control 174, as well as whenever the blade is moving. For example, the logic controller is configured to evaluate the line voltage supplied by power source 20, and to shut off the motor if the voltage drops below a minimum value sufficient to operate the safety system. The logic controller is also adapted to test the contact sense signal received from the detection subsystem to ensure the charge plates are correctly positioned, that the detection signal is properly coupled across the blade, and that the capacitive load on the blade is within defined limits. Further, the logic controller is also coupled to a blade rotation sense component 177. Examples of suitable mechanisms for detecting blade rotation are described below in Section 10.

In addition, logic controller 50 is also adapted to detect whether firing subsystem 76 has sufficient stored charge to melt fusible member 70. It will be appreciated that detection of sufficient stored charge in the firing subsystem may be carried out in a variety of ways depending on the configuration of the firing system. In each of the exemplary implementations described herein, firing subsystem 76 includes a single 390 μF firing capacitor 620 configured to discharge through fusible member 70 via a suitable SCR 621 connected to ground. Exemplary firing subsystems 76 are described in greater detail in Section 6 above.

Figure 122:
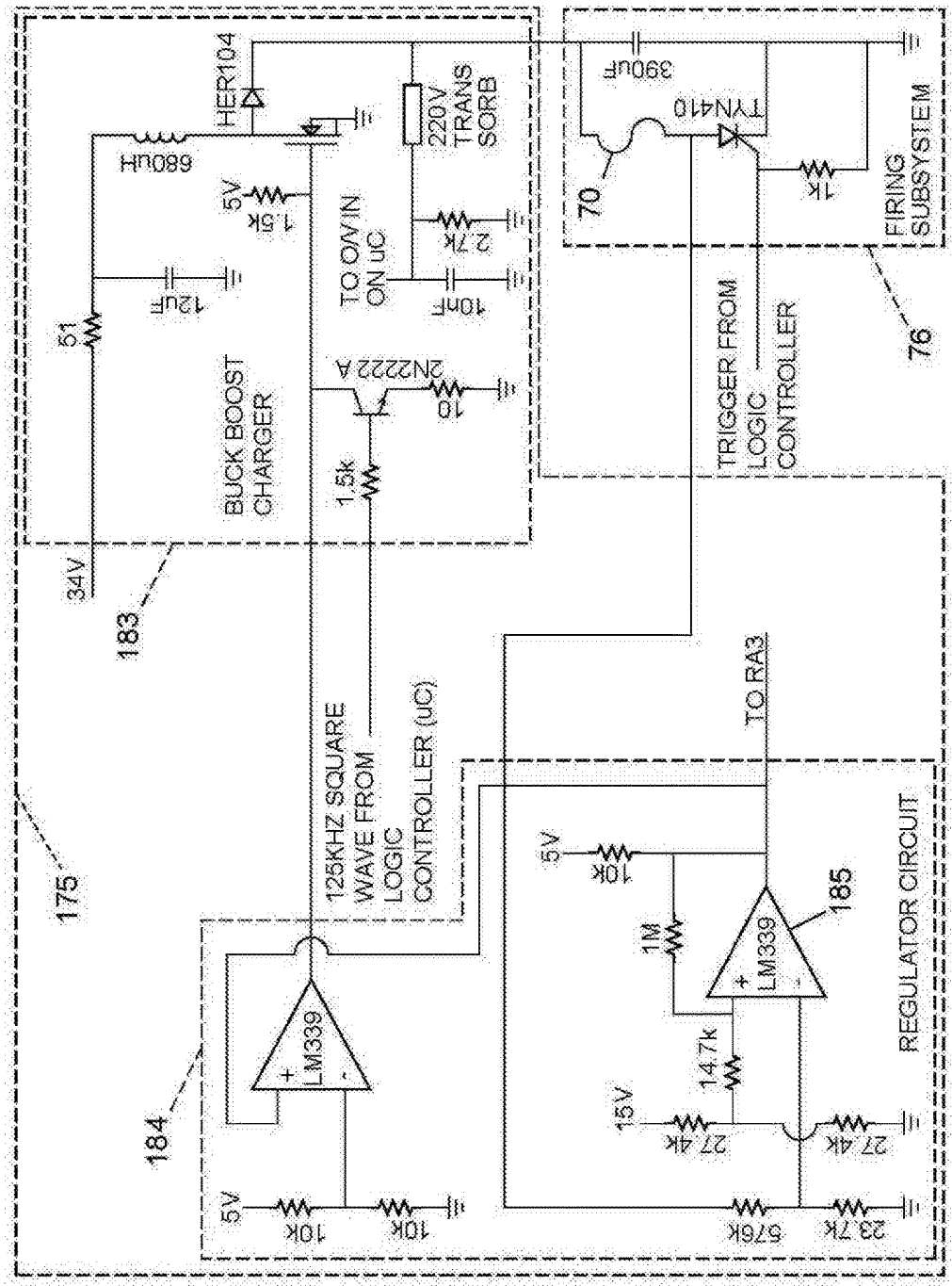

In the implementation depicted in FIG. 120, the firing capacitor is both charged and tested by a buck-boost regulator 175, which is shown in greater detail in FIG. 122. Buck-boost regulator 175 includes a buck-boost charger 183 that steps up an 32-volt supply input to 180 volts for charging the firing capacitor. Logic controller 50 provides a 125 khz input to control the buck-boost cycle of the charger. A regulator circuit 184 monitors the voltage on the firing capacitor and turns charger 183 on or off as necessary to maintain the charge near 180 volts. Regulator circuit 184 is constructed with a predetermined amount of hysteresis so that the charger will go on when the firing circuit voltage falls below 175 volts and turn off when the voltage reaches 180 volts, as set by the voltage divider inputs and feedback to comparator 185.

The output of comparator 185 is fed to logic controller 50. The logic controller monitors both the time required to charge and to discharge the firing capacitor based on the state of the output of comparator 185. Thus, the controller can verify that the firing capacitor is operating properly and storing adequate charge. If the firing capacitor cannot reach 180 volts quickly enough or discharges too rapidly, the logic controller determines that the firing capacitor or charging system has failed and takes appropriate action based on its programming.

It should be noted that regulator circuit 184 measures the voltage across the firing capacitor through fusible member 70. As a result, the regulator circuit is also testing the integrity of the fusible member since a missing or failed fusible member would prevent the regulator circuit from detecting the voltage on the firing capacitor. While testing both the firing capacitor charge and fusible member with a single mechanism or test provides obvious savings of both processor cycle time and component costs, the fusible member may alternatively be tested separately from the firing capacitor charge.

Figure 123:
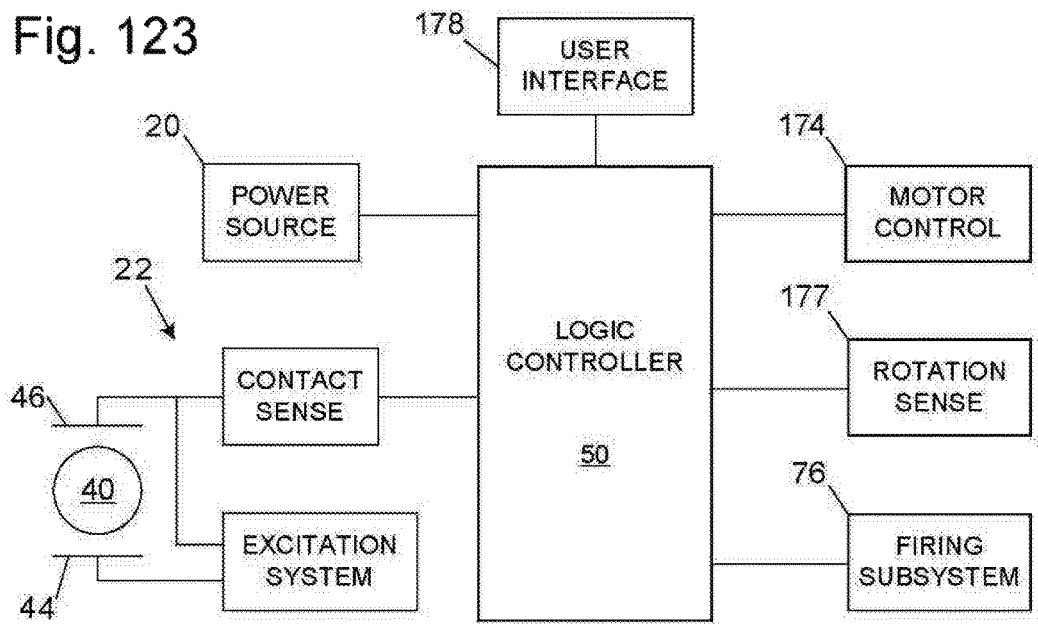

A second exemplary implementation of logic controller 50 is illustrated schematically in FIG. 123. Logic controller 50 is implemented by a 87C752 controller available from Philips Semiconductor of Sunnyvale, Calif. As in the first exemplary implementation described above, the logic controller of the second implementation is coupled to power source 20, contact detection subsystem 22, firing subsystem 76, user interface 178, motor control 174, and blade rotation sense 177. Suitable examples of power source 20, contact detection subsystem 22, and motor control 174 are described in more detail in Section 1 above. Exemplary firing subsystems 76 are described in Section 6 above. Exemplary circuitry and mechanisms for sensing blade rotations are described in Section 10 below.

Figure 124:
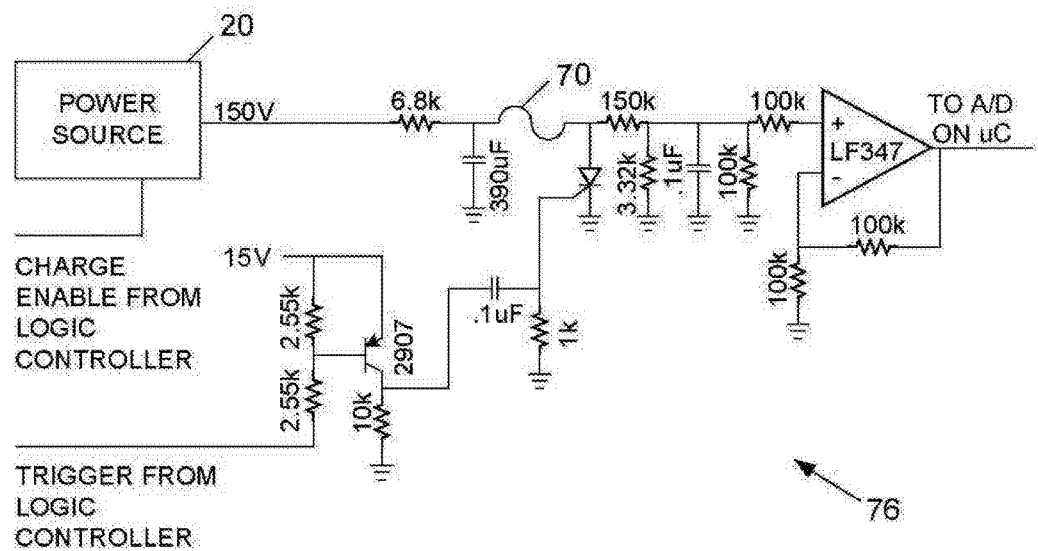

As shown in FIG. 124, the firing capacitor charging circuit for the second implementation is regulated by an enable line from logic controller 50. By deactivating the charging circuit, the logic controller can monitor the capacitor voltage through an output to an analog-to-digital converter (A/D) line on the logic controller. When the capacitor is not being charged, it will normally discharge at a relatively known rate through the various paths to ground. By monitoring the discharge rate, the controller can insure that the capacitance of the capacitor is sufficient to burn the fusible member. Optionally, the logic controller may be configured to measure the voltage on the firing capacitor at a plurality of discharge intervals to evaluate the integrity of the capacitor. In one embodiment, the logic controller measures the capacitor voltage at three defined intervals during a discharge cycle, which should correspond to 3%, 5% and 7% of the full charge voltage. The logic controller may be configured to interpret a low voltage at any of the discharge intervals as a failure, or may require a low voltage at two or more discharge intervals to indicate a failure.

As with the first exemplary implementation described above, the logic controller is configured to test the firing capacitor through fusible member 70, thereby simultaneously testing the fusible member. Alternatively or additionally, the logic controller may test the fusible member independently of the capacitor by monitoring the capacitor voltage during charging.

As mentioned above, logic controller 50 may also be configured to monitor the pawl-to-blade spacing. It is well known in the art that many cutting tools such as saw blades do not have precisely uniform dimensions. As a result, when a new blade is installed on a saw, the pawl may no longer be correctly spaced from the blade. An incorrectly positioned pawl may slow the stopping speed of the pawl or prevent the pawl from stopping the blade. Therefore, to ensure the blade is stopped with uniform braking speed, it may be necessary to adjust the position of the pawl whenever a blade is replaced. Exemplary mechanisms and methods for automatically positioning the pawl are described in Section 8 above. However, regardless of whether the pawl is automatically positioned, configuring logic controller 50 to detect incorrect blade-to-pawl spacing provides an additional level of assurance that a user is protected against accidental contact with the blade.

Figure 125:
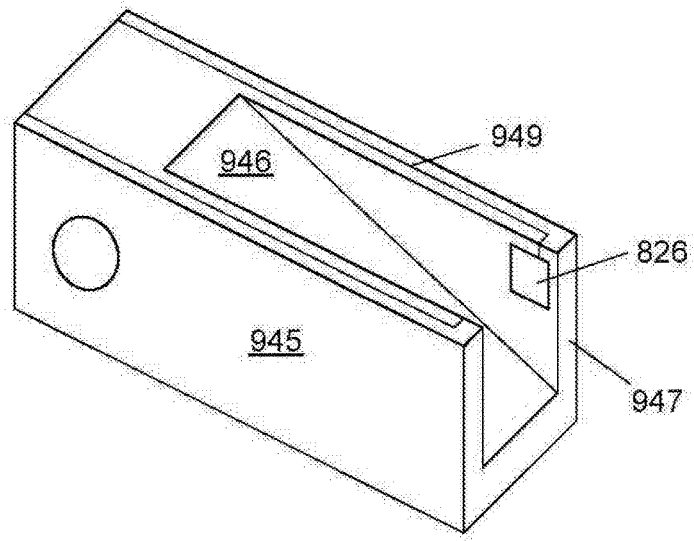

It will be appreciated that there are many ways in which incorrect spacing between blade 40 and pawl 60 may be detected. As one example, FIG. 125 illustrates a pawl 945 having a capacitive system for detecting correct pawl spacing. Similar to pawl 40 shown in FIG. 2, pawl 945 may include a portion 946 that is beveled or otherwise shaped to quickly and completely engage the teeth of a cutting tool. In addition, pawl 945 includes a pair of generally parallel, spaced-apart arms 947 which extend beyond portion 946.

Arms 947 are disposed to extend on either side of the blade, without touching the blade, when the pawl is in place adjacent the blade. Each arm includes a capacitor plate 826 disposed on the inside surface of the arm adjacent the blade. Conductive leads 949 run from each capacitor plate 826 to suitable blade detector circuitry (not shown).

Capacitor plates 826 are positioned on arms 947 such that, when the pawl spacing is within a desired range, the blade extends between the two capacitor plates. It will be appreciated that the capacitance across plates 826 will vary depending on whether the blade is positioned between the plates. The blade detector circuitry is configured to drive an electrical signal through conductive leads 949 and detect changes in the capacitance across the plates.

Figure 126:
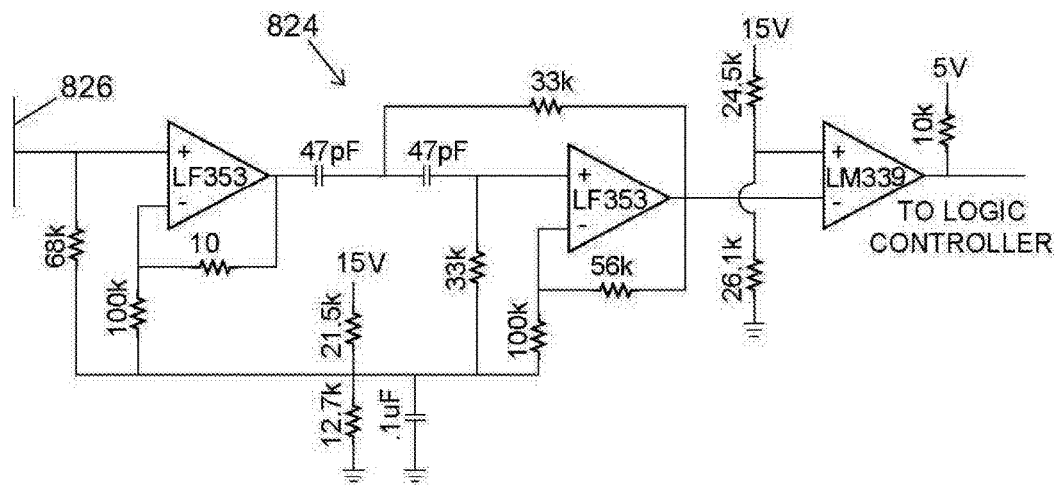

Suitable circuitry that may be used with pawl 945 is well known to those of skill in the art. One exemplary pawl-to-blade spacing detection circuit is indicated generally at 824 in FIG. 126. As described above in Sections 1 and 2, one exemplary contact detection system suitable for use with the present invention applies an electrical signal to the blade via a drive plate (not shown). This signal can be picked up by either or both of plates 826 and monitored to insure that it has an amplitude in a predetermined range. In particular, the amplitude detected by plates 826 will fall off rapidly with distance from the blade. Therefore, by monitoring the detected amplitude, proper spacing can be verified. If the proper signal is not detected, circuit 824 conveys an error signal to logic controller 50, which prevents operation of machine 10 until proper pawl-to-blade spacing is detected. Other examples include circuits similar to the exemplary contact detection circuits described in Section 1.

Capacitor plates 826 can optionally be shaped to detect when the pawl is too close to the blade as well as not close enough. Alternatively, two pairs of capacitor plates may be positioned on the pawl: one pair to detect if the pawl is too close to the blade, and the other pair to detect if the pawl is too far from the blade. In any event, the detector circuitry is configured to transmit an error signal to logic controller 50, which then takes appropriate action.

While one exemplary automatic pawl spacing detection system has been described above, it will be appreciated that there are many possible variations. For example, both capacitor plates may be positioned on the same side of the blade rather than on opposite sides. The capacitor plates and/or blade detection circuitry may be separate from the pawl. In the latter case, for example, the capacitor plates and detection circuitry may be mounted on a separate electronics board associated with the pawl. Alternatively, the capacitor plates may be replaced with one or more light-emitting diodes and detectors such that, when the pawl is properly positioned, the blade obstructs the optical path between the diodes and detectors. Other methods of detecting the proximity of the blade to the pawl are also possible. As a further option, capacitor plates 826 may function as charge plates 44, 46 as well as pawl-spacing detectors. In addition, a detection plate may be mounted on beveled face 946 of the pawl. This plate can be used to detect the drive input signal used for contact detection. The amplitude of the signal detected at the plate will be inversely proportional to the space between the plate and the teeth of the blade. If this signal does not have an amplitude over a given threshold, the system would interpret this as indicating that the pawl face is not close enough to the blade.

In embodiments where portions of safety system 18 are mounted in a replaceable cartridge 80, the logic controller may also be configured to detect whether the cartridge is properly connected to the remainder of the safety system. One exemplary method of testing for an operable connection with the cartridge is by testing a component mounted in the cartridge (e.g., the fusible link, charge stored by firing system, etc.). Alternatively, a cable (not shown) connecting cartridge 80 to logic controller 50 may include a separate signal line which is grounded or otherwise biased when the cartridge is connected. In addition to detecting an operable connection to the cartridge, the correct blade-to-pawl spacing may be detected by measuring the blade-to-cartridge spacing. For example, capacitor plates 826 may be placed on cartridge housing 82 rather than on the pawl itself. Furthermore, failure of the blade-to-cartridge spacing test could also be used to detect an inoperable connection to the cartridge.

The control systems, methods and related machines may be described as set forth in the following numbered paragraphs. These paragraphs are intended as illustrative, and are not intended to limit the disclosure or claims in any way. Changes and modifications may be made to the following descriptions without departing from the scope of the disclosure.

9.1 A woodworking machine comprising:
a working portion;
a detection system adapted to detect a dangerous condition between a person and the working portion;
a reaction system associated with the detection system to cause a predetermined action to take place upon detection of the dangerous condition; and
a control system adapted to control the operability of one or more of the working portion, the detection system and the reaction system.

9.1.1 The woodworking machine of paragraph 9.1 where the control system is adapted to control the operability of one or more of the working portion, the detection system and the reaction system by processing data received from one or more of the working portion, the detection system and the reaction system.

9.1.2 The woodworking machine of paragraph 9.1 where the control system is adapted to perform self tests on the machine.

9.1.3 The woodworking machine of paragraph 9.1 where the control system is adapted to determine whether the detection system is functioning.

9.1.4 The woodworking machine of paragraph 9.1 where the control system is adapted to determine whether the reaction system is functioning.

9.1.5 The woodworking machine of paragraph 9.1 where the reaction system includes a capacitor, and where the control system is adapted to perform a self test to determine whether the capacitor is functioning.

9.1.6 The woodworking machine of paragraph 9.1 where the reaction system includes a fusible member, and where the control system is adapted to perform a self test to determine whether the fusible member is in place.

9.1.7 The woodworking machine of paragraph 9.1 where the detection system imparts an electric signal to the working portion, and where the control system is adapted to effectively monitor that electric signal.

9.1.8 The woodworking machine of paragraph 9.1 where the control system is adapted to prevent inadvertent triggering of the reaction system.

9.1.9 The woodworking machine of paragraph 9.1 where the control system is adapted to control display devices relating to the functioning of the machine.

9.1.10 The woodworking machine of paragraph 9.1 where the working portion is driven by a motor, and where the control system is adapted to control the motor.

9.1.11 The woodworking machine of paragraph 9.1 where the working portion includes a blade, where the reaction system includes a brake pawl positioned adjacent the blade and adapted to contact the blade, and where the control system is adapted to monitor the position of the brake pawl relative to the blade.

9.1.12 The woodworking machine of paragraph 9.1 further comprising a frame supporting the working portion, where the working portion includes an electrically conductive cutter electrically isolated from the frame, where the detection system imparts an electrical signal on the electrically conductive cutter, and where the control system is adapted to monitor whether the electrical signal has been imparted to the electrically conductive cutter.

9.1.13 The woodworking machine of paragraph 9.1 where the reaction system includes a firing subsystem to trigger the predetermined action, where the firing subsystem includes a fusible member, and where the control system checks whether the fusible member is in place.

9.1.14 The woodworking machine of paragraph 9.1 where the reaction system includes a firing subsystem to trigger the predetermined action, where the firing subsystem is adapted to hold a charge, and where the control system checks whether the firing subsystem is holding the charge.

9.1.15 The woodworking machine of paragraph 9.1 where the control system repeatedly checks the operability of one or more of the working portion, the detection system and the reaction system while the machine is running.

9.1.16 The woodworking machine of paragraph 9.1 where the control system includes a microprocessor.

9.1.17 The woodworking machine of paragraph 9.1 where the control system allows a user to bypass the reaction system.

9.1.18 The woodworking machine of paragraph 9.1 further comprising a frame supporting the working portion, where the working portion includes an electrically conductive cutter electrically isolated from the frame, where the detection system imparts an electrical signal on the electrically conductive cutter, and where the control system is adapted to monitor whether the imparted electrical signal produces a detection signal within a predetermined range.

9.2 A saw comprising:
a blade;
a detection system adapted to detect a dangerous condition between a person and the blade;
a reaction system associated with the detection system to cause a predetermined action to take place upon detection of the dangerous condition; and
a control system adapted to monitor and control the functioning of the detection and reaction systems.

9.3 A method of controlling a saw, where the saw includes a blade driven by a motor, a detection system adapted to detect a dangerous condition between a person and the blade, and a reaction system associated with the detection system to cause a predetermined action to take place upon detection of the dangerous condition, the method comprising:
checking to see whether the detection system is functioning;
checking to see whether the reaction system is functioning; and
powering the motor to drive the blade if the detection and reaction systems are functioning.

Section 10: Motion Detection

As mentioned above, safety system 18 may include a sensor or sensor assembly for detecting motion of the blade or cutting tool. The sensor assembly typically is coupled to send a signal to logic controller 50 indicating whether the blade is in motion. The logic controller may be configured to respond differently to the detection of a dangerous condition based on whether the blade is moving. For example, it is often necessary for a user of machine 10 to touch blade 40 when preparing the machine for use, and when installing or removing the blade. Usually, the user would disconnect all power from machine 10 while performing such operations. However, in the event that the user neglects to disconnect the machine from power source 20 before touching the blade, logic controller 50 would receive a contact detection signal from detection subsystem 22. If safety system 18 includes a blade motion sensor, then logic controller 50 may be configured not to actuate firing subsystem 76 when the blade is not moving. Instead, the logic controller may be configured to take one or more other actions such as disabling motor assembly 16, sounding an alarm, displaying an error, etc. Alternatively, the logic controller may be configured to take no action if contact is detected while the blade is not moving.

In addition to detecting whether the blade is moving, safety system 18 may also be configured to determine the speed at which the blade is moving. This allows the logic controller to distinguish between rapid blade movement which could cause injury to the user, and slow blade movement which generally would not cause injury to the user. Thus, for example, a user could move the blade by hand without actuating firing subsystem 76. In some embodiments, the blade motion sensor may be configured to determine relative blade speed. In alternative embodiments, logic controller 50 may be configured to analyze the signal from the blade motion sensor to determine relative blade speed.

It will be appreciated that the speed at which a blade is considered likely to cause injury will vary depending on the type of machine 10 and blade 40. For example, a 14-inch carbide tooth blade on a table saw will cause serious injury at a lower speed than a 5⅜-inch plywood blade on a cordless trim saw. Thus, an embodiment of safety system 18 for use on the table saw may be configured to actuate the firing subsystem only at blade speeds above approximately 10, 25, 60, or 90 rpm, while an alternative embodiment of safety system 18 for use on the trim saw may be configured to actuate the firing subsystem only at blade speeds above approximately 40, 100, or 240 rpm.

Alternatively or additionally, the logic controller may be configured to interpret blade motion as being dangerous only when detected during or soon after motor assembly 16 was in operation. In other words, the blade motion detection would only be active while the blade was being moved by the motor assembly and during a relatively brief period afterward while the blade was coasting to a stop. Any blade motion detected at other times would be ignored.

Safety system 18 may include any of a wide variety of sensor assemblies to detect blade movement. Furthermore, each sensor assembly may be adapted as necessary depending on the particular type of blade 40 and/or the configuration of machine 10. While several exemplary sensor assemblies are described herein, it will be understood that a variety of other methods and mechanisms may be suitable for automatically detecting the motion of a blade.

Figure 127:
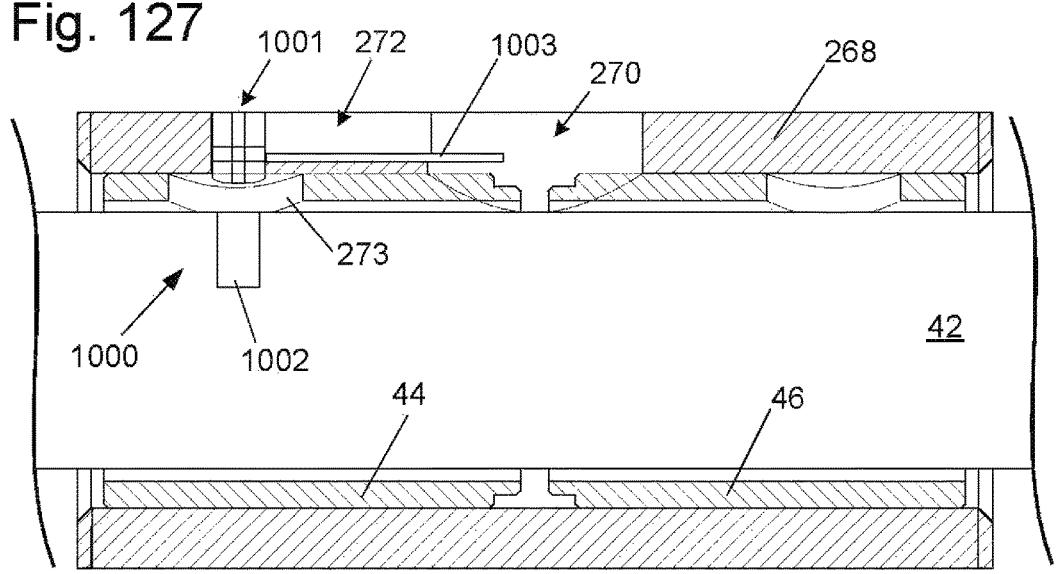

One exemplary embodiment of safety system 18 includes a magnetic sensor assembly 1000 configured to detect movement of the blade. It will be appreciated that the blade movement may be detected by monitoring the blade or any other portion of the safety system that moves with the blade, including the arbor, bearings, motor assembly, arbor pulley, etc. In the exemplary implementation depicted in FIG. 127, magnetic sensor assembly 1000 includes a Hall effect sensor 1001 and one or more magnets 1002. A coil could also be used to detect magnetic field fluctuations from rotation. The magnets are mounted on arbor 42. Sensor 1001 is mounted and configured to detect blade motion by detecting the movement of the magnets on the arbor. Sensor 1001 may be any suitable Hall effect sensor such as, for example, the sensor available from Micronas Intermetall of San Jose, Calif., under the part no. HAL114.

Hall effect sensor 1001 may be mounted adjacent the arbor by any suitable method. In the exemplary implementation, the sensor is mounted in a recessed region 272 of an insulating tube 268. The insulating tube also supports charge plates 44 and 46, as is described in more detail above in Section 2. The recessed region is disposed over a hole 273 in charge plate 44. Alternatively the recessed region may be disposed over a hole 273 in charge plate 46. In any event, magnet 1002 is disposed on arbor 42 to pass beneath or adjacent hole 273 as the arbor rotates within the insulating tube. Hole 273 allows sensor 1001 to detect the field created by magnet 1002 as it passes. Sensor 1001 includes one or more connector leads 1003 connectable to receive power from, and transmit signals to, logic controller 50.

Magnets 1002 may be mounted on the arbor in any suitable fashion. Typically, the magnets are mounted so as not to extend above the surface of the arbor. For example, the magnets may be press-fit and/or glued in a recess formed on the arbor. Alternatively, one or more of the magnets may be mounted to extend above the surface of the arbor. The size and number of magnets 1002 may be varied to control the signal produced by sensor 1001. In alternative embodiments, magnets 1002 may be mounted at other locations such as adjacent an end of arbor 42, or on blade 40, etc.

Figure 128:
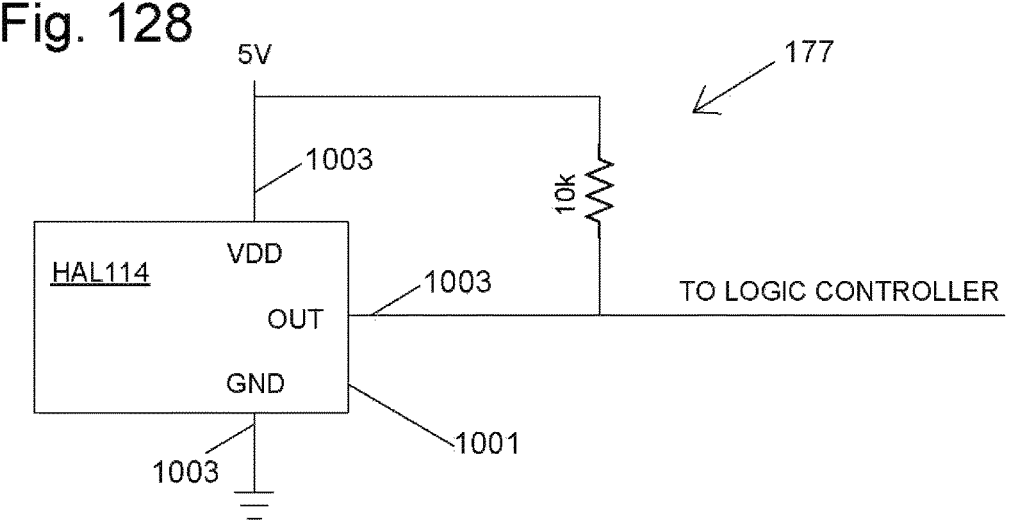

Sensor 1001 may be connected to send signals to logic controller 50 via any suitable circuitry. For example, FIG. 128 illustrates one exemplary rotation sense circuit 177 adapted to couple the signals from sensor 1001 to logic controller 50. Those of skill in the art will appreciate that circuit 177 may be modified as needed for a particular application.

Another example of a suitable method for detecting blade motion is through electromagnetic field (EMF) measurements. As is known to those of skill in the art, when power to an electric motor is shut off, the motor will produce EMF pulses on the input power cables as the motor spins down. Thus, where blade 40 is driven by an electric motor assembly 16, the blade may be assumed to be in motion whenever an EMF pulse is detected on the power supply cables, as well as whenever power is being supplied to the motor assembly.

Figure 129:
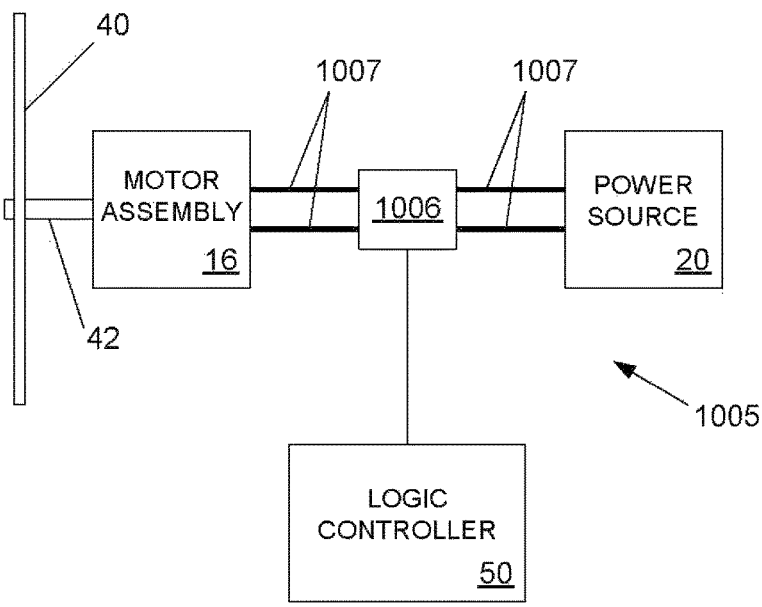

Thus, in another exemplary embodiment depicted in FIG. 129, safety system 18 includes an EMF sensor assembly 1005 configured to detect motion of blade. Sensor assembly 1005 includes an EMF detection circuit 1006 disposed in the power supply path between motor assembly 16 and power source 20. Circuit 1006 is adapted to monitor power cables 1007 which extend between the power source and the motor assembly, and to detect the presence of EMF pulses on the cables. Alternatively, circuit 1006 may be disposed at any other location suitable for detecting EMF pulses from motor assembly 16. Circuit 1006 may be any circuit or mechanism adapted to detect EMF pulses, such as are known to those of skill in the art. Circuit 1006 is also coupled to logic controller 50, and adapted to convey a signal to the logic controller indicating the presence and/or absence of EMF pulses on cables 1007. Optionally, circuit 1006 and/or logic controller 50 may be adapted to analyze the detected EMF emissions, and evaluate the speed of blade 40. In such case, the logic controller may be configured not to actuate firing subsystem 76 when the speed of the blade is not likely to cause serious injury to the user.

In another exemplary embodiment, safety system 18 includes an optical sensor assembly adapted to optically detect movement of blade 40. Safety system 18 may be configured to optically detect blade motion in a variety of ways. For example, a rotary optical encoder may be coupled to the arbor to detect rotation of the arbor. Any rotary encoder may be used, such as those available from Omron Electronics Inc., of Schaumburg, Ill. Alternatively, other optical sensor assemblies may be used as described below.

Typically, the optical sensor assembly will be at least partially enclosed to prevent saw dust or other debris from interfering with the detection. One exemplary implementation of an optical sensor assembly is indicated generally at 1010 in FIG. 130. Sensor assembly 1010 includes an optical detector 1011 adapted to detect light from an optical source 1012. Alternatively, plural optical sources and/or plural optical detectors may be used. It will be appreciated that any of a variety of different optical sources may be used which are known to those of skill in the art, including an incandescent or fluorescent bulb, light emitting diode (LED), laser diode, etc. Similarly, any of a variety of different optical detectors may be used which are known to those of skill in the art, including a photodiode, phototransistor, etc.

In any event, the optical source is arranged so that the signal received at the optical detector when the blade is moving is different than the signal received when the blade is stationary. For example, the source and detector may be arranged so that a signal is received only when the blade is moving, or only when the blade is stationary. Alternatively, source 1012 and detector 1011 may be arranged so that the amount of emitted light that reaches the detector varies when the blade is in motion.

Figure 130:
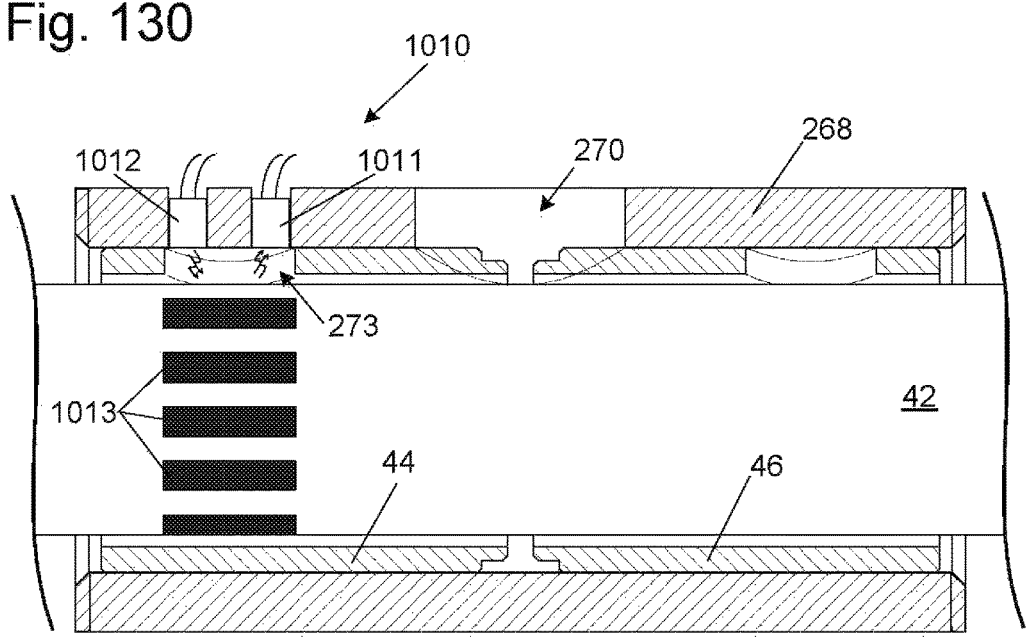

The implementation depicted in FIG. 130 uses this latter arrangement. Sensor assembly 1010 includes an LED 1012 mounted in insulating tube 268 to emit light through hole 273 in charge plate 44 or 46. The light reflects off arbor 42 and is detected by a photodiode 1011 which is also mounted in insulating tube 268 adjacent hole 273. The arbor includes one or more reduced-reflection regions 1013 adapted to reduce the amount of light reflected to photodiode 1011. Regions 1013 may be formed by coating the arbor with a light-absorbing coating, roughening the arbor to cause random scattering of the light, etc. In any event, the reduced reflecting regions create a varying signal at the photodiode when the arbor is rotating. In contrast, a constant signal is produced at the photodiode when the arbor is stationary.

The minimal clearance between arbor 42 and charge plates 44, 46 tends to maintain the space between the arbor and the photodiode/LED relatively free of debris which could block the signal. Alternatively, the insulating tube assembly may be sealed in a protective housing (not shown).

In another alternative implementation depicted in FIGS. 131 and 132, optical sensor assembly 1010 includes a barrier member 1014 mounted on the arbor and disposed between photodiode 1011 and LED 1012. Alternatively, the barrier member may be mounted on any other portion of cutting tool 14 or motor assembly 16 adapted to move with the blade. Barrier member 1014 includes one or more light-transmitting regions or holes 1015, which may take any desired shape or size. The photodiode and LED are mounted in a support member 1016 attached to an arbor block 250, and disposed on either side of barrier member 1014. The photodiode is aligned so that emitted light will pass through holes 1015. Likewise, the LED is aligned to detect the light which passes through the holes. Thus, as arbor 42 rotates, light from the LED is alternately blocked and transmitted by the barrier member, thereby creating a varying signal at the photodiode.

Photodiode 1011 and LED 1012 may be connected to any suitable driving circuitry such as are known to those of skill in the art. FIG. 133 shows one exemplary circuitry for producing an optical signal at LED 1012 and detecting the signal at photodiode 1011. The particular values of the circuit components and voltage supplies may be selected as desired for a specific application. In any event, the photodiode is coupled to transmit a signal to logic controller 50 to indicate whether blade 40 is moving.

In another exemplary embodiment, safety system 18 includes an electrical sensor assembly adapted to electrically detect movement of blade 40. There are numerous methods and mechanisms for electrically detecting blade movement. The particular method and/or mechanism selected will typically depend on the specific type and configuration of machine 10. For example, where charge plate 46 is configured to capacitively detect a signal induced in the blade, any incidental eccentricity in the blade or the blade rotation will cause the capacitance between the blade and charge plate 46 to vary as the blade rotates. As a result, charge plate 46 will detect a varying signal amplitude when the blade is rotating. Thus, a single sensor may be configured to detect both contact with the user and rotation of the blade. Preferably, the incidental variation is insufficient in magnitude and/or rate of change to trigger reaction subsystem 24.

Rather than rely on incidental eccentricities, safety system 18 may include an exemplary electrical sensor assembly adapted to detect a signal variation caused by a designed eccentricity or non-uniformity in the blade. Alternatively, the sensor assembly may be adapted to detect the signal from an eccentricity in some portion of cutting tool 14 that moves with the blade and is electrically coupled to the blade. One exemplary implementation of such a sensor assembly is indicated generally at 1020 in FIG. 134. Sensor assembly 1020 includes a detection electrode 1021 capacitively coupled to detect an electrical signal on arbor 42. Electrode 1021 may be mounted in any suitable fashion to provide electrical insulation from arbor 42 as well as the remainder of cutting tool 14 and machine 10. In the exemplary implementation, electrode 1021 is mounted in insulating tube 268 and arranged to extend to a point closely adjacent the arbor between charge plates 44 and 46. Sensor assembly 1020 also includes one or more eccentricities 1022 disposed on the arbor and substantially aligned with electrode 1021 so as to pass by the electrode as the arbor rotates.

It will be appreciated that eccentricities 1022 may be configured in any desired quantity, size, shape or form adapted to cause a variation in the capacitance between the arbor and the electrode as the arbor rotates. In the exemplary implementation, eccentricities 1022 take the form of beveled regions formed on the surface of arbor 42. Thus, the space between the electrode and the arbor is greater (and therefore the capacitance is less) when an eccentricity is positioned beneath the electrode than when an eccentricity is not positioned beneath the electrode. Alternatively, eccentricities 1022 may take other forms adapted to vary the capacitance between the arbor and electrode, including raised regions, dielectric pads, etc. In any event, if an electrical signal is induced in the arbor (e.g., by charge plate 44 of contact detection subsystem 22), then electrode 1021 will detect variations in that signal if the arbor is rotating. Conversely, the electrode will detect no variations in the signal if the arbor is stationary.

Turning attention now to FIG. 135, another exemplary implementation of electrical sensor assembly 1020 is shown in which electrode 1021 is disposed adjacent the teeth 1023 of blade 40. Electrode 1021 may be mounted on arbor block 250 or any other suitable portion of machine 10. Additionally, the electrode may be positioned at the side of the blade (as shown in FIG. 134) or at the perimeter of the blade facing in toward the arbor. The size, shape and position of the electrode may vary depending on the position and size of teeth 1023. In any event, as teeth 1023 pass by electrode 1021, the capacitance between the blade and the electrode varies, thereby by varying the amplitude of the signal detected by the electrode. Alternatively, a plurality of electrodes may be positioned at various points adjacent the teeth so that blade motion would be detected by modulations in the relative signal amplitudes at the electrodes. Such an alternative detection mechanism may also be used with other implementations of sensor assembly 1020.

While a few exemplary magnetic, EMF, optical and electrical sensor assemblies have been described for detecting blade motion, it will be appreciated that many modifications and variations to such sensor assemblies are possible. The invention provides effective and reliable means for discriminating between conditions which are, and are not, likely to cause injury to a user of power machinery.

The motion detection systems, methods and related machines may be described as set forth in the following numbered paragraphs. These paragraphs are intended as illustrative, and are not intended to limit the disclosure or claims in any way. Changes and modifications may be made to the following descriptions without departing from the scope of the disclosure.

10.1 A woodworking machine comprising:
a working portion adapted to work when moving;
a detection system adapted to detect a dangerous condition between a person and the working portion;
a reaction system associated with the detection system to cause a predetermined action to take place relative to the working portion upon detection of the dangerous condition; and
a motion detection system adapted to detect motion of the working portion and to disable the reaction system when the working portion is not moving.

10.1.1 The woodworking machine of paragraph 10.1 where the working portion is a spinning blade and where the motion detection system detects whether the blade is spinning.

10.1.2 The woodworking machine of paragraph 10.1 where the motion detection system detects the speed of the motion and considers the working portion to be not moving if the working portion is moving below a threshold speed.

10.1.3 The woodworking machine of any of paragraphs 10.1 where the motion detection system includes a sensor.

10.1.3.1 The woodworking machine of paragraph 10.1.3 where the sensor is a Hall effect sensor.

10.1.3.2 The woodworking machine of paragraph 10.1.3 where the sensor is an electromagnetic field sensor.

10.1.3.3 The woodworking machine of paragraph 10.1.3 where the sensor is an optical sensor.

10.1.3.4 The woodworking machine of paragraph 10.1.3 where the sensor is an electrical sensor.

10.2 A woodworking machine comprising:
a working portion adapted to work when moving;
a motor to drive the working portion
a detection system adapted to detect a dangerous condition between a person and the working portion; and a reaction system associated with the detection system to cause a predetermined action to take place relative to the working portion upon detection of the dangerous condition, where the reaction system causes the predetermined action only when the motor is running or during a defined period of time after the motor has been running.

Section 11: Translation Stop

In the case of miter saws, chop saws, radial arm saws, and other power equipment in which a cutting tool moves down onto or across a workpiece to cut the workpiece, reaction subsystem 24 can include a system to stop the cutting tool from continuing to move down onto or across the workpiece. Stopping the translational motion of the cutting tool can minimize any injury from accidental contact between a user and the cutting tool.

FIG. 136 illustrates an exemplary implementation of a system to stop the translational motion of a cutting tool in the context of a radial arm saw 1100. Typically, radial arm saw 1100 includes a horizontal base 1102, a vertical support column 1104 extending upward from base 1102, and a guide arm 1106 that extends from column 1104 vertically spaced above base 1102. A carriage 1108 is slidably coupled to the underside of guide arm 1106. The bottom end of carriage 1108 is connected to a saw housing 1110 and to a motor assembly 1112, allowing a blade 1114 to be pulled across the base to cut workpieces (not shown) supported on the base. Radial arm saw 1106 is preferably equipped with a system as described above to stop the spinning of the blade, which includes a brake pawl 60 in a cartridge 80.

In use, a user grasps a handle 1116 on the saw and pulls the saw and blade across a workpiece on base 1102. In so doing, a user may accidentally pull the saw into contact with a misplaced finger or some other part of his body. Upon contact, brake pawl 60 works to stop the blade from spinning, but since the user may be pulling the saw toward his or her body when contact is detected, the saw may continue to move toward the user even after pawl 60 has stopped the blade. This continued movement may cause; the stopped blade to be driven over a portion of the user's body (e.g., the user's hand), causing further injury. A system to stop the movement of the carriage and saw along the guide arm once contact is detected between the blade and the user's body addresses this issue.

It will be appreciated that there are a wide variety of ways to stop the sliding movement of bracket 1108 along arm 1106. FIG. 136 illustrates two examples. One example includes a pivoting wedge assembly 1118. Assembly 1118 includes a wedge or pawl 1120 pivotally coupled to guide bracket 1108. An actuator 1122 mounted on bracket 1108 is operatively coupled to the control and detection subsystems associated with brake pawl 60 and cartridge 80 so that when pawl 60 is released, actuator 1122 engages pawl 1120. During normal operation, actuator 1122 maintains the wedge spaced-apart from guide arm 1106. However, once contact between the blade and the user's body is detected, the detection system sends an actuation signal to actuator 1122. The signal sent to actuator 1122 may be the same signal that triggers the release of brake pawl 60, or it may be a different signal. In any event, upon receipt of the actuation signal, the actuator drives against wedge 1120, causing it to pivot into the guide arm, preventing further movement of the guide bracket forward along the guide arm. The wedge may be constructed or coated with a high friction material such as rubber, and/or may be configured with teeth, etc., to increase its braking action.

The other exemplary braking configuration illustrated in FIG. 136 includes a lockable spool assembly 1124. Assembly 1124 may be used in place of, or in addition to, wedge assembly 1118. In any event, the lockable spool assembly includes a spring-loaded spool 1126 mounted on support column 1104. One end of a tether or cable 1128 is attached to guide bracket 1108, while the other end is wound around spool 1126. As the user pulls the saw across the base, the spool unwinds, allowing the tether to extend. The spring-loading of the spool ensures that the spool maintains a slight tension on the tether and retracts the tether around the spool when the user pushes the saw back toward the support column. Assembly 1124 also includes a spool brake, such as pawl 1130, operatively coupled to the control and detection systems associated with brake pawl 60. Thus, when contact between the blade and the user's body is detected, an actuation signal is sent to the spool brake, causing the spool to lock. Once the spool locks, the tether prevents further movement of the saw away from support column 1104. In an alternative implementation of spool assembly 1124 not shown in FIG. 136, the lockable spool may be contained in, or placed adjacent to, cartridge 80, in which case the tether would run from the spool backward to support column 1104.

It will be appreciated that there are many alternative methods, devices, and configurations for stopping the travel of the guide bracket and the saw along the guide arm. Any one or more of these alternatives may be used in place of, or in addition to, the braking configurations illustrated in FIG. 136 and described above.

FIG. 137 illustrates an exemplary implementation of a system to stop the translational motion of a cutting tool in the context of a miter saw or chop saw 1150. It will be understood that miter saw 1150 may be any type of miter saw including a simple miter saw, compound miter saw, sliding compound miter saw, etc. Typically, miter saw 1150 includes a base or stand 1152 adapted to hold the workpiece to be cut. A swing arm 1154 is pivotally coupled to base 1152 to allow the arm to pivot downward toward the base. Attached to arm 1154 is a housing 1156 adapted to at least partially enclose a circular blade 1158. A motor assembly 1112 is coupled to the housing, and includes a rotating arbor 1160 on which the blade is mounted. Motor assembly 1112 includes a handle 1162 with a trigger (not shown) operable to run the saw. An optional blade guard (not shown) may extend from the bottom of housing 1156 to cover any portion of the blade exposed from the housing. A person uses miter saw 1150 by lifting the saw up, placing a workpiece on base 1152, and then bringing the saw down onto the workpiece to cut the workpiece.

Miter saw 1150 also preferably includes a brake pawl 60 in a cartridge 80 configured to stop the spinning of the blade, as described above. A saw blade spinning at several thousand revolutions per minute has substantial angular momentum. Thus, when the brake pawl engages and stops the blade, the angular momentum must be transferred to the brake. Because the swing arm of the miter saw is free to pivot in the direction of blade rotation, the angular momentum of the blade may be transferred to the swing arm when the blade is suddenly stopped, causing the swing arm to swing downward. This sudden and forceful downward movement of the swing arm may cause injury to the user if a portion of the user's body is beneath the blade.

There are many suitable means for preventing the sudden downward movement of the swing arm. For example, the pivotal connection between the swing arm and the base of the miter saw may be electrically lockable, for example using an electromagnetic leaf brake, to prevent the arm from pivoting. The signal to lock the connection may be provided by the detection system. Alternatively, a shock absorber, such as a gas discharge cylinder, may be connected between the swing arm and the base to limit the speed with which the swing arm can pivot relative to the base, as shown at 1180 in FIG. 137. This arrangement also serves to limit how far the blade moves between the time contact between the blade and user is detected, and the time the blade is stopped by the pawl. While there are many other ways of connecting the swing arm to the base to prevent sudden movement of the arm toward the base, most such arrangements transfer the angular momentum to the swing arm/base assembly. Depending on the weight and balance of the saw, the angular momentum may be sufficient to cause the entire saw to overturn. Therefore, it may be desirable to secure the base to a stable surface with clamps, bolts, etc.

FIG. 137 shows one way to prevent the sudden downward movement of swing arm 1154. Swing arm 1154 includes a cam portion 1170 having a cam surface 1172. Cam portion 1170 may be integral with the swing arm and housing 1156. A stopping pawl 1174 is mounted to a vertical support adjacent cam surface 1172, and an actuator 1176 is positioned adjacent pawl 1174. The actuator 1176 is operatively coupled to the control and detection subsystems associated with brake pawl 60 and cartridge 80 so that when pawl 62 is released, actuator 1176 engages pawl 1174. During normal operation, actuator 1176 maintains the pawl spaced-apart from cam surface 1172. However, once contact between the blade and the user's body is detected, the detection system sends an actuation signal to actuator 1176, which may be the same or a different signal that triggers the release of brake pawl 60. In any event, upon receipt of the actuation signal, the actuator drives against pawl 1174, causing it to pivot into cam surface 1172, preventing further movement of the swing arm. Pawl 1174 may be constructed or coated with a high friction material such as rubber, and/or may be configured with teeth, etc., to increase its braking action. Cam portion 1170 may be modified so that it extends as far as possible from the point around which it pivots, in order to provide as great a moment arm as possible to help stop the downward motion of the swing arm.

The miter saw in FIG. 137 also includes a piston/cylinder 1180 connected between swing arm 1154 and base 1152. That piston/cylinder limits the speed with which the swing arm can pivot relative to the base, and can also serve to stop or limit the downward motion of the blade when accidental contact with the blade is detected.

There are many alternative methods, devices, and configurations for stopping the swing arm from moving down. Any one or more of these alternatives may be used in place of, or in addition to, the pawl and cam configuration illustrated in FIG. 137 and described above. What is important is to provide a mechanical stop to halt the downward motion of the swing arm when the blade contacts a user.

FIG. 138 illustrates an alternative translation stop mechanism implemented in the context of a pneumatic up-cut chop saw 1181. Chop saw 1181 includes a blade 40 mounted to a pivotal arbor block 1182. The blade and/or some associated portion of the saw, are electrically isolated and coupled to a detection system as described in Sections 1 and 2 above. This arrangement allows detection of contact of the blade with a user as described in those cases.

The arbor block is pivoted to the upward position shown in the dashed lines by a pneumatic cylinder 1183. The cylinder may be actuated by the user, such as by stepping on a foot switch, or may be operated by an electronic controller. In either case, a solenoid valve (not shown) is normally provided to control the delivery of air to the cylinder. A blade guard 1184 is provided to cover the blade as it emerges through the top of the table. In many cases the blade guard moves down upon actuation of the saw to serve as a hold down on the material being cut. A metal strip 1885 along the bottom of the blade guard can therefore be electrically isolated and used as an electrode to also detect contact with a user as described above. Because the blade guard is not spinning, it may not be necessary to use a capacitive coupling to detect contact, and any suitable system can be utilized. In any case, the detection system then monitors for contact between the bottom of the blade guard and a user. Although not essential, it is preferable that the control subsystem only treat a detected contact as a dangerous condition and trigger the reaction system during actual actuation of the saw. Otherwise, inadvertent contact when the user is positioning stock to be cut may result in false triggers where no danger was present. However, if the bottom of the guard is touching the user at any time during the actuation cycle of the saw, the reaction system should be triggered. Because the user's hand may be covered by a glove or may be positioned under the board, in most cases it is not sufficient just to use the blade guard for contact detection. Rather, contact between the user and the blade (as the blade passes through the glove) can also be monitored and trigger the reaction system. Alternatively, the glove can be constructed of or incorporate, electrically conductive material.

As an alternative or in addition to monitoring for contact with the blade guard, a region of the table of the saw around the blade opening can be isolated and monitored for user contact, just as with the blade guard. For instance a metal strip 2 cm wide with a slot for the blade to pass through can be installed in an insulating material into the portion to the table through which the blade projects. This strip can then serve as a contact detection electrode. Therefore, if a user's hand contacts the electrode on the table, i.e. is on the table within 1 cm of the blade, when the saw is actuated, the reaction system can be triggered. Similar systems can of course be used on many other types of woodworking machinery, such as on the infeed section of a planer, to detect dangerous conditions.

Saw 1181 includes a reaction system 24 configured to interrupt the upward motion of the saw if contact with a user is detected at the guard/table or by the blade. Reaction system 24 includes a first link 1186*a* extending between arbor block 1182 and an end of a lever link 1186*b*. The lever link pivots about a pivot point 1187 and is connected at the opposite end to a second link 1186*c*. The pivot point is positioned so that the second link travels substantially farther than the first link during actuation of the saw. A spring 1188 is connected to the free end of the second link to tension the entire linkage mechanism against upward motion of the saw. This tension, although not essential, is beneficial to insure that any slop in the linkage is already taken up when the brake is actuated, as described below, to thereby minimize upward travel after actuation.

The reaction system also includes a brake mechanism 28 in the form of a pawl 1189. The pawl is mounted on a pivot 1190 and biased toward the second link by a biasing mechanism 30 in the form of a stack 1191 of belleville springs. The springs are preferably positioned to push the pawl against the pivot in a direction to minimize any slop or play in uptake when the face of the pawl contacts the second link. Again, this reduces the upward movement of the blade after triggering of the brake. A restraining mechanism in the form of an electromagnet 1192 is magnetically connected to the upper side of the pawl to hold the pawl against the biasing mechanism. Typically, the pawl is constructed from a hard, magnetic metal and is provided with serrations on the front surface to grip or bite into the link when engaged. The pawl can also be provided with a magnetic plate attached to the top to engage the electromagnet. A slide surface 1193 is provided opposite the pawl to guide the second link and provide a support for the second link when the pawl pushes against the linkage. A retainer 1194 holds the second link against the slide surface so no play is present when the pawl is actuated and to insure that the link does not accidentally contact the pawl prior to release. The face of the pawl is preferably positioned so that it rides very close—preferably between 0.1 mm and 2 mm—to minimize the time required for engagement with the link.

Under normal conditions, a current is driven through the electromagnet to hold the pawl. Upon actuation of the reaction system, the electrical current is interrupted, and preferably a current of the opposite polarity is applied for a short period of time, to quickly release the pawl to be pushed over into contact with the second linkage by the spring. The pawl then immediately binds against the second linkage to prevent further upward motion of the blade. Simultaneously, the pneumatic cylinder is reversed to begin retraction of the blade. Simple reversing of the cylinder by a standard solenoid valve, by itself, is not fast enough to stop upward motion quickly enough to prevent serious injury. Braking by the pawl, however, can stop upward motion in 1-5 milliseconds and restrain the pneumatic cylinder until the solenoid valve can be reversed to retract the blade. Preferably, the retraction begins in substantially less than 100 milliseconds so that the user does not have time to react and jerk their hand across the still spinning blade, thereby causing more serious injury.

After the brake pawl is released, a shoulder 1195 located on the second link is positioned to reset the pawl against the electromagnet when the blade is fully lowered. When the blade is lowered, the shoulder pushes against the underside of the pawl to lift the pawl back into contact with the electromagnet. This resets the system so that it is ready for repeated use. It should be understood that the electromagnetic release can be used interchangeably with the fusible member release previously described. The fusible member is generally cheaper to implement, but has the disadvantage of being suitable for only a single use.

An alternative reaction system configuration to stop translational movement similar to the system of FIG. 138 is shown in FIG. 139. The system of FIG. 139 includes only a single link 1186 connected to an extension arm 1199 connected to arbor block 1182. The extension arm provides some mechanical advantage, similar to the lever link of FIG. 138. When the reaction system is actuated, pawl 1189 grips link 1186 as previously described to stop upward movement of the blade. As before, spring 1188 maintains a tension on the link to take up any play that may be present or develop in the mechanism. It should be understood that the system of FIGS. 138 and 139 could be used together to create additional mechanical advantage in the translation stopping mechanism.

FIG. 140 illustrates another reaction system similar to those of FIGS. 138 and 139. In the reaction system of FIG. 140, the brake is mounted on a carriage 1196, which slides along link 1186 on bushing 1197. The carriage is mounted to a brace 1198 that is coupled to arbor block 1182 to pivot therewith. As the arbor block pivots upwardly, the carriage is driven along the link. When contact is detected, the pawl is released to catch against the surface of the link and stop the upward travel of the blade. As described above, springs 1188 and 1191 are positioned to eliminate any play in the translation stop mechanism. It should be noted that different cut-off saws have different mechanisms, such as cams, eccentrics, etc., to raise and lower the blade and the above-described translation stops and variations thereof can be applied to such different mechanisms as well.

The translation stops described above can also be used in connection with various braking or blade retraction systems to obtain combined benefit. For instance, the blade may be braked at the same time as the translation stop is engaged to further minimize the chance of serious injury. Alternatively or in addition, a retraction mechanism may be provided to quickly retract the blade.

The systems and methods to stop translational motion, and related machines, may be described as set forth in the following numbered paragraphs. These paragraphs are intended as illustrative, and are not intended to limit the disclosure or claims in any way. Changes and modifications may be made to the following descriptions without departing from the scope of the disclosure.

11.1 A woodworking machine comprising:
a cutting portion, where the cutting portion is adapted to move translationally relative to a workpiece to be cut;
a detection system adapted to detect a dangerous condition between a person and a determined portion of the machine; and
a reaction system adapted to interrupt the translational movement of the cutting portion upon the detection by the detection system of the dangerous condition between the person and the portion of the machine.

11.1.1 The woodworking machine of paragraph 11.1 where the determined portion of the machine is the cutting portion.

11.1.2 The woodworking machine of paragraph 11.1 where the determined portion of the machine is a guard.

11.1.3 The woodworking machine of paragraph 11.1 where the reaction system is adapted to interrupt the translational movement of the cutting portion by stopping that movement.

11.1.4 The woodworking machine of paragraph 11.1 where the reaction system is adapted to interrupt the translational movement of the cutting portion by reversing that movement.

11.1.5 The woodworking machine of paragraph 11.1 further comprising a brake system to stop the motion of the cutting portion upon the detection by the detection system of the dangerous condition.

11.1.6 The woodworking machine of paragraph 11.1 where the determined portion is the cutting portion, and where the dangerous condition is contact between the person and the cutting portion.

11.1.7 The woodworking machine of paragraph 11.1 where the determined portion is the cutting portion, and where the dangerous condition is proximity between the person and the cutting portion.

11.2 A radial arm saw comprising:
a guide arm;
a blade mounted to slide along the guide arm;
a detection system adapted to detect a dangerous condition between a person and the blade; and
a reaction system adapted to interrupt the sliding movement of the blade upon the detection by the detection system of the dangerous condition between the person and the blade.

11.2.1 The saw of paragraph 11.2 where the reaction system includes a member configured to contact and wedge against the guide arm.

11.2.1.1 The saw of paragraph 11.2.1 where the member is a pawl.

11.2.2 The saw of paragraph 11.2 where the blade is mounted to slide along the guide arm on a support structure, where the reaction system includes a tether between the support structure and an anchor, and where the tether is adapted to stop the sliding of the blade on the guide arm upon detection of the dangerous condition.

11.2.2.1 The saw of paragraph 11.2.2 where the tether is adapted to play out as the blade slides along the guide arm.

11.2.2.2 The saw of paragraph 11.2.2 where the tether is would around a spool, and where the spool is locked to prevent the tether from playing out upon detection of the dangerous condition.

11.3 A miter saw comprising:
a base;
a swing arm supported by the base and adapted to pivot toward a workpiece to be cut;
a blade mounted to move with the swing arm to contact the workpiece when the pivot arm pivots toward the workpiece;
a detection system adapted to detect a dangerous condition between a person and the blade; and
a reaction system adapted to interrupt the movement of the blade and swing arm upon the detection by the detection system of the dangerous condition between the person and the blade.

11.3.1 The miter saw of paragraph 11.3 where the reaction system includes an electric lock configured to prevent the swing arm from pivoting.

11.3.2 The miter saw of paragraph 11.3 further comprising a piston/cylinder to limit the speed with which the swing arm can pivot.

11.3.3 The miter saw of paragraph 11.3 where the swing arm includes a cam portion, and further comprising a pawl adapted to engage the cam portion to stop the pivoting of the swing arm upon the detection of the dangerous condition.

11.4 A safety system for machines, the safety system comprising:
a detection system adapted to detect a dangerous condition between a person and a working portion of a machine, where the working portion has a motion; and
a reaction system associated with the detection system to interrupt the motion of the working portion upon detection of the dangerous condition between the person and the working portion by the detection system.

11.4.1 The safety system of paragraph 11.4 where the dangerous condition is contact between the person and the working portion of the machine, and where the detection system is adapted to capacitively impart an electric charge on the working portion and to detect when that charge drops.

11.4.2 The safety system of paragraph 11.4 where the motion of the working portion is translational, and where the reaction system stops that translational motion.

11.4.3 The safety system of paragraph 11.4 where the reaction system interrupts the motion of the working portion within 25 milliseconds after detection of the dangerous condition.

11.5 A chop saw comprising:
a blade mounted on a pivotal arbor block and adapted to pivot into contact with a workpiece to cut the workpiece;
a detection system adapted to detect a dangerous condition between a person and the blade; and
a reaction system adapted to interrupt the movement of the blade and pivotal arbor block upon the detection by the detection system of the dangerous condition between the person and the blade.

11.5.1 The chop saw of paragraph 11.5 further comprising a pneumatic cylinder to pivot the blade and pivotal arbor block.

11.5.2 The chop saw of paragraph 11.5 where the detection system detects contact between the person and the blade.

11.5.3 The chop saw of paragraph 11.5 further comprising a blade guard, and where the detection system detects contact between the person and the blade guard.

11.5.4 The chop saw of paragraph 11.5 further comprising a worksurface through which the blade extends to cut the workpiece, and where the detection system detects contact between the person and at least a portion of the worksurface.

11.5.5 The chop saw of paragraph 11.5 where the reaction system comprises a brake mechanism and a linkage between the pivotal arbor block and an anchor, where the linkage includes at least a portion that moves when the pivotal arbor block pivots, and where the brake mechanism is adapted to restrict the movement of the linkage to stop the motion of the pivotal arbor block.

11.5.6 The chop saw of paragraph 11.5 where the reaction system comprises:
a linkage having a lever link adapted to pivot around a pivot point, the lever link having two ends and the pivot point being closer to one end than the other end, a first link connected between the pivotal arbor block and the end of the lever link closest to the pivot point, and a second link connected to the other end of the lever link, where movement of the pivotal arbor block causes the first link to move, which in turn causes the lever link to pivot around the pivot point, which in turn causes the second link to move; and
a brake mechanism adapted to stop the movement of the second link, which in turn stops the movement of the pivotal arbor block.

11.5.6.1 The chop saw of paragraph 11.5.6 where the reaction system further comprises a spring connecting the second link to a predetermined point.

11.5.7 The chop saw of paragraph 11.5 where the reaction system comprises:
a member fixed to and extending from the pivotal arbor block and moving with the pivotal arbor block;
a link attached at one end to the member, where the link moves with the member; and
a brake mechanism adapted to stop the movement of the link, which in turn stops the movement of the pivotal arbor block.

11.5.7.1 The chop saw of paragraph 11.5.7 where the reaction system further comprises a spring connecting the link to a predetermined point.

11.5.8 The chop saw of paragraph 11.5 where the reaction system comprises:
a brace mounted to the pivotal arbor block and adapted to move with the pivotal arbor block;
a link associated with the brace;
a carriage fixed to the brace and adapted to slide on the link as the brace moves; and
a brake mechanism adapted to stop the movement of the carriage, which in turn stops the movement of the brace and pivotal arbor block.

11.5.8.1 The chop saw of paragraph 11.5.8 where the reaction system further comprises a spring connecting the link to a predetermined point.

11.5.9 The chop saw of paragraph 11.5 where the reaction system comprises a brake mechanism and a linkage between the pivotal arbor block and an anchor, where the linkage includes at least a portion that moves when the pivotal arbor block pivots, where the brake mechanism is adapted to restrict the movement of the linkage to stop the motion of the pivotal arbor block, where the brake mechanism includes a brake pawl, and where the brake mechanism includes an electromagnet adapted to hold the brake pawl in a non-braking position until detection of the dangerous condition.

11.5.9.1 The chop saw of paragraph 11.5.9 further comprising a member configured to engage the brake pawl and move the brake pawl into contact with the electromagnet to thereby set the brake in a non-braking position.

Section 12: Cutting Tool Disablement

In many of the embodiments described above, reaction subsystem 24 is configured to stop and/or retract a blade. However, alternative embodiments of reaction subsystem 24 may be configured to prevent serious injury to a user in other ways. For example, FIG. 141 illustrates one embodiment of a reaction system adapted to disable the dangerous portions of a cutting tool. In the embodiment of FIG. 141, the cutting tool is a generally cylindrical cutting head having one or more elongate blades mounted on the outer surface of the cutting head. Such cutters are used in jointers, such as jointer 1200, and planers. In operation, the cutting head is rotated about its cylindrical axis. When a workpiece is passed across the cutting head, the blades make wide cuts into the adjacent surface of the workpiece. As with machines using circular blades described above, machines using cylindrical cutting heads may also cause severe injury if the blades come into contact with the user's body during operation. The reaction subsystem of FIG. 141, indicated at 24, is designed to prevent or minimize such injury. For clarity, many of the components of safety system 18 are not shown in FIG. 141 since they are similar to the components described above in the context of other cutting machines.

Jointer 1200 includes a generally cylindrical cutterhead 1202 mounted to rotate on an arbor 1204. The arbor typically is mounted in one or more bearing assemblies (not shown) and rotationally driven by a motor assembly (not shown), which is coupled to the arbor either directly or by a belt-and-pulley system. The cutterhead is mounted in a main frame assembly 1206 to extend upward in the space between infeed table 1208 and outfeed table 1210. A workpiece is cut by sliding it along infeed table 1208, past the cutterhead and onto outfeed table 1210. Typically, the vertical positions of the infeed and outfeed tables are independently adjustable to control the depth of cut into a workpiece and alignment with the upper surface of the cutterhead.

The cutterhead is usually constructed of metal, such as steel, and typically includes three knife blades 1212 mounted to extend above the surface of the cutterhead. It will be appreciated that fewer or more knife blades may be used and that the utility of safety system 18 is not limited by the number of blades on cutterhead 1202. One or more electrically non-conductive bushings 1214 are placed between the cutterhead and arbor to insulate the cutterhead and blades from frame 1206. Charge plates 44 and 46 may be placed adjacent the cutterhead to couple the signal generated by the detection subsystem across the cutterhead. In FIG. 141, the charge plates (shown in dashed lines) are mounted adjacent one flat end of the cutterhead. Alternatively, the arbor may be insulated from the frame and the charge plates may be positioned around the arbor as described above in Section 2.

Due to the relatively few blades, first contact between the user's body and the cutterhead may be on one of the blades or on the surface of the cutterhead itself. However, the blades and cutterhead are electrically coupled so that any contact with the user's body is detected regardless of whether or not it occurs on the blades. Once contact is detected, the reaction system is actuated to quickly stop the rotation of cutterhead 1202 and/or disable the blades.

In the embodiment depicted in FIG. 141, safety system 18 includes a reaction system 24 configured to cover the blades to prevent them from causing injury to the user. Specifically, the reaction system of FIG. 141 includes a flexible sheet 1220 such as plastic, rubber, metal foil, metal sheet, metal mesh, fabric, etc., configured to cover the blades. A particularly preferred material is stainless steel sheet 0.005-0.050 inches thick. Sheet 1220 includes a hook 1222 disposed at one end to engage any of the blades 1212. The hook is preferably formed integrally with the sheet in the form of a short fold shaped to catch on a blade. Alternatively, the hook may be separate and joined to the sheet. When hook 1222 is pushed against cutterhead 1202, the next passing blade catches the hook, causing sheet 1220 to wrap around the cutterhead as it rotates. Thus, the blades are covered by sheet 1220, which protects the user from serious injury. Typically, the outer surface of hook 1222 is rounded or beveled to prevent injury to the user when the hook is pulled around the cutterhead.

The sheet preferably extends across the entire width of the cutterhead and is preferably longer than two-thirds of the circumference of the cutterhead to allow it to cover all three blades simultaneously. More preferably, the sheet should be longer than the circumference of the cutterhead to wrap more than once around the head. The sheet is typically formed with an inward curl. The curl reduces the tendency of the sheet to spring away from the cutterhead. The free end of the sheet is stored around a spool 1224. The spool may include a torsion spring or other device to limit the number of rotations the spool can undergo, thereby pulling the cutterhead to a stop. Alternatively, the end of material 1220 opposite the hook may be anchored to stop the cutterhead before it makes a full rotation. Additionally or alternatively, the jointer motor assembly may be shut off to stop rotation of the cutterhead.

The hook is moved into contact with the cutterhead by being mounted to the front of a drive plate 1226 or other high speed actuator assembly. The hook may be spot welded or adhesively attached to the plate, secured thereto with soft rivets, or may be provided with several holes through which protrusions on the plate can be pushed. The attachment needs to hold the hook securely during normal use, while allowing it to split away when caught by a blade. The drive plate is preferably substantially as wide as the hook to provide sufficient rigidity to insure that the entire hook engages a blade simultaneously.

FIGS. 142-144 illustrate an alternative blade covering system for a machine using a circular blade. The reaction system of FIG. 142 includes a band 1230 of flexible material that is used to wrap around the teeth of blade 40. Band 1230 includes a loop 1232 formed at the leading end. The loop is hooked around a pair of torsion springs 1234 and held in place by a guide structure (not shown) secured to the frame of the saw. The springs are held in a cocked position by a fast-acting release system (not shown), such as described above in Sections 4 and 6. When the springs are released, they pull loop 1232 down into a gullet 1236 of blade 40. The gullet captures the leading edge of the loop and pulls the loop off of the springs and drags the band forward as illustrated by the dashed lines in FIG. 142. The width of the loop forms a shock absorbing structure to absorb some of the impact of the gullet catching the loop. It is also possible to provide a compressible material at the leading end of the loop as a shock absorbing system to reduce impact loading.

The trailing section of the band is shaped to fold over the teeth of the blade, as shown in FIG. 143. The trailing section of the band is stored on a spool 1238. The C-shape of the band flattens out when the band is wound on the spool. The band is preferably formed of a spring-temper material to return to an unbiased C-shape when curved to match the perimeter of the blade, such as spring temper stainless steel of 0.005 to 0.050 thickness.

The leading end of the band is preferably positioned as close as possible to the location where the blade emerges from the guard or housing on the saw. This insures that the band will reach the location of the user as soon as possible to minimize injury. The motor of the saw will preferably be disengaged as soon as the reaction system is actuated. In addition, the reaction system of FIGS. 142-144 is also preferably used in connection with translation stopping systems such as described above in Section 11, or retraction systems such as disclosed above in Section 3, to further minimize injury.

FIG. 145 illustrates another alternative reaction system in which the cutter is obstructed upon actuation of the reaction system. In particular, a pawl 1240 is pushed into contact with the teeth of blade 40 upon actuation of the reaction system. The pawl is preferably formed from a plastic material, such as polycarbonate, that forms curls 1242 in gullets 1236 between the teeth upon being cut by the teeth. The curls block the sharp edges of the teeth to prevent the teeth from cutting into a user. The pawl may also be constructed from material softer than polycarbonate, such as ultra-high molecular weight polyethylene (UHMWPE) to reduce the braking effect on the blade as the cutis are formed. The blade should preferably have gullets that are shaped with relatively parallel sides to minimize the tendency of the curls to slip out. As with the band system described above, it is preferable that the pawl be located as close as possible to where the blade emerges from the guard or housing to minimize the number of unblocked teeth to which the user is exposed. Of course, the same principle can be applied to other cutters, such as a jointer or shaper, with appropriate modification.

FIG. 146 illustrates another alternative reaction system in which the teeth on the cutter are broken or shifted. A pawl 1244 is provided to selectively engage the teeth of blade 40. The pawl is formed of a material hard enough to dislodge or break the carbide inserts 1246 on the teeth upon contact. Suitable materials would include carbide and hardened steel. The pawl is actuated by the mechanism described above for brake pawl 60. When actuated, the pawl shifts into the path of the teeth of the blade, as illustrated in FIG. 146. The pawl shifts into contact with a brace structure 1248 adapted and positioned to support the pawl against the teeth. Brace structure may be in any suitable form including a pin, post, bracket, etc. In any event, the carbide inserts are shattered by the impact from striking the pawl. This reaction system is preferably used in conjunction with translation stopping systems or retraction systems, and serves primarily to generate sufficient user-to-blade clearance to give the translation or retraction system more time to operate.

FIGS. 147 and 148 illustrate another embodiment of a reaction system in which a cutting tool is wrapped with a covering. A shaper is shown at 1260 with a work surface 1262, a fence 1264 and a cutting head 1266. A workpiece is slid on the work surface and along the fence past the cutting tool. The cutting tool shapes the workpiece at is moves past. The safety system on shaper 1260 includes a pair of vertically spaced shafts 1268 that pivot around pin 1270. Shafts 1268 are biased toward cutting head 1266 by spring 66, as explained above in connection with other embodiments. A fusible member 70 restrains shafts 1268 from pivoting toward the cutting head. The safety system also includes a covering 1272, which takes the form of a sheet of material mounted between the two shafts as shown in FIG. 148. The covering is mounted to the shafts by pockets 1274 and 1276 formed in the material. The shafts are slipped into the pockets so that the covering spans the area between the shafts. The pockets extend along the upper and lower edges of the covering on the end of the covering adjacent the shafts. The covering extends away from the shafts and is wound on a spool 1278. When the system detects accidental contact with cutting head 1266, as described above in connection with other embodiments, fusible member 70 is burned and shafts 1268 are released to pivot toward the cutting head because of spring 66. When shafts 1268 move toward the cutting head, the covering contacts the cutting head and the cutting head catches on or bites into the covering and pulls the covering off of shafts 1268 and off of spindle 1278 until the covering has wrapped the cutting head. The covering can be any material sufficiently strong to absorb the sudden acceleration when caught on the cutting head, and sufficiently pliable to catch on the cutting head and wrap around it. Possible materials include Kevlar fabric, stainless steel mesh, natural or synthetic fabrics, etc. The covering may be used in connection with an internal brake to more rapidly slow the cutting head or the power to the motor may be disengaged to stop the cutting head.

The various embodiments described above for covering, blocking or disabling the cutter are particularly suitable for use on relatively light machinery, such as portable circular saws and miter saws, or on machinery with relatively heavy cutters such as jointers, shapers and planers.

The systems and methods for cutting tool disablement and safety, and related machines, may be described as set forth in the following numbered paragraphs. These paragraphs are intended as illustrative, and are not intended to limit the disclosure or claims in any way. Changes and modifications may be made to the following descriptions without departing from the scope of the disclosure.

12.1 A machine, comprising
a cutting element;
a motor adapted to drive the cutting element;
a detection system adapted to detect a dangerous condition; and
a reaction system adapted to at least partially shield the cutting element in response to detection of a dangerous condition.

12.1.1 The machine of paragraph 12.1, wherein the cutting element is circular with cutting edges disposed around a perimeter and the reaction system includes a strip of material adapted to wrap around the perimeter of the cutting element.

12.2 A machine comprising:
a cutting element with one or more cutting edges;
a motor adapted to drive the cutting element;
a detection system adapted to detect a dangerous condition; and
a reaction system adapted to disable the cutting edges upon detection of a dangerous condition by the detection system.

12.2.1 The machine of paragraph 12.2, wherein the reaction system separates the cutting edges from the cutting element.

12.3 A machine comprising:
a cutting element having one or more cutting edges;
a motor adapted to drive the cutting element;

a detection system adapted to detect a dangerous condition related to the cutting element; and a reaction system adapted to block the cutting edges in response to detection of the dangerous condition.

Section 13: Table Saw

It will be appreciated that safety system 18 may be configured for use on table saws in a variety of ways. FIG. 149 shows one type of a table saw 1400, often called a contractor's saw. It includes a table 1401 through which a blade 1402 extends from beneath the table. The table and blade are supported by a housing 1403 and legs 1404. Housing 1403 encloses the mechanics that support, position and drive the blade. A motor to drive the blade can be positioned in or outside of the housing. A switch 1405 turns the saw on and off, causing blade 1402 to spin. Handles, such as handle 1406, are used to adjust the position of the blade relative to the table, for example, how far the blade extends above the table or how the blade tilts relative to the top of the table. Of course, table saws take many different configurations, from large saws sized for industrial use to small saws that can be placed on a bench top or counter, and table saws come with various types of tables and housings. Essentially, a table saw is a saw with a flat workspace or "table" and a cutting blade projecting up through the table. A user places a workpiece on the table and slides it into the blade to cut the workpiece.

FIGS. 150 and 151 show side elevation views of the internal mechanism one type of table saw configured with a safety system as described above. FIG. 152 shows a bottom view of the same saw, and FIG. 153 shows a perspective view.

In the saw, blade 1402 is mounted on an arbor 1407 by a nut (not shown). The arbor spins the blade in the direction of arrow 1409. Table 1401 (not shown in FIG. 151), which defines the work surface for the table saw, is adjacent the blade and the blade extends above the table.

An arbor block 1410 supports arbor 1407 and holds the arbor in bearings to allow the arbor to rotate. The arbor is connected to a motor (not shown), such as by a belt extending around a pulley on the arbor and a pulley on the motor's drive shaft, and the motor drives or spins the arbor, as is known in the art. The motor may be mounted on motor plate 1411 shown in FIG. 151.

Arbor block 1410 is also mounted on a pin 1412 and may pivot around that pin. Pin 1412, in turn, is mounted to a support member 1413 that, along with another support member 1414, comprise at least part of the supporting frame from the table saw. The supporting frame is connected to the housing, legs, and/or table.

Blade 1402 is configured to pivot up and down so that a user can position the blade to extend above the table as needed. The blade pivots around pin 1412. A user may pivot the blade to adjust its position by turning a shaft 1415 on which a worm gear 1416 is mounted. The worm gear is mounted on the shaft so that it turns with the shaft, but so that it may slide on the shaft when necessary, as explained below. Worm gear 1416 is mounted on shaft 1415 like a collar, with the shaft extending through a longitudinal hole in the worm gear. The worm gear is held in place during normal operation of the saw by a spring clip 1417, which is positioned in a notch or channel on the worm gear and which also engages a detent or groove on shaft 1415 to hold the worm gear in place. The worm gear engages a rack or segment gear 1418 that is connected to or part of arbor block 1410. Thus, when a user turns shaft 1415, such as by turning a knob or handle attached to the shaft, like handle 1406 in FIG. 149, worm gear 1416 moves rack 1418 and the blade up and down, depending on the direction that the worm gear is turned.

Most table saws are also configured to allow blade 1402 to tilt from side to side relative to table 1401. That is accomplished by a system similar to shaft 1415, worm gear 1416, and rack 1418, but oriented generally perpendicularly to the plane of the blade. Support members 1413 and 1414 may be used as part of that system; for example, support member 1414 may comprise a segment gear or rack like rack 1418. The support members include arcuate projections 1440 that fit into arcuate grooves or slides in mounting blocks (not shown) to allow the support members to pivot. The mounting blocks are secured to the table of the saw.

A brake cartridge 1419 is mounted in the saw adjacent blade 1402. (The cartridge is shown open in FIGS. 150 and 152, and shown with a cover in FIG. 153.) The cartridge may be configured as described above in Sections 7 and 8. The brake cartridge includes a pawl 1420 biased toward blade 1402 by a spring 1421. Various pawls are described in more detail in Section 5 above. The pawl is held away from blade 1402 by a release mechanism 1422, as described in Section 4 above. The cartridge is configured so that the release mechanism releases the pawl into the blade upon the receipt of a detection signal, as explained in more detail in Section 6 above. The detection signal that causes the release of the pawl, and the system or systems to generate that signal, are explained in more detail in Sections 1 and 2 above. Electronics that form at least part of the system to detect contact between a user and the blade, and then to signal the release of the brake pawl, are enclosed in housing 1423 mounted on arbor block 1410. The housing should be closed to prevent sawdust and other particles from entering the housing and potentially damaging the electronics housed therein.

When the pawl is released, the pawl quickly hits the teeth of the blade. The teeth bite into the pawl, stopping the blade. The saw described above can stop the blade in 2-10 milliseconds, thereby reducing the extent of injury caused by accidental contact with the blade.

Brake cartridge 1419 is positioned on the blade's pivot axis so that pawl 1420 can move around pin 1412. Thus, when pawl 1420 hits the blade, the angular momentum of the blade is transferred to the arbor, and the blade, arbor, rack and cartridge tend to retract or move down in the direction of arrow 1424. The blade will move down to the extent permitted by the contact between rack 1418 and worm gear 1416. If the worm gear is fixed in place, the downward movement of the blade may strip teeth on the rack and/or worm gear, and may prevent the blade from moving down as far as desired. In the embodiment shown in FIGS. 150 and 151, the worm gear is adapted to snap free and move on shaft 1415 when the blade hits the pawl.

When the blade hits the pawl, the force of the impact causes spring clip 1417 to snap loose, allowing the worm gear to slide down the shaft toward an end 1425 of the shaft. The spring clip snaps loose because the rack is urged down when the blade is stopped, and the rack contacts the worm gear and forces the worm gear to move. The force of the rack against the worm gear causes the spring clip to snap loose. The worm gear then moves into a receptacle 1426 formed around the end of the shaft. The worm gear is put back in place by simply lifting up on the arbor to pivot the blade up, which causes the rack to move up and the worm gear to slide back along shaft 1415 until the spring clip snaps into place on the shaft.

The table saw shown in FIGS. 150 and 151 also includes a support 1427 configured with a seat or region 1428 in which is placed an impact-absorbing material 1429 (shown in FIGS. 150 and 151, but not in FIG. 153). The support is positioned under the arbor and arbor block so that when the blade retracts, the arbor block strikes impact-absorbing material 1429. Support 1427 and impact-absorbing material 1429 act as a barrier to stop the downward movement of the blade. The support is positioned so that blade 1402 may retract a sufficient distance. The impact-absorbing material can be any one of a number of cushioning materials, such as rubber, dense foam, plastic, etc. One material found to be suitable is available under the part number C-1002-06 from AearoEAR, of Indianapolis, Ind. Alternatively, impact-absorbing material 1429 may be attached to the undersurface of the arbor block instead of on support 1427. Additionally, support 1427 may take many forms. In fact, shaft 1415 may be configured and positioned so that it provides a surface to stop the downward movement of the blade.

In the construction described above, the angular momentum of the blade causes the blade, rack and cartridge to all pivot down when the pawl strikes the blade. Thus, the angular momentum of the blade causes the retraction. Blade 1402 is permitted to move downward a sufficient distant so that the blade is completely retracted. The ability of the blade to retract minimizes any injury from accidental contact with the blade and works simultaneously with the braking system described above. The ability of the blade to retract is in part because the point around which the blade pivots relative to the direction that the blade spins may be described as on what could be thought of as the "back side" of existing table saws. The brake cartridge is also mounted on this "back side," and may be mounted to pivot with the blade as described above, or may be fixedly mounted to the frame of the saw so it does not pivot with the blade and so that the blade climbs down the pawl when the pawl engages the blade. Other configurations to cause the blade to retract, which can be used alone or in conjunction with the embodiment described herein, are described in Section 3 above.

FIG. 151 also shows a splitter 1430 that extends above table 1401 behind blade 1402 to prevent kickback. A blade guard may also substantially enclose blade 1402 and prevent accidental contact with the blade.

Table saws like those described above can include logic controls to test that the saw and its safety system are functioning properly. For example, the logic controls can verify that the brake pawl is in place adjacent the blade, and that the firing system is ready to release the pawl into the blade upon the detection of accidental contact between the blade and a user. The saws also may include various signals, lights, etc., to inform a user of the status of the saw and the features in operation. Self tests, logic controls and user interfaces are described in Sections 9 and 10 above.

FIG. 161 shows another embodiment of a safety system in the context of a typical table saw. Saw blade 40 is mounted to rotate on arbor 42. The arbor extends outward (as viewed in FIG. 161) from a swing arm 1432, which pivots about an axle 1434 to raise and lower the blade. A worm gear 1436 engages an arcuate rack on the swing arm to pivot the swing arm about the axle. Safety system 18 includes a bracket 1438 that attaches to swing arm 1432, for example, by one or more bolts 1440 extending through the bracket. Disposed on mounting bracket 1438 are charging plates 44 and 46. The charging plates are positioned parallel to, and slightly spaced from, blade 40 to create the capacitive shunt between the plates. The mounting bracket may be constructed of an electrically insulating material or include electrical insulation between the bracket and the charging plates.

Mounting bracket 1438 extends from the end of swing arm 1432 beyond the edge of blade 40. A pawl 60 is pivotally mounted on a bolt 1442 extending from the bracket. The free end of the pawl is biased toward the edge of the blade by a compression spring 66. The spring is held in compression between the pawl and a spring block 1444, which extends from the bracket. A fusible member 70 is anchored to a pair of contact studs 1446. The fusible member is coupled to the pawl and holds it away from the edge of the blade against the spring bias.

An electronics unit 1448 contains a contact detector such as detection subsystem 22 described above. Shielded cables extend from the electronics unit to charging plates 44 and 46, respectively. Electronics unit 1448 also includes a current generator, such as firing subsystem 76 described above, which is connected to contact studs 1446. A power cable 1450 extends from electronics unit 1448 to a suitable power source (not shown). When the contact detector detects contact between the user's body and the blade, the firing circuit melts the fusible member, thereby releasing the pawl, which engages and abruptly stops the blade.

It should be noted that by placing the pawl and the charging plates on bracket 1438 which is attached to the swing arm, the pawl and charging plates move with the blade when it is adjusted. This eliminates the need to reposition the pawl and/or the charging plates whenever the blade is moved. Furthermore, the embodiment of safety system 18 depicted in FIG. 161 is suitable for easy installation or retrofit of existing table saws which do not currently have a safety stop. The only requirement to retrofit an existing saw is to tap one or more holes into the end of the swing arm to receive bolts 1440. The exact positioning of bracket 1438 can be adjusted as necessary, for example to extend downward, to fit within the particular saw housing.

The table saws described above are configured to absorb the impact of a brake pawl stopping a blade. However, on some table saws, small saws for example, it may be desirable to construct the saw knowing that if the brake pawl stops the blade, the saw would be damaged, perhaps by bending the arbor or other support structure. In fact, the saw may be constructed specifically to absorb the energy of stopping the blade by destroying or damaging part of the saw. Such saws may be thought of as disposable to the extent they are intended to be used only until an accident occurs requiring the brake pawl to stop the blade. A disposable saw may be less expensive to manufacture, and reduced injury to a user in the event of an accident would more than justify the entire cost of the saw.

Table saws equipped with the disclosed systems and methods may be described as set forth in the following numbered paragraphs. These paragraphs are intended as illustrative, and are not intended to limit the disclosure or claims in any way. Changes and modifications may be made to the following descriptions without departing from the scope of the disclosure.

13.1 A table saw comprising:
a worksurface;
a rotatable blade adapted to extend up through the worksurface;
a detection system adapted to detect a dangerous condition between a person and the blade; and
a brake system adapted to stop the rotation of the blade upon detection of the dangerous condition by the detection system.

13.1.1 The table saw of paragraph 13.1 where the blade is electrically isolated from the rest of the saw, and where the detection system is adapted to capacitively impart an electric signal on the blade and to detect the occurrence of a determined change in the signal.

13.1.2 The table saw of paragraph 13.1 where the blade is mounted on an arbor and where the blade and arbor are electrically isolated from the rest of the saw, and where the detection system is adapted to capacitively impart an electric signal on the blade and arbor and to detect the occurrence of a determined change in the signal.

13.1.3 The table saw of paragraph 13.1 where the dangerous condition is contact between the person and the blade.

13.1.4 The table saw of paragraph 13.1 where the dangerous condition is proximity between the person and the blade.

13.1.5 The table saw of any one of paragraphs 13.1 where the brake system includes a brake pawl adapted to engage the blade.

13.1.5.1 The table saw of paragraph 13.1.5 where the brake pawl is part of a replaceable cartridge.

13.1.5.2 The table saw of paragraph 13.1.5 where the brake pawl is biased toward the blade by a spring.

13.1.5.3 The table saw of paragraph 13.1.5 where the brake pawl is restrained from engaging the blade by a fusible member.

13.1.5.3.1 The table saw of paragraph 13.1.5.3 where the brake system includes a linkage between the brake pawl and the fusible member.

13.1.6 The table saw of any one of paragraphs 13.1 further comprising a firing system to trigger the brake system upon detection of the dangerous condition.

13.1.6.1 The table saw of paragraph 13.1.6 where the firing system includes a capacitor.

13.1.7 The table saw of paragraph 13.1 further comprising a frame supporting the blade, where the blade is adapted to be raised and lowered relative to the frame, and where the brake system is configured to raise and lower with the blade;

13.1.8 The table saw of paragraph 13.1 further comprising a frame supporting the blade, where the blade is adapted to be tilted relative to the frame, and where the brake system is configured to tilt with the blade.

13.2 A table saw comprising:
a worksurface;
a rotatable blade adapted to extend up through the worksurface;
a detection system adapted to detect a dangerous condition between a person and the blade;
a brake system adapted to stop the rotation of the blade; and
a firing system adapted to trigger the brake system upon detection of the dangerous condition by the detection system.

13.2.1 The table saw of paragraph 13.2 where the brake system includes a brake pawl biased toward the blade, where the firing system includes a fusible member restraining the brake pawl from contacting the blade, and where the firing system melts the fusible member to release the brake pawl into the blade.

13.2.2 The table saw of paragraph 13.2 further comprising a test system to test the operability of the firing system.

13.3 A safety system for table saws, where a table saw includes a rotatable blade, the safety system comprising:
a detection system adapted to detect a dangerous condition between a person and the blade; and
a brake system adapted to stop the rotation of the blade upon detection of the dangerous condition by the detection system.

Section 14: Miter Saw

Turning now to FIGS. 154 and 155, an exemplary embodiment of machine 10 is shown in the context of a miter saw 1510, which is also commonly referred to as a chop saw. It will be understood that miter saw 1510 may be any type of miter saw including a simple miter saw, compound miter saw, sliding compound miter saw, etc. Typically, miter saw 1510 includes a base or stand 1512 adapted to hold the workpiece to be cut. A swing arm 1514 is pivotally coupled to base 1512 to allow the arm to pivot downward toward the base. Attached to arm 1514 is a housing 1516 adapted to at least partially enclose a circular blade 40. A motor assembly 16 is coupled to the housing, and includes a rotating arbor 42 on which the blade is mounted. Motor assembly 16 includes a handle 1518 with a trigger 1520 operable to run the saw. Blade 40 rotates downward toward base 1512. An optional blade guard (not shown) may extend from the bottom of housing 1516 to cover any portion of the blade exposed from the housing. A person uses miter saw 1510 by placing workpiece on base 1512 beneath the upraised blade and then bringing the blade down via swing arm 1514 to cut the workpiece. It should be understood that various embodiments of miter saws with improved safety systems are disclosed herein and include various elements, subelements, features and variations. Miter saws may include any one or more of the elements, subelements, features and variations disclosed herein, regardless of whether or not the particular elements, subelements, features and/or variations are described together or shown together in the figures.

The portion of saw 1510 from which sensors 44 and 46 detect contact with a user should be electrically isolated from ground and the remaining portion of saw 1510 to allow an input signal to be capacitively coupled from one plate to the other. For example, blade 40 may be electrically isolated from the rest of the saw via a plastic or other nonconductive bushing, such as shown in FIG. 160 at 1570. Alternatively, the blade and arbor assembly may be electrically isolated. Also shown in FIG. 160 are insulating washers 1572 and 1574 that isolate blade 40 from arbor flange 1576 and arbor washer 1578. The insulating washers should be sufficiently thick that only negligible capacitance is created between the blade and the grounded arbor flange and washer. A typical thickness is approximately ⅛-inch, although thicker or thinner washers may be used. In addition, some or all of the arbor components may be formed from non-conductive materials, such as ceramics, to reduce or eliminate the need for bushing 1570.

An arbor nut 1580 holds the entire blade assembly on arbor 42. Friction established by tightening the arbor nut allows torque from the arbor to be transmitted to the saw blade. It is preferable, although not essential, that the blade be able to slip slightly on the arbor in the event of a sudden stop by the brake to reduce the mass that must be stopped and decrease the chance of damage to the blade, arbor, and/or other components in the drive system of the saw. Alternatively, a threaded arbor bolt may be used in place of nut 1580. The arbor bolt has a threaded shaft that is received into arbor 40, and a head that retains the blade assembly on the arbor.

Furthermore, it may be desirable to construct the bushing from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake, as will be discussed in further detail below.

In an alternative embodiment, the arbor and/or part of its supporting framework is electrically isolated from ground instead of isolating the blade from the arbor. One benefit of this embodiment is that if the blade is electrically connected to the arbor, then the arbor itself can be used to capacitively couple the input signal from charge plate 44 to charge plate 46. An example of such a configuration is described above in Section 2.

Any of the various configurations and arrangements of safety system 18 described above may be implemented in miter saw 1510. In the exemplary embodiment depicted in FIGS. 154 and 155, safety system 18 is a cartridge-type system. With the exception of charging plates 44 and 46, both brake mechanism 28 and detection subsystem 22 are contained within cartridge 80. Examples of suitable cartridges 80 are described in Sections 7 and 8 above. The cartridge is configured to be mounted on the front inside surface of housing 1516 by any suitable fastening mechanism 1522, such as by one or more bolts 1524. The housing may include a movable panel or door 1526 to allow access to the cartridge. Alternatively, cartridge 80 may be inserted into a port or opening in the housing. A pawl 60 is mounted in the cartridge and is positionable in front of the blade. Examples of suitable pawls and brake mechanisms incorporating the same are described in Sections 4 and 5. It should be understood that cartridge 80 is not essential to all embodiments of the miter saw disclosed herein and that miter saw 1510 may be implemented without requiring a cartridge. Instead, the brake mechanism of the safety system may be mounted in any suitable operative position relative to blade 40 without being housed in a cartridge.

Charge plates 44 and 46 are attached to the inside wall of housing 1516 by one or more mounts 1528. The mounts are attached to the housing by any suitable fastening mechanism 1522, such as by bolts 1532, and are configured to position the charge plates parallel to, and closely adjacent, blade 40. As shown in FIG. 155, the spacing between the charge plates and the blade is preferably much less than the spacing between the charge plates and the housing to minimize any parasitic capacitance between the charge plates and the housing. Alternatively, the housing may be constructed from an electrically non-conductive material.

Cables 1534 and 1536 connect the charge plates to safety system's electronics unit, which may be housed in the cartridge or elsewhere on the miter saw. Electrical power for safety system 18 is provided by any suitable source, such as a cable extending from motor assembly 16. In addition to actuating the engagement of the pawl with the blade, the electronics unit within cartridge 80 is also configured to interrupt the power to motor assembly 16 when contact between the user's body and the blade is detected.

A circular blade spinning at several thousand revolutions per minute possesses a substantial amount of angular momentum. Thus, when the pawl engages a circular blade such as is found on miter saw 1510 and stops the blade within a few milliseconds, the angular momentum must be transferred to the brake mechanism, including pawl 60. Because the swing arm of the miter saw is free to pivot in the direction of blade rotation, the angular momentum of the blade may be transferred to the swing arm when the blade is suddenly stopped, causing the swing arm to swing downward. This sudden and forceful downward movement of the swing arm may cause injury to the user if a portion of the user's body is beneath the blade. Therefore, an alternative embodiment of miter saw 1510 includes means for preventing the swing arm from moving downward when the blade is stopped. In addition, the pawl typically is mounted at the front of the miter saw to urge the blade to climb upward away from the user (i.e., deforming the plastic bushing) when engaged by the pawl.

It will be appreciated that there are many suitable means for preventing sudden downward movement of the swing arm. For example, the pivotal connection between the swing arm and the base of the miter saw may be electrically lockable, for example using an electromagnetic leaf brake, to prevent the arm from pivoting. The signal to lock the connection may be provided by the detection system. An example of a miter saw with a lockable swing arm is shown in FIG. 156, in which an electromagnetic leaf brake is schematically illustrated at 1537. Alternatively, or additionally, a shock absorber may be connected between the swing arm and the base to limit the speed with which the swing arm can pivot relative to the base. This arrangement also serves to limit how far the blade moves between the time contact between the blade and user is detected, and the time the blade is stopped by the pawl. An example of a miter saw with a shock absorber 1539 is shown in FIG. 157 extending between the base and swing arm of the miter saw. While there are many other ways of connecting the swing arm to the base to prevent sudden movement of the arm toward the base, most such arrangements transfer the angular momentum to the swing arm/base assembly. Depending on the weight and balance of the saw, the angular momentum may be sufficient to cause the entire saw to overturn. Therefore, it may be desirable to secure the base to a stable surface with clamps, bolts, etc.

Alternatively, the miter saw can be configured to absorb any angular momentum without allowing the swing arm to move downward. For example, the exemplary embodiment depicted in FIGS. 154 and 155 is configured with a pivotal motor assembly to allow the blade to move upward into the housing upon engagement with the pawl. Motor assembly 16 is connected to housing 1516 via pivot bolt, or axle, 1540, allowing the motor assembly to pivot about bolt 1540 in the direction of blade rotation. A spring 1542 is compressed between the housing and an anchor 1544 to bias the motor assembly against the direction of blade rotation. The motor assembly may include a lip 1546, which slides against a flange 1548 on the housing to hold the end of the motor assembly opposite the pivot bolt against the housing.

When the saw is in use, spring 1542 holds the motor assembly in a normal position rotated fully counter to the direction of blade rotation. However, once the pawl is released to engage the blade, the motor assembly and blade pivot upward against the bias of the spring. In this embodiment, the pawl is positioned at the front of the blade so that the pivot bolt 1540 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped.

While one exemplary implementation of safety system 18 in the context of a miter saw has been described, the invention should not be seen as limited to any particular implementation as the configuration and arrangement of safety system 18 may vary among miter saws and applications. For example, the pivoting motor assembly configuration may also be combined with one or more of the other systems described above which prevent the swing arm from pivoting suddenly toward the base. Further, it will be appreciated that the blade and motor assembly may be configured in any of a variety of ways to at least partially absorb the angular momentum of the blade.

FIG. 158 shows an alternative configuration of miter saw 1510 adapted to absorb the angular momentum of the blade. In this configuration, the miter saw includes two swing arms 1550 and 1552. One end 1554 of each swing arm is connected to base 1512, and the opposite end 1556 of each swing arm is connected to housing 1516, blade 40, and/or the motor assembly (not shown). The position of the swing arms relative to each other may vary depending on the swing arm motion desired. In FIG. 158, swing arm 1550 is connected to base 1512 somewhat below and forward of swing arm 1552. Typically, the motor assembly is rigidly attached to end 1556 of swing arm 1550, while housing 1516 is connected to rotate about end 1556 of swing arm 1550. End 1556 of swing arm 1552 is connected only to the housing. This arrangement replicates the motion of the motor assembly and trigger found on many conventional miter saws. Alternatively, the motor assembly may be connected to rotate about end 1556 of swing arm 1550 along with the housing.

The configuration shown in FIG. 158 causes the housing and/or motor assembly to rotate as the swing arms pivot. Significantly, when the swing arms move upward, the housing and/or motor assembly rotate in the same direction in which the blade rotates during cutting. As a result, when the pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, as described above, the miter saw configuration illustrated in FIG. 158 is adapted to absorb the angular momentum of the blade and translate that angular momentum into an upward force on the swing arm.

The configuration shown in FIG. 158 and described above illustrates a further alternative embodiment of a miter saw with safety system 18. Specifically, the safety system may be configured to move the blade of the cutting tool rapidly away from the user when contact with the user's body is detected in addition to, or instead of, stopping the blade. This alternative embodiment may be implemented in the context of any of the cutting tools described herein. For example, a table saw implemented with safety system 18 may include a swing arm adapted to pivot downward to pull the blade beneath the upper surface of the saw when a dangerous, or triggering, condition is detected, such as contact between the user and the blade while the blade is rotating. A spring (not shown) may be coupled to the swing arm to increase the speed with which it drops downward. It will be appreciated that similar implementations may be configured in the context of all the saws described herein. In the case of the miter saw, a electromagnetic leaf brake can be used to stop the movement of the arm upon contact with a user. In addition, the restraining mechanism can be used to release a spring to push the arm upward upon contact of the blade and user. With such systems, it may not be necessary to abruptly stop the blade to avoid injury.

Another example of a miter saw 1510 is shown in FIG. 159. As shown, saw 1510 illustrates another suitable mechanism for stopping the sudden downward movement of swing arm 1514 when safety system 18 is actuated and pawl 60 engages blade 40. Swing arm 1514 includes a cam portion 1560 having a cam surface 1562. Cam portion 1560 may be integral with the swing arm and housing 1516. A stopping pawl 1564 is mounted to vertical support 1566 adjacent cam surface 1562, and an actuator 1568 is positioned adjacent pawl 1564. The actuator is operatively coupled to the control and detection subsystems associated with brake pawl 60 and cartridge 80 so that when brake pawl 60 is released, actuator 1568 engages stopping pawl 1564. During normal operation, actuator 1568 maintains the pawl spaced-apart from cam surface 1562. However, once contact between the blade and the user's body is detected, the detection system sends an actuation signal to actuator 1568, which may be the same or a different signal that triggers the release of brake pawl 60. In any event, upon receipt of the actuation signal, the actuator drives against stopping pawl 1564, causing it to pivot into cam surface 1562, preventing further movement of the swing arm. Stopping pawl 1564 may be constructed or coated with a high friction material such as rubber, and/or may be configured with teeth, etc., to increase its braking action. Cam portion 1560 may be modified so that it extends as fat as possible from the point around which it pivots, in order to provide as great a moment arm as possible to help stop the downward motion of the swing arm.

Safety system 22 may also protect the user from injury by wrapping the blade with a protective surface upon detection of a dangerous, or triggering, condition. Alternatively, or additionally, system 22 may protect the user by disabling the teeth of the blade. Examples of these embodiments of safety system 22 are described in Section 12 above.

Miter saws equipped with the disclosed systems and methods may be described as set forth in the following numbered paragraphs. These paragraphs are intended as illustrative, and are not intended to limit the disclosure or claims in any way. Changes and modifications may be made to the following descriptions without departing from the scope of the disclosure.

14.1 A miter saw comprising:
a base;
a blade supported by the base;
a detection system adapted to detect a dangerous condition between a person and the blade; and
a reaction system associated with the detection system to cause a predetermined action to take place upon detection of the dangerous condition.

14.1.1 The miter saw of paragraph 14.1 where the reaction system includes a brake system to brake the blade.

14.1.2 The miter saw of paragraph 14.1 where the reaction system includes a mechanism to retract the blade.

14.1.3 The miter saw of paragraph 14.1 where the reaction system includes a mechanism to cover the blade.

14.2 A miter saw comprising:
a base;
a swing arm supported by the base and adapted to move toward a workpiece to be cut;
a blade mounted to move with the swing arm to contact the workpiece when the pivot arm moves toward the workpiece;
a detection system adapted to detect a dangerous condition between a person and the blade; and
a reaction system adapted to interrupt the movement of the blade and swing arm upon the detection by the detection system of the dangerous condition between the person and the blade.

Section 15: Circular Saw

FIG. 162 illustrates safety system 18 implemented in the context of a hand-held circular saw 1500. Typically, circular saw 1500 includes a housing 1502 that contains a motor assembly (not shown), a guide plate 1504, and a retractable blade guard 1506. Blade 40 is coupled to the motor assembly by arbor 42. Safety system 18 may be implemented on saw 1500 according to any of the embodiments and configurations described above. In the exemplary implementation depicted in FIG. 162, the safety system is illustrated as a cartridge-based system. Cartridge 1508 includes a pawl 60, and is attachable to housing 1502 so that the pawl may engage the blade. Charge plates (not shown) may be mounted to an inner surface of the housing adjacent the blade or any other location suitable to capacitively couple the input signal across the blade and detect contact. The cartridge and pawl are shown as mounted adjacent the front of the blade to avoid interference with blade guard 1506. Alternatively, the pawl and cartridge may be mounted adjacent any other portion of the blade.

As described above, safety system 18 may be implemented on a circular saw with a brake pawl that engages and stops the blade. Alternatively, or additionally, safety system 18 may be configured to take other action to prevent serious injury to the user. As one example, safety system 18 may include a fast-acting actuator, such as a spring, adapted to push guide plate 1504 down quickly. This would serve to push the user's hand or body away from the blade by retracting the blade above the guide plate.

Circular saws equipped with the disclosed systems and methods may be described as set forth in the following numbered paragraphs. These paragraphs are intended as illustrative, and are not intended to limit the disclosure or claims in any way. Changes and modifications may be made to the following descriptions without departing from the scope of the disclosure.

15.1 A circular saw comprising:
a blade supported in a housing;
a detection system adapted to detect a dangerous condition between a person and the blade; and
a reaction system associated with the detection system to cause a predetermined action to take place upon detection of the dangerous condition.

15.1.1 The circular saw of paragraph 15.1 where the reaction system includes a brake system to brake the blade.

15.1.2 The circular saw of paragraph 15.1 where the reaction system includes a mechanism to retract the blade.

15.1.3 The circular saw of paragraph 15.1 where the reaction system includes a mechanism to cover the blade.

INDUSTRIAL APPLICABILITY

The present invention is applicable to power equipment, and specifically to woodworking equipment such as table saws, miter saws, chop saws, band saws, circular saws, jointers, etc.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

The invention claimed is:

1. A machine comprising:
an operative structure adapted to perform a task, where the operative structure includes a circular blade having a perimeter and teeth disposed about the perimeter, where the blade is adapted to spin, and where the blade when spinning cuts an object that moves into contact with the teeth;
a detection circuit to detect when a person is in contact with the teeth when the blade is spinning, where the detection circuit includes an oscillator that generates an oscillating signal, where the detection circuit also includes an electrical connection between the oscillator and the blade, where the oscillating signal is imparted on the blade through the electrical connection, where the detection circuit further includes a controller that detects a change in the oscillating signal on the blade indicative of the person being in contact with the teeth when the blade is spinning, and where the detection circuit generates a detection signal when the controller detects the change in the oscillating signal on the blade;
a firing circuit connected to the detection circuit to receive the detection signal, where the firing circuit outputs electric current upon receiving the detection signal;
an electrically triggerable actuator connected to the firing circuit to receive the electric current output by the firing circuit, where the actuator generates a force that causes the blade to stop cutting the object; and
an override, selectively engageable by a user, where the override, when engaged, prevents the firing circuit from outputting the electric current.

2. The machine of claim 1, further including a visual indicator viewable by a user to inform the user the override is engaged.

3. The machine of claim 1, where the operative structure includes a motor to spin the blade; and where the user can engage the override only as part of a process of starting the motor.

4. The machine of claim 1, where the operative structure includes a motor to spin the blade; where the motor can be on or off; and where the override, if engaged while the motor is on, will be disengaged automatically when the motor is off.

5. The machine of claim 1, where the operative structure includes a motor to spin the blade, where the motor can be turned on by a user performing a first action, and where engagement of the override requires a user to perform a second action in addition to and different from the first action.

6. The machine of claim 1, further comprising a motor to spin the blade, a motor on/off switch, and an override switch, and where the override is engaged by switching the override switch and subsequently switching the motor on/off switch.

7. A machine comprising:
an operative structure adapted to perform a task, where the operative structure includes a circular blade having a perimeter and teeth disposed about the perimeter, where the blade is adapted to spin, and where the blade when spinning cuts an object that moves into contact with the teeth;
a selectively operable motor to spin the blade;
a detection circuit to detect when a person is in contact with the teeth when the blade is spinning, where the detection circuit includes an oscillator that generates an oscillating signal, where the detection circuit also includes an electrical connection between the oscillator and the blade, where the oscillating signal is imparted on the blade through the electrical connection, where the detection circuit further includes a controller that detects a change in the oscillating signal on the blade indicative of the person being in contact with the teeth when the blade is spinning, and where the detection circuit generates a detection signal when the controller detects the change in the oscillating signal on the blade;
a firing circuit connected to the detection circuit to receive the detection signal, where the firing circuit outputs electric current upon receiving the detection signal;
an electrically triggerable actuator connected to the firing circuit to receive the electric current output by the firing circuit, where the actuator generates a force that causes the blade to stop cutting the object; and
where the machine includes a normal mode of operation where the detection circuit generates the detection signal when the controller detects the change in the oscillating signal on the blade when the blade is spinning, and a selectively engageable override mode where the detection circuit does not generate the detection signal when the controller detects the change in the oscillating signal on the blade when the blade is spinning.

8. The machine of claim 7, further including a visual indicator viewable by a user to inform the user the override mode is engaged.

9. The machine of claim 7, where the override mode can be engaged only as part of a process of starting the motor.

10. The machine of claim 7, where the override mode, if engaged while the motor is on, will be disengaged automatically when the motor is off.

11. The machine of claim 7, where the motor can be turned on by a user performing a first action, and where engagement of the override mode requires a user to perform a second action in addition to and different from the first action.

12. The machine of claim 7, further comprising a motor on/off switch and an override switch; where the override mode is engaged by switching the override switch and subsequently switching the motor on/off switch.

\* \* \* \* \*